US 8,885,948 B2

(12) United States Patent
Holeva et al.

(10) Patent No.: US 8,885,948 B2
(45) Date of Patent: Nov. 11, 2014

(54) IDENTIFYING AND EVALUATING POTENTIAL CENTER STRINGERS OF A PALLET IN AN IMAGE SCENE

(71) Applicants: Lee F. Holeva, Ft. Wayne, IN (US); Edwin R. Elston, El Paso, TX (US); Michael J. Seelinger, South Bend, IN (US); John-David S. Yoder, Bluffton, OH (US)

(72) Inventors: Lee F. Holeva, Ft. Wayne, IN (US); Edwin R. Elston, El Paso, TX (US); Michael J. Seelinger, South Bend, IN (US); John-David S. Yoder, Bluffton, OH (US)

(73) Assignee: Crown Equipment Corporation, New Bremen, OH (US)

( * ) Notice: Subject to any disclaimer, the term of this patent is extended or adjusted under 35 U.S.C. 154(b) by 133 days.

(21) Appl. No.: 13/652,546

(22) Filed: Oct. 16, 2012

(65) Prior Publication Data

US 2013/0101228 A1 Apr. 25, 2013

Related U.S. Application Data

(60) Provisional application No. 61/548,776, filed on Oct. 19, 2011, provisional application No. 61/569,596, filed on Dec. 12, 2011, provisional application No. 61/709,611, filed on Oct. 4, 2012.

(51) Int. Cl.
*G06K 9/46* (2006.01)
*G06T 7/00* (2006.01)
*B66F 9/12* (2006.01)
*B66F 9/24* (2006.01)

(52) U.S. Cl.
CPC .............. *G06T 7/0085* (2013.01); *B66F 9/122* (2013.01); *B66F 9/24* (2013.01); *G06T 2207/10016* (2013.01)
USPC ............................. 382/202; 382/181; 382/199

(58) Field of Classification Search
CPC ................... G06T 2207/10016; G06T 7/0085; B66F 9/24; B66F 9/122; B66F 9/0755; G65G 47/90; B65G 47/905; B65G 61/00
USPC .......................................... 382/190, 202, 208
See application file for complete search history.

(56) References Cited

U.S. PATENT DOCUMENTS 3,069,654 A 12/1962 Hough
3,672,470 A 6/1972 Ohntrup et al.
(Continued)

FOREIGN PATENT DOCUMENTS

CA 2144886 A1 9/1996
DE 4141925 A1 6/1993
(Continued)

OTHER PUBLICATIONS

Pozzi, Christian; International Search Report and Written Opinion; International Application No. PCT/US2012/060329; Jan. 22, 2013; European Patent Office.
(Continued)

*Primary Examiner* — Edward Park
(74) *Attorney, Agent, or Firm* — Stevens & Showalter LLP

(57) ABSTRACT

A method is provided for evaluating a possible center stringer of a pallet. The method may comprise providing a first Ro image; providing a second Ro image comprising pixels that may generally correspond to an orthogonal distance from an origin point to one or more possible vertical right lines in the corresponding gray scale image; identifying, using a computer, a possible lower left corner location of a center stringer in the corresponding gray scale image; determining, using the computer, an upper left corner location based on the possible lower left corner location; identifying, using the computer, a possible lower right corner location of the center stringer in the corresponding gray scale image; and determining, using the computer, an upper right corner location based on the possible lower right corner location.

39 Claims, 70 Drawing Sheets

(56) References Cited

U.S. PATENT DOCUMENTS

| | | | |
|---|---|---|---|
| 3,854,820 A | 12/1974 | Hansen | |
| 4,122,957 A | 10/1978 | Allen et al. | |
| 4,224,657 A | 9/1980 | Olson | |
| 4,279,328 A | 7/1981 | Ahlbom | |
| 4,331,417 A | 5/1982 | Shearer, Jr. | |
| 4,411,577 A | 10/1983 | Shearer, Jr. | |
| 4,490,848 A | 12/1984 | Beall et al. | |
| 4,547,844 A | 10/1985 | Adams | |
| 4,564,085 A | 1/1986 | Melocik et al. | |
| 4,678,329 A | 7/1987 | Lukowski, Jr. et al. | |
| 4,679,329 A | 7/1987 | Goldsmith et al. | |
| 4,684,247 A | 8/1987 | Hammill, III | |
| 5,208,753 A | 5/1993 | Acuff | |
| 5,300,869 A | 4/1994 | Skaar et al. | |
| 5,318,219 A | 6/1994 | Smith | |
| 5,586,620 A | 12/1996 | Dammeyer et al. | |
| 5,738,187 A | 4/1998 | Dammeyer et al. | |
| 5,749,696 A | 5/1998 | Johnson | |
| 5,812,395 A | 9/1998 | Masciangelo et al. | |
| 5,832,138 A | 11/1998 | Nakanishi et al. | |
| 5,938,710 A | 8/1999 | Lanza et al. | |
| 6,052,627 A * | 4/2000 | Nakamura | 700/182 |
| 6,150,938 A | 11/2000 | Sower et al. | |
| 6,194,860 B1 | 2/2001 | Seelinger et al. | |
| RE37,215 E | 6/2001 | Dammeyer et al. | |
| 6,246,476 B1 | 6/2001 | Frohn et al. | |
| 6,388,748 B1 | 5/2002 | Kokura | |
| 6,411,210 B1 | 6/2002 | Sower et al. | |
| 6,713,750 B2 | 3/2004 | Goddard | |
| 6,795,187 B2 | 9/2004 | Kokura | |
| 6,952,488 B2 | 10/2005 | Kelly et al. | |
| 7,010,404 B2 | 3/2006 | Ichijo et al. | |
| 7,219,769 B2 | 5/2007 | Yamanouchi et al. | |
| 7,221,776 B2 | 5/2007 | Xiong | |
| 7,274,970 B2 | 9/2007 | Schuchard | |
| 7,320,385 B2 | 1/2008 | Katae et al. | |
| 7,379,564 B2 | 5/2008 | Kakinami et al. | |
| 7,487,020 B2 | 2/2009 | Iwazaki et al. | |
| 7,648,329 B2 | 1/2010 | Chilson et al. | |
| 7,765,668 B2 | 8/2010 | Townsend et al. | |
| 8,542,276 B2 | 9/2013 | Huang et al. | |
| 8,553,982 B2 | 10/2013 | Tong et al. | |
| 8,561,897 B2 | 10/2013 | Kunzig et al. | |
| 8,565,913 B2 | 10/2013 | Emanuel et al. | |
| 8,599,268 B2 | 12/2013 | Niinami | |
| 2002/0054210 A1 | 5/2002 | Glier et al. | |
| 2003/0008385 A1 | 1/2003 | Tweedie et al. | |
| 2003/0044047 A1 | 3/2003 | Kelly et al. | |
| 2004/0073359 A1 | 4/2004 | Ichijo et al. | |
| 2004/0086364 A1* | 5/2004 | Watanabe et al. | 414/416.01 |
| 2006/0018524 A1 | 1/2006 | Suzuki et al. | |
| 2006/0263182 A1 | 11/2006 | Mizner | |
| 2007/0026872 A1 | 2/2007 | Fiegert et al. | |
| 2007/0059135 A1 | 3/2007 | Mizner | |
| 2007/0098264 A1 | 5/2007 | Van Lier et al. | |
| 2007/0143979 A1* | 6/2007 | Townsend et al. | 29/402.01 |
| 2007/0154295 A1 | 7/2007 | Kuriakose | |
| 2007/0183663 A1 | 8/2007 | Wang et al. | |
| 2008/0011554 A1 | 1/2008 | Broesel et al. | |
| 2008/0106746 A1 | 5/2008 | Shpunt et al. | |
| 2008/0152208 A1 | 6/2008 | Zahniser | |
| 2009/0003652 A1 | 1/2009 | Steinberg et al. | |
| 2009/0060349 A1 | 3/2009 | Linaker et al. | |
| 2009/0304229 A1 | 12/2009 | Hampapur et al. | |
| 2010/0063692 A1 | 3/2010 | Madsen et al. | |
| 2010/0091094 A1 | 4/2010 | Sekowski | |
| 2011/0003640 A9 | 1/2011 | Ehrman | |
| 2011/0088979 A1 | 4/2011 | Bandringa et al. | |
| 2011/0157379 A1 | 6/2011 | Kimura | |
| 2011/0175998 A1 | 7/2011 | Azuma et al. | |
| 2011/0216185 A1 | 9/2011 | Laws et al. | |
| 2011/0216201 A1 | 9/2011 | McAndrew et al. | |
| 2011/0218670 A1 | 9/2011 | Bell et al. | |
| 2011/0257776 A1 | 10/2011 | Townsend et al. | |
| 2011/0288667 A1 | 11/2011 | Noda et al. | |
| 2012/0002056 A1 | 1/2012 | Nam et al. | |
| 2012/0095575 A1 | 4/2012 | Meinherz et al. | |
| 2012/0123614 A1 | 5/2012 | Laws et al. | |
| 2012/0126000 A1 | 5/2012 | Kunzig et al. | |
| 2012/0134576 A1 | 5/2012 | Sharma et al. | |
| 2012/0303176 A1 | 11/2012 | Wong et al. | |
| 2012/0327190 A1 | 12/2012 | Massanell et al. | |
| 2013/0054129 A1 | 2/2013 | Wong et al. | |

FOREIGN PATENT DOCUMENTS

| | | |
|---|---|---|
| DE | 4405770 A1 | 8/1995 |
| EP | 0712697 A2 | 5/1996 |
| EP | 0800129 A1 | 8/1997 |
| EP | 1361190 A1 | 11/2003 |
| EP | 1408001 A1 | 4/2004 |
| EP | 1502896 A1 | 2/2005 |
| EP | 2468678 A1 | 6/2012 |
| FR | 2815450 A1 | 4/2002 |
| GB | 2019809 A | 11/1979 |
| GB | 2359291 A | 8/2001 |
| JP | 4298453 A | 10/1992 |
| JP | 07257270 A | 10/1995 |
| JP | 09030324 A | 2/1997 |
| JP | 09278397 A | 10/1997 |
| JP | 2001002395 A | 1/2001 |
| JP | 2001122598 A | 5/2001 |
| JP | 2001139291 A | 5/2001 |
| JP | 20011392298 A | 5/2001 |
| JP | 2001206684 A | 7/2001 |
| JP | 2002241094 A | 8/2002 |
| JP | 2003192295 A | 7/2003 |
| JP | 2003341996 A | 12/2003 |
| JP | 2005104652 A | 4/2005 |
| JP | 3932811 B2 | 3/2007 |
| WO | 8702484 A1 | 4/1987 |
| WO | 2005006252 A1 | 1/2005 |
| WO | 2005108146 A1 | 11/2005 |
| WO | 2005108246 A2 | 11/2005 |
| WO | 2008057504 A2 | 5/2008 |
| WO | 2011108944 A2 | 9/2011 |

OTHER PUBLICATIONS

Pozzi, Christian; International Search Report and Written Opinion; International Application No. PCT/US2012/060332; Jan. 22, 2013; European Patent Office.

Kuhnen, Leila; International Search Report and Written Opinion; International Application No. PCT/US2012/060333; Jan. 16, 2013; European Patent Office.

Kuhnen, Leila; International Search Report and Written Opinion; International Application No. PCT/US2012/060334; Jan. 16, 2013; European Patent Office.

Pozzi, Christian; International Search Report and Written Opinion; International Application No. PCT/US2012/060336; Jan. 22, 2013; European Patent Office.

Kuhnen, Leila; International Search Report and Written Opinion; International Application No. PCT/US2012/060339; Jan. 16, 2013; European Patent Office.

Kuhnen, Leila; International Search Report and Written Opinion; International Application No. PCT/US2012/060340; Jan. 30, 2013; European Patent Office.

Kuhnen, Leila; International Search Report and Written Opinion; International Application No. PCT/US2012/060343; Jan. 16, 2013; European Patent Office.

Kuhnen, Leila; International Search Report and Written Opinion; International Application No. PCT/US2012/060348; Jan. 16, 2013; European Patent Office.

Kuhnen, Leila; International Search Report and Written Opinion; International Application No. PCT/US2012/060350; Jan. 30, 2013; European Patent Office.

Kuhnen, Leila; International Search Report and Written Opinion; International Application No. PCT/US2012/060352; Jan. 16, 2013; European Patent Office.

Rosales, R., et al.; 3D Trajectory Recovery for Tracking Multiple Objects and Trajectory Guided Recognition of Actions; Proc. IEEE Conference on Computer Vision and Pattern Recognition; pp. 117-123; Jun. 1999.

(56) References Cited

OTHER PUBLICATIONS

Mallon, J., et al.; Precise Radial Un-distortion of Images; Proc. of the 17th International Conference on Pattern Recognition; ICPR 2004; pp. 18-21; 2004.
Hu, Jiuxang, et al.; An Algorithm for Computing Extrinsic Camera Parameters for Accurate Stereo Photogrammetry of Clouds; Arizona State University; pp. 1-10; Technical Report; 2006.
Park, Seong-Woo, et al.; Real-Time Camera Calibration for Virtual Studio; Real-Time Imaging; vol. 6; pp. 433-448; 2000.
Cuevas, Erik, et al.; Kalman Filter for Vision Tracking; Technical Report B 05-12; pp. 1-18; Aug. 10, 2005.
Rimon, Elias, et al.; Projective Geometry for Three-Dimensional Computer Vision; Proceedings of the Seventh World Multiconference on Systemics, Cybernetics and Informatics; pp. 1-41; 2003.
Tsai, R.; A Versatile Camera Calibration Technique for High-Accuracy 3D Machine Vision Metrology Using Off-the-Shelf TV Cameras and Lenses; IEEE Journal of Robotics and Automation; vol. RA-3; No. 4; pp. 323-344; Aug. 1987.
Camera Calibration and 3D Reconstruction; Open CV2.0 C Reference; pp. 1-25; Sep. 2009.
Cucchiara, Rita, et al.; Focus Based Feature Extraction for Pallets Recognition; BMVC2000; pp. 1-10; www.bmva.org/bmvc/2000/papers/p70; Jan. 1, 2000.
Baxansky, Artemy, et al.; Single-Image Motion Deblurring Using a Low-Dimensional Hand Shake Blur Model; 2010 IEEE 26th Convention of Electrical and Electronics Engineers in Israel; pp. 97-100; Nov. 17, 2010.
Seelinger, Michael, et al.; Automatic Visual Guidance of a Forklift Engaging a Pallet; Robotics and Autonomous Systems; vol. 54, No. 12; ScienceDirect; pp. 1026-1038; Dec. 31, 2006; Elsevier Science Publisher.
Pages, J., et al.; A Computer Vision System for Autonomous Forklift Vehicles in Industrial Environments; Proc. of the 9th Mediterranean Conference on Control and Automation MEDS 2001; pp. 1-6; Jan. 1, 2001.
Katsoulas, D.K.; An Efficient Depalletizing System Based on 2D Range Imagery; Proceedings of the 2001 IEEE International Conference on Robotics and Automation; ICRA 2001; Seoul, Korea; pp. 305-312; May 21-26, 2001.
Gish, W., et al.; Hardware Antialiasing of Lines and Polygons; Proceedings of the 1992 Symposium on Interactive 3D Graphics; pp. 75-86; Jan. 1, 1992.
Cats Eye—Forklift Camera and Monitor; www.safetyinfo.com/equipment/forklifts/catseye.htm; 1 page; Believed to have been published prior to Sep. 14, 2009.
Oralco Products; http://www.gcaon.ca/orlaco_products.htm; Believed to have been published prior to Sep. 14, 2009.
Lift Truck Camera Systems; http://www.liftek.com/liftek_170.htm; Believed to have been published prior to Sep. 14, 2009.
Lyvers, Edward et al.; Subpixel Measurements Using A Moment-Based Edge Operator; IEEE Transactions on Pattern Analysis and Machine Intelligence; vol. 11, No. 12; pp. 1293-1309; Dec. 1989.
Line Detection; Application of the Hough Transform to Line Detection; Chapter 9; pp. 264-271; Believed to have been published prior to Sep. 20, 2011.
Cox, Earl; The Fuzzy Systems Handbook: A Practitioner's Guide to Building, Using, and Maintaining Fuzzy Systems; Chapter 4; Fuzzy Operators; pp. 109-121; 1994.
Abbaraju, Pranith et al.; Iris Recognition Using Corner Detection; Proceedings of the International Conference on Applied Computer Science; 5 pages; Sep. 15-17, 2010.
The Segmentation Problem; pp. 85-117; Believed to have been published before Oct. 16, 2012.
Seelinger, Michael et al.; Automatic Pallet Engagement by a Vision Guided Forklift; Robotics and Automation; 2005; ICRA 2005; Proceedings of the 2005 IEEE International Conference; IEEE; 2005; 6 pages.
Walter, Matthew R. et al.; Closed-loop Pallet Manipulation in Unstructured Environments; The 2010 IEEE/RSJ International Conference on Intelligent Robots and Systems; IEEE 2010; Oct. 18-22, 2010; pp. 5119-5126.
Accu-Fork Laser; Fork/Tine Position Laser; US-Laser, Inc.; Research/Design/Production; 2 pages; Published on or before May 29, 2009.
Raymond fork-tip laser ensure accuracy for reach-fork trucks; Source: IVT magazine; http://www.ivtinternational.com/new_php?NewsID=11777; 1 page; Apr. 2009.
Material Transport (AMTS); Material Transport (AMTS) Application; http://www.rec.ri.cmu.edu/projects/amts/application/index.php; 2013.
Park, Edward; Notice of Allowance and Fee(s) Due; U.S. Appl. No. 13/652,524; Feb. 21, 2014; United States Patent and Trademark Office; Alexandria, VA.
Nakhjavan, Shervin K.; Non-Final Office Action; U.S. Appl. No. 13/652,622; May 27, 2014; United States Patent and Trademark Office; Alexandria, VA.
Park, Soo Jin; Non-Final Office Action; U.S. Appl. No. 13/652,649; May 22, 2014; United States Patent and Trademark Office; Alexandria, VA.
Mariam, Daniel G.; Non-Final Office Action; U.S. Appl. No. 13/652,572; Jun. 2, 2014; United States Patent and Trademark Office; Alexandria, VA.
Mariam, Daniel G.; Non-Final Office Action; U.S. Appl. No. 13/652,640; Jun. 10, 2014; United States Patent and Trademark Office; Alexandria, VA.
Mariam, Daniel G.; Non-Final Office Action; U.S. Appl. No. 13/652,534; Apr. 11, 2014; United States Patent and Trademark Office; Alexandria, VA.
Nakhjavan, Shervin K.; Non-Final Office Action; U.S. Appl. No. 13/652,510; Apr. 30, 2014; United States Patent and Trademark Office; Alexandria, VA.

* cited by examiner

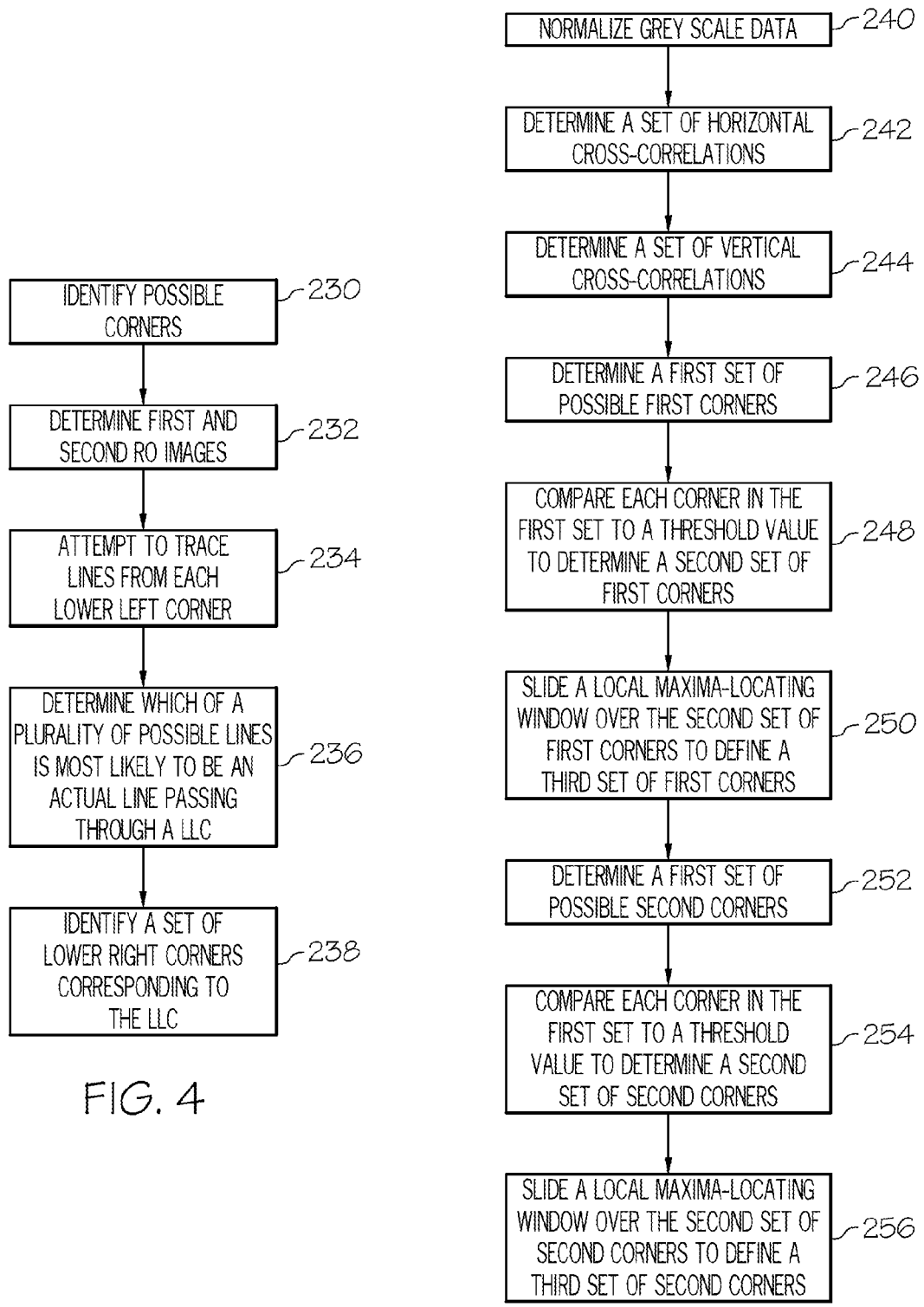

| COLUMN: | 1 | 2 | 3 | 4 | 5 | 6 | 7 | 8 | 9 | 10 | 11 |
|---|---|---|---|---|---|---|---|---|---|---|---|
| ROW 1 | 0 | 0 | 0 | 0 | 0 | 0 | 0 | 0 | 0 | 0 | 0 |
| 2 | 0 | 0.95 | 0 | 0 | 0 | 0 | 0 | 0 | 0 | 0 | 0 |
| 3 | 0 | 0 | 0 | 0 | 0 | 0 | 0 | 0 | 0 | 0 | 0 |
| 4 | 0 | 0 | 0 | 0 | 0 | 0 | 0 | 0 | 0 | 1 | 0 |
| 5 | 0 | 0 | 0 | 0 | 0 | 0 | 0 | 0 | 0 | 0 | 0 |
| 6 | 0 | 0 | 0 | 0 | 0 | 0.7 | 0.9 | 0.8 | 0 | 0 | 0 |

710

IS ANY VALUE IN COLUMN 6 GREATER THAN "MAX"?
NO
IS "MAX" STILL WITHIN 5 COLUMNS?
YES
MAX = 0.95
PIXEL [2,2]

10

| COLUMN: | 1 | 2 | 3 | 4 | 5 | 6 | 7 | 8 | 9 | 10 | 11 |
|---|---|---|---|---|---|---|---|---|---|---|---|
| ROW 1 | 0 | 0 | 0 | 0 | 0 | 0 | 0 | 0 | 0 | 0 | 0 |
| 2 | 0 | 0.95 | 0 | 0 | 0 | 0 | 0 | 0 | 0 | 0 | 0 |
| 3 | 0 | 0 | 0 | 0 | 0 | 0 | 0 | 0 | 0 | 0 | 0 |
| 4 | 0 | 0 | 0 | 0 | 0 | 0 | 0 | 0 | 0 | 1 | 0 |
| 5 | 0 | 0 | 0 | 0 | 0 | 0 | 0 | 0 | 0 | 0 | 0 |
| 6 | 0 | 0 | 0 | 0 | 0 | 0 | 0.9 | 0.8 | 0 | 0 | 0 |

710

IS ANY VALUE IN COLUMN 7 GREATER THAN "MAX"?
NO
IS "MAX" STILL WITHIN 5 COLUMNS?
NO
MAX = 0.9
PIXEL [7,6]

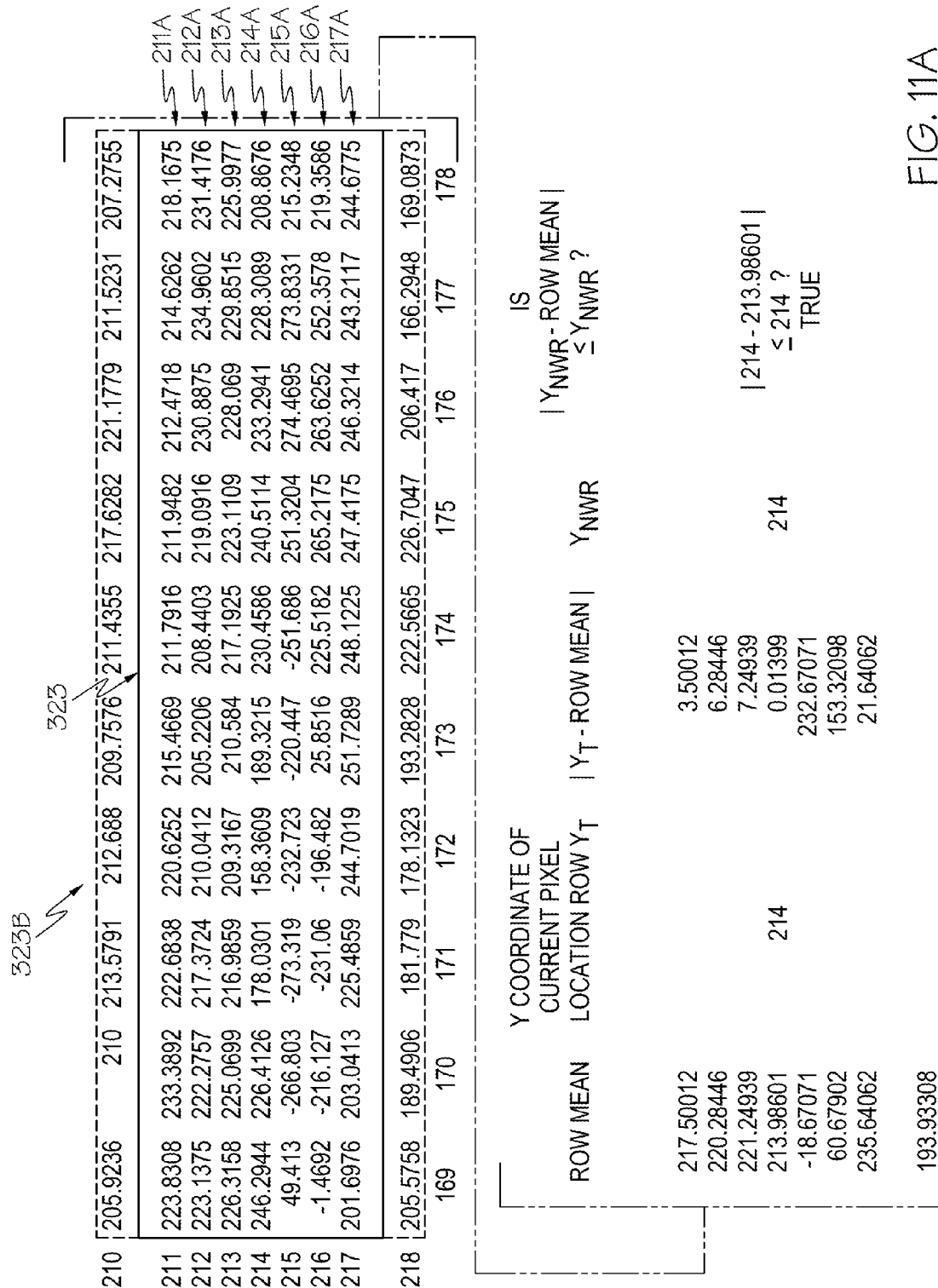

| | 175 | 176 | 177 | 178 | 179 | 180 | 181 |
|---|---|---|---|---|---|---|---|
| | | 176A | 177A | 178A | 179A | 180A | 371B |
| 209 | 193.5587 | 204.2889 | 217.9809 | 221.1231 | 212.7166 | 208.7468 | -249.045 |
| 210 | 217.6182 | 221.1779 | 223.3451 | 222.2126 | 215.3074 | 209.5663 | 13.7278 |
| 211 | 211.9482 | 212.4718 | 214.6262 | 218.1675 | 218.9573 | 216.961 | 229.7343 |
| 212 | 219.0916 | 230.8875 | 234.9602 | 231.4176 | 225.0797 | 219.9049 | 229.8073 |
| 213 | 223.1109 | 228.069 | 229.8515 | 225.9977 | 219.2508 | 216.0523 | -254.163 |
| 214 | 240.5114 | 233.2941 | 228.3089 | 208.8676 | 258.333 | 280.0523 | -183.559 |
| COL. MEAN | 221.6982 | 224.8455 | 221.2977 | 178 | 224.9408 | 225.2139 | |

X COORDINATE OF CURRENT PIXEL LOCATION = $X_T$:    178

$|X_T -$ COLUMN MEAN $|$    43.6982   46.84547   43.29768   46.9408   47.21393

$X_{NWC}$:    178

$|178 - 221.2977| \leq 267$ ??    TRUE

FIG. 11C

|  | 176 | 177 | 178 | 179 | 180 |
|---|---|---|---|---|---|
|  | ↙176B | ↙177B | ↙178B | ↙179B | ↙180B ↙371A |
| 208 | 169.0873 | 183.2462 | 209.1961 | 223.6425 | 240.0646 |
| 209 | 204.2889 | 217.9809 | 221.1231 | 212.7166 | 208.7468 |
| 210 | 221.1779 | 223.3451 | 222.2126 | 215.3074 | 209.5663 |
| 211 | 212.4718 | 214.6262 | 218.1675 | 218.9573 | 216.961 |
| 212 | 230.8875 | 234.9602 | 231.4176 | 225.0797 | 219.9049 |
| 213 | 228.069 | 229.8515 | 225.9977 | 219.2508 | 216.0523 |
| COL. MEAN | 210.9971 | 217.335 | 221.3524 | 219.1591 | 218.5493 |

X COORDINATE OF CURRENT PIXEL LOCATION = $X_T$ : 178

$|X_T -$ COLUMN MEAN $|$ : 32.99707  39.33502  43.35243  41.15905  40.54932

$X_{NWC}$ : 176

$| 176 - 210.9971 | \leq 264$ ?? TRUE

FIG. 11D

| K | X | 225 | 226 | 227 | 228 | 229 | 230 | 231 | 232 | W(k) |
|---|---|---|---|---|---|---|---|---|---|---|
| | Y | | | | | | | | | |
| 1 | 118 | -160.504 | -161.086 | -156.522 | -151.216 | -149.889 | -154.875 | -165.395 | -171.367 | -158.85683 |
| 2 | 119 | -166.446 | -169.69 | -164.313 | -154.386 | -151.494 | -159.241 | -173.045 | -167.497 | -163.26396 |
| 3 | 120 | -156.024 | -149.619 | -158.293 | -173.845 | -172.102 | -155.126 | -145.086 | -131.161 | -155.15703 |
| 4 | 121 | -153.746 | -174.936 | -182.435 | -191.434 | -202.163 | -217.245 | -258.804 | 182.5356 | -149.77846 |
| 5 | 122 | -94.2193 | 19.5223 | 60.5809 | 92.4008 | 120.4829 | 140.0854 | 144.5718 | 148.2598 | 78.960575 |
| 6 | 123 | 170.8996 | 156.9349 | 139.3569 | 136.2312 | 143.7376 | 146.4344 | 142.1387 | 144.9866 | 147.589988 |
| 7 | 124 | 181.505 | 169.919 | 158.8348 | 154.7692 | 154.3149 | 154.843 | 157.5592 | 167.5279 | 162.409125 |
| 8 | 125 | 202.8922 | 200.3976 | 195.9131 | 189.2054 | 180.1823 | 177.0259 | 174.671 | 168.8841 | 186.14645 |
| 9 | 126 | 223.6471 | 220.7945 | 204.4855 | 179.1394 | 158.4279 | 154.7078 | 160.3276 | 162.5138 | 183.00545 |
| 10 | 127 | 207.1781 | 222.4854 | 218.7002 | 193.0301 | 166.343 | 144.9357 | 127.345 | 125.2608 | 175.659788 |
| 11 | 128 | 170.6102 | 185.879 | 210.4715 | 199.1542 | 172.75 | 146.1599 | 169.2848 | 180.5064 | 179.352 |
| 12 | 129 | 182.8374 | 234.2422 | 171.3371 | 56.1715 | -99.995 | -81.7545 | -75.5744 | -90.0052 | 37.1573875 |
| 13 | 130 | -127.65 | -156.929 | -139.195 | -122.866 | -134.858 | -157.856 | -153.992 | -140.015 | -141.67 |

| $Y_{LLC}$ | W(k+1) > 0 | MEAN(W(1:k)) | MEAN(W(k+1:13)) | $\|Y_{LLC} - MEAN(W(k+1:13))\|$ $\leq Y_{LLC}$ | SUCCESS |
|---|---|---|---|---|---|
| 124 | | | | | |
| | N | -158.856825 | 45.03427604 | Y | N |
| | N | -161.0603938 | 63.97047955 | Y | N |
| | N | -159.0926042 | 85.88323 | Y | N |
| | Y | -156.7640688 | 112.0678625 | Y | N |
| | Y | -109.61914 | 116.2062734 | Y | N |
| | Y | -66.75095208 | 111.7228857 | Y | Y |
| | Y | -34.01379821 | 103.2751792 | Y | |
| | Y | -6.493767188 | 86.700925 | Y | |
| | Y | 14.56170139 | 62.62479375 | Y | |
| | Y | 30.67151 | 24.9464625 | Y | |
| | Y | 44.18791818 | -52.25630625 | Y | |
| | N | 43.60204063 | -141.67 | N | |
| | | 29.35034519 | | | |

FIRST k y=y+k-6

FIG. 14A

|  | X | 231 | 232 | 233 | 234 | 235 | 236 | 237 |
|---|---|---|---|---|---|---|---|---|
| Y | k | 1 | 2 | 3 | 4 | 5 | 6 | 7 |
| 121 |  | -258.804 | 182.5356 | 261.0071 | 262.6237 | 262.981 | 257.0072 | 245.73 |
| 122 |  | 144.5718 | 148.2598 | 178.3317 | 223.6241 | 247.5331 | 263.0229 | 263.0524 |
| 123 |  | 142.1387 | 144.9866 | 166.5167 | 191.3189 | 214.2287 | 236.8794 | 262.0135 |
| 124 |  | 157.5592 | 167.5279 | 189.0942 | 201.392 | 213.3024 | 222.0677 | 238.9276 |
|  |  | 46.36633 | 160.8275 | 198.7374 | 219.7397 | 234.5113 | 244.7443 | 252.4309 |
|  |  | 190.6337 | 76.17253 | 38.26258 | 17.26083 | 2.4887 | 7.7443 | 15.43088 |

$W(k)$ — 675
$|W - X_{LLC}|$
$k$
IS $|X_{LLC} - W(k)| \leq 355.5$ ?
$x = x + k - 6$

|  | X | 238 | 239 | 240 | 241 | 242 | 243 |
|---|---|---|---|---|---|---|---|
| Y | k | 8 | 9 | 10 | 11 | 12 | 13 |
|  |  | 248.839 | 265.984 | 262.3634 | 198.013 | 182.1957 | 183.2986 |
|  |  | 259.747 | 268.3199 | 266.5419 | 228.415 | 202.6785 | 167.3196 |
|  |  | 267.8989 | 265.9274 | 258.6412 | 229.668 | 229.6974 | 207.949 |
|  |  | 257.4829 | 255.6701 | 237.5588 | 215.244 | 193.8332 | 129.6808 |
|  |  | 258.492 | 263.9754 | 256.2763 | 217.835 | 202.1012 | 172.062 |
|  |  | 21.49195 | 26.97535 | 19.27633 | 19.165 | 34.8988 | 64.938 |

FIG. 14B

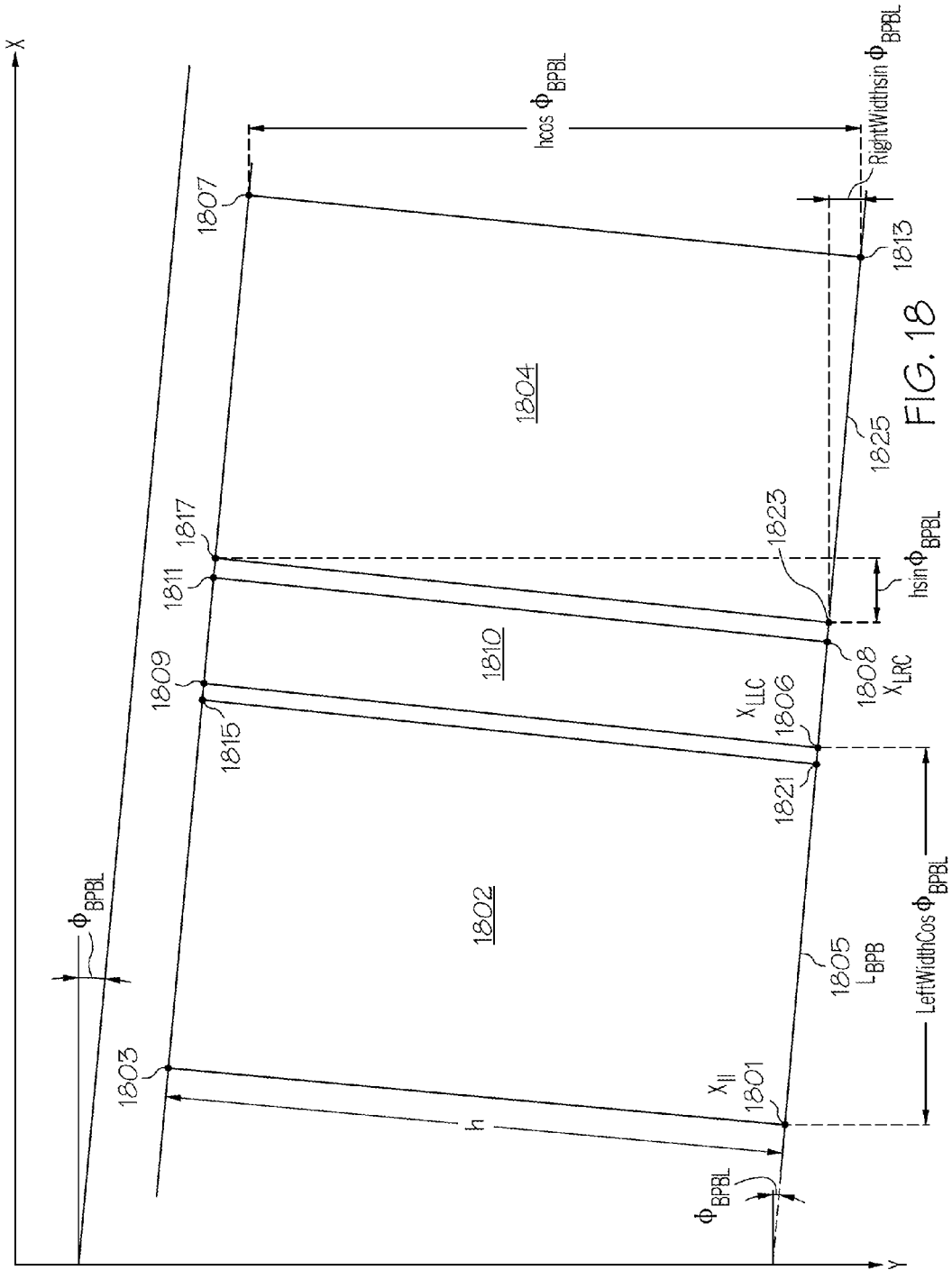

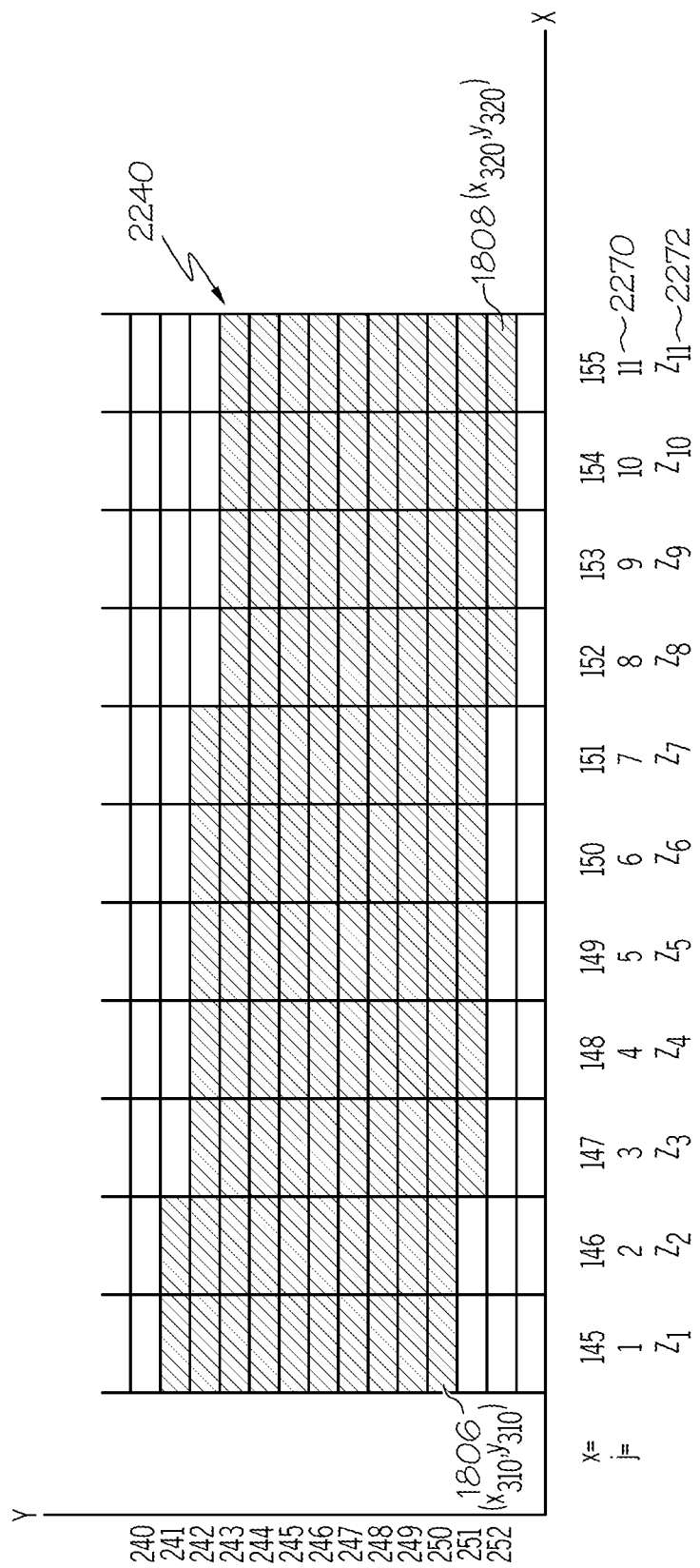

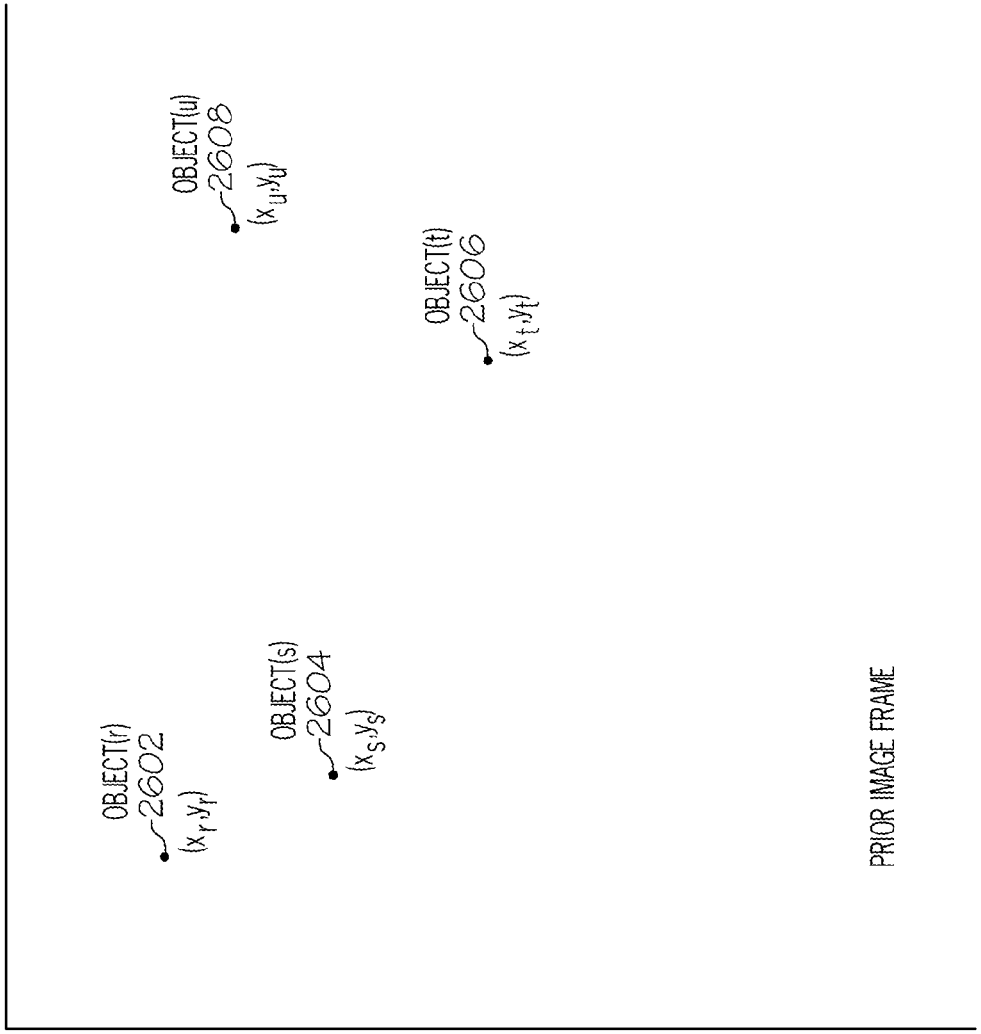

IDENTIFYING AND EVALUATING POTENTIAL CENTER STRINGERS OF A PALLET IN AN IMAGE SCENE

CROSS REFERENCE TO RELATED APPLICATIONS

This application claims the benefit of U.S. Provisional Patent Application Ser. No. 61/548,776, filed Oct. 19, 2011, entitled "SYSTEM FOR IMAGING AND LOCATING A PALLET TO BE PICKED"; claims the benefit of U.S. Provisional Patent Application Ser. No. 61/569,596, filed Dec. 12, 2011, entitled "SYSTEM FOR IMAGING AND LOCATING A PALLET TO BE PICKED"; and claims the benefit of U.S. Provisional Patent Application Ser. No. 61/709,611, filed Oct. 4, 2012, entitled "SYSTEM FOR IMAGING AND LOCATING A PALLET TO BE PICKED," the entire disclosure of each of these applications is hereby incorporated by reference herein.

FIELD OF THE INVENTION

The present invention relates generally to materials handling vehicles, and more particularly to a system for imaging and locating a pallet to be picked by the vehicle.

BACKGROUND OF THE INVENTION

In a typical warehouse or distribution center, palletized stock items are stored in racks or other storage structures that are aligned to each side of generally long, parallel extending aisles. To maximize available space, it is common for several storage structures to be vertically stacked, such that stock may be stored at elevated heights. Accordingly, an operator of a materials handling vehicle that is retrieving and/or putting away stock may be required to look upward from an operating position of the vehicle to identify the proper height and lateral position of the forks for stock to be retrieved or put away.

Positioning a forklift carriage to pick up or to put away palletized materials becomes increasingly more difficult at increasing heights. Visual perspective becomes more difficult. Extensive training can be required in order to effectively perform the positioning adjustments necessary. Even with sufficient ability, correct positioning can take more time than desired for efficient use of the materials handling vehicle and operator.

SUMMARY OF THE INVENTION

In accordance with a first aspect of the present invention, a method is provided for evaluating a possible center stringer of a pallet comprising: providing a first Ro image comprising pixels that may generally correspond to an orthogonal distance from an origin point to one or more possible vertical left lines in a corresponding gray scale image; providing a second Ro image comprising pixels that may generally correspond to an orthogonal distance from an origin point to one or more possible vertical right lines in the corresponding gray scale image; identifying, using a computer, a possible lower left corner location of a center stringer in the corresponding gray scale image; determining, using the computer, an upper left corner location based on the possible lower left corner location; identifying, using a computer, a possible lower right corner location of the center stringer in the corresponding gray scale image; and determining, using the computer, an upper right corner location based on the possible lower right corner location.

The upper left corner location may be horizontally aligned with the possible lower left corner location and located a predetermined number of pixels above the possible lower left corner location.

The upper right corner location may be horizontally aligned with the possible lower right corner location and located the predetermined number of pixels above the possible lower right corner location.

The method may further comprise calculating a left vertical stringer line extending between the possible lower left corner location and the upper left corner location.

Calculating a left vertical stringer line may comprise calculating:

$$\varphi_1 = \tan^{-1}\left(\frac{P_{LowerLeft}(y) - P_{UpperLeft}(y)}{P_{LowerLeft}(x) - P_{UpperLeft}(x)}\right)$$

$$\rho_{1desired} = -P_{LowerLeft}(x)\sin\varphi_1 + P_{LowerLeft}(y)\cos\varphi_1$$

wherein:

$\phi_1$=is an angle between a horizontal line and the left vertical stringer line;

$P_{LowerLeft}(y)$=a Y coordinate value for the possible lower left corner location;

$P_{UpperLeft}(y)$=a Y coordinate value for the upper left corner location;

$P_{LowerLeft}(x)$=an X coordinate value for the possible lower left corner location;

$P_{UpperLeft}(x)$=an X coordinate value for the upper left corner location;

$\rho_{1desired}$=an orthogonal distance from an origin point on the corresponding gray scale image to a vertical line passing through the possible lower left corner location and the upper left corner location.

The method may further comprise calculating a right vertical stringer line extending between the possible lower right corner location and the upper right corner location.

Calculating a right vertical stringer line may comprise calculating:

$$\varphi_2 = \tan^{-1}\left(\frac{P_{LowerRight}(y) - P_{UpperRight}(y)}{P_{LowerRight}(x) - P_{UpperRight}(x)}\right)$$

$$\rho_{2desired} = -P_{LowerRight}(x)\sin\varphi_2 + P_{LowerRight}(y)\cos\varphi_2$$

wherein:

$\phi_2$=is an angle between a horizontal line and the right vertical stringer line;

$P_{LowerRight}(y)$=a Y coordinate value for the possible lower right corner location;

$P_{UpperRight}(y)$=a Y coordinate value for the upper right corner location;

$P_{LowerRight}(x)$=an X coordinate value for the possible lower right corner location;

$P_{UpperRight}(x)$=an X coordinate value for the upper right corner location;

$\rho_{2desired}$=an orthogonal distance from an origin point on the corresponding gray scale image to a vertical line passing through the possible lower right corner location and the upper right corner location.

The method may further comprise identifying a plurality of contiguous pixel locations adjacent the possible lower left corner location and extending vertically upwards, the plurality of pixel locations comprising $h_{left}$ pixels, wherein:

$$h_{left} = \min(P_{LowerLeft}(y) - P_{UpperLeft}(y), 10).$$

The method may further comprise calculating a score value, $Score_{left}$, that represents a likelihood that the plurality of contiguous pixel locations correspond to an actual stringer left edge in the corresponding gray scale image, wherein:

$$Score_{left} = \frac{A_1}{h_{left}}$$

where $A_1$ is an accumulator value that is incremented each time the following inequality is true:

$$|\rho(x_i, y_i) - \rho_{1desired}| \leq TOL4 * \rho_{1desired}$$

wherein:

i=an index value referring to x and y coordinates of one particular pixel location of the plurality of contiguous pixel locations, the index value ranging from 1 to $h_{left}$;

$\rho(x_i,y_i)$=a value of an $i^{th}$ pixel in the first Ro image at the one particular pixel location of the plurality of contiguous pixel locations;

TOL4=an empirically determined value equal to 0.5.

The method may further comprise identifying a plurality of contiguous pixel locations adjacent the possible lower right corner and extending vertically upwards, the plurality of pixel locations comprising $h_{right}$ pixels, wherein:

$$h_{right} = \min(P_{LowerRight}(y) - P_{UpperRight}(y), 10).$$

The method may further comprise calculating a score value, $Score_{right}$, that represents a likelihood that the plurality of contiguous pixel locations correspond to an actual stringer right edge in the corresponding gray scale image, wherein:

$$Score_{right} = \frac{A_2}{h_{right}}$$

where $A_2$ is an accumulator value that is incremented each time the following inequality is true:

$$|\rho(x_j, y_j) - \rho_{2desired}| \leq TOL4 * \rho_{2desired}$$

wherein:

j=an index value referring to x and y coordinates of one particular pixel location of the plurality of contiguous pixel locations, the index value ranging from 1 to $h_{right}$;

$\rho(x_j,y_j)$=a value of all $j^{th}$ pixel in the second Ro image at the one particular pixel location of the plurality of contiguous pixel locations;

TOL4=an empirically determined value equal to 0.5.

In accordance with a second aspect of the present invention, a system is provided for evaluating a possible center stringer of a pallet comprising: a memory storage device; a processor configured to execute instructions stored in the memory storage device; a first Ro image comprising pixels that may generally correspond to an orthogonal distance from an origin point to one or more possible vertical left lines in a corresponding gray scale image; a second Ro image comprising pixels that may generally correspond to an orthogonal distance from an origin point to one or more possible vertical right lines in the corresponding gray scale image; a component configured to identify a possible lower left corner location of a center stringer in the corresponding gray scale image; a component configured to determine an upper left corner location based on the possible lower left corner location; a component configured to identify a possible lower right corner location of the center stringer in the corresponding gray scale image; and a component configured to determine an upper right corner location based on the possible lower right corner location.

The upper left corner location may be horizontally aligned with the possible lower left corner location and located a predetermined number of pixels above the possible lower left corner location. The upper right corner location may be horizontally aligned with the possible lower right corner location and located the predetermined number of pixels above the possible lower right corner location.

The system may further comprise a component configured to calculate a left vertical stringer line extending between the possible lower left corner location and the upper left corner location. The component configured to calculate a left vertical stringer line may be configured to calculate:

$$\varphi_1 = \tan^{-1}\left(\frac{P_{LowerLeft}(y) - P_{UpperLeft}(y)}{P_{LowerLeft}(x) - P_{UpperLeft}(x)}\right)$$

$$\rho_{1desired} = -P_{LowerLeft}(x)\sin\varphi_1 + P_{LowerLeft}(y)\cos\varphi_1$$

wherein:

$\phi_1$=is an angle between a horizontal line and the left vertical stringer line;

$P_{LowerLeft}(y)$=a Y coordinate value for the possible lower left corner location;

$P_{UpperLeft}(y)$=a Y coordinate value for the upper left corner location;

$P_{LowerLeft}(x)$=an X coordinate value for the possible lower left corner location;

$P_{UpperLeft}(X)$=an X coordinate value for the upper left corner location;

$\rho_{1desired}$=an orthogonal distance from an origin point on the corresponding gray scale image to a vertical line passing through the possible lower left corner location and the upper left corner location.

The system may further comprise a component configured to calculate a right vertical stringer line extending between the possible lower right corner location and the upper right corner location. The component configured to calculate a right vertical stringer line may be configured to calculate:

$$\varphi_2 = \tan^{-1}\left(\frac{P_{LowerRight}(y) - P_{UpperRight}(y)}{P_{LowerRight}(x) - P_{UpperRight}(x)}\right)$$

$$\rho_{2desired} = -P_{LowerRight}(x)\sin\varphi_2 + P_{LowerRight}(y)\cos\varphi_2$$

wherein:

$\phi_2$=is an angle between a horizontal line and the right vertical stringer line;

$P_{LowerRight}(y)$=a Y coordinate value for the possible lower right corner location;

$P_{UpperRight}(y)$=a Y coordinate value for the upper right corner location;

$P_{LowerRight}(X)$=an X coordinate value for the possible lower right corner location;

$P_{UpperRight}(X)$=an X coordinate value for the upper right corner location;

$\rho_{2desired}$=an orthogonal distance from an origin point on the corresponding gray scale image to a vertical line passing through the possible lower right corner location and the upper right corner location.

The system may further comprise a component configured to identify a plurality of contiguous pixel locations adjacent the possible lower left corner location and extending vertically upwards, the plurality of pixel locations comprising $h_{left}$ pixels, wherein:

$$h_{left} = \min(P_{LowerLeft}(y) - P_{UpperLeft}(y), 10).$$

The system may further comprise a component configured to calculate a score value, $Score_{left}$, that represents a likelihood that the plurality of contiguous pixel locations correspond to an actual stringer left edge in the corresponding gray scale image, wherein:

$$Score_{left} = \frac{A_1}{h_{left}}$$

where $A_1$ is an accumulator value that is incremented each time the following inequality is true:

$$|\rho(x_i, y_i) - \rho_{1desired}| \leq TOL4 * \rho_{1desired}$$

wherein:
i=an index value referring to x and y coordinates of one particular pixel location of the plurality of contiguous pixel locations, the index value ranging from 1 to $h_{left}$;
$\rho(x_i, y_i)$=a value of an $i^{th}$ pixel in the first Ro image at the one particular pixel location of the plurality of contiguous pixel locations;
TOL4=an empirically determined value equal to 0.5.

The system may further comprise a component configured to identify a plurality of contiguous pixel locations adjacent the possible lower right corner and extending vertically upwards, the plurality of pixel locations comprising $h_{right}$ pixels, wherein:

$$h_{right} = \min(P_{LowerRight}(y) - P_{UpperRight}(y), 10).$$

The system may further comprise a component configured to calculate a score value, $Score_{right}$, that represents a likelihood that the plurality of contiguous pixel locations correspond to an actual stringer right edge in the corresponding gray scale image, wherein:

$$Score_{right} = \frac{A_2}{h_{right}}$$

where $A_2$ is an accumulator value that is incremented each time the following inequality is true:

$$|\rho(x_j, y_j) - \rho_{2desired}| \leq TOL4 * \rho_{2desired}$$

wherein:
j=an index value referring to x and y coordinates of one particular pixel location of the plurality of contiguous pixel locations, the index value ranging from 1 to $h_{right}$;
$\rho(x_j, y_j)$=a value of an $j^{th}$ pixel in the second Ro image at the one particular pixel location of the plurality of contiguous pixel locations;
TOL4=an empirically determined value equal to 0.5.

In accordance with a third aspect of the present invention, a computer program product is provided for evaluating a possible center stringer of a pallet. The computer program product may comprise a computer readable storage medium having computer readable program code embodied therewith. The computer readable program code may comprise: computer readable program code configured to analyze a first Ro image comprising pixels that may generally correspond to an orthogonal distance from an origin point to one or more possible vertical left lines in a corresponding gray scale image; computer readable program code configured to analyze a second Ro image comprising pixels that may generally correspond to an orthogonal distance from an origin point to one or more possible vertical right lines in the corresponding gray scale image; computer readable program code configured to identify a possible lower left corner location of a center stringer in the corresponding gray scale image; computer readable program code configured to determine an upper left corner location based on the possible lower left corner location; computer readable program code configured to identify a possible lower right corner location of the center stringer in the corresponding gray scale image; and computer readable program code configured to determine an upper right corner location based on the possible lower right corner location.

The upper left corner location may be horizontally aligned with the possible lower left corner location and located a predetermined number of pixels above the possible lower left corner location. The upper right corner location may be horizontally aligned with the possible lower right corner location and located the predetermined number of pixels above the possible lower right corner location.

The computer program product may further comprise computer readable program code configured to calculate a left vertical stringer line extending between the possible lower left corner location and the upper left corner location. The computer readable program code configured to calculate a left vertical stringer line may be configured to calculate:

$$\varphi_1 = \tan^{-1}\left(\frac{P_{LowerLeft}(y) - P_{UpperLeft}(y)}{P_{LowerLeft}(x) - P_{UpperLeft}(x)}\right)$$

$$\rho_{1desired} = -P_{LowerLeft}(x)\sin\varphi_1 + P_{LowerLeft}(y)\cos\varphi_1$$

wherein:
$\phi_1$=is an angle between a horizontal line and the left vertical stringer line;
$P_{LowerLeft}(y)$=a Y coordinate value for the possible lower left corner location;
$P_{UpperLeft}(y)$=a Y coordinate value for the upper left corner location;
$P_{LowerLeft}(X)$=an X coordinate value for the possible lower left corner location;
$P_{UpperLeft}(X)$=an X coordinate value for the upper left corner location;
$\rho_{1desired}$=an orthogonal distance from an origin point on the corresponding gray scale image to a vertical line passing through the possible lower left corner location and the upper left corner location.

The computer program product may further comprise computer readable program code configured to calculate a right vertical stringer line extending between the possible lower right corner location and the upper right corner location. The computer readable program code configured to calculate a right vertical stringer line may be configured to calculate:

$$\varphi_2 = \tan^{-1}\left(\frac{P_{LowerRight}(y) - P_{UpperRight}(y)}{P_{LowerRight}(x) - P_{UpperRight}(x)}\right)$$

$$\rho_{2desired} = -P_{LowerRight}(x)\sin\varphi_2 + P_{LowerRight}(y)\cos\varphi_2$$

wherein:
$\phi_2$=is an angle between a horizontal line and the right vertical stringer line;
$P_{LowerRight}(y)$=a Y coordinate value for the possible lower right corner location;

$P_{UpperRight}(y)$=a Y coordinate value for the upper right corner location;

$P_{LowerRight}(x)$=an X coordinate value for the possible lower right corner location;

$P_{UpperRight}(x)$=an X coordinate value for the upper right corner location;

$\rho_{2desired}$=an orthogonal distance from an origin point on the corresponding gray scale image to a vertical line passing through the possible lower right corner location and the upper right corner location.

The computer program product may further comprise computer readable program code configured to identify a plurality of contiguous pixel locations adjacent the possible lower left corner location and extending vertically upwards, the plurality of pixel locations comprising $h_{left}$ pixels, wherein:

$$h_{left}=\min(P_{LowerLeft}(y)-P_{UpperLeft}(y),10).$$

The computer program product may further comprise computer readable program code configured to calculate a score value, $Score_{left}$, that represents a likelihood that the plurality of contiguous pixel locations correspond to an actual stringer left edge in the corresponding gray scale image, wherein:

$$Score_{left} = \frac{A_1}{h_{left}}$$

where $A_1$ is an accumulator value that is incremented each time the following $$|\rho(x_i,y_i)-\rho_{1desired}| \le TOL4 * \rho_{1desired}$$

wherein:

i=an index value referring to x and y coordinates of one particular pixel location of the plurality of contiguous pixel locations, the index value ranging from 1 to $h_{left}$;

$\rho(x_i,y_i)$=a value of an $i^{th}$ pixel in the first Ro image at the one particular pixel location of the plurality of contiguous pixel locations;

TOL4=an empirically determined value equal to 0.5.

The computer program product may further comprise computer readable program code configured to identify a plurality of contiguous pixel locations adjacent the possible lower right corner and extending vertically upwards, the plurality of pixel locations comprising $h_{right}$ pixels, wherein:

$$h_{right}=\min(P_{LowerRight}(y)-P_{UpperRight}(y),10).$$

The computer program product may further comprise computer readable program code configured to calculate a score value, $score_{right}$, that represents a likelihood that the plurality of contiguous pixel locations correspond to an actual stringer right edge in the corresponding gray scale image, wherein:

$$Score_{right} = \frac{A_2}{h_{right}}$$

where $A_2$ is an accumulator value that is incremented each time the following inequality is true:

$$|\rho(x_j,y_j)-\rho_{2desired}| \le TOL4 * \rho_{2desired}$$

wherein:

j=an index value referring to x and y coordinates of one particular pixel location of the plurality of contiguous pixel locations, the index value ranging from 1 to $h_{right}$;

$\rho(x_j,y_j)$=a value of an $j^{th}$ pixel in the second Ro image at the one particular pixel location of the plurality of contiguous pixel locations;

TOL4=an empirically determined value equal to 0.5.

BRIEF DESCRIPTION OF THE DRAWINGS

FIG. 4 is a flow chart illustrating steps implemented by an image analysis computer in accordance with the present invention;

FIG. 5 is a flow chart illustrating steps implemented by the image analysis computer in accordance with the present invention for identifying possible pallet corners;

FIGS. 6C-6E illustrate an example for locating maximum pixel values in a lower left corner image;

FIGS. 11A-11D illustrate portions of a left Ro image including at least one window;

FIGS. 14A and 14B illustrate portions of a left Ro image including at least one window;

FIG. 18 illustrates a geometrical framework for evaluating potential holes and a center stringer of a pallet structure in accordance with the principles of the present invention;

FIG. 22C illustrates an example of a third rectangle that possibly represents a pallet center stringer;

FIGS. 26A and 26B depict a prior image frame and a next image frame with candidate objects in accordance with the principles of the present invention;

DETAILED DESCRIPTION OF THE INVENTION

Figure 1:
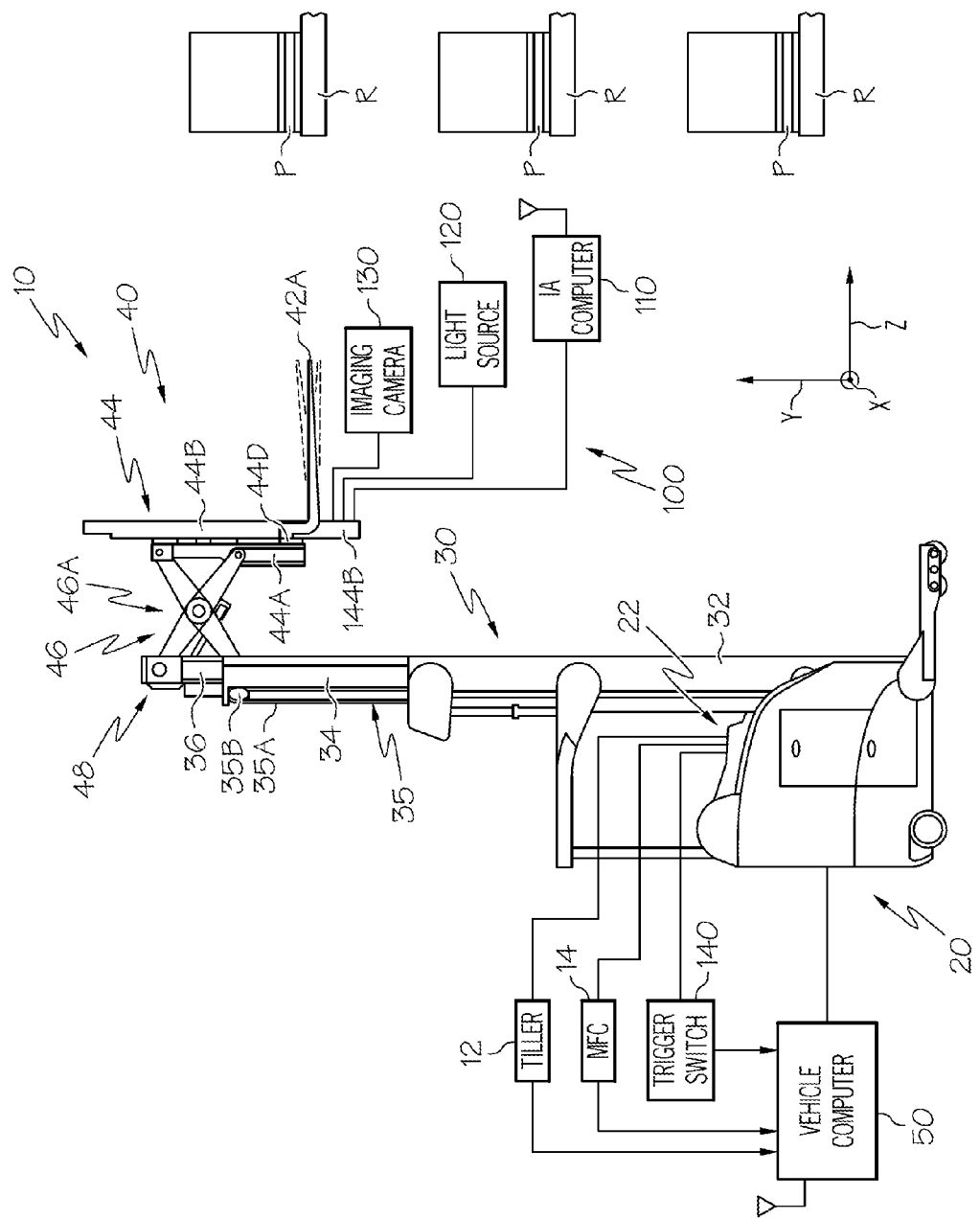
FIG. 1 is a side view of a materials handling vehicle in which an image-based detection system of the present invention is incorporated.

Reference is now made to FIG. 1, which illustrates a fork lift truck or vehicle 10 in which the present invention may be incorporated. The vehicle 10 comprises a power unit or main body 20 including an operator's compartment 22. The vehicle 10 further comprises a mast assembly 30 and a fork carriage apparatus 40, shown best in FIG. 2. While the present invention is described herein with reference to a stand-up counterbalanced truck, it will be apparent to those skilled in the art that the invention and variations of the invention can be more generally applied to a variety of other materials handling vehicles including a rider reach fork lift truck including a monomast, as described in U.S. Patent Application Publication No. 2010/0065377, the entire disclosure of which is incorporated herein by reference. The different types of vehicle 10 in which embodiments of the present invention may be incorporated include manual vehicles, semi-autonomous vehicles, and autonomous vehicles.

The mast assembly 30 includes first, second and third mast weldments 32, 34 and 36, wherein the second weldment 34 is nested within the first weldment 32 and the third weldment 36 is nested within the second weldment 34. The first weldment 32 is fixedly coupled to the truck main body 20. The second or intermediate weldment 34 is capable of vertical movement relative to the first weldment 32. The third or inner weldment 36 is capable of vertical movement relative to the first and second weldments 32 and 34.

First and second lift ram/cylinder assemblies 35 (only the first assembly is illustrated in FIG. 1) are coupled to the first and second weldments 32 and 34 for effecting movement of the second weldment 34 relative to the first weldment 32. Chains 35A (only the chain of the first assembly is illustrated in FIG. 1) are fixed to cylinders of the first and second lift assemblies and the third weldment 36 and extend over pulleys 35B (only the pulley of the first assembly is illustrated in FIG. 1) coupled to a corresponding one of the rams such that movement of rams of the first and second lift assemblies effects movement of the third weldment 36 relative to the first and second weldments 32 and 34.

The fork carriage apparatus 40 is coupled to the third stage weldment 36 so as to move vertically relative to the third stage weldment 36. The fork carriage apparatus 40 also moves vertically with the third stage weldment 36 relative to the first and second stage weldments 32 and 34.

Figure 2:
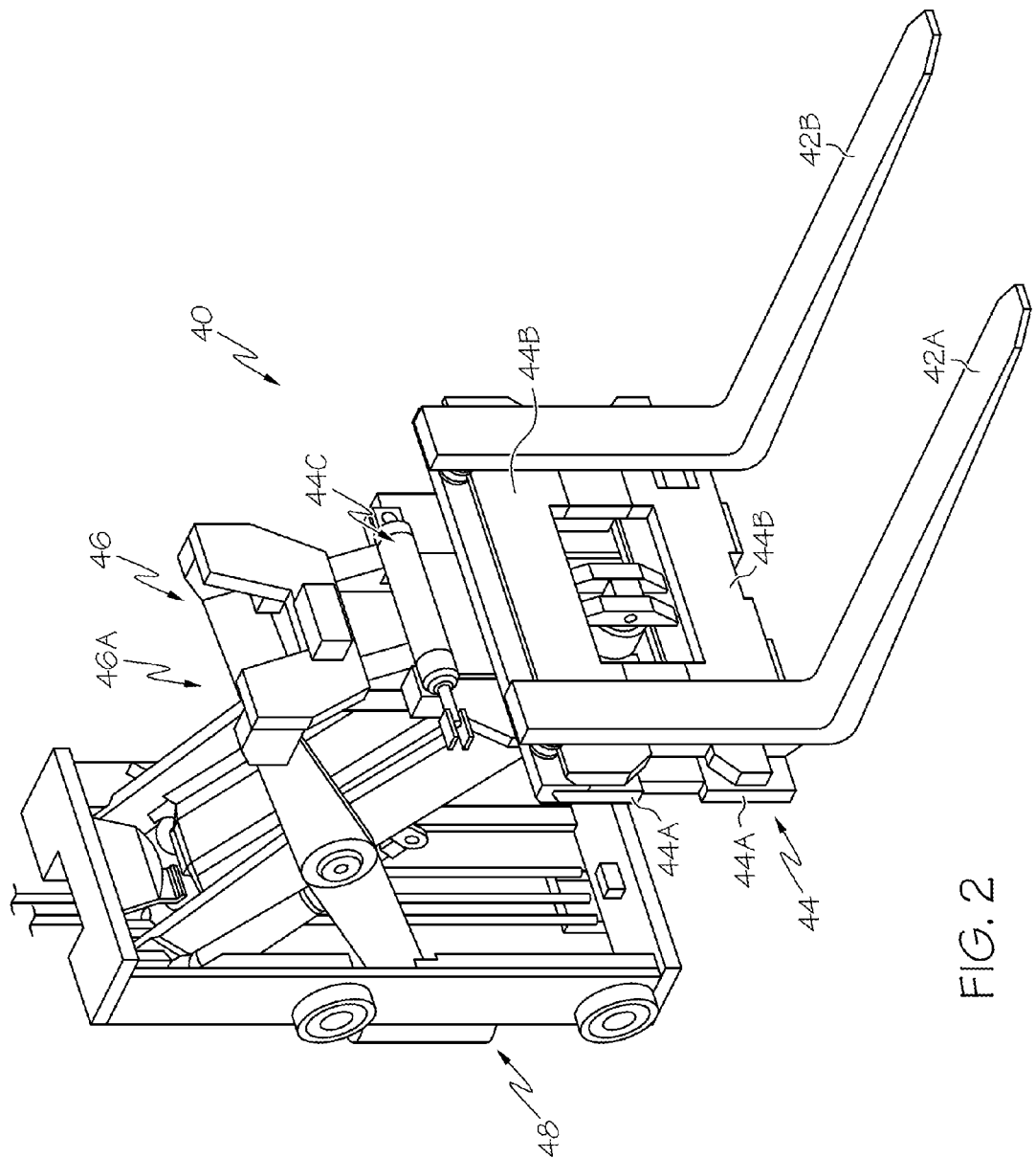
FIG. 2 is a perspective view of a fork carriage apparatus forming part of the vehicle illustrated in FIG. 1.

In the illustrated embodiment, the fork carriage apparatus 40 comprises a fork carriage mechanism 44 to which the first and second forks 42A and 42B are mounted, see FIGS. 1 and 2. The fork carriage mechanism 44 is mounted to a reach mechanism 46 which, in turn, is mounted to a mast carriage assembly 48. The mast carriage assembly 48 is movably coupled to the third weldment 36. The reach mechanism 46 comprises a pantograph or scissors structure 46A, which effects movement of the fork carriage mechanism 44 and the first and second forks 42A and 42B toward and away from the mast carriage assembly 48 and the third weldment 36.

The fork carriage mechanism 44 comprises a carriage support structure 44A and a fork carriage frame 44B. The forks 42A and 42B are mounted to the fork carriage frame 44B. The frame 44B is coupled to the carriage support structure 44A for lateral and pivotable movement relative to the support structure 44A. A side-shift piston/cylinder unit 44C is mounted to the carriage support structure 44A and the fork carriage frame 44B, so as to effect lateral movement of the fork carriage frame 44B relative to the carriage support structure 44A.

A tilt piston/cylinder unit 44D, shown only in FIG. 1, is fixedly attached to the carriage support structure 44A and contacts the fork carriage frame 44B for effecting pivotable movement of the fork carriage frame 44B relative to the carriage support structure 44A.

An operator standing in the compartment 22 may control the direction of travel of the truck 10 via a tiller 12. The operator may also control the travel speed of the truck 10, fork carriage apparatus and mast assembly extension, and tilt and side shift of the first and second forks 42A and 42B via a multifunction controller 14.

In accordance with the present invention, an image-based pallet detection system 100 is provided for repeatedly capturing images as the fork carriage apparatus 40 is raised and lowered, identifying one or more objects in image frames which may comprise one or more pallets, determining which of the one or more objects most likely comprises a pallet, tracking the one or more objects in a plurality of frames so as to determine their locations relative to the fork carriage apparatus 40 and generating and transmitting pallet location information to a vehicle computer 50 located on the vehicle power unit 20.

The system 100 comprises an image analysis computer 110 coupled to the fork carriage frame 44B, a light source 120 coupled to a lower section 144B of the fork carriage frame 44B, an imaging camera 130 coupled to the lower section 144B of the fork carriage frame 44B and a trigger switch 140 located in the operator's compartment 22 to actuate the system 100. While some mounting positions may be more preferable than others, the imaging camera and lights may be located either above or below the forks. It is desirable that the camera side shift with the forks, but it does not necessarily need to tilt with the forks. However the camera and lights are mounted, the forks should be in the bottom of the field of view to give maximum warning of an approaching pallet. In the illustrated embodiment, the imaging camera, 130 and the lights, 120, are below the forks, see FIG. 1. The computer 110 may be located anywhere on the truck. It is also possible that items 110, 120, and 130 may be combined into a single package, comprising a smart camera. The light source 120, in the illustrated embodiment, comprises a near infrared light source which can, for example, be one or more light emitting diodes (LEDs) that are on while the forks 42A and 42B are moving or are "pulsed" so as to be on only while an image is being acquired. The image analysis computer 110 may either with a wired cable or wirelessly transmit pallet identification and location information to the vehicle computer 50 such that the vehicle computer 50 may accurately position the forks 42A in 42B in vertical and lateral directions, as defined by a Y-axis and X-axis, respectfully, see FIG. 1.

The vehicle and image analysis computers 50 and 110 may comprise any kind of a device which receives input data, processes that data through computer instructions, and generates output data. Such a computer can be a hand-held device, laptop or notebook computer, desktop computer, microcomputer, digital signal processor (DSP), mainframe, server, cell phone, personal digital assistant, other programmable computer devices, or any combination thereof. Such computers can also be implemented using programmable logic devices such as field programmable gate arrays (FPGAs) or, alternatively, realized as application specific integrated circuits (ASICs) or similar devices. The term "computer" is also intended to encompass a combination of two or more of the above recited devices, e.g., two or more microcomputers. The vehicle and image analysis computers 50 and 110 may be connected wirelessly or hard-wired to one another. It is also contemplated that the computers 50 and 110 may be combined as a single computer. Accordingly, aspects of the present invention may be implemented entirely as hardware, entirely as software (including firmware, resident software, micro-code, etc.) or in a combined software and hardware implementation that may all generally be referred to herein as a "circuit," "module," "component," or "system." Furthermore, aspects of the present invention may take the form of a computer program product embodied in one or more computer readable media having computer readable program code embodied thereon.

When an operator wishes to pick a pallet P, the operator maneuvers the vehicle 10 such that it is positioned directly in front of and generally laterally aligned in the X-direction with a desired pallet P on a rack R to be picked, see FIG. 1. The operator then raises the forks 42A and 42B vertically in the Y-direction via actuation of the multifunction controller 14 to a position above the last pallet P which is to be ignored. The image analysis computer 110 causes the imaging camera 130 to take image frames, such as at a rate of 10-30 fps (frames/second), as the fork carriage apparatus 40 continues to move vertically. As will be discussed in greater detail below, the image analysis computer 110 analyzes the images, identifies one or more objects in the image frames, determines which of the one or more objects most likely comprises a pallet, tracks the one or more objects in a plurality of image frames, determines the location of the objects relative to a world coordinate origin and generates and transmits pallet location information to the vehicle computer 50. The image analysis computer 110 may also wirelessly transmit to the vehicle computer 50 pallet location information so that the vehicle computer 50 may accurately position the forks 42A and 42B in vertical and lateral directions such that the forks 42A and 42B are positioned directly in front of openings in the pallet. Thereafter, an operator need only cause the fork carriage apparatus to move toward the pallet such that the forks enter the pallet openings.

Figure 3:
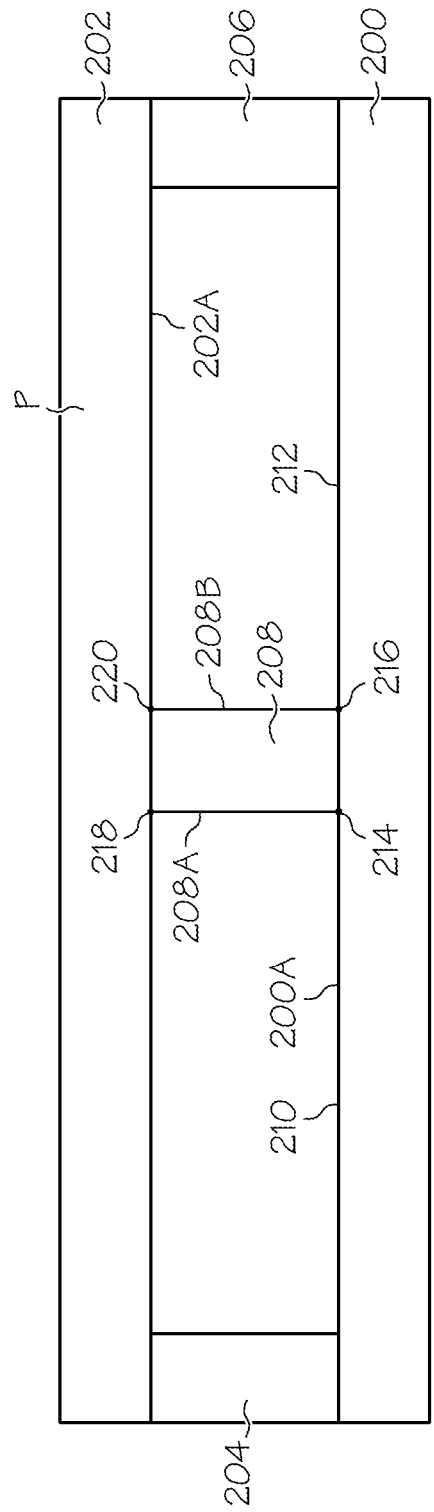
FIG. 3 is a front view of a pallet.

In FIG. 3, a pallet P is illustrated having bottom and top pallet boards 200 and 202 first and second outer stringers 204 and 206 and a center stringer 208. The boards 200, 202 and stringers 204, 206 and 208 define first and second fork receiving openings 210 and 212. The pallet boards 200 and 202 and the center stringer 208 also define a lower left corner 214, a lower right corner 216, an upper left corner 218 and an upper right corner 220. The lower left corner 214 is also referred to herein as the lower left corner of the center stringer 208 and the lower right corner 216 is also referred to herein as the lower right corner of the center stringer 208.

In order to identify one or more objects in each image frame taken by the imaging camera 130 and determine which of the one or more objects most likely comprises a pallet, assuming that the camera is oriented looking either up or straight ahead, either above or below the forks, the image analysis computer 110 implements at least the following processes: identifies possible corners of one or more pallets P in a gray scale image, see FIG. 4 process 230; determines first and an optional second Ro images including orthogonal distance(s) from an origin point to one or more possible lines on one or more possible pallets in the corresponding gray scale image, see FIG. 4 process 232; attempts to trace horizontal and vertical lines from each possible lower left corner of a third set of possible lower left corners to define a set of prequalified lower left corners, see FIG. 4 process 234; determines, for each prequalified lower left corner, which of a plurality of possible lines is most likely to be an actual line passing through a prequalified lower left corner, see FIG. 4 process 236; and attempts to identify a set of lower right corners for each prequalified lower left corner for which an actual line is found, see FIG. 4 process 238. It is further contemplated that an imaging camera may be located above the forks 42A, 42B looking down instead of up, which occurs when the camera is located below the forks 42A, 42B. In such an embodiment, the computer 110 may attempt to trace horizontal and vertical lines from each possible upper left corner of a third set of possible upper left corners to define a set of prequalified upper left corners, and determine, for each prequalified upper left corner, which of a plurality of possible lines is most likely to be an actual line passing through a prequalified upper left corner. The computer 110 may also attempt to locate a third set of possible upper right corners associated with each upper left corner.

The process 230 for identifying possible corners of one or more pallets P in an image will now be described with reference to FIG. 5. In the illustrated embodiment, the data defining each image frame received from the imaging camera 130 comprises gray scale data. The image analysis computer 110 normalizes the gray scale data to make it zero-mean data, see step 240 in FIG. 5. Creation of a normalized gray scale image can be accomplished by calculating the mean value of all the pixels in the gray scale image and then subtracting that mean value from each individual pixel value. As a consequence, pixels in the normalized gray scale image corresponding to pallet structure tend to have positive pixel values while other pixels in the normalized gray scale image tend to have negative pixel values. The term "gray scale data" and "gray scale image" used henceforth means "normalized gray scale data" and "normalized gray scale image," respectively. The image analysis computer 110 then determines a set of horizontal cross correlation results, i.e., a horizontal cross correlation image, see step 242, using a first step-edge template comprising in the illustrated embodiment:

$$T(x)=-1,-1,-1,-1,-1,-1,+1,+1,+1,+1,+1,+1,$$

wherein "−1" corresponds to an open area and "+1" corresponds to structure on the pallet.

Using the first step-edge template T(x) and the normalized gray scale image data, the image analysis computer 110 determines the horizontal cross correlation results from the following single dimension normalized cross correlation equation:

$$NCC(x) = \frac{\sum_{W(x)} (f_x - \overline{f_x})T(x)}{\sqrt{\sum_{W(x)} (f_x - \overline{f_x})^2 \sum_{W(x)} T^2(x)}}$$

wherein:

W(x)=dimensional limits of the first step-edge template, i.e., 12 in the illustrated embodiment.

$f_x$=a gray scale intensity value at a single point in the gray scale image;

$\overline{f_x}$=an average of the intensity values over W(x); and

T(x)=first step-edge template.

The horizontal cross correlation image has the same number of pixels as its corresponding gray scale image such that there is a one-to-one correspondence between pixel locations in the gray scale image and the horizontal cross correlation image. The horizontal cross correlation image provides information regarding where a region of the gray scale image is similar to the first step-edge template, with the first step-edge template positioned horizontally over the image region. With the normalized gray scale image data having values from −m to +n, each pixel in the horizontal cross correlation image has a value between −1 and +1, wherein pixels having values of −1 correspond to a perfect miss-match between the template and gray scale pixels over which the target is positioned and pixels having values of +1 correspond to a perfect match between the template and gray scale pixels over which the template is positioned. Hence, positive horizontal cross correlation values near or at +1 correspond to a vertical interface between an open area and an adjacent pallet structure, i.e., the open area is on the left and the pallet structure is on the right, wherein the interface between the open area and the pallet structure extends in the Y or vertical direction.

Figure 16A:
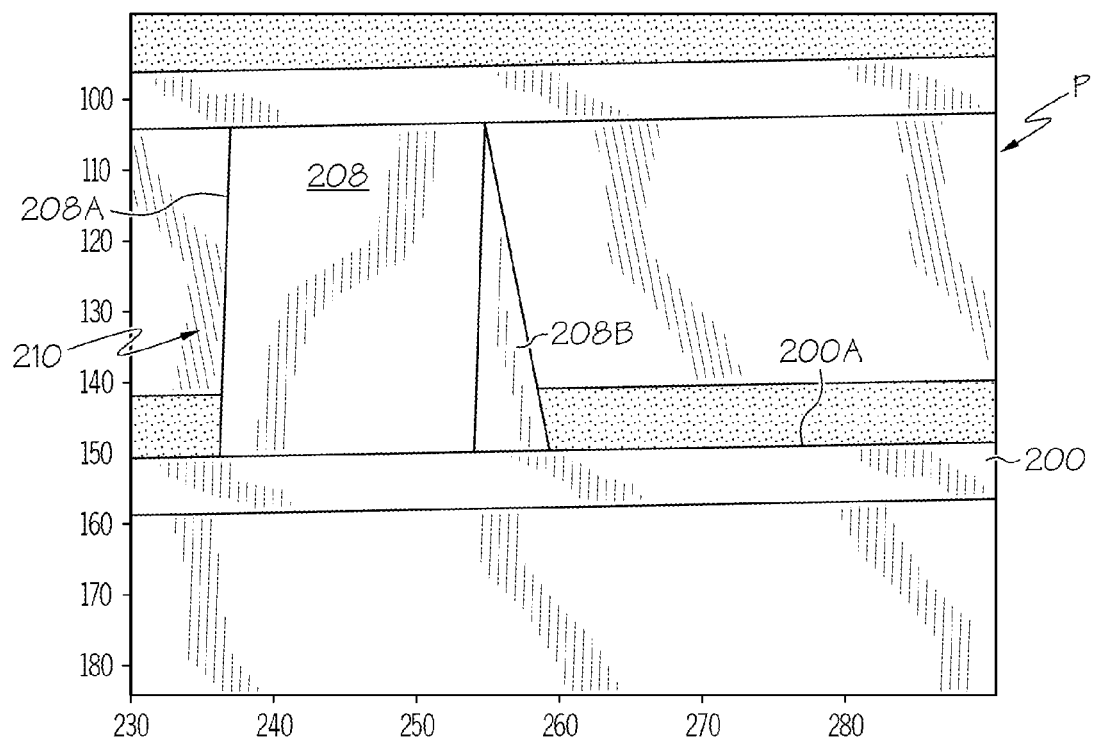
FIG. 16A illustrates a normalized gray scale image illustrating a pallet P having a bottom pallet board 200 and a center stringer 208.
Figure 16B:
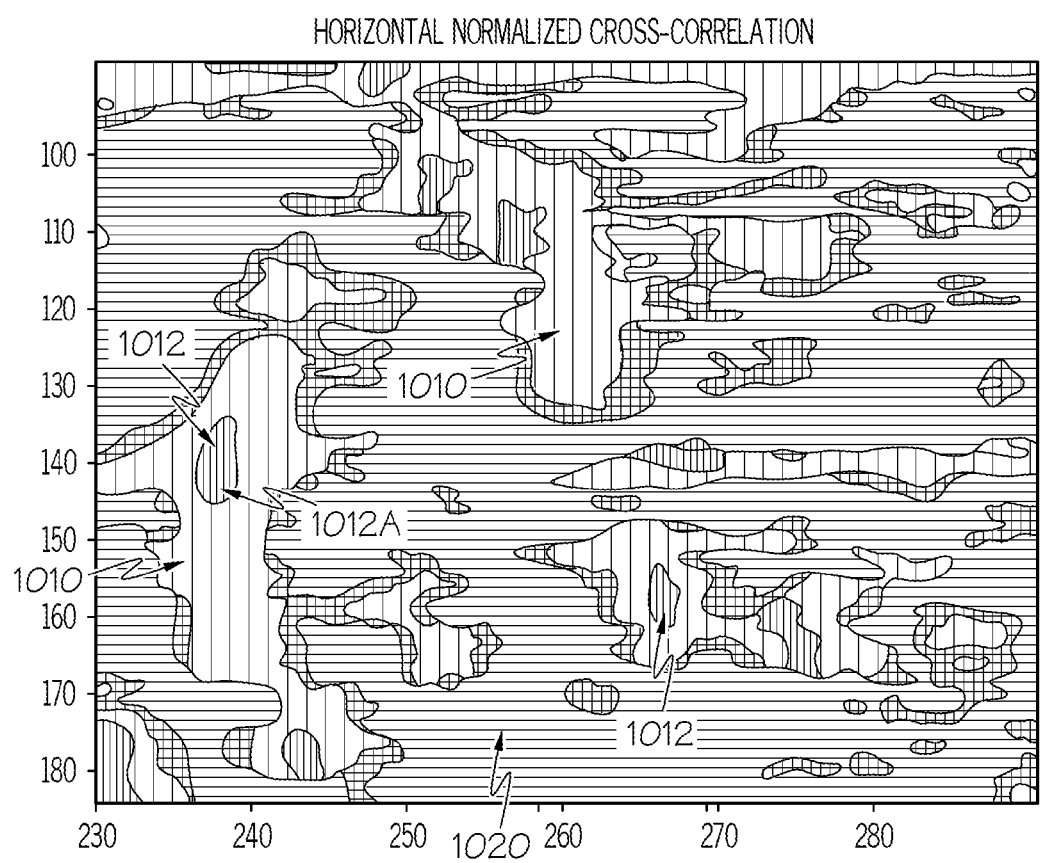
FIG. 16B is a horizontal cross correlation image corresponding to the gray scale image in FIG. 16A.

FIG. 16A illustrates a normalized gray scale image illustrating a pallet P having a bottom pallet board 200 and a center stringer 208. FIG. 16B is a horizontal cross correlation image corresponding to the gray scale image in FIG. 16A. In FIG. 16B, regions 1010 have positive pixel values and regions 1020 have negative pixel values. Regions 1012 have high magnitude positive values near or at +1 such that they may correspond to a transition in the gray scale image between an open area and a vertically oriented edge of a pallet. Hence, region 1012A corresponds to an interface between pallet opening 210 and a left surface 208A of the center stringer 208.

The image analysis computer 110 then determines a set of vertical cross correlation results, i.e., a vertical cross correlation image, see step 244, using a second step-edge template comprising in the illustrated embodiment:

$$T(y)=-1,-1,-1,-1,-1,-1,-1,-1,-1,-1,-1,+1,+1,+1,+1,+1,+1,+1,+1,+1,+1,+1,$$

wherein "−1" corresponds to an open area and "+1" corresponds to structure on the pallet.

Using the second step-edge template T(y) and the image gray scale data, the image analysis computer 110 determines the vertical cross correlation results from the following single dimension normalized cross correlation equation:

$$NCC(y) = \frac{\sum_{W(y)} (f_y - \overline{f_y})T(y)}{\sum_{W(y)} (f_y - \overline{f_y})^2 \sum_{W(x)} T^2(y)}$$

wherein:
W(y)=the dimensional limits of the template, i.e., 24 in the illustrated embodiment;
$f_y$=a gray scale intensity value at a single point in the gray scale image;
$\overline{f_y}$=an average of the intensity values over W(y);
T(y)=second step-edge template.

The vertical cross correlation image has the same number of pixels as its corresponding gray scale image such that there is a one-to-one correspondence between pixel locations in the gray scale image and the vertical cross correlation image. The vertical cross correlation image provides information regarding where a region of the gray scale image is similar to the second step-edge template, with the second step-edge template positioned vertically over the image region such that the negative template values are positioned vertically above the positive template values. With the normalized gray scale image data having values from −m to +n, each pixel in the vertical cross correlation image has a value between −1 and +1, wherein pixels having values at −1 correspond to a perfect miss-match between the template T(y) and the gray scale pixels over which the template is positioned and pixels having values at +1 correspond to a perfect match between the template T(y) and gray scale pixels over which the template is positioned. Hence, positive vertical cross correlation values at +1 identify a perfect horizontal interface between an open area and an adjacent pallet structure, i.e., the open area is above the pallet structure, wherein the horizontal interface between the open area and the pallet structure extends in the X or horizontal direction and −1 denotes the exact opposite.

Figure 16C:
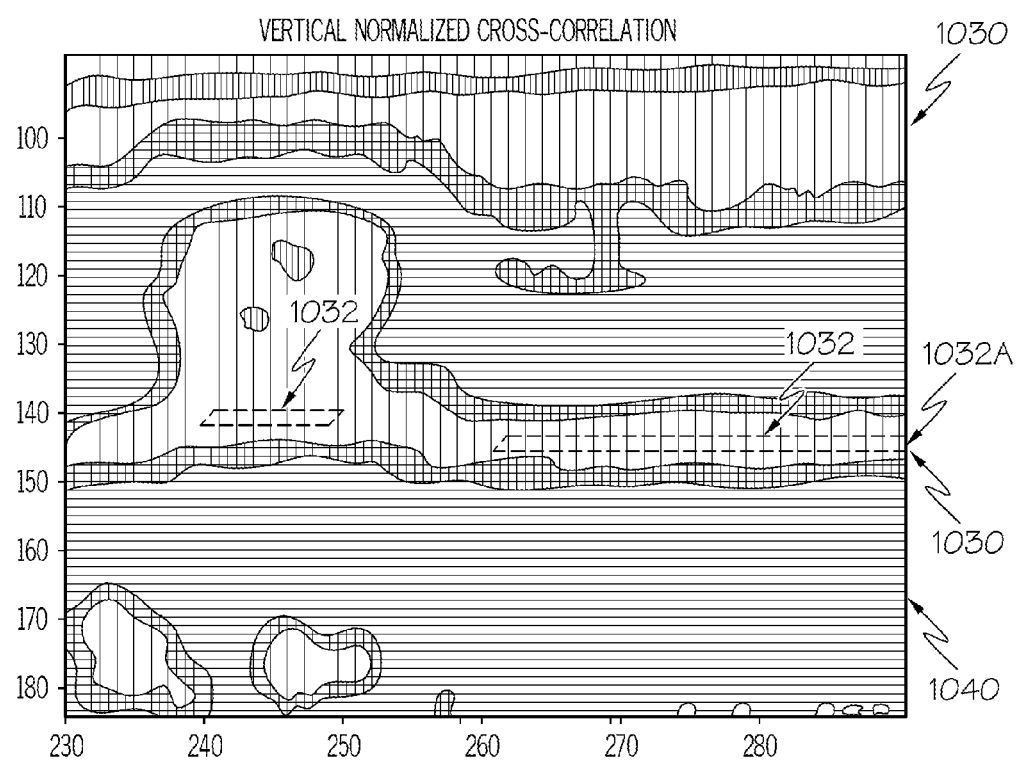
FIG. 16C is a vertical cross correlation image corresponding to the gray scale image in FIG. 16A.

FIG. 16C is a vertical cross correlation image corresponding to the gray scale image in FIG. 16A. In FIG. 16C, regions 1030 have positive pixel values and regions 1040 have negative pixel values. Regions 1032 have high magnitude positive values such that they generally correspond to a transition in the gray scale image between an open area and a horizontally oriented edge of a pallet. Hence, region 1032A corresponds to an interface between an open area and an upper surface 200A of bottom pallet board 200.

As described above, the horizontal cross-correlation image and the vertical cross-correlation image may have the same number of pixels as the normalized gray scale image. This means that a corresponding horizontal and vertical cross-correlation value is calculated for every pixel in the gray scale image. Alternatively, the respective cross-correlation images may be calculated in a way that each such image may have fewer numbers of pixels than the normalized gray scale image.

For example, the imaging camera 130 may be configured so that the gray scale image captures a view that extends, horizontally, from a first point that is substantially in line with the outside edge of the second or left fork 42B to a second point that is substantially in line with the outside edge of the first or right fork 42A. Thus, there is an inner region of the gray scale image that can be described as being "between the forks" 42A and 42B. It is within this between the forks region that corners are sought.

An exemplary gray scale image may have 480 columns and 752 rows of pixels. If the origin point for this gray scale image is defined as being the top left pixel location, then the left-most column of pixels has an x coordinate value of "1" and the right-most column of pixels has an x coordinate value of "480". Similarly, in the vertical direction, the top-most row of pixels may have a y coordinate value of "1" and the bottom-most row of pixels may have a y coordinate value of "752". For the gray scale image, a left limit for x coordinates may be chosen that corresponds to a point that is substantially in line with the inner edge of the left fork 42B; and a right limit for x coordinates may be chosen that corresponds to a point that is substantially in line with the inner edge of the right fork 42A. Any pixel in the gray scale image that has its x coordinate between the left and right limits is considered to be "between the forks". For example, the left limit may be "80" and the right limit may be "400", but other values may alternatively be selected without departing from the scope of the present invention.

Thus, in the description above with respect to calculating a horizontal cross correlation image and a vertical cross correlation image, the calculations may be limited to only those pixels that are located between the forks such that the horizontal cross correlation image and the vertical cross correlation image each have fewer columns of pixels than the gray scale image.

The image analysis computer 110 next determines pixel values corresponding to a first set of possible first corners of one or more pallets, i.e., a lower-left corner image, using a first corner template, the horizontal cross correlation results and the vertical cross correlation results, see step 246 in FIG. 5. In the illustrated embodiment, the possible first corners comprise possible lower left corners of one or more pallets. The first corner template 300 is defined by an M×N window, a 3×3 window in the illustrated embodiment, corresponding to a lower-left corner of a pallet, see FIG. 6.

Figure 6:
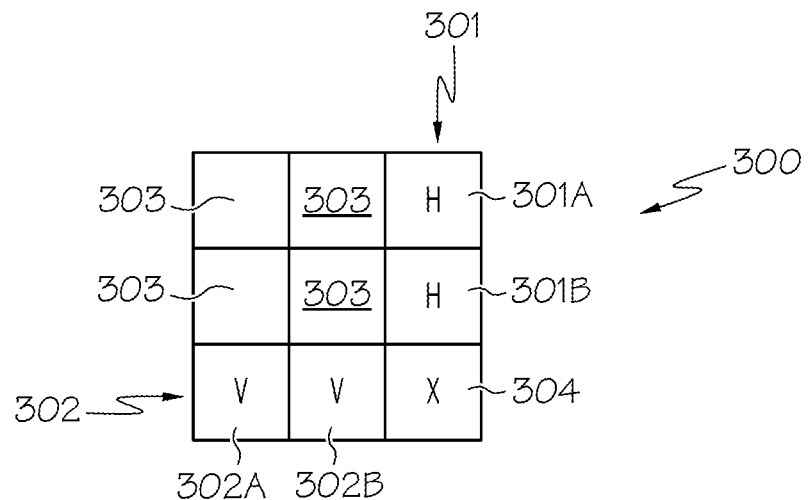
FIGS. 6, 7, 6B and 7A illustrate first, second, third and fourth corner templates.
Figure 6A:
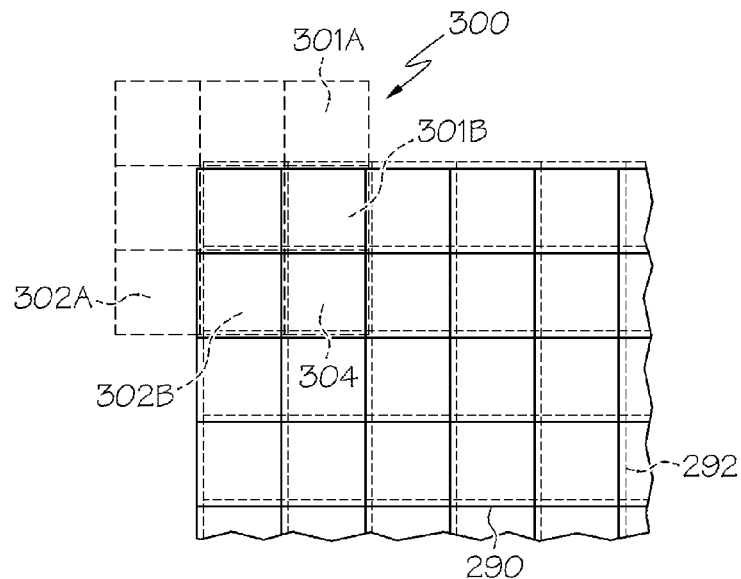
FIG. 6A illustrates the first corner template located over horizontal and vertical cross correlation results.

The computer 110 slides the first corner template 300 concurrently over the set of horizontal or first cross correlation results or image 290 and the set of vertical or second cross correlation results or image 292 so as to determine pixel values for the lower-left corner image, see FIG. 6A. More specifically, the first corner template 300 is positioned over the horizontal and vertical cross correlations so that the required values from each can be retrieved. Thus, the pixel location 304 is moved over similarly positioned pixels in the first and second cross correlation images. As the template pixel location 304 is sequentially moved over each pixel in the first cross correlation image and a similarly located pixel in the second cross correlation image, a pixel value, $Score_{LowerLeftCorner}$, for that pixel location is defined for the lower-left corner image. During each placement of the first corner template 300, the computer 110 places into first and second pixels 301A and 301B of an outer vertical column 301 corresponding horizontal cross correlation results or pixel values, i.e., pixel values having corresponding locations in the horizontal cross correlation image, and places into first and second pixels 302A and 302B of an outer horizontal row 302 corresponding vertical cross correlation results or pixel values, i.e., pixel values having corresponding locations in the vertical cross correlation image, see FIG. 6. No values are placed into the pixels 303. The computer 110 then determines the lowest or minimum value of pixels 301A, 301B, 302A and 302B, wherein the minimum is a fuzzy logic AND, and assigns that lowest or minimum value to pixel 304 at the intersection of the vertical and horizontal columns 301 and 302, see FIG. 6, which pixel 304 should have a value between −1 and +1. Values closer to "−1" and "+1" indicate that the pixel has a strong likelihood of defining a transition between structure on a pallet and open area or vice versa in the gray scale image. Values close to "0" indicate that the pixel has a strong likelihood of defining a continuous area of the normalized gray scale image corresponding to continuous pallet structure or a continuous open area. Values close to "0" are typically ignored as the image analysis computer 110 attempts to find, as noted below, pixels having values near +1. The value assigned to pixel 304 is also assigned to a corresponding pixel location in the lower-left corner image, i.e., the value from pixel 304 is assigned to a pixel location in the lower-left corner image corresponding to the pixel location in each of the first and second cross correlation images over which the template pixel location 304 is positioned. The pixels in the resulting lower left corner image define a first set of pixels corresponding to a first set of possible first or lower left corners. In an embodiment, the number of first set pixels in the lower left corner image equals the number of pixels in each of the gray scale images, the horizontal cross correlation image and the vertical cross correlation image. Alternatively, similar to the technique described above with respect to the cross correlation images, the determination of the pixel values in the lower left corner image may be limited to only those pixel locations that are between the forks (i.e., between the left limit and the right limit, as described above). In this instance, the lower left corner image, the vertical cross correlation image and the horizontal cross correlation image would all have the same number of pixels but this number would be less than the number of pixels in the gray scale image.

For one or more of the vertical column first and second pixels 301A and 301B and the horizontal column first and second pixels 302A and 302B which fall outside of the boundary of the horizontal and vertical cross correlation results or images 290 and 292, the computer 110 "pads out" the horizontal and vertical cross correlations by placing a 0 in each of those pixels. Hence, in the example illustrated in FIG. 6A, a 0 is placed into pixels 301A and 302A.

In order to reduce the number of first corner pixels, the image analysis computer 110 compares the value of each pixel in the first set of pixels to a first threshold value, such as 0.5 in the illustrated embodiment, see step 248 in FIG. 5. All pixels in the first set having a value less than the first threshold value are eliminated, i.e., the value for each eliminated pixel is changed to 0. All remaining pixels, i.e., those having values equal to or greater than the first threshold value, define a second set of pixels corresponding to a second set of possible first corners. Pixels having a value less than 0.5 are deemed not to be possible first corners as pixels near +1 indicate either a vertical interface between an open area on the left and pallet structure on the right or a horizontal interface between an upper open area and a lower pallet structure.

In order to further reduce the number of first corner pixels, the image analysis computer 110 recursively slides a local maxima-locating window, e.g., an M×M window, where M is equal to or greater than 3, over the second set of pixels and eliminates all pixels from the second set of pixels in each placement of the window except for the pixel having a maximum value. More specifically, the behavior of the maxima-locating window is as if it is sequentially moved such that a center pixel of the maxima-locating window is positioned over each pixel in the second set of pixels. During each positioning of the maxima-locating window, all pixels are eliminated (i.e., set to "0") except for the pixel having a maximum value. After the window has been sequentially moved over all pixels in the second set of pixels, the remaining pixels define a third set of pixels corresponding to a third set of possible first corners, see step 250 in FIG. 5. However, in practice, an identical result can be achieved but with far less computational complexity.

Figure 6B:
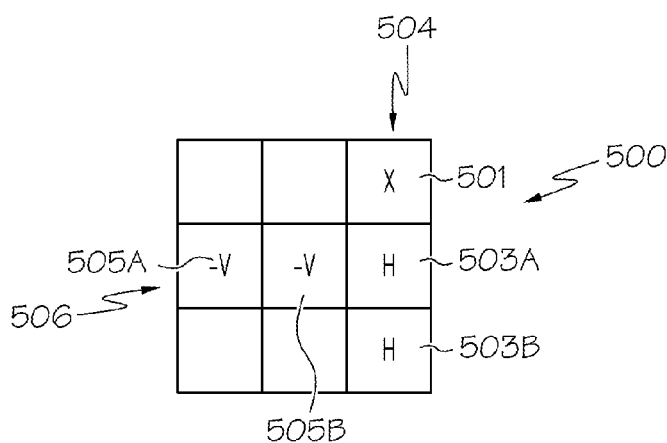
Figure 6C:
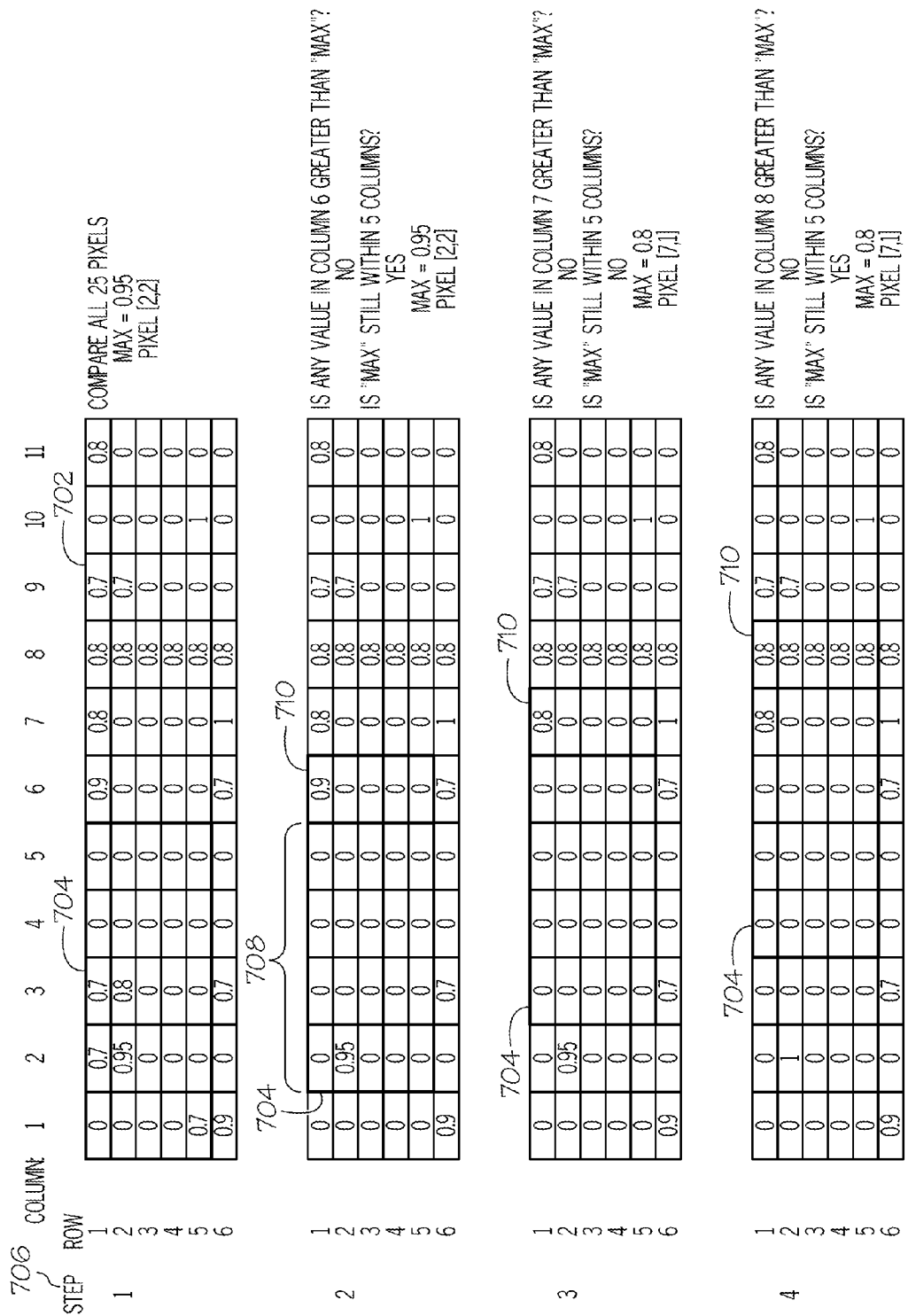
Figure 6D:
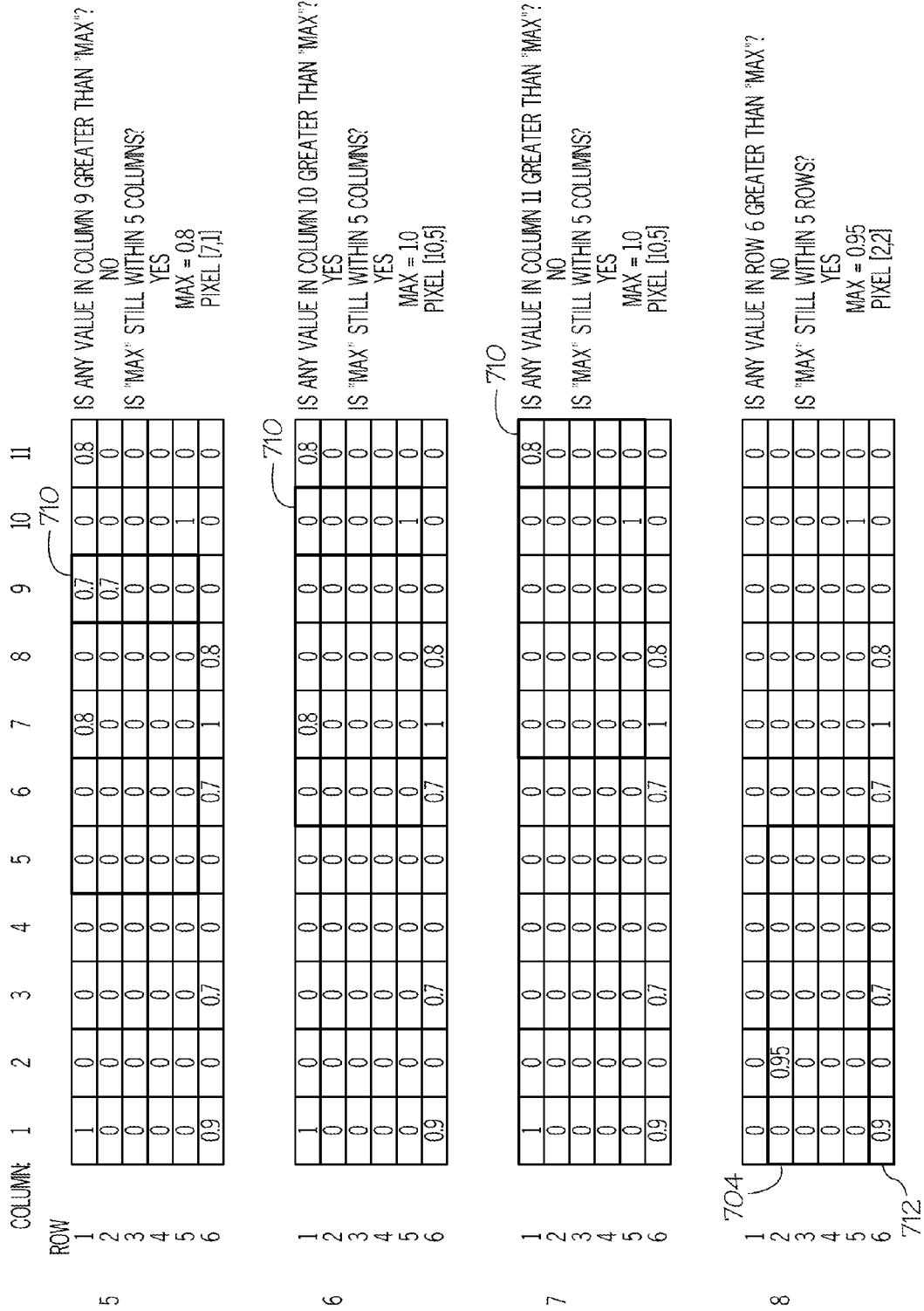

FIGS. 6C-6E illustrate a sequence of an efficient method for moving a 5×5 window, for example, to identify the pixels in the second set of pixels having a maximum value. In FIG. 6C, merely a portion of a large image comprising the second set of pixels is depicted. In particular, the image portion 702 of FIG. 6C is 11 columns×6 rows of pixels wherein each pixel has a value that was determined as described earlier using a 3×3 corner template and, further, with some having a value greater than the first threshold value, 0.5. FIGS. 6C-6E include a series of "snapshots" of the image portion 702 to illustrate how the 5×5 window is iteratively moved in order to efficiently locate the maximum pixels. Each snapshot of the image portion 702 corresponds to an iterative step of moving the 5×5 window 704; the step number is located in the left column 706.

Initially, as depicted in the first snapshot, the 5×5 window 704 is placed in the upper left corner of the image portion 702. The upper left corner of the image portion 702 may have its x coordinate position at a location corresponding to the left most column of the gray scale image. However, if processing of the lower left corner image by the image analysis computer 110 is limited to those pixels that are "between the forks," then the x coordinate position of the upper left corner of the image portion 702 is determined by the value of the left limit for x coordinates (e.g., 80). The 25 pixels are evaluated to determine that the pixel at location (2, 2), having a value of 0.95, is the maximum valued pixel. The values of all the other pixels in the 5×5 window 704 are set to zero. The location and value of the maximum pixel are retained for later use.

The 5×5 window 704 is then moved one pixel to the right as shown in the second snapshot. The four left-most columns 708 of the 5×5 window 704 have pixels that, other than the maximum value, if present, are all zero. Thus, in "Step 2", the 5 values in the right-most column 710 are compared to determine if any are greater than the previously identified maximum value, presuming the previously identified maximum value is within the bounds of the 5×5 window 704. In this second snapshot, the previously identified maximum value is within the bounds of the window 704. Hence, the 5 values in the right-most column 710 are compared to 0.95, i.e., the previously identified maximum value. It is not necessary to consider the values of the remaining 19 pixels in the four left-most columns 708. In this instance, none of the pixels in the right-most column 710 are greater than 0.95. Because the location of the maximum value (e.g., pixel (2,2)) lies within the span of the 5×5 window 704, all the pixels in column 710 are set to zero and the maximum pixel value and location remain the same.

In the third snapshot, the 5×5 window 704 has once again been moved one column to the right. The pixels in the current placement of the right-most column 710 are not evaluated against the previously identified maximum value because it is no longer within the 5×5 window 704. In this snapshot, the pixels within the right-most columns 710 are only compared to one another. Under these conditions, the pixel at location (7, 1) becomes the new maximum value pixel having a value of 0.8.

The fourth snapshot occurs when the 5×5 window 704 is again moved one pixel to the right. In this instance none of the pixels in the current placement of the right-most column are greater than the current maximum value. Because the current maximum value pixel is also within the boundary of the 5×5 window 704, the maximum value pixel location and pixel value remain unchanged. Further, all pixels in the right-most column are set to zero.

The fifth and sixth steps occur to produce the 5×5 window 704 placement shown in the fifth and sixth snapshots of FIG. 6D. In the sixth step, the right-most column aligns with column 10 of image portion 702. In this column, there is a pixel at location (10,5) that is greater than the current maximum value "0.8" and the current maximum value is still located (e.g., pixel (7,1)) within the boundary of the 5×5 window 604. Under these conditions the following changes occur: the previous maximum value pixel location (7,1) is set to zero, the current maximum pixel value is identified as "1", and the current maximum pixel value location is identified as (10,5).

After the next iteration, the 5×5 window 704 is located at the right most portion of the image portion 702. Eventually, the 5×5 window 704 will reach a point where the right-most column 710 is aligned with the right-most column of the full image. Once this occurs, the next iteration of moving the window 704 produces the window placement shown in the snapshot at the bottom of FIG. 6D. In other words, when the right-most edge of the image is reached, the 5×5 window 704 is returned to the left-most edge of the image but shifted down by one row. If processing of the lower left corner image by the image analysis computer 110 is limited to those pixels that are "between the forks," then the x coordinate position of the right most column of the image portion 702 is determined by the value of the right limit for x coordinates (e.g., 400).

When the 5×5 window 704 is placed, as shown in the bottom snapshot of FIG. 6D, so that its left-most column aligns with the left-most column of the image (which may be determined by the left limit for x coordinates (e.g., 80)), the pixels of interest are not the right-most column of the window 704 but are the bottom-most row 712. Recalling the initially saved maximum value "0.95" at location (2,2), the pixels in the bottom-most row 712 are compared to see if any are greater than that maximum value, presuming that previous maximum value pixel is located within the current boundary of the 5×5 window 704. In this instance, there are no pixels greater than "0.95" which causes all the pixels in the bottom-most row 712 to be set to zero. Thus, the maximum value remains at "0.95" at location (2,2) and this information is again saved so that it can be used when the 5×5 window 704 once again returns to the left-most column of the image.

In the next iteration, the 5×5 window 704 is moved one pixel to the right and the focus returns to the pixels in the right-most column 710. These pixels are compared with the current maximum value and pixels location to determine what pixels may need to be modified. The movement of the window 704 continues as before until the 5×5 window reaches the bottom-most and right-most pixel of the image. At that point, a matrix of pixels defining a third set of possible first corners exists having the same dimensions as the lower left corner image and each pixel with a non-zero value has a value that represents a confidence score that the pixel corresponds to a possible lower left corner of a pallet structure in the normalized gray scale image.

The image analysis computer 110 next determines pixel values corresponding to a first set of possible second corners of the one or more pallets, i.e., a lower-right corner image, using a second corner template, the horizontal cross correlation results and the vertical cross correlation results, see step 252 in FIG. 5. In the illustrated embodiment, the possible second corners comprise possible lower right corners. The second corner template 310 is defined by an S×T window, a 3×3 window in the illustrated embodiment, corresponding to a lower-right corner of a pallet, see FIG. 7.

The computer 110 slides the second corner template 310 concurrently over the set of horizontal cross correlation results and the set of vertical cross correlation results so as to define pixel values, $Score_{LowerRightCorner}$, for the lower-right corner image. More specifically, the second corner template 310 is positioned over the horizontal and vertical cross correlations so that required values from each can be retrieved. Thus, the pixel location 312C is moved sequentially over similarly positioned pixels in the first and second cross correlation images, see FIG. 7. As the template pixel location 312C is sequentially moved over each pixel in the first cross correlation image and a similarly located pixel in the second cross correlation image, a value for that pixel location is defined for the lower-right corner image. During each placement of the second corner template window 310, the computer 110 places into first and second pixels 311A and 311B of a center vertical column 311 corresponding horizontal cross correlation results or pixel values, i.e., pixel values having corresponding locations in the horizontal cross correlation image, and places into first and second pixels 312A and 312B of an outer horizontal row 312 corresponding vertical cross correlation results or pixels, i.e., pixel values having corresponding locations in the vertical cross correlation image. The computer 110 also negates the values added to the first and second pixels 311A and 311B. Values close to −1 in the horizontal cross correlation image correspond to an interface between a pallet structure on the left and an open area on the right. By negating the values in the first and second pixels 311A and 311B, high magnitude negative values in the horizontal cross correlation image are converted to high magnitude positive values. Hence, vertical transitions between a pallet structure on the left and an open area on the right are defined by high magnitude positive values, which is beneficial when finding fifth and sixth sets of pixels in the manner discussed below. No values are placed into pixels 313. The computer 110 then determines the lowest or minimum value of pixels 311A, 311B, 312A and 312B, wherein the minimum is a fuzzy logic AND, and assigns that lowest or minimum absolute value to the pixel 312C of the horizontal row 312, see FIG. 7. The resulting value in pixel 312C should have a value between −1 and +1. Values closer to "−1" and "+1" indicate that the pixel has a strong likelihood of defining a transition between an open area and structure on a pallet or vice versa in the gray scale image. Values close to "0" indicate that the pixel has a strong likelihood of defining a continuous area of the normalized gray scale image corresponding to continuous pallet structure or a continuous open area. In an embodiment, the value assigned to pixel 312C is also assigned to a corresponding pixel location in the lower right corner image. Alternatively, similar to the technique described above with respect to the lower left corner image, the determination of the pixel values in the lower right corner image may be limited to only those pixel locations that are between the forks (i.e., between the left limit and the right limit, as described above). In this instance, the lower right corner image, the vertical cross correlation image and the horizontal cross correlation image would all have the same number of pixels but this number would be less than the number of pixels in the gray scale image. The pixels in the resulting lower right corner image define a fourth set of pixels corresponding to a first set of possible second or lower right corners. The number of fourth set pixels in the lower right corner image equals the number of pixels in each of the gray scale image, the horizontal cross correlation image and the vertical cross correlation image.

The image analysis computer 110 compares the value of each pixel in the fourth set of pixels to a second threshold value, such as 0.5, see step 254 in FIG. 5. All possible second corner pixels having a value less than the second threshold value are eliminated, i.e., the value for each eliminated second corner pixel is changed to 0. All remaining second corner pixels, i.e., those having values equal to or greater than the second threshold value, define a fifth set of pixels corresponding to a second set of possible second corners. Pixels having a value less than 0.5 are deemed not to be possible first corners as pixels near +1 indicate either a vertical interface between a pallet structure on the left and an open area on the right or a horizontal interface between an upper open area and a lower pallet structure.

The image analysis computer 110 recursively slides a local maxima-locating window, e.g., an M×M window, where M is equal to or greater than 3, over the fifth set of pixels and eliminates all pixels in each placement of the window except for the pixel having a maximum value such that a sixth set of pixels is defined corresponding to a third set of possible second corners, see step 256 in FIG. 5. More specifically, the maxima-locating window is sequentially moved such that a center pixel of the maxima-locating window is positioned over each pixel of the fifth set of pixels. During each positioning of the maxima-locating window, all pixels in the fifth set are eliminated except for the pixel having a maximum value. The remaining pixels define a sixth set of pixels corresponding to a third set of possible second corners. The method discussed above with regards to FIGS. 6C-6E to determine the third set of pixels corresponding to a third set of possible first corners may be used to define a sixth set of pixels corresponding to a third set of second corners.

As noted above, in a further contemplated embodiment, an imaging camera may be located above the forks 42A, 42B looking down instead of looking up or straight ahead. In this embodiment, the computer 110 may attempt to locate a plurality of possible upper left corners and a plurality of possible upper right corners instead of locating possible lower left and lower right corners.

The image analysis computer 110 determines pixel values corresponding to a first set of possible upper left corners of the one or more pallets using a third corner template 500, the horizontal cross correlation results and the vertical cross correlation results, see FIG. 6B. The third corner template 500 is defined by a 3×3 window in the illustrated embodiment, corresponding to an upper left corner of a pallet.

The computer 110 slides the third corner template 500 concurrently over the set of horizontal cross correlation results and the set of vertical cross correlation results so as to define pixel values for an upper left corner image. More specifically, the third corner template 500 is positioned over the horizontal and vertical cross correlations so that required values from each can be retrieved. Thus, a pixel location 501 is moved sequentially over similarly positioned pixels in the first and second cross correlation images, see FIG. 6B. As the template pixel location 501 is sequentially moved over each pixel in the first cross correlation image and a similarly located pixel in the second cross correlation image, a value for that pixel location is defined for the upper left corner image. During each placement of the third corner template window 500, the computer 110 places into first and second pixels 503A and 503B of an outer vertical column 504 corresponding horizontal cross correlation results or pixel values, i.e., pixel values having corresponding locations in the horizontal cross correlation image, and places into first and second pixels 505A and 505B of a middle horizontal row 506 corresponding vertical cross correlation results or pixels, i.e., pixel values having corresponding locations in the vertical cross correlation image. The computer 110 also negates the values added to the first and second pixels 505A and 505B. The computer 110 then determines the lowest or minimum value of pixels 503A, 503B, 505A and 505B and assigns that lowest or minimum absolute value to the pixel 501 of the vertical row 504, see FIG. 6B. The resulting value in pixel 501 should have a value between −1 and +1. The pixels in the resulting upper left corner image define a first set of pixels corresponding to a first set of possible upper left corners.

The image analysis computer 110 compares the value of each pixel in the first set of upper left corner pixels to a third threshold value, such as 0.5. All possible upper left corner pixels having a value less than the third threshold value are eliminated, i.e., the value for each eliminated upper left corner pixel is changed to 0. All remaining upper left corner pixels, i.e., those having values equal to or greater than the third threshold value, define a second set of pixels corresponding to a second set of possible upper left corners.

The image analysis computer 110 recursively slides a local maxima-locating window, e.g., an M×M window, where M is equal to or greater than 3, over the second set of upper left pixels and eliminates all pixels in each placement of the window except for the pixel having a maximum value such that a third set of upper left corner pixels is defined.

Figure 7:
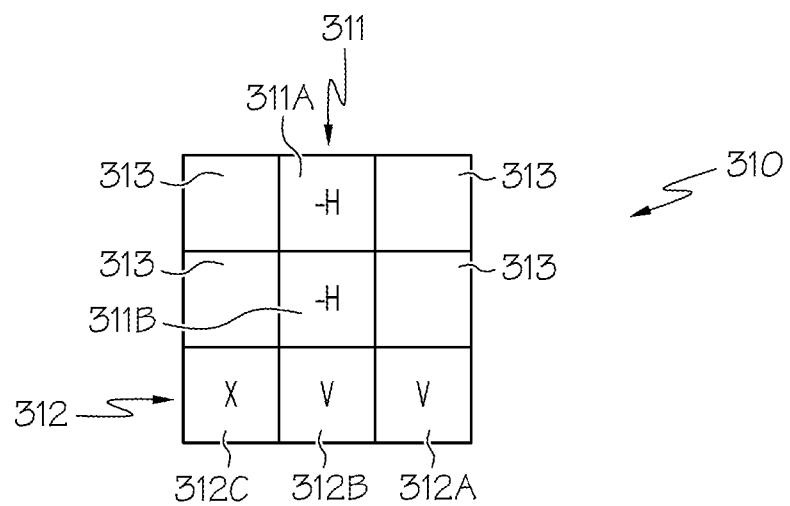
Figure 7A:
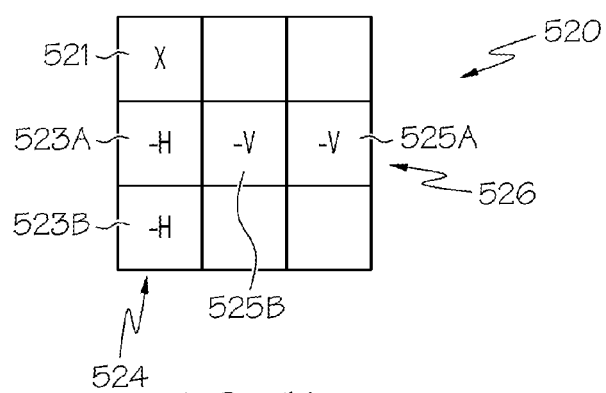

The image analysis computer 110 determines pixel values corresponding to a first set of possible upper right corners of the one or more pallets using a fourth corner template 520, the horizontal cross correlation results and the vertical cross correlation results, see FIG. 7A. The fourth corner template 520 is defined by a 3×3 window in the illustrated embodiment, corresponding to an upper right corner of a pallet.

The computer 110 slides the fourth corner template 520 concurrently over the set of horizontal cross correlation results and the set of vertical cross correlation results so as to define pixel values for an upper right corner image. More specifically, the fourth corner template 520 is positioned over the horizontal and vertical cross correlations so that required values from each can be retrieved. Thus, a pixel location 521 is moved sequentially over similarly positioned pixels in the first and second cross correlation images, see FIG. 7A. As the template pixel location 521 is sequentially moved over each pixel in the first cross correlation image and a similarly located pixel in the second cross correlation image, a value for that pixel location is defined for the upper right corner image. During each placement of the fourth corner template window 520, the computer 110 places into first and second pixels 523A and 523B of an outer vertical column 524 corresponding horizontal cross correlation results or pixel values, i.e., pixel values having corresponding locations in the horizontal cross correlation image, and places into first and second pixels 525A and 525B of a middle horizontal row 526 corresponding vertical cross correlation results or pixels, i.e., pixel values having corresponding locations in the vertical cross correlation image. The computer 110 also negates the values added to the first and second pixels 523A, 523B and 525A, 525B in the vertical column 524 and horizontal row 526. The computer 110 then determines the lowest or minimum value of pixels 523A, 523B, 525A and 525B and assigns that lowest or minimum absolute value to the pixel 521 of the vertical row 524, see FIG. 7A. The pixels in the resulting upper right corner image define a first set of pixels corresponding to a first set of possible upper right corners.

The image analysis computer 110 compares the value of each pixel in the first set of upper right corner pixels to a fourth threshold value, such as 0.5. All possible upper right corner pixels having a value less than the fourth threshold value are eliminated, i.e., the value for each eliminated upper right corner pixel is changed to 0. All remaining upper right corner pixels, i.e., those having values equal to or greater than the fourth threshold value, define a second set of pixels corresponding to a second set of possible upper right corners.

The image analysis computer 110 recursively slides a local maxima-locating window, e.g., an M×M window, where M is equal to or greater than 3, over the second set of upper right pixels and eliminates all pixels in each placement of the window except for the pixel having a maximum value such that a third set of upper right corner pixels is defined.

In the above description of different image analysis and image manipulation steps, there are instances in which the columns of pixels considered and used during the steps were limited to those columns of pixels considered to be "between the forks." In a similar manner, the number of rows of pixels considered and used during some of these steps may be reduced as well. For example, if the gray scale image has 752 rows of pixels, then not all of these rows of pixels need to be used and/or considered for all of the image analysis and manipulation steps previously described.

As one example, only 500 of the rows of pixels may be utilized and the other 252 rows of pixels ignored. If the fork carriage apparatus 40 is moving upwards, then only the top 500 rows of pixels of the gray scale image may be utilized for corner finding and similar steps described above. Conversely, if the fork carriage apparatus 40 is traveling downwards, then the bottom 500 rows of pixels of the image may be considered as relevant for analysis. Thus, the vehicle computer 50 can indicate to the image analysis computer 110 the direction of travel of the fork carriage apparatus 40. Using this information, the image analysis computer 110 can determine the vertical span of the rows of pixels that are to be used or considered for various image analysis and manipulation steps.

The corner finding process described above involved the normalized gray scale image which may be, for example, 480 (columns)×752 (rows) pixels or, alternatively, involved a limited image area of the gray scale image which may be, for example, 321 (columns)×752 (rows) pixels or even 321 (columns)×500 (rows) pixels. Because many of the computations described are performed once, or possibly twice, for each pixel, the computational burden may be relatively high depending on the type of image analysis computer 110 being utilized. The computational steps used to evaluate and analyze the normalized gray scale image when attempting to identify pallet objects can be reduced by using a number of techniques. In particular, the concept of an image pyramid can be used to reduce the number of pixels in an image being analyzed at particular steps of the process of identifying pallet objects.

Figure 6F:
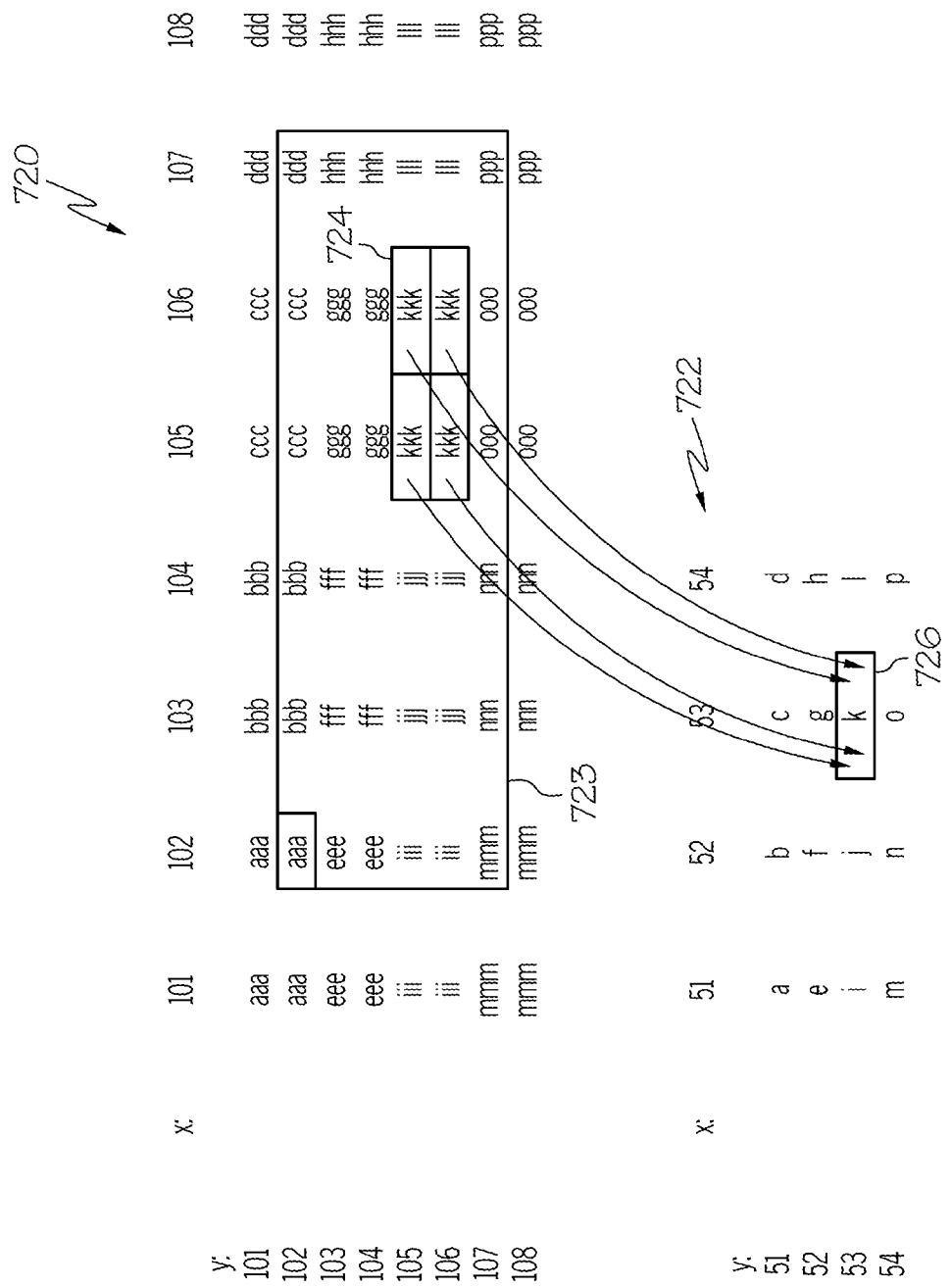
FIG. 6F illustrates an example of producing a lower resolution image from a higher resolution image.

For example, if the normalized gray scale image includes 480×752 pixels and is considered to be the base image of an image pyramid, then a mid-level image can be defined having a coarser resolution, and a top-level image can be defined having an even coarser resolution. For example, a low-pass and sub-sampled mid-level image can be created by using a 2×2 window to average four pixels of the base image in order to generate a pixel value for one pixel in the mid-level image. Referring to FIG. 6F, a base image 720 is illustrated and a 2×2 window 724 is used to select 4 pixels in a region of the base image 720. The values of the four pixels in the window 724 can be averaged and that value placed in the pixel 726 of the mid-level image 722. The result is that the mid-level image 722 is created that has ¼ the number of pixels as the base image. This same process can be performed on the mid-level image 722 to create the top-level image of the image pyramid. This top level image will have $\frac{1}{16}^{th}$ the number of pixels as the base image. Using the example size described above for the base image, the mid-level image would be 240×376 pixels and the top-level image would be 120×188 pixels.

The previously described processes for creating a vertical cross correlation image and a horizontal cross correlation image can be applied to the top-level image having the reduced number of pixels in order to reduce the computational burden of locating a first set of possible left or right corners. As described earlier, the first step-edge template, T(x), had a size of 12 elements and the second step-edge template, T(y), had a size of 24 elements. In applying these respective templates to the top-level image, their sizes can be adjusted so that each template has 6 elements. Thus:

$$T(X)_{top\text{-}level} = -1,-1,-1,+1,+1,+1$$

$$T(y)_{top\text{-}level} = -1,-1,-1,+1,+1,+1$$

Using these templates, a horizontal cross correlation image and a vertical cross correlation image are generated as described earlier such that the resulting images each have the same number of pixels as the top-level image. The first corner template 300 is slid over the vertical and horizontal cross correlation images as before in order to calculate each pixel value for a top-level lower-left corner image. As before, the number of pixels that will retain non-zero values in the top-level lower-left corner image can be reduced by zeroing out any pixels having a value less than a threshold (e.g., 0.5) and using a 5×5, or other size window to identify local maxima pixels in order to zero-out the other pixels.

The pixels that remain in the top-level lower-left corner image (i.e., the non-zero pixels) represent a set of pixels that may correspond to a lower left corner of a pallet in the normalized gray scale image. Each of these pixel locations from the top-level lower-left corner image is further analyzed to more concretely determine a possible location of a lower left corner.

First, each pixel location in the top-level image is translated to a corresponding pixel location in the mid-level image. Although one pixel location in a lower resolution image corresponds to four different pixel locations in a higher resolution image arranged in a 2×2 matrix, as the 2×2 averaging is not perfect, artifacts remain, and a larger 6×6 search region is defined. The one pixel location identified in the lower-resolution image (e.g., the top-level image) allows the location of the 36 pixels of the 6×6 search region to be calculated. For example, assuming the pixel coordinate system described earlier, the upper left corner of the 6×6 search region in the next level down in the pyramid can be translated according to:

$$x_{higher\text{-}res} = (x_{lower\text{-}res} - 1)*2 - 2$$

$$y_{higher\text{-}res} = (y_{lower\text{-}res} - 1)*2 - 2$$

If the image portions of FIG. 6F are used, pixel location (53, 53) in the lower resolution image is translated into pixel location (102, 102) in the higher resolution image which means the 6×6 search region 723 in the higher resolution image includes the 36 pixels to the right, below, and inclusive of pixel (102, 102).

Figure 6G:
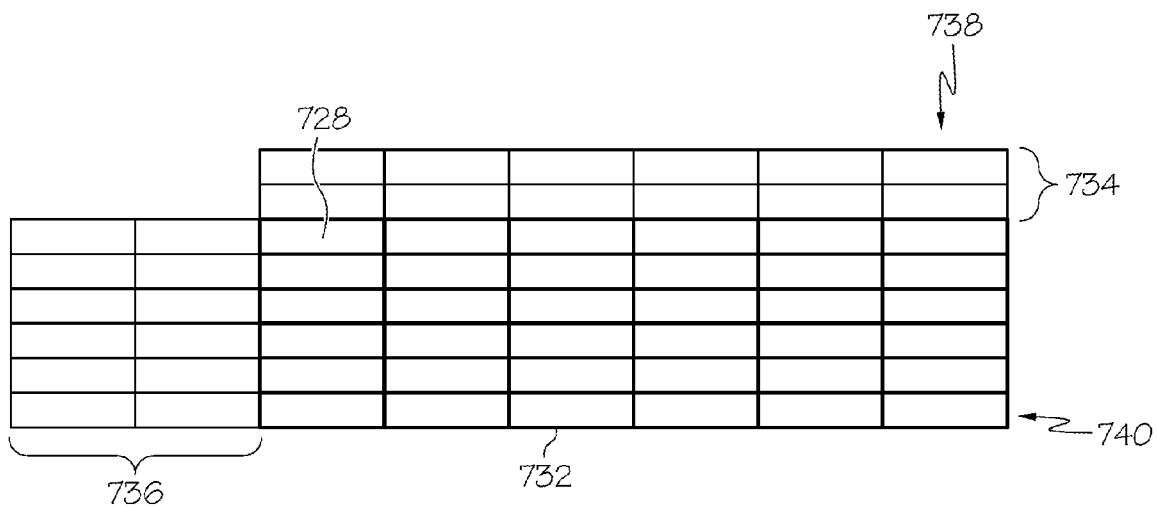
FIG. 6G illustrates a portion of a mid-level image to be further analyzed for a location of a potential lower left corner.

Each possible lower left corner location in the top-level lower left corner image can be translated into a 36 pixel search region in the mid-level image. FIG. 6G illustrates an arbitrary 36 pixel search region 732 in the mid-level image.

These 36 pixels in the set 732 will be used to once again create horizontal and vertical cross correlation images, apply a corner template 300, and then keeping only the maximum corner over the 6×6 region. Because of the shape of the corner template (see FIG. 6), the two additional columns 736 to the left of the set 732 are needed for vertical correlations and the two additional rows 734 above the set 732 are needed for horizontal correlations.

As before, a horizontal step-edge template is applied to the appropriate pixels to generate a horizontal cross-correlation image and a vertical step-edge template is applied to the appropriate pixels to generate a vertical cross-correlation image. In applying these respective templates to pixels of the mid-level image, their size can be adjusted so that each template has 12 elements. Thus:

$$T(x)_{mid\text{-}level} = -1,-1,-1,-1,-1,-1,+1,+1,+1,+1,+1,+1$$

$$T(y)_{mid\text{-}level} = -1,-1,-1,-1,-1,-1,+1,+1,+1,+1,+1,+1.$$

Because of the way the corner template 302 of FIG. 6 is constructed, not all of the 60 pixels of FIG. 6G require both a horizontal cross-correlation value and a vertical cross-correlation value to be calculated. For example, for pixel locations in the two rows of 734, a vertical cross-correlation value is unnecessary and a vertical cross-correlation value from pixels in the right-most column 738 are not used either. Similarly, horizontal cross-correlation values are not needed for the pixels in the bottom-most row 740 or the two columns 736. Thus, there are 42 horizontal cross-correlation values generated using the above template $T(x)_{mid\text{-}level}$ and there are 42 vertical cross correlation values generated using the above template $T(y)_{mid\text{-}level}$. The horizontal and vertical cross-correlation values are used in the same manner as before, as described with respect to FIG. 6, in order to calculate lower left corner values for the 36 pixel locations of the set 732 of FIG. 6G.

Rather than locate more than one local maxima within the 36 pixels using a sliding window technique, the one pixel from the 36 pixels having the maximum value is selected and all the other pixel locations are ignored. The identified pixel location in the mid-level image corresponds to a pixel location in the base image that implicitly references 4 pixels of the base image.

The steps described above with respect to the translation from the top-level image to the mid-level image are repeated but now are applied to translating a pixel location from the mid-level image to the base image. Utilizing exactly the same steps as described above, a single pixel location from the mid-level image is used to identify a single pixel location in the base image that possibly corresponds to a lower left corner. One change that may be implemented is that when calculating the horizontal and vertical cross-correlation images based on the base image pixels, the original step-edge templates T(x) and T(y) can be used.

Thus, a possible lower left corner location was identified in the top-level image. This pixel location was used to select a subset of pixels in the mid-level image. This subset of pixels was further analyzed to identify a pixel location in the base image for further analysis.

The process described above is repeated for each of the possible lower left corners first identified in the top-level lower-left corner image. The result is a set of one or more pixel locations in the normalized gray scale image that may correspond to a pallet lower left corner and is equivalent to and used in place of the third set of possible first corners. Furthermore, for each of these locations a lower left corner score $Score_{LowerLeftCorner}$, discussed below, has been calculated and retained during the application of the mask of FIG. 6.

The above description of determining possible pallet lower left corners involved using all the pixels in a normalized gray scale image having dimension of 480×752 pixels. As noted previously, there can be a left limit and a right limit defined for x coordinate values such that only pixels in a region of the gray scale image considered to be "between the forks" are used in such determinations. Similarly, there can be an upper limit and a lower limit defined for y coordinate values such that only pixels in a region near the top or bottom of the gray scale image are used in such determinations, as well.

The imaging camera 130 may, in some instances, comprise either a charge coupled device (CCD) or complementary metal-oxide-semiconductor (CMOS) camera. Such cameras may have the capability to perform pixel binning. In a CCD camera, as light falls on each pixel, charge accumulates for that pixel location. The amount of accumulated charge for a pixel corresponds to that pixel's value and is represented by a color or gray scale level when the resulting image is displayed. With pixel binning, the CCD camera can combine the accumulated charge value for multiple pixels to arrive at a single pixel value for the group of pixels. While binning allows increased sensitivity to light, the resolution of a resulting image is decreased.

Binning is normally referred to as 2×2 or 4×4 binning and this refers to the horizontal and vertical dimensions of the bin size. A 2×2 binning, for instance, includes a square grouping of 4 pixels. In embodiments of the present invention, a CCD camera having a resolution of 480×752 pixels can be utilized with a 2×2 pixel binning, for example, to acquire images that are 240 (columns)×376 (rows) pixels in size. These images can be utilized with the techniques described above relating to applying one or more templates to vertical and horizontal cross-correlation images to identify possible lower left corners and other attributes of pallets in the gray scale image. The technique of using an image pyramid for analysis can also be used with these images having fewer pixels. However, it may be beneficial to only have two different image sizes in the pyramid. For example, the base image may be 240×376 pixels in size and the top-level image may be 120×188 pixels in size.

However, when using images with fewer pixels some aspects of the techniques described above may need to be modified. For example, if a 240×376 pixel image size is being used, the columns considered to be "between the forks" can be defined with a different left limit value and a different right limit value. Also, the upper limit and lower limit values for what rows of the image to consider may be different as well. For example, for the smaller image size the left limit may be 40 and the right limit may be 200. Thus, only pixels located in columns 40 to 200 would be considered "between the forks." Also, if the fork carriage apparatus 40 is traveling upwards, then only the top 250 rows of the image may be considered during analysis. Conversely, if the fork carriage apparatus 40 is traveling downwards, then the bottom 250 rows of the image may be considered during analysis.

A similar process can be used, but with the appropriate mask of FIG. 7, to identify a set of possible lower right corner locations in the normalized gray scale image along with a corresponding lower right corner score $Score_{LowerRightCorner}$, discussed below.

Figure 8:
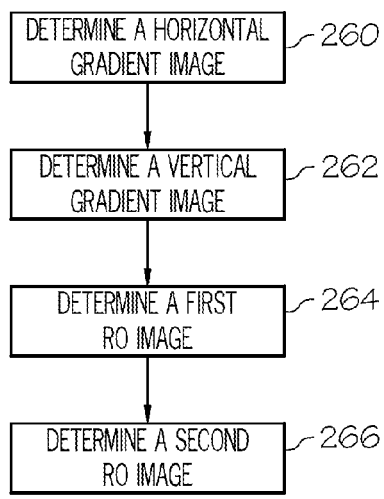
FIG. 8 is a flow chart illustrating steps implemented by the image analysis computer in accordance with the present invention for determining a first Ro image and an optional second Ro image.

The process 232 for determining a first or left Ro image, which provides an orthogonal distance from an origin point to one or more possible left vertical lines and one or more possible horizontal lines on one or more possible pallets in a corresponding gray scale image and a second or right Ro image, which provides an orthogonal distance from an origin point to one or more possible right vertical lines and one or more possible horizontal lines on one or more possible pallets in a corresponding gray scale image, will now be described with reference to FIG. 8. While both the left and right Ro images may comprise pixels corresponding to an offset from the origin of more or less horizontal lines, the first Ro image may also comprise pixels corresponding to an offset from the origin of left vertical lines, i.e., lines defining a vertical interface between an open area on the left and a pallet structure on the right, which pixels have a value greater than 0. The second Ro image may also comprise pixels corresponding to an offset from the origin of right vertical lines, i.e., lines defining a vertical interface between a pallet structure on the left and an open area on the right, which pixels have a value greater than 0.

First the image analysis computer 110 determines a horizontal gradient image, see step 260 in FIG. 8, by convolving gray scale image data from a given image frame with a first convolution kernel. The first convolution kernel G comprises in the illustrated embodiment:

G=0.0854, 0.3686, 0.8578, 0.9079, 0, −0.9079, −0.8578, −0.3686, −0.0854, wherein G is computed as a first derivative of a Gaussian function with its spread value chosen to deemphasize image noise. For example, choosing a spread value of σ=2 deemphasizes noise in the gray scale image. One example of a simplified Gaussian function shown below is the exponential of the negative square of the index x divided by the square of the spread value. This simplified Gaussian function is then modified to produce a gradient kernel, G(x), such that the peak value of the kernel is +1 and its minimum value is −1.

Thus, starting with the following simplified Gaussian equation $$\text{Simplified Gaussian}(x) = \exp\left(-\frac{x^2}{\sigma^2}\right)$$

The first derivative over x is calculated as:

$$\frac{d\,\text{Simplified Gaussian}(x)}{dx} = -\frac{2x}{\sigma^2}\exp\left(-\frac{x^2}{\sigma^2}\right)$$

The peak values of this derivative function occur at $$\pm\frac{\sigma}{\sqrt{2}}$$

and the magnitude of the derivative function at these points is $$\frac{\sqrt{2}}{\sigma}\exp(0.5)$$

By dividing the derivative function by this magnitude value, the derivative function can be modified so that its maximum value is +1 and its minimum value is −1. Performing the division generates the formula for the gradient kernel G(x):

$$G(x) = \frac{-\sqrt{2}x}{\sigma}\exp\left(0.5 - \frac{x^2}{\sigma^2}\right)$$

Figure 9:
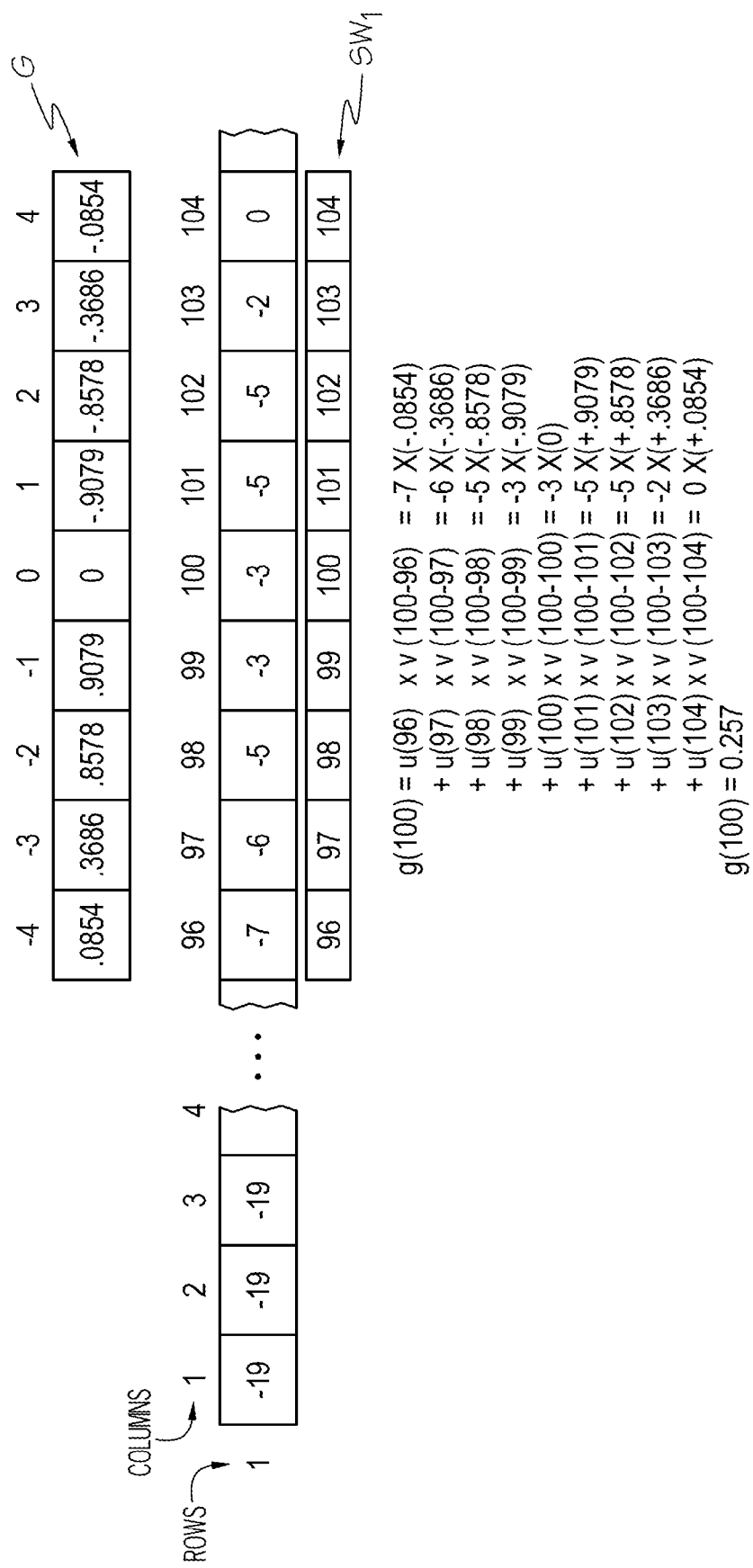
FIG. 9 illustrates an example for calculating a pixel value in a horizontal gradient image.

The computer 110 determines the horizontal gradient image by evaluating the following convolution equation using a first sliding window $SW_1$, see FIG. 9, having a horizontal number of adjacent cells that is equal to a number of elements of the first convolution kernel G, wherein the first sliding window $SW_1$ is positioned so that each cell corresponds to a respective pixel location along a portion of a particular row of the normalized gray scale image. The convolution equation for calculating a value for each pixel of the horizontal gradient image comprises:

$$g(k) = \sum_j (u(j) * v(k-j))$$

wherein:

j=a particular pixel column location in the gray scale image wherein, for the convolution equation, a value of j ranges between a first pixel column location in the portion of the particular row and a last pixel column location in the portion of the particular row;

u(j)=pixel value in the portion of the particular row of the normalized gray scale image having a j column location;

k=a pixel column location of the normalized gray scale image over which the first sliding window is centered;

(k−j)=is an index value for the first convolution kernel, as j varies in an increasing manner, this index value ranges from a highest index value corresponding to a last element of the first convolution kernel to a lowest index value corresponding to a first element of the first convolution kernel; and v(k−j)=a value of a particular element of the first convolution kernel at the index value (k−j).

With reference to FIG. 9, an example is provided of how the above convolution equation is evaluated to find a column 100, row 1 pixel value in the horizontal gradient image. The sliding window $SW_1$ is shown centered at column location 100 in the normalized gray scale image and is positioned so that each cell of the sliding window corresponds to a respective pixel location along a portion, i.e., pixel column locations 96-104 in the example of FIG. 9, of a particular row, i.e., row 1 in the example of FIG. 9, of the normalized gray scale image. Hence, the sliding window $SW_1$ has pixel column location values extending from 96 to 104. When the convolution equation is evaluated to find a column 101, row 1 pixel value, the sliding window $SW_1$ is shifted one pixel to the right such that it will then have pixel column location values extending from 97 to 105. In the example illustrated in FIG. 9, the value for the pixel at column 100, row 1 in the horizontal gradient image was calculated to equal 0.257.

Figure 16D:
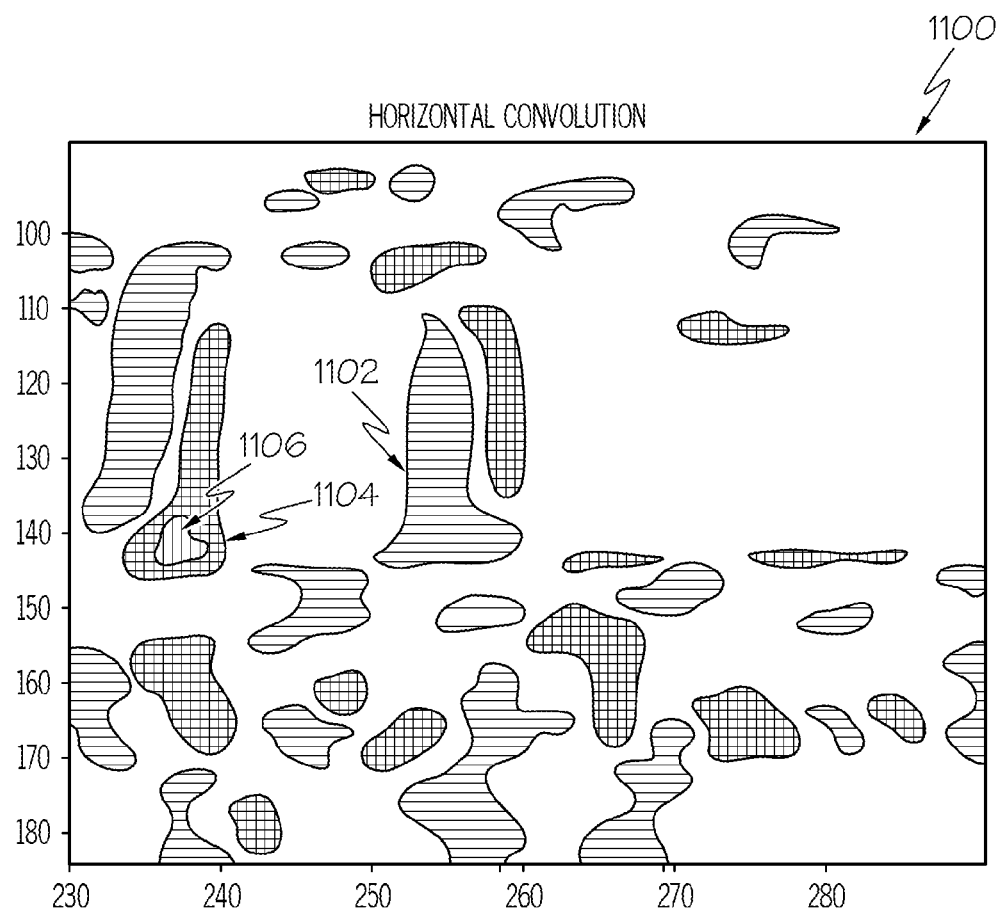
FIG. 16D is a horizontal gradient image corresponding to the gray scale image in FIG. 16A.

The horizontal gradient image will have the same number of pixels as the corresponding gray scale image such that there is a one-to-one correspondence between pixel locations in the gray scale image and the horizontal gradient image. The pixels in the horizontal gradient image measure a change in intensity at a corresponding location in the gray scale image when moving horizontally in the gray scale image and caused by a vertical interface between an open area and a pallet structure. If for example, 8-bits are being used to represent each pixel value, then the pixels in the horizontal gradient image may have values from about $-2^7$ to about $+2^7$. Depending on the number of bits allocated to represent the pixel values, the range of possible minimum and maximum values will, of course, vary. Values near zero correspond to a continuous area, i.e., continuous pallet structure or open area; a vertical interface between a pallet structure on the left and an open area on the right will result in gradient values much less than zero and a vertical interface between an open area on the left and a pallet structure on the right will result in gradient values much greater than zero. In FIG. 16D, a horizontal gradient image is shown corresponding to the gray scale image in FIG. 16A. In FIG. 16D, a first area 1100 corresponds to pixel values near 0, a second area 1102 corresponds to pixel values much less than zero, a third area 1104 corresponds to pixel values much greater than zero and a fourth area 1106 corresponds to pixel values substantially greater than zero.

Next, the image analysis computer 110 determines a vertical gradient image, see step 262 in FIG. 8, by convolving gray scale image data from a given image frame with a second convolution kernel, which, in the illustrated embodiment, is the same as the first convolution kernel. As noted above, the first convolution kernel G comprises:

G=0.0854,0.3686,0.8578,0.9079,0,−0.9079,−0.8578,− 0.3686,−0.0854

The computer 110 determines the vertical gradient image by evaluating the following convolution equation using a second sliding window having a vertical number of adjacent cells that is equal to a number of elements of the second convolution kernel, wherein the second sliding window is positioned so that each cell corresponds to a respective pixel location along a portion of a particular column of the normalized gray scale image. The convolution equation for calculating a value for each pixel of the vertical gradient image $$g(d) = \sum_c (u(c) * v(d-c))$$

wherein:

c=a particular pixel row location in the gray scale image wherein, for the convolution equation, a value of c ranges between a first pixel row location in the portion of the particular column and a last pixel row location in the portion of the particular column;

u(c)=pixel value in the portion of the particular column of the normalized gray scale image having a c row location;

d=a pixel row location of the normalized gray scale image over which the second sliding window is centered;

(d−c)=is an index value for the second convolution kernel, as c varies in an increasing manner, this index value ranges from a highest index value corresponding to a last element of the second convolution kernel and a lowest index value corresponding to a first element of the second convolution kernel; and v(d−c)=a value of a particular element of said second convolution kernel at the index value (d−c).

Figure 10:
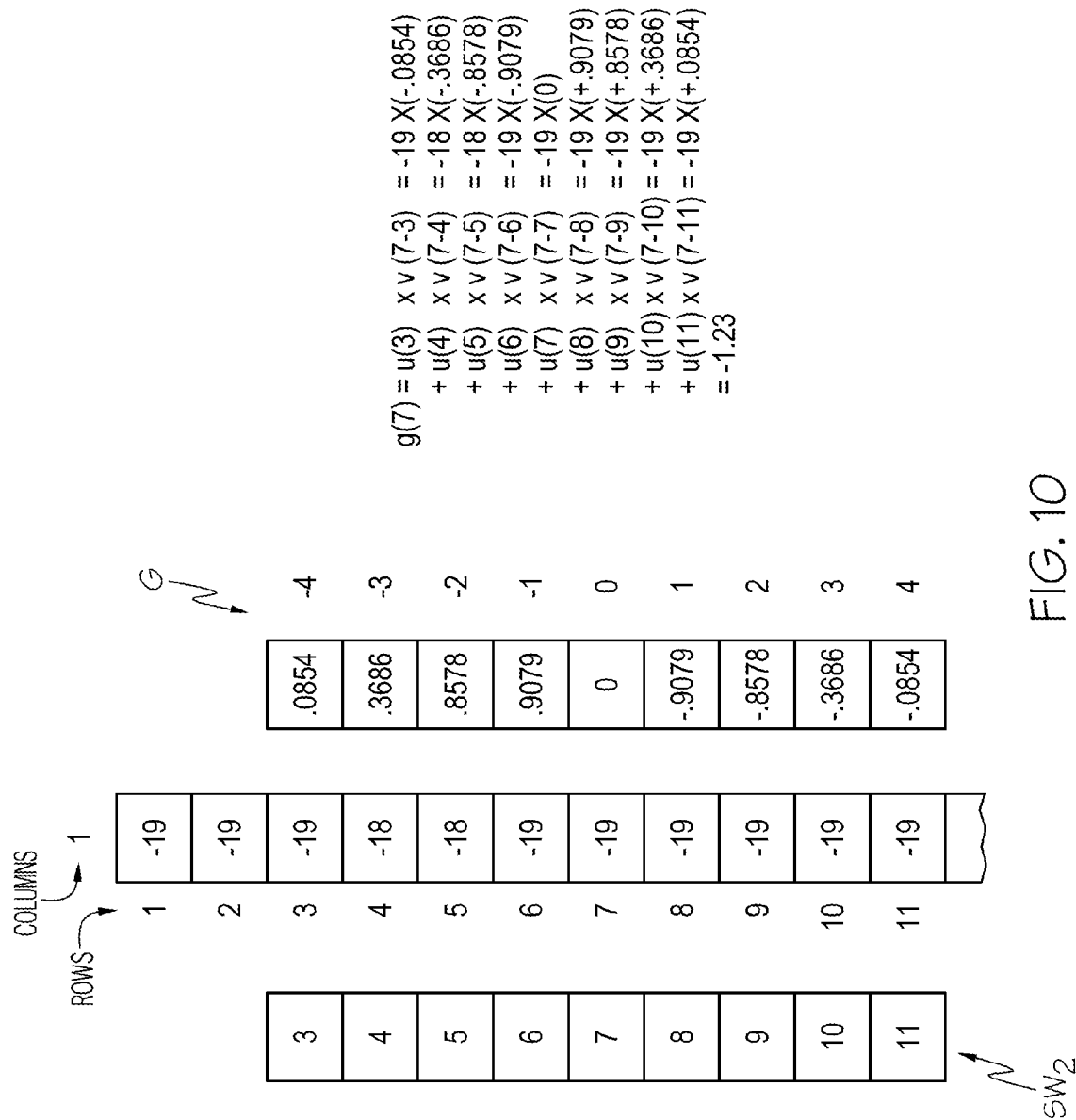
FIG. 10 illustrates an example for calculating a pixel value in a vertical gradient image.

With reference to FIG. 10, an example is provided of how the above convolution equation is evaluated to find a column 1, row 7 pixel value in the vertical gradient image. The sliding window $SW_2$ is shown centered at row location 7 in the gray scale image and is positioned so that each cell of the sliding window corresponds to a respective pixel location along a portion, i.e., pixel row locations 3-11 in the example of FIG. 10, of a particular column, i.e., column 1 in the example of FIG. 10, of the normalized gray scale image. Hence, the sliding window $SW_2$ has pixel row location values extending from 3 to 11. When the convolution equation is evaluated to find a column 1, row 8 pixel value, the sliding window SW is shifted down one pixel such that it will then have pixel location values extending from 4 to 12. In the example illustrated in FIG. 10, the value for the pixel at column 1, row 7 in the vertical gradient image was calculated to equal −1.23.

Figure 16E:
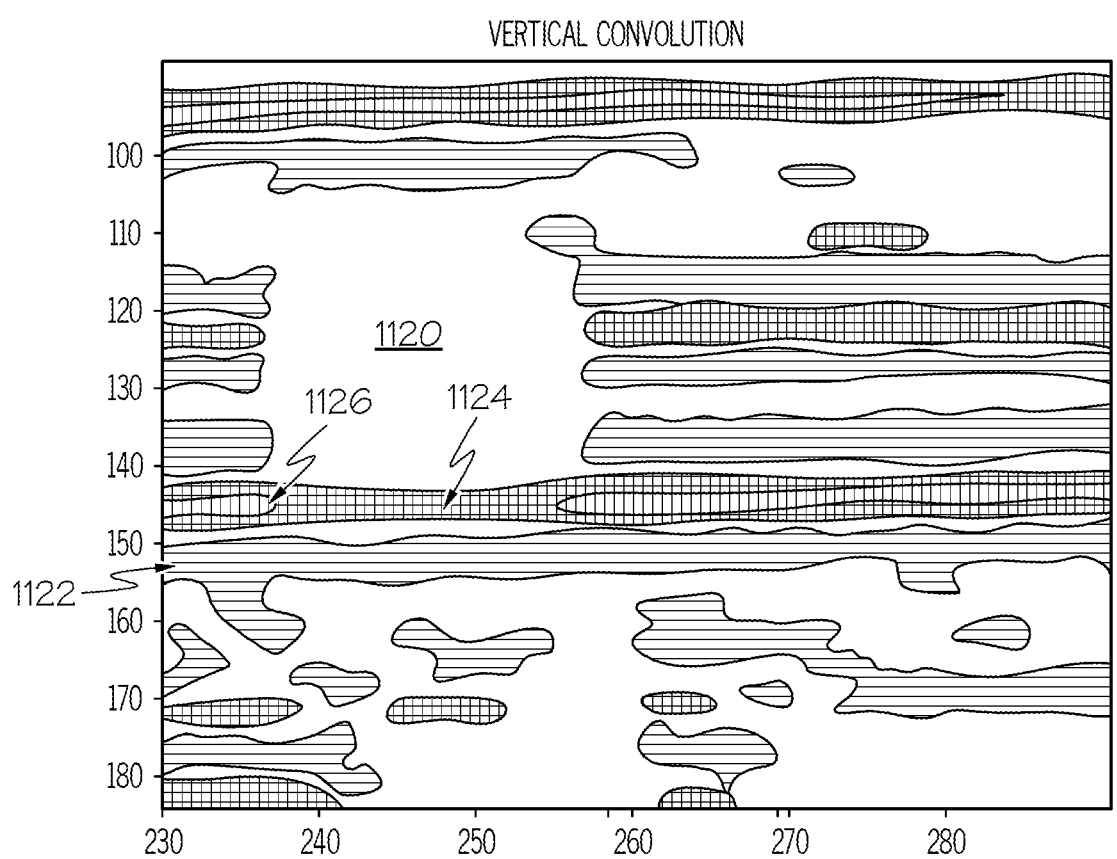
FIG. 16E is a vertical gradient image corresponding to the gray scale image in FIG. 16A.

The vertical gradient image will have the same number of pixels as the corresponding gray scale image such that there is a one-to-one correspondence between pixel locations in the gray scale image and the vertical gradient image. The pixels in the vertical gradient image measure a change in intensity at a corresponding location in the gray scale image when moving vertically from top to bottom in the gray scale image and caused by a horizontal interface between an open area and pallet structure. If for example, 8-bits are being used to represent each pixel value, then the pixels in the vertical gradient image may have values from about $-2^7$ to about $+2^7$. Values near zero correspond to a continuous area, i.e., continuous pallet structure or open area; a horizontal interface between an upper pallet structure and a lower open area will result in gradient values much less than zero and a horizontal interface between an upper open area and a lower pallet structure will result in gradient values much greater than zero. In FIG. 16E, a vertical gradient image is shown corresponding to the gray scale image in FIG. 16A. In FIG. 16E, a first area 1120 corresponds to pixel values near 0, a second area 1122 corresponds to pixel values much less than 0, a third area 1124 corresponds to pixel values much greater than 0 and a fourth area 1126 corresponds to pixel values substantially greater than 0.

In determining the horizontal and vertical gradient images there will be instances near the edges of the image that the sliding window will have one or more cells that do not overlap an image pixel because the cell falls outside the range of the image pixels. In these instances, the value of the image pixel when calculating the convolution equations will be treated as equal to zero in order to minimize the effect that these non-existent pixels have on the convolution calculations.

After determining the horizontal and vertical gradient images, the image analysis computer 110 determines the first Ro image, $\rho_{left}$, providing an orthogonal distance in pixels from an origin point on the normalized gray scale image to one or more possible horizontal lines and left vertical lines representative of one or more possible pallets in the gray scale image (that corresponds to the camera image), see step 264 in FIG. 8. The first Ro image is determined by the image analysis computer 110 by evaluating the following equation:

$$\rho_{left}(x, y) = \frac{xg_x + yg_y}{\sqrt{g_x^2 + g_y^2}}$$

wherein:

x=a gradient pixel row location in a horizontal direction;

y=a gradient pixel column location in a vertical direction;

$g_x$=a gradient pixel value from the horizontal gradient image corresponding to pixel location (x, y); and $g_y$=a gradient pixel value from the vertical gradient image corresponding to pixel location (x, y).

In a particular instance when both $g_x$ and $g_y$ equal zero for a pixel, then the Ro image pixel value is set to zero.

The first Ro image will have the same number of pixels as the corresponding gray scale image such that there is a one-to-one correspondence between pixel locations in the gray scale image and the first Ro image. The range of pixel values in the first Ro image may vary based on gray scale image dimensions, which, in the illustrated embodiment, are 480 pixels×752 pixels. Hence, the first Ro image pixels, which define an orthogonal distance from an origin point on the normalized gray scale image to one or more possible horizontal lines and left vertical lines, may have values from about −800 to about +800. A vertical line defining an interface between an open structure on the left and a pallet structure on the right or a horizontal line defining an interface between an upper open area and a lower pallet structure will be represented in the first Ro image by positive pixel values. A vertical line defining an interface between a pallet structure on the left and an open area on the right or a horizontal line defining an interface between a lower open area and an upper pallet structure will be represented by negative values.

Figure 16F:
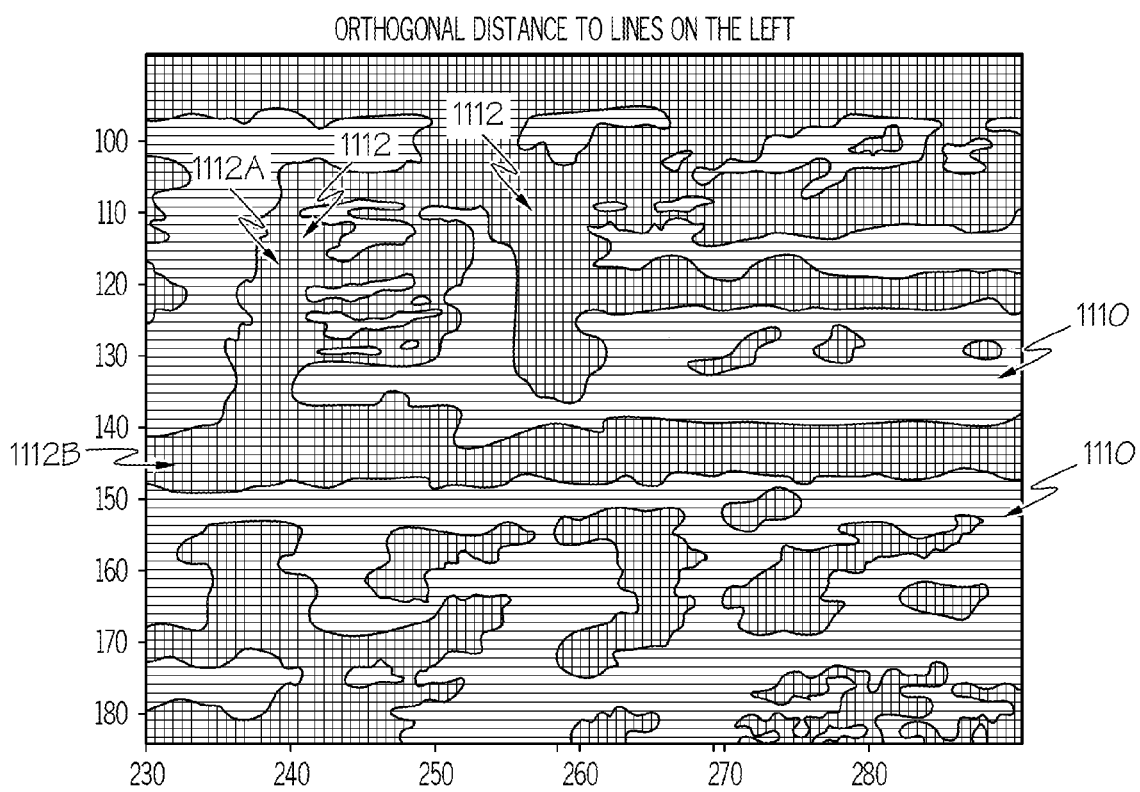
FIG. 16F is a first Ro image corresponding to the gray scale image in FIG. 16A.

In FIG. 16F is a first Ro image corresponding to the gray scale image in FIG. 16A. In FIG. 16F, first regions 1110 corresponds to negative pixel values and second regions 1112 corresponds to positive pixel values. A first section 1112A of the second region 1112 corresponds to the left surface 208A of the center stringer 208 and a second section 1112B of the second region 1112 corresponds to the upper surface 200A of the bottom pallet board 200. FIG. 16F illustrates that first, or left, Ro image pixels will have a positive value when those pixel locations are over the left vertical surface 208A of the center stringer 208 or an upper horizontal surface 200A of the bottom pallet board 200. However, other pixels in the first Ro image may also have a positive value but not necessarily be located over a left vertical surface of a center stringer or an upper horizontal surface of a bottom pallet board.

Next, the image analysis computer 110 may determine a second Ro image, $\rho_{right}$, providing an orthogonal distance in pixels from an origin point on the normalized gray scale image (that corresponds to the camera image) to one or more possible horizontal lines and right vertical lines representative of one or more possible pallets in the gray scale image, see step 266 in FIG. 8. The second Ro image is determined by the image analysis computer 110 by evaluating the following equation:

$$\rho_{right}(x, y) = \frac{-xg_x + yg_y}{\sqrt{g_x^2 + g_y^2}}$$

wherein:
x=a gradient pixel row location in a horizontal direction;
y=a gradient pixel column location in a vertical direction;
$g_x$=a gradient pixel value from the horizontal gradient image corresponding to pixel location (x, y); and
$g_y$=a gradient pixel value from the vertical gradient image corresponding to pixel location (x, y).

Similar to the first Ro image, the value of this equation is set to zero if both $g_x$ and $g_y$ equal zero for a pixel.

The second Ro image will have the same number of pixels as the corresponding gray scale image. The range of pixel values in the second Ro image may vary based on gray scale image dimensions, which, in the illustrated embodiment, are 480 pixels×752 pixels. Hence, the pixels may have values from about −800 to about +800. A vertical line defining an interface between a pallet structure on the left and an open area on the right or a horizontal line defining an interface between an upper open area and a lower pallet structure will be represented in the second Ro image by positive pixel values. A vertical line defining an interface between an open structure on the left and a pallet structure on the right or a horizontal line defining an interface between a lower open area and an upper pallet structure will be represented by negative pixel values.

Figure 16G:
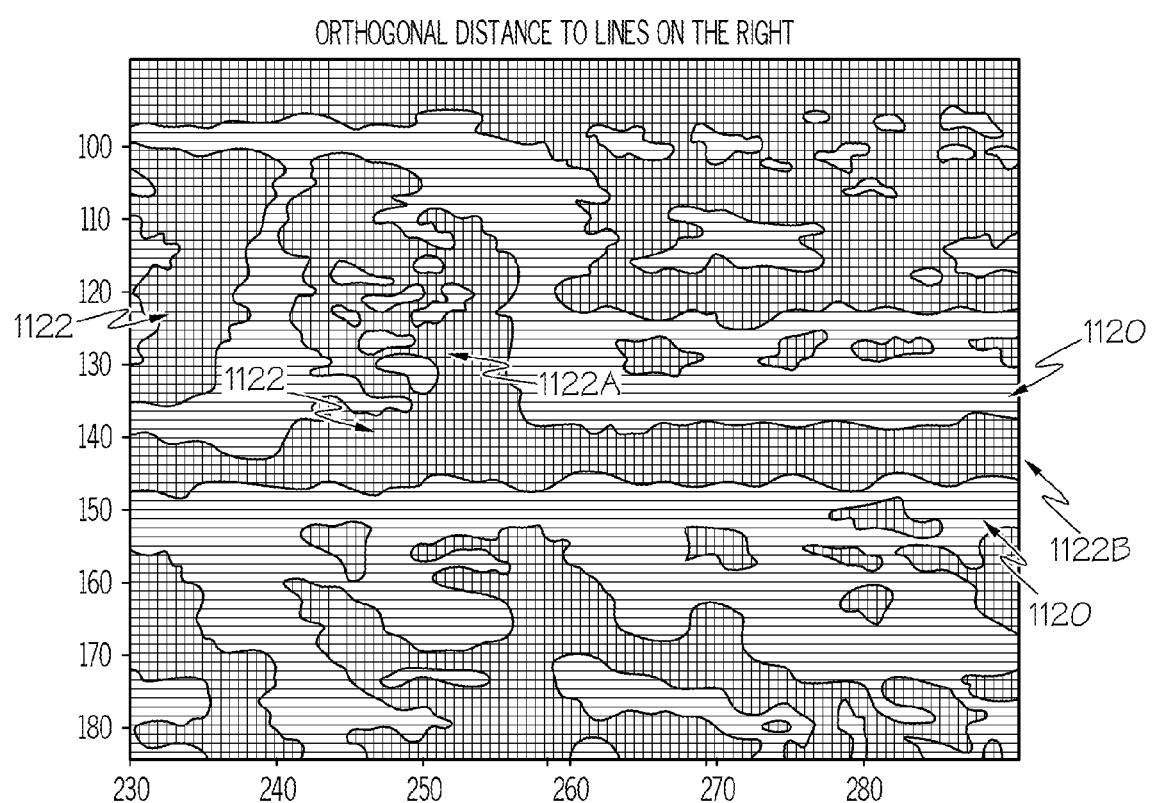
FIG. 16G is a second Ro image corresponding to the gray scale image in FIG. 16A.

In FIG. 16G a second Ro image is illustrated corresponding to the gray scale image in FIG. 16A. In FIG. 16G, first regions 1120 corresponds to negative pixel values and second regions 1122 corresponds to positive pixel values. A first section 1122A of the second region 1122 corresponds to the right surface 208B of the center stringer 208 and a second section 1122B of the second region 1122 corresponds to the upper surface 200A of the bottom pallet board 200. FIG. 16G illustrates that second, or right, Ro image pixels will have a positive value when those pixel locations are over the right vertical surface 208B of the center stringer 208 or an upper horizontal surface 200A of the bottom pallet board 200. However, other pixels in the second Ro image may also have a positive value but not necessarily be located over a right vertical surface of a center stringer or an upper horizontal surface of a bottom pallet board.

Analysis of a single pixel in a Ro image does not definitively reveal whether or not that pixel is over a left (or right) vertical surface or upper horizontal surface of a pallet. Instead, an interface between pallet structure and an opening is characterized in a Ro image by a string of adjacent pixels having substantially the same pixel value, with that value being the orthogonal distance from the image origin to that interface. Thus, a string of such pixels having nearly the same positive Ro value and stretching from $(x_1, y_1)$ to $(x_2, y_2)$ in the Ro image represents an possible pallet line or edge in the gray scale image that also extends between $(x_1, y_1)$ and $(x_2, y_z)$. For a pallet edge that extends substantially vertically, $x_2$ can equal $x_1$ and for a substantially horizontal edge $y_2$ may equal $y_1$. Furthermore, the longer the string of pixels is that share the same Ro value, the more likely the string of pixels represents an actual edge of the pallet. Ideally, the pixels sharing the same Ro value will be directly adjacent to one another; however, in an actual image having noise and other imperfections, "adjacent" can include pixels within a certain minimum distance (e.g., ±5 pixels) of one another rather than only pixels directly adjacent to one another.

An optional pre-qualification test in accordance with a first embodiment of the present invention for each lower left corner from the third set of lower left corners is defined by the process 234, which attempts to trace horizontal and vertical lines from each identified corner of the third set of first possible corners, i.e., possible lower-left corners. The process 234 will now be described with reference to FIGS. 11A, 11B, 12A, 12B, 13A and 13B. If a horizontal and a vertical line can be traced from a possible lower-left corner, then that corner is considered pre-qualified. If horizontal and vertical lines cannot be traced from a possible lower-left corner, then that possible corner is disqualified/ignored. A traced horizontal line may correspond to an upper surface 200A of a bottom pallet board 200 and a traced vertical line may correspond to the left surface 208A of the pallet center stringer 208, see FIG. 3.

A portion of an example first or left Ro image is illustrated in FIG. 11A, which includes a possible first or lower left corner LLC shown at a pixel location corresponding to image column 178, row 214.

A process for attempting to trace a horizontal line will now be described with reference to the process steps illustrated in FIGS. 12A and 12B.

Figure 11B:
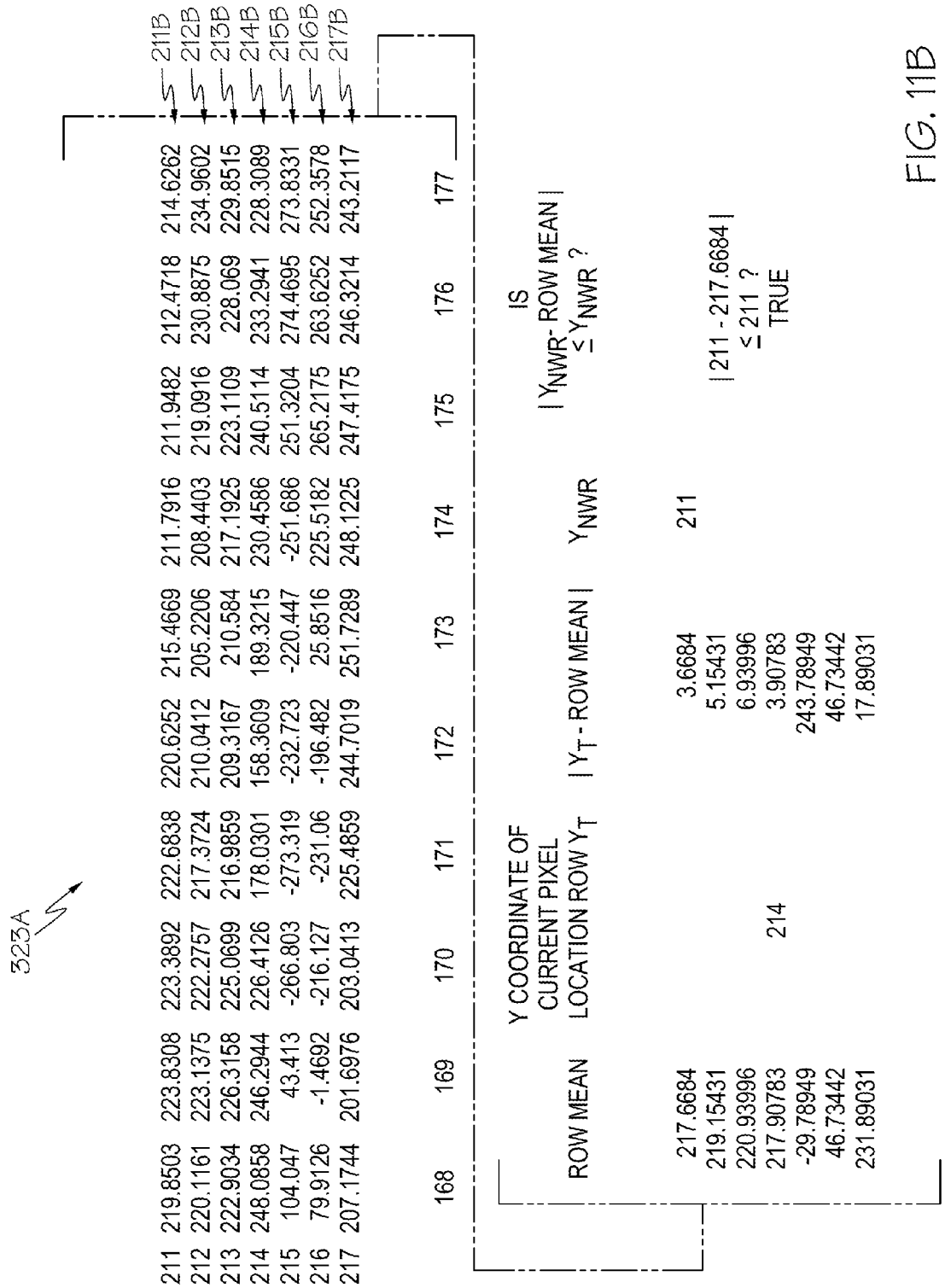
Figure 12A:
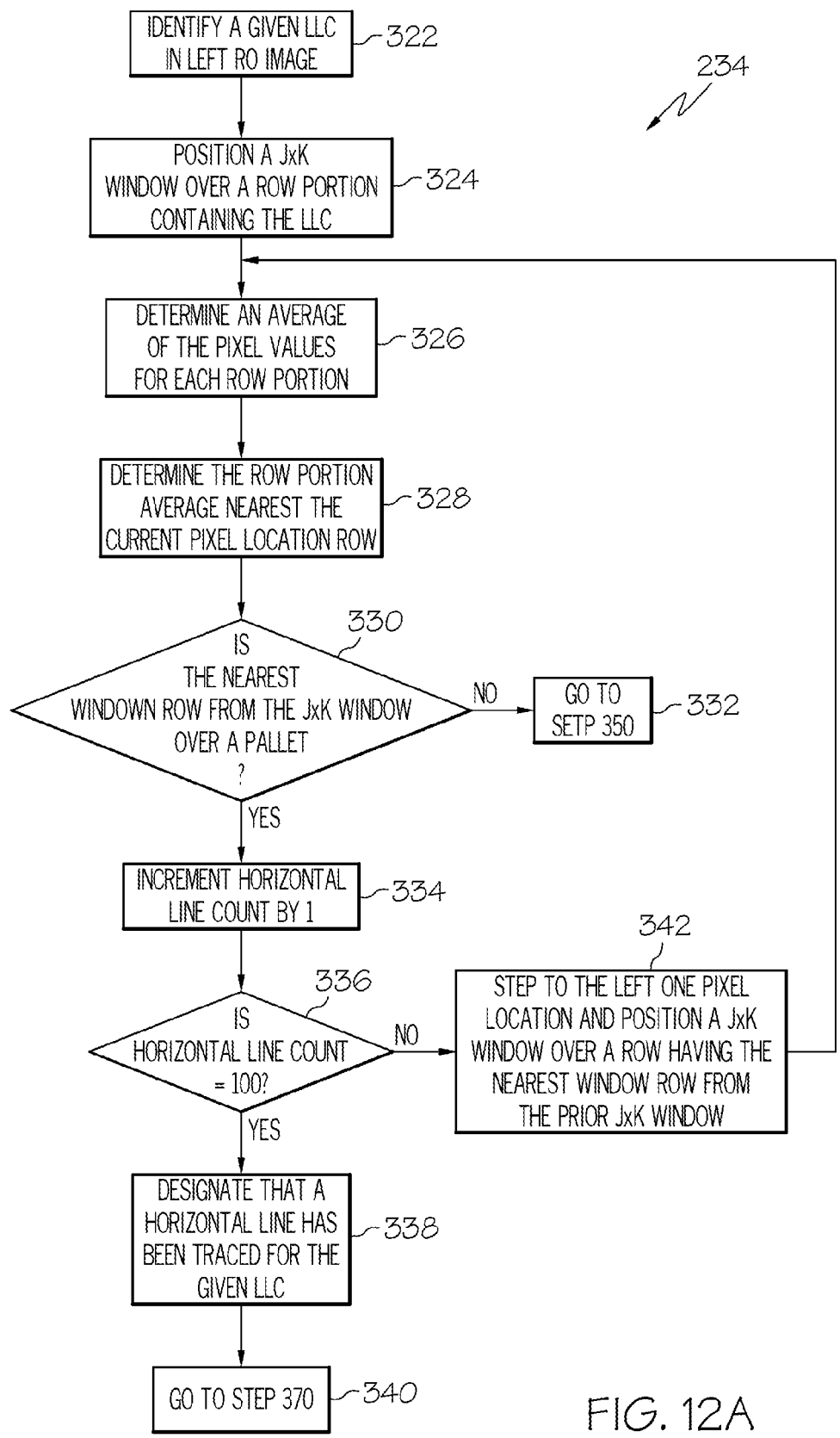
FIGS. 12A, 12B, 13A and 13B are flow charts illustrating steps implemented by the image analysis computer in accordance with one embodiment of the present invention for tracing a horizontal and a vertical line from a lower left corner in the left Ro image.
Figure 12B:
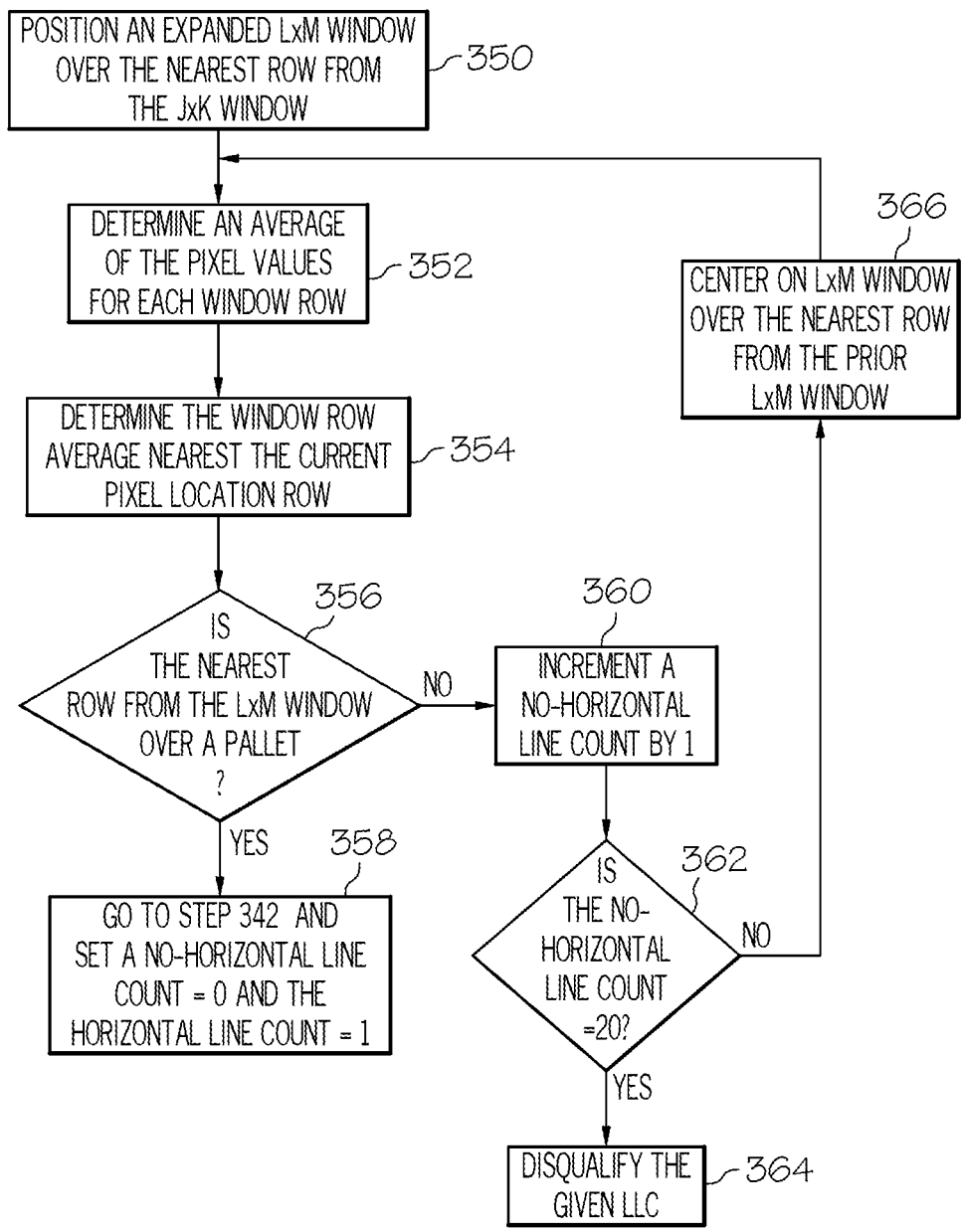

After the image analysis computer 110 identifies one of the possible lower left corners from the third set of lower left corners in the first Ro image, see step 322, it positions a J×K window 323 over at least portions of a plurality of image rows in the first Ro image including at least a portion of an image row containing the possible lower left corner LLC, see step 324 in FIG. 12A. More specifically, the window 323 is centered over the row portion including the lower left corner LLC, with the column including the lower left corner defining the right-most column in the window 323. In the illustrated embodiment, the J×K window 323 comprises a 10×7 window, see FIG. 11A.

The image analysis computer 110 then calculates an average pixel value for each row in the window 323, see step 326. In FIG. 11A, the window 323 includes rows 211A-217A. Window rows 211A-217A define portions of the image rows 211-217 in the first Ro image in FIG. 11A. The average pixel value or row mean for each window row 211A-217A is provided in FIG. 11A. For example, window row 211A has an average pixel value or row mean of 217.50012.

The computer 110 then determines which window row 211A-217A in the window 323 has an average pixel value nearest the Y coordinate value of a row $Y_T$ of the current pixel location being considered for inclusion in a line being traced (a line being traced is also referred to herein as "trace"), see step 328. In FIG. 11A, the lower left corner LLC at first Ro image column 178, row 214 defines the starting point of the line being traced and, hence, is the current pixel location being considered for inclusion in the line being traced in the window 323. To find the window row having an average pixel value nearest the current pixel location row $Y_T$, 214 in the illustrated example, the computer 110 first determines an absolute value of the difference |D| between the current pixel location row $Y_T$ and the row mean for each window row 211A-217A using the following equation:

$$|D|=|Y_T-\text{row mean}| \quad \text{Equation 1}$$

|D| values for each window row 211A-217A are provided in FIG. 11A. The computer 110 then identifies the window row 211A-217A having the smallest absolute value of the difference between the current pixel location row $Y_T$ and its row mean. For the window 323 illustrated in FIG. 11A, window row 214A has an absolute value of the difference |D| between the current pixel location row $Y_T$ and its row mean=0.01399, which is the smallest absolute value of the difference |D| of all of the window rows 211A-217A in the window 323, see FIG. 11A. The window row having the smallest absolute value of the difference |D| is defined as the "nearest window row"; hence, window row 214A is defined as the nearest window row in the window 323 of FIG. 11A.

The image analysis computer 110 then decides whether the nearest window row is over a pallet P, see step 330, by solving the following equation:

$$\begin{cases} |Y_{NWR} - \text{row mean}(NWR)| \leq Y_{NWR}, & \Rightarrow \text{over a pallet} \\ \text{otherwise}, & \Rightarrow \text{not over a pallet} \end{cases} \quad \text{Equation 2}$$

wherein:
$Y_{NWR}$=Y coordinate value of an image row including the nearest window row in the J×K window; and
row mean (NWR)=average of pixel values in the nearest window row in the J×K window.

In the illustrated example, Equation 2 is shown solved in FIG. 11A as being true, i.e., the nearest window row 214A is over a pallet P. If the nearest window row 214A is over a pallet, it is presumed that the current pixel location, i.e., the possible lower left corner LLC at image column 178, row 214, is also positioned over a pallet P. The computer 110 then decides that the current pixel location (column 178, row 214) is to be included as one of the pixels that make up the horizontal line, i.e., a possible bottom pallet board, being traced and increments a horizontal line count by 1, see step 334. The computer 110 then checks to determine if the count is equal to a predefined count, e.g., 100 in the illustrated embodiment, see step 336. If yes, then the computer 110 concludes that a horizontal line has been traced from the lower left corner LLC, see step 338. The computer 110 then goes to step 370 in FIG. 13A, which will be discussed below, see step 340.

If the count is less than 100 in step 336, the computer 110 then steps the window 323 horizontally to the left by one pixel, centers the stepped window 323A over a new window row collinear with the image row containing the previously determined nearest window row, row 214 in the example illustrated in FIGS. 11A and 11B, and returns to step 326, see step 342.

In FIG. 11B, the stepped window 323A is shown centered over row 214. The window 323A comprises window rows 211B-217B. The current pixel location in the stepped window 323A is at the right-most pixel of the center window row in the window 323A, i.e., window row 214B. Hence, the current pixel location being considered for inclusion in the line being traced is at a pixel located at image column 177, row 214. The average pixel value for each of the window rows 211B-217B in the stepped window 323A is provided in FIG. 11B. Window row 211B has an average pixel value nearest the Y-coordinate value of row 214, which is the row of the current trace location. Hence, window row 211B is the nearest window row in the stepped window 323A. Equation 2 is shown solved in FIG. 211B as true. As shown in FIG. 11B, solving Equation 2 above determines that the current pixel location, i.e., the pixel at image column 177, row 214, is positioned over a pallet P. The computer 110 then determines that the current pixel location (column 177, row 214) should be included as a pixel of the horizontal line, i.e., a possible bottom pallet board, being traced and increments a horizontal line count by 1, see step 334. The computer 110 then goes to step 336.

If, in step 330, it is decided that the nearest row in the window 323 is not over a pallet, then the image analysis computer 110 centers an L×M window 323B over the nearest row 214A in the window 323, see step 350, wherein the L×M window 323B is larger than the J×K window 323 to facilitate capture of the pallet if possible. In the illustrated embodiment, the L×M window 323B comprises a 10×9 window. The computer 110 then calculates an average of the pixel values for each row in the L×M window 323B, see step 352 and determines which row in the L×M window 323B has an average pixel value nearest the Y coordinate value of the current pixel location being considered for inclusion in the line being traced, which comprises the right-most pixel in the center row of the window 323 (the center row in the window 323B is the same as the nearest row 214A in the window 323), see step 354. The row in the L×M window having an average pixel value nearest the Y coordinate of the current pixel location is defined as a "nearest row," and the computer 110 decides whether the nearest row in the L×M window 323B is over a pallet using Equation 2 set out above (wherein the L×M window is used when evaluating Equation 2 instead of the J×K window), see step 356. If the nearest row in the L×M window 323B is determined to be over a pallet, the computer 110 sets the horizontal line count equal to 1, sets a no-horizontal line count equal to zero and then proceeds to step 342, see step 358. If the nearest row in the L×M window is determined not to be over a pallet, then the no-horizontal line count is incremented by 1, see step 360. The computer 110 then determines if the no-horizontal line count is equal to 20, see step 362. If yes, the lower left corner is disqualified. If the no-horizontal line count is less than 20, then an L×M window is centered over the nearest row from the prior L×M window, see step 366, and the computer returns to step 352.

A further portion of the example first or left Ro image from FIG. 11A is illustrated in FIG. 11C, which includes the possible first or lower left corner LLC shown at a pixel location corresponding to image column 178, row 214.

Figure 13A:
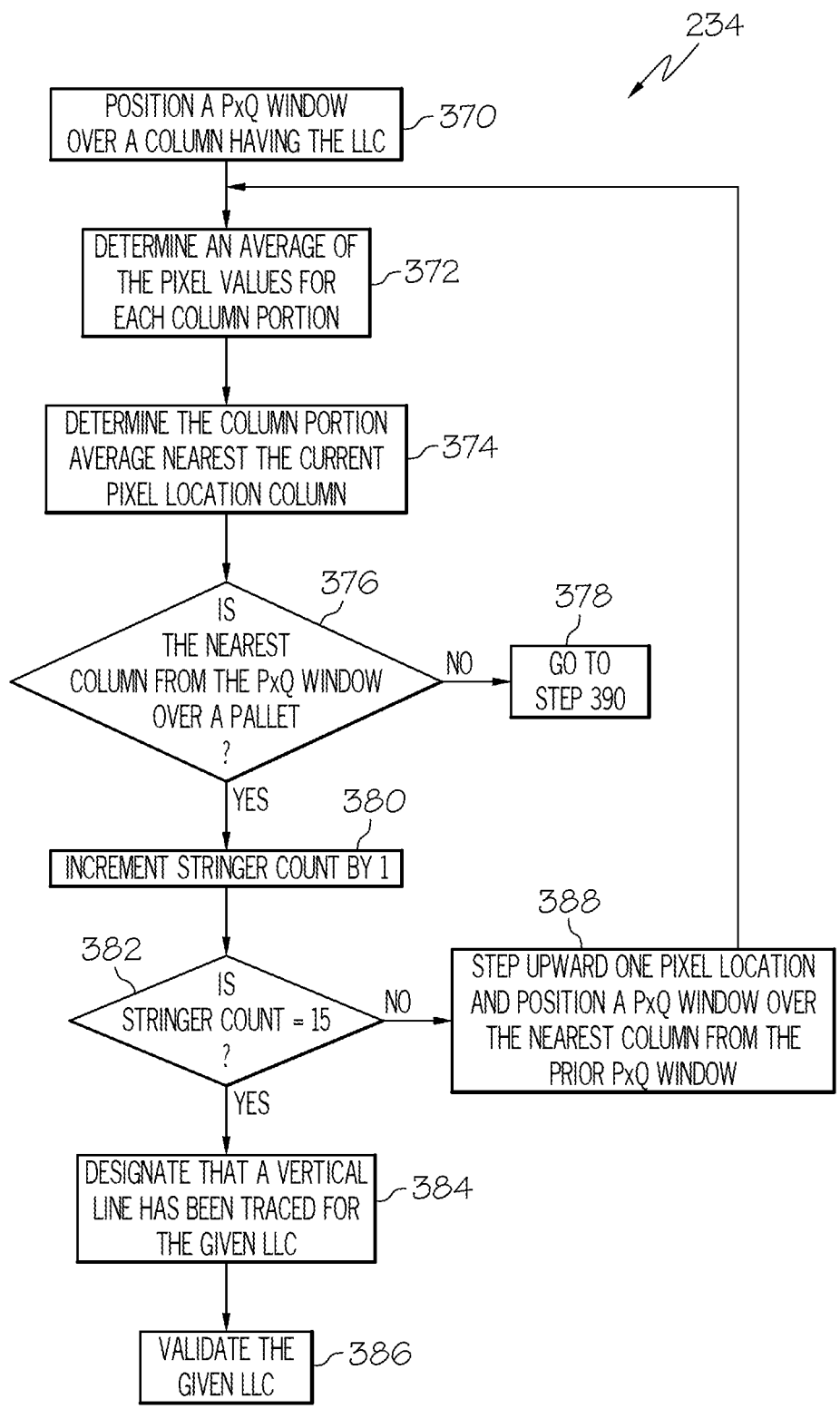
Figure 13B:
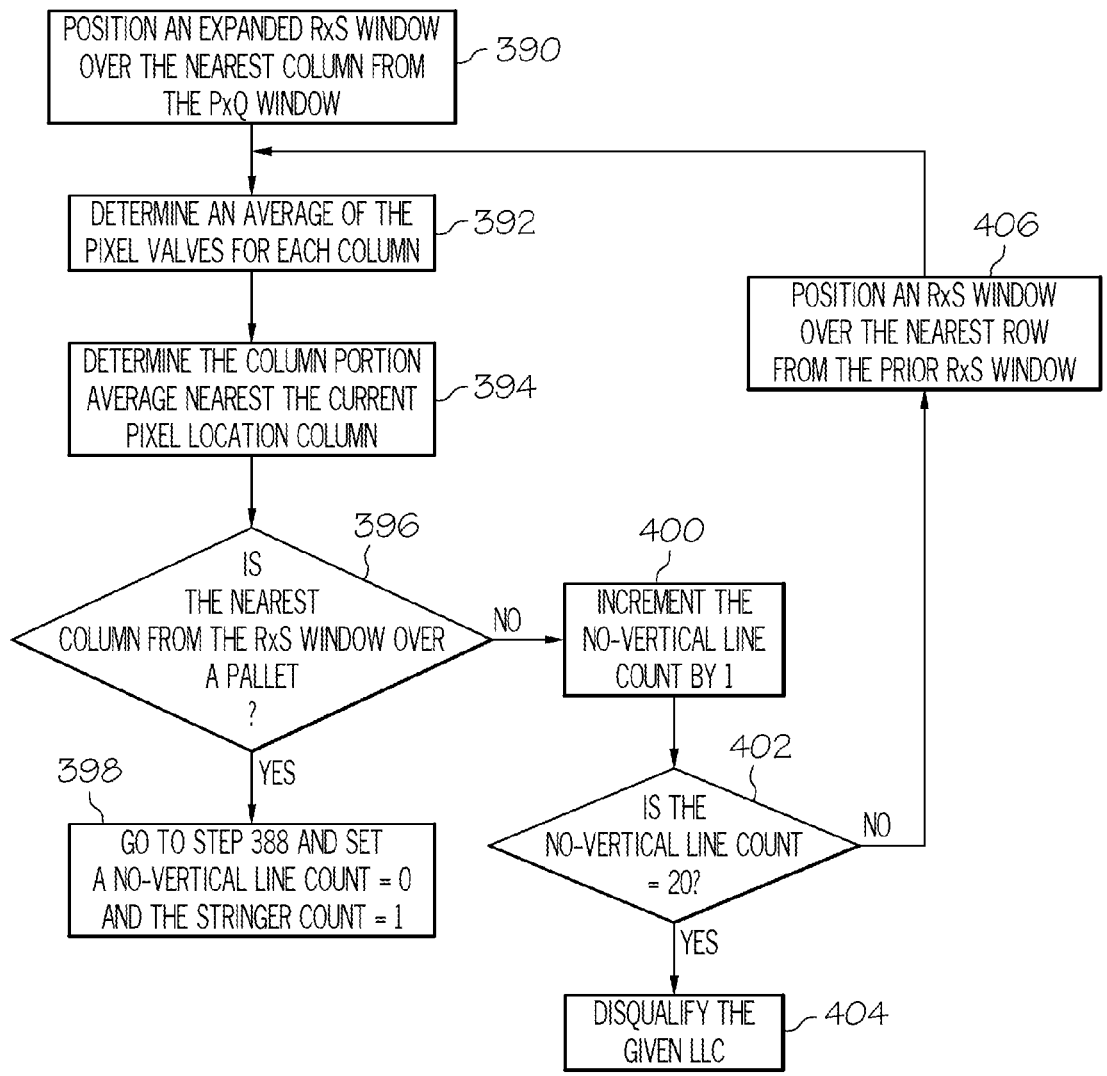

A process for attempting to trace a vertical line will now be described with reference to the process steps illustrated in FIGS. 13A and 13B. After the image analysis computer 110 has traced a horizontal line from the possible lower left corner LLC, see steps 338 and 340, it positions a P×Q window 371 over at least portions of a plurality of image columns in the first Ro image including at least a portion of an image column containing the possible lower left corner LLC, see step 370 and FIG. 11C. More specifically, the window 371 is centered over the column portion including the lower left corner LLC, with the row including the lower left corner defining the lower-most row in the window 371. In the illustrated embodiment, the P×Q window 371 comprises a 5×6 window.

The image analysis computer 110 then calculates an average pixel value for each column in the window 371, see step 372. In FIG. 11C, the window 371 includes columns 176A-180A. Window columns 176A-180A define portions of the image columns 176-180 in FIG. 11C. The average pixel value or column mean for each window column 176A-180A is provided in FIG. 11C. For example, window column 178A has an average pixel value or column mean of 221.2977.

The computer 110 then determines which window column 176A-180A in the window 371 has an average pixel value nearest the X coordinate value of a column $X_T$ of the current pixel location being considered for inclusion in a line being traced, see step 374. In FIG. 11C, the lower left corner LLC at first Ro image column 178, row 214 defines the starting point of the line being traced and, hence, is the current pixel location being considered for inclusion in the line being traced in the window 371. To find the window column having an average pixel value nearest the current pixel location column $X_T$, the computer 110 first determines an absolute value of the difference |D| between the current pixel location column $X_T$ and the column mean for each window column 176A-180A using the following equation:

$$|D| = |X_T - \text{column mean}|$$ Equation 3

|D| values for each window column 176A-180A are provided in FIG. 11C. The computer 110 then identifies the window column 176A-180A having the smallest absolute value of the difference between the current pixel location column $X_T$ and its column mean. For the window 371 illustrated in FIG. 11C, window column 178A has an absolute value of the difference |D| between the current pixel location column $X_T$ and its column mean=43.29768, which is the smallest absolute value of the difference |D| of all of the window columns 176A-180A in the window 371, see FIG. 11C. The window column having the smallest absolute value of the difference |D| is defined as the "nearest window column"; hence, window column 178A is defined as the nearest window column in the window 371 of FIG. 11C.

The image analysis computer 110 then decides whether the nearest column is over a pallet P, see step 376, by solving the following Equation 4:

$$\begin{cases} |X_{NWC} - \text{column mean}(NWC)| \le 1.5 X_{NWC}, & \Rightarrow \text{over a pallet} \\ \text{otherwise}, & \Rightarrow \text{not over a pallet} \end{cases}$$

wherein:
$X_{NWC}$=X coordinate value of a column in the Ro image including the nearest column from the P×Q window; and
column mean (NWC)=average of pixel values in the nearest window column in the P×Q window.

In the illustrated example, Equation 4 is shown solved in FIG. 11C as being true, i.e., the nearest window column 178A is over a pallet. If the nearest window column is over a pallet, it is presumed that the current pixel location, i.e., the possible lower left corner LLC at image column 178, row 214, is also positioned over a pallet P. The computer 110 then decides that the current pixel location (column 178, row 214) in the nearest column 178A is to be included as one of the pixels that make up a vertical line, i.e., a possible left surface 208A of a pallet center stringer 208, being traced and increments a vertical line or stringer count by 1, see step 380. The computer 110 then checks to determine if the stringer count is equal to a predefined count, e.g., 15 in the illustrated embodiment, see step 382. If yes, then the computer 110 concludes that a vertical line has been traced from the lower left corner LLC, see step 384. The computer 110 then validates the lower left corner LLC from which horizontal and vertical lines were traced, see step 386 in FIG. 13A.

If the count is less than 15 in step 382, the computer 110 then steps the window 371 vertically upward by one pixel, centers the stepped window 371A over a new window column collinear with the image column containing the previously determined nearest window column, column 178A in the example illustrated in FIGS. 11C and 11D, and returns to step 372.

In FIG. 11D, the stepped window 371A is shown centered over column 178. The window 371A comprises window rows 176B-180B. The current pixel location being considered for inclusion in the line being traced in the stepped window 371A is at the bottom-most pixel of the center window column in the window 371A, i.e., window column 178B. Hence, the current pixel location being considered for inclusion in the line being traced is at a pixel located at image column 178, row 213. The average pixel value for each of the window columns 176B-180B in the stepped window 371A is provided in FIG. 11D. Window column 176B has an average pixel value nearest the X-coordinate value of column 178, which is the column of the current pixel location. Hence, window column 176B is the nearest window column in the stepped window 371A. Equation 4 is shown solved in FIG. 11D as true. As shown in FIG. 11D, solving Equation 4 determines that the current pixel location, i.e., the pixel at image column 178, row 213, is positioned over a pallet P. Thus, computer 110 then determines that the current trace location (column 178, row 213) is a pixel of a vertical line, i.e., a possible left surface 208A of a pallet center stringer 208, to be traced and increments a vertical line count by 1, see step 380. The computer 110 then goes to step 382.

If, in step 376, it is decided that the one nearest column in the window 371 is not over a pallet, then the image analysis computer 110 centers an R×S window 371B over the nearest column 178A in the window 371, see step 390, to facilitate capture of the pallet if possible, wherein the R×S window 371B is larger than the P×Q window 371, see FIG. 11C. In the illustrated embodiment, the R×S window 371B comprises a 7×6 window. The computer 110 then calculates an average of the pixel values for each column in the R×S window 371B, see step 392, determines which column in the R×S window 371B has an average pixel value nearest the X coordinate value of the current pixel location being considered for inclusion in the trace, which comprises the lower-most pixel in the center column of the window 371B (the center column in the window 371B is the same as the nearest column 178A in the window 371), see step 394, which column is defined as a "nearest column" and decides whether the nearest column in the R×S window 371B is over a pallet using Equation 4 set out above (wherein the R×S window is used when evaluating Equation 4 instead of the P×Q window), see step 396. If the nearest column in the R×S window 371B is determined to be over a pallet, then the computer 110 sets the stringer count equal to 1, sets a no-vertical line count equal to zero and then proceeds to step 388, see step 398. If the nearest column in the R×S window is determined not to be over a pallet, then the no-vertical line count is incremented by 1, see step 400. The computer 110 then determines if the no-vertical line count is equal to 20, see step 402. If yes, then lower left corner LLC is disqualified. If the no-vertical line count is less than 20, then a R×S window is centered over the nearest column from the prior R×S window, see step 406, and the computer returns to step 392.

A pre-qualification test in accordance with a second embodiment of the present invention for each lower left corner will now be described with reference to FIG. 14A-14D. The pre-qualification test involves attempting to trace a horizontal line and a vertical line from each possible lower left corner. This test also uses the pixel values from a Ro image and, particularly, pixel values from the first Ro image. If a horizontal and a vertical line can be traced from a possible lower-left corner, then that corner is considered pre-qualified. If horizontal and vertical lines cannot be traced from a possible lower left corner, then that possible corner is disqualified/ignored. A traced horizontal line may correspond to an upper surface 200A of a bottom pallet board 200 and a traced vertical line may correspond to the left surface 208A of the pallet center stringer 208, see FIG. 3.

Figure 14C:
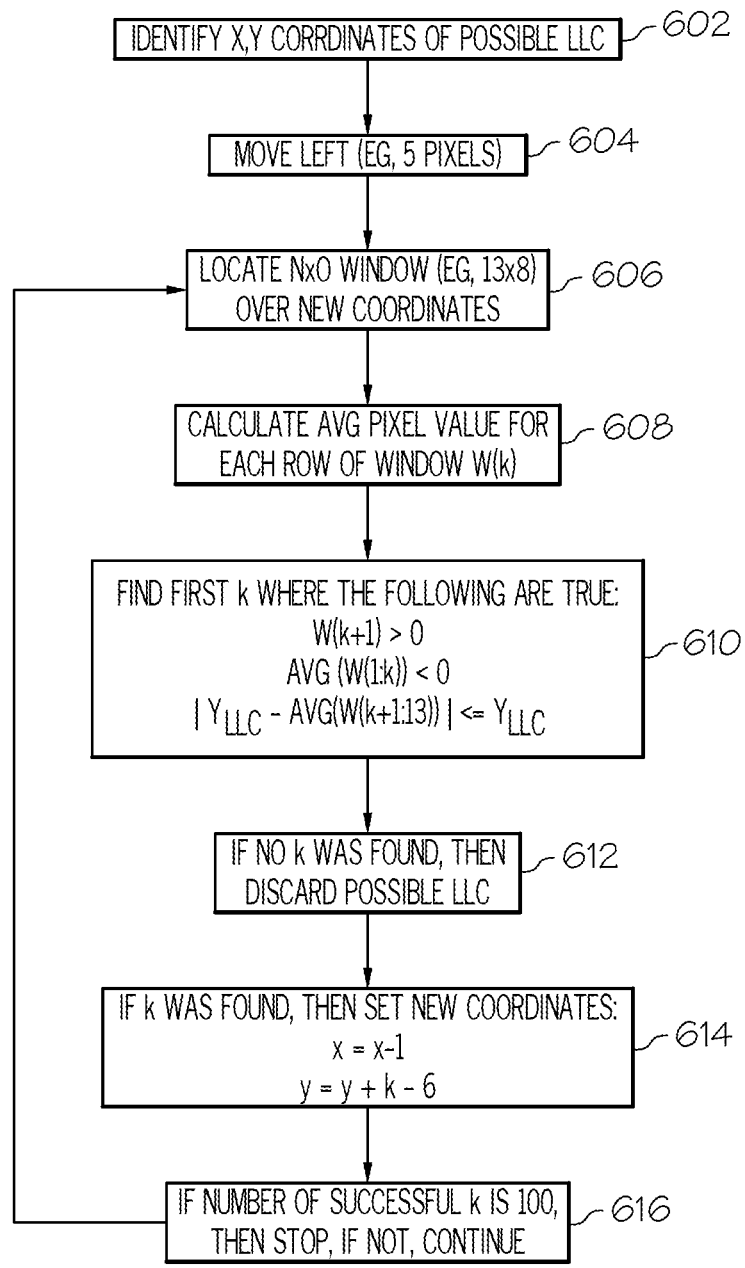
FIGS. 14C and 14D are flow charts illustrating steps in accordance with another embodiment of the present invention for tracing a horizontal and a vertical line from a lower left corner.

A portion of an example first or left Ro image is illustrated in FIG. 14A. A process for attempting to trace a horizontal line will now be described with reference to the process steps illustrated in FIG. 14C.

After the image analysis computer 110 identifies one of the possible lower left corners from the third set of lower left corners in the first Ro image, see step 602, it moves left a predetermined number of pixels, see step 604. For example, moving left by about 5 pixels is beneficial to increase the likelihood of starting the attempted tracing with an opening, rather than pallet structure, above the starting trace location. The image analysis computer 110 positions an N×O window 639 over at least portions of a plurality of image rows in the first Ro image, see step 606 in FIG. 14C. In relation to FIG. 14A, a possible lower left corner was identified to be at pixel location x=237, y=124 which can also be referred to as $X_{LLC}$=237 and $Y_{LLC}$=124. As mentioned, 5 pixels, for example, are subtracted from the x coordinate in step 604 to initialize the starting location 650 for the attempted trace. Thus, the starting location 650 for the example attempted trace is (232,124), see FIG. 14A. The N×O window 639 is positioned so that it is vertically centered over pixel location (232,124) and horizontally positioned such that the rightmost column overlays the pixel location (232,124). In the example in FIG. 14A, the N×O window 639 is a 13×8 window, or matrix, and, by its positioning, there are 6 rows of the window 39 above the pixel location (232,124) and 6 rows below it. Also there are 7 columns of the window 639 to the left of the pixel location (232,124). Although a 13×8 window is shown as an example, other size windows can be used as well without departing from the scope of the present invention. Thus, the N×O window 639 extends in the y-direction from row 118 to row 130 and extends in the x direction from column 225 to column 232. Each row is also referenced by an index value k, 646, as shown in FIG. 16A. The index value is assigned such that the top row of the N×O window 639 is at k=1 and the bottom row of the N×O window 639 is at k=13 (in this example).

As explained below, during each step of the tracing method new coordinates ($x_{new}$, $y_{new}$) are calculated for a subsequent step of the attempted tracing method to find a further point of the horizontal line being traced. When positioning the N×O window for a subsequent step, the window is centered vertically over $y_{new}$ and positioned horizontally so that the rightmost column is over $x_{new}$.

In step 608, the image analysis computer 110 calculates an average W(k) (shown as column 652) for each of the rows of the N×O window 639. The average is calculated using the pixel values from the first Ro image. Then, in step 610, the image analysis computer 110 determines the first row, starting with k=1, which satisfies three different tests:
1. W(k+1)>0 (shown as column 656);
2. MEAN(W(1:k))<0
where $$\mathrm{MEAN}(W(1{:}k))(\text{shown as column 658}) = \frac{1}{k} * \sum_{i=1}^{k} W(i)$$

3. $|Y_{LLC} - \mathrm{MEAN}(w(k+1{:}13))| \le Y_{LLC}$ (shown as column 660)
where $$\mathrm{MEAN}(W(k+1{:}13))(\text{shown as column 659}) = \frac{1}{13-k} * \sum_{j=k+1}^{13} W(i)$$

If all the rows of the window 639 are tested and the image analysis computer 110 determines, in step 612, that no row is found that satisfies the above constraints, then the possible lower left corner is discarded and the process stops for this particular possible lower left corner. In the example window 639 of FIG. 14A, a successful row was found, and column 662 indicates that the first k value to satisfy the above constraints is k=4 (shown as column 664). In step 614, the image analysis computer 110 uses this k value to identify the coordinates used when determining how to position the N×O window 639 for the next step of the attempted tracing. In particular, in step 614, the image analysis computer 110 calculates a new x coordinate based on $x_{new}=x_{current}-1$. For the example of FIG. 14A, $x_{new}$=231. In step 614, the image analysis computer also calculates a new y coordinate based on $y_{new}=y_{current}+k-6$ (shown as column 666). For the example of FIG. 14A, $y_{new}$=122.

If the image analysis computer 110 determines, in step 616, that the constraints of step 610 have been successfully met for the previous 100 points/pixels of a traced line, then a horizontal line has been successfully traced from the possible lower left corner. Processing stops for the horizontal trace and continues to the vertical tracing technique shown in FIG. 16D. If less than 100 points/pixels, or some other predetermined number of points/pixels, have been successfully tested, then tracing effort continues with step 606 using the new x and y coordinates ($x_{new}$, $y_{new}$) to appropriately position the N×O window.

In the description of the process of FIG. 14C, step 610 provided a three prong test to determine the row value "k" that would be used in step 614 to position the N×O window 639 at its next location. As an alternative, a less restrictive and simpler test illustrated in FIG. 14E, could be used to determine the value "k". After the image analysis computer 110, in step 608, calculates an average W(k) (shown as column 652) for each of the rows of the N×O window 639. The image analysis computer 110, instead of the test of step 610 could alternatively, in step 610', determine which average, W(k) minimizes $|W(k)-Y_{LLC}|$ and then, in step 612', determine if the following inequality is true: $|Y_{LLC}-W(k)| \le Y_{LLC}$ for that row, k. If the inequality is not true, then the image analysis computer 110 discards (237,124) as a possible lower left corner; if the inequality is true, then new coordinates are calculated according to step 614.

Figure 14D:
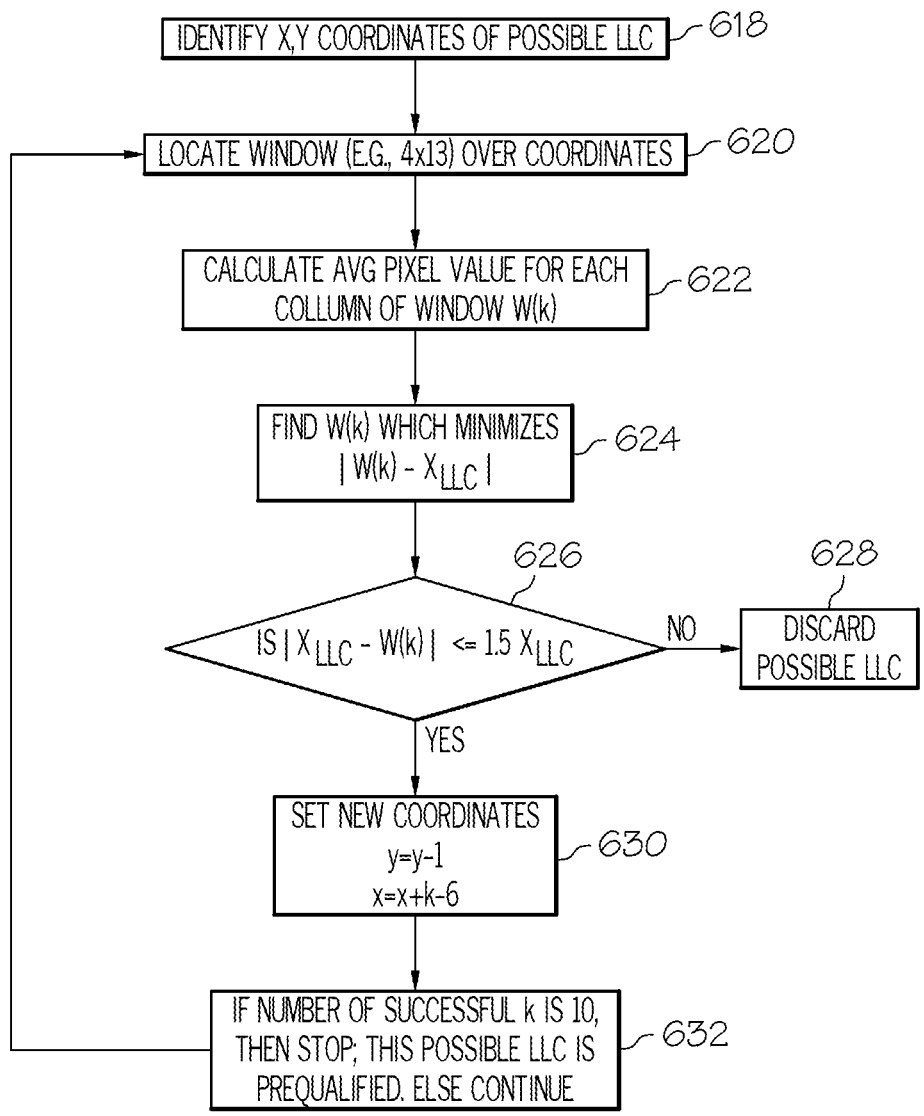
Figure 14E:
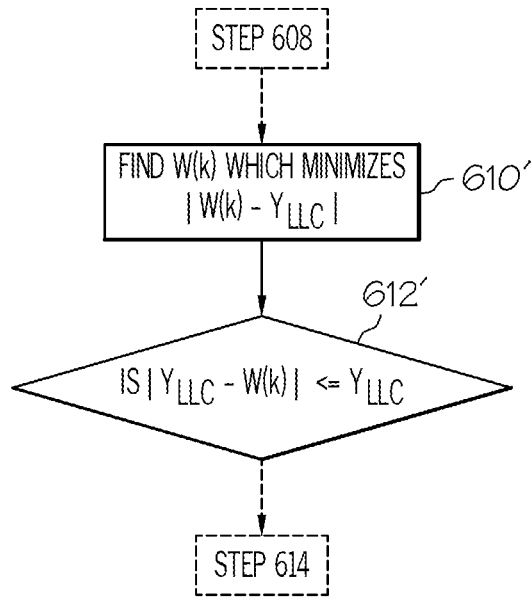
FIG. 14E is a flowchart having some steps that are alternatives to corresponding steps in the flowchart of FIG. 14C.

Using the alternative, simpler test of FIG. 14E, the row with k=6, having a W(k)=147.489988 satisfies the test of step 610'. That is, the row which has a k value that is equal to "6" has an average that is equal to "147.589988" and minimizes the value of $|W(k)-Y_{LLC}|$ to be equal to "23.58999". In addition, the inequality of step 612' is also satisfied by this value of W(k) (i.e., |124−147.589988|) is less than or equal to 124.

As before, in step 614, the image analysis computer 110 uses the identified k value to identify the coordinates used when determining how to position the N×O window 639 for the next step of the attempted tracing. In particular, in step 614, the image analysis computer 110 calculates a new x coordinate based on $x_{new}=x_{current}-1$. For the example of FIG. 14A, $x_{new}=231$. In step 614, the image analysis computer also calculates a new y coordinate based on $y_{new}=y_{current}+k-6$. For the example of FIG. 14A, when using the alternative simpler test of FIG. 14E, $y_{new}=124$.

If a horizontal line is successfully traced from the possible lower left corner, then an attempt is made to trace a vertical line from that possible lower left corner as well.

A portion of an example first or left Ro image is illustrated in FIG. 14B. A process for attempting to trace a vertical line will now be described with reference to the process steps illustrated in FIG. 14D. In step 618, the image analysis computer 110 identifies the possible lower left corner 678 as having coordinates (237,124) which makes the x coordinate $X_{LLC}$ equal to 237.

The image analysis computer 110 positions an V×W window 667 over at least portions of a plurality of image columns in the first Ro image, see step 620 in FIG. 14D. As mentioned above, based on the coordinates of the possible lower left corner, the starting location 678 for the example attempted trace is (237,124). The V×W window 667 is positioned so that it is horizontally centered over pixel location (237,124) and vertically positioned such that the bottom-most row overlays the pixel location (237,124). In the example in FIG. 14B, the V×W window 667 is a 4×13 window, or matrix, and, by its positioning, there are 6 columns of the window 667 to the right of the pixel location (237,124) and 6 columns to the left of it. Also there are 3 rows of the window 667 above the pixel location (237,124). Although a 4×13 window is shown as an example, other size windows can be used as well without departing from the scope of the present invention. Thus, the V×W window 667 extends in the y direction from row 121 to row 124 and extends in the x direction from column 231 to column 243. Each column is also referenced by an index value k, 676, as shown in FIG. 14B. The index value is assigned such that the left-most column of the V×W window 667 is at k=1 and the right-most column of the V×W window 667 is at k=13 (in this example).

As explained below, during each step of the tracing method new coordinates $(X_{new}, y_{new})$ are calculated for a subsequent step of the attempted tracing method. When positioning the V×W window for a subsequent step, the window is centered horizontally over $x_{new}$ and positioned vertically so that the bottom-most row is over $y_{new}$.

In step 622, the image analysis computer 110 calculates an average W(k) (shown as row 675) for each of the columns of the V×W window 667. The average is calculated using the pixel values from the first Ro image. Next, in step 624, the image analysis computer 110 determines which average, W(k) minimizes $|W(k)-X_{LLC}|$ and determines, in step 626 if the following inequality is true: $|X_{LLC}-W(k)| \le 1.5\, X_{LLC}$ for that row, k. If the inequality is not true, then the image analysis computer, in step 628, discards (237,124) as a possible lower left corner.

In the example of FIG. 14B, the column which has a k value that is equal to "5" has an average 681 that is equal to "234.5113" and minimizes the value 680 of $|W(k)-X_{LLC}|$ to be equal to "2.4887". As indicated by the answer 684, the image analysis computer, in step 626 determined that the left hand side of the inequality (i.e., |237−234.5113|) is less than or equal to 1.5×237 (i.e., 355.5). Thus, in step 630, the image analysis computer computes new x coordinates and y coordinates. In particular, in step 630, the image analysis computer 110 calculates a new y coordinate based on $y_{new}=y_{current}-1$. For the example of FIG. 14B, $y_{new}=123$. In step 630, the image analysis computer also calculates a new x coordinate based on $x_{new}=x_{current}+k-6$. For the example of FIG. 14B, $x_{new}=236$.

If the image analysis computer 110 determines, in step 632, that the constraint of step 626 has been successfully met for the previous 10 points/pixels of a traced line, then a vertical line has been successfully traced from the possible lower left corner which is now considered a prequalified possible lower left corner. If less than 10 pixels, or some other predetermined number of points/pixels, have been successfully tested, then tracing effort continues with step 620 using the new x and y coordinates $(x_{new}, y_{new})$ to appropriately position the P×Q window.

Figure 15:
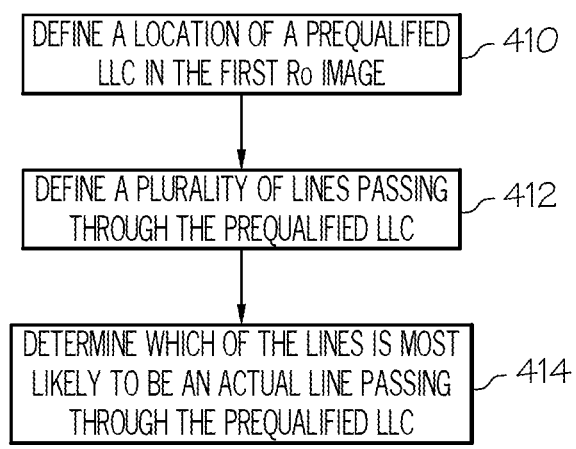
FIG. 15 is a flow chart illustrating steps implemented by the image analysis computer in accordance with the present invention for determining which of a plurality of possible lines is most likely to be an actual line passing through a prequalified lower left corner.

After process 234 has been completed such that attempts have been made to draw/trace a horizontal line and possibly a vertical line from each identified corner in the third set of possible first corners so as to define a set of prequalified lower left corners, the image analysis computer 110 implements process 236. Hence, the computer 110 determines, for each prequalified lower left corner, which of a plurality of possible lines is most likely to be an actual line passing through the prequalified lower left corner. The process 236 will be discussed with reference to FIG. 15.

The above-described calculations involving the different Ro images and the line tracing algorithms may benefit by considering the values of all the pixel locations in the gray scale image. Thus, those particular image analysis steps performed by the image analysis computer 110 are not necessarily limited to being performed only on pixel locations that are "between the forks." However, once all the prequalified lower left corners have been identified, that set of pixel locations can be trimmed by discarding any prequalified lower left corner that is not located "between the forks." Thus, in such an embodiment, none of the additional analysis and processing techniques described below are performed on any prequalified lower left corner that has an x coordinate location outside of the left limit and the right limit for x-coordinates (e.g., 80 and 400, respectively).

Figure 15A:
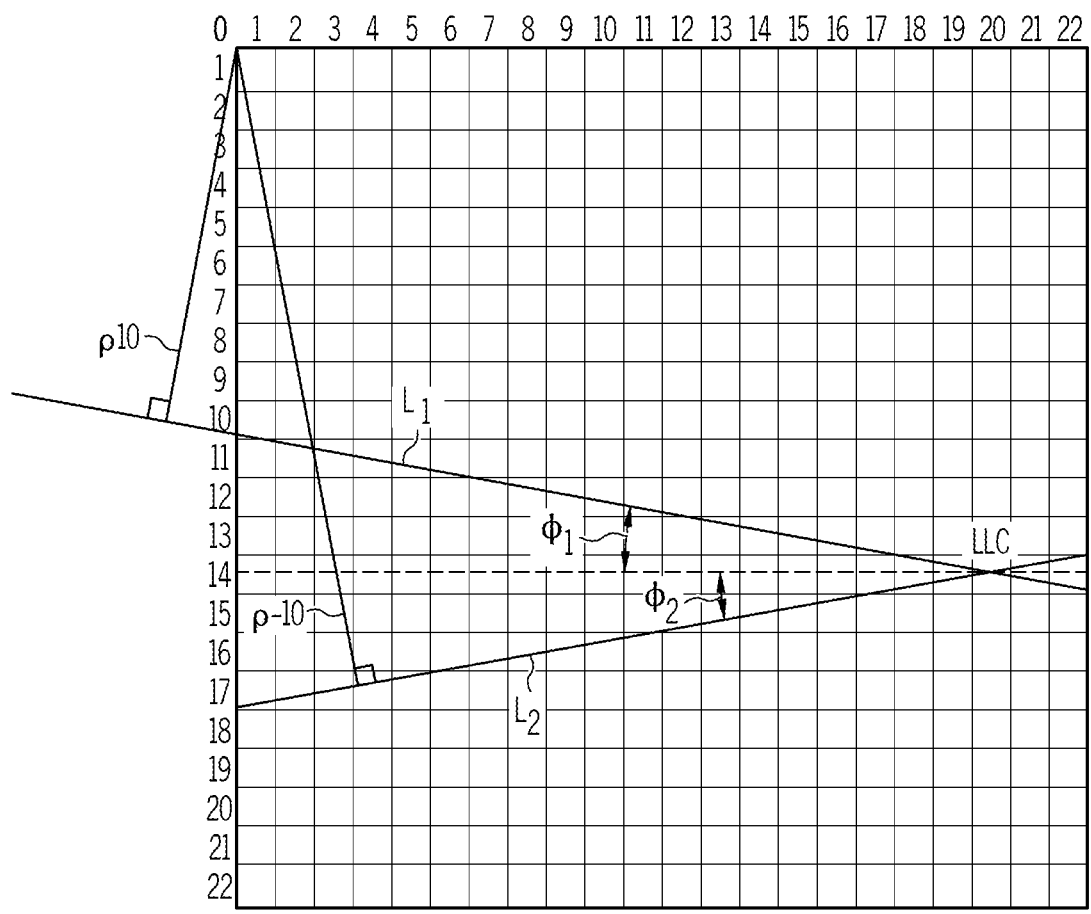
FIG. 15A illustrates two possible lines passing through a prequalified lower left corner.

The image analysis computer 110 defines a location of one of the prequalified lower left corners in the first Ro image, see step 410. The computer 110 then defines a plurality of possible lines extending through that prequalified lower left corner LLC, 61 lines in the illustrated embodiment, with each line being located at a corresponding angle φ with respect to a horizontal axis in the first Ro image, wherein the range of angles is from −15 degrees to +15 degrees in 0.5 degree increments, see step 412 in FIG. 15. Two lines $L_1$ and $L_2$ are illustrated in FIG. 15A passing through the prequalified lower left LLC at pixel location column 20, row 14. The remaining 59 possible lines are not illustrated in FIG. 15A. Line $L_1$ is at an angle $\phi_1=-10$ degrees and line $L_2$ is at an angle $\phi_2=10$ degrees. As noted below, the computer 110 determines which of the plurality of the possible lines is most likely to be an actual line passing through the prequalified lower left corner of a pallet, see step 414.

In order to define each of the plurality of possible lines passing through a given prequalified lower left corner LLC, the computer 110 solves the following equation for each of the possible lines being respectively oriented at one angle so as to calculate an orthogonal distance ρ(φ) from the origin of the Ro image to the line:

$$\rho(\phi) = -x_{PalletCorner} \sin\phi + y_{PalletCorner} \cos\phi \quad \text{Equation 5}$$

wherein:

ρ(φ)=an orthogonal distance from the origin point in the Ro image to a possible line at angle φ;

φ=an angle within the range of angles; and $(x_{PalletCorner}, y_{PalletCorner})$=coordinates in the Ro image for the pallet prequalified lower left corner.

In the illustrated embodiment, the equation ρ(φ) is evaluated 61 times, once for each of the 61 possible lines. In FIG. 15A, ρ(10) and ρ(−10) are illustrated.

After calculating ρ(φ) for a possible line, the computer 110 defines points (e.g., pixel locations) for that line using the calculated value of ρ(φ). Depending on the image size, each possible line may be defined by combining points from multiple sub-lines. The multiple sub-lines can be considered as "thickening" the possible line so that a sufficient number of pixels can be included in the evaluation of the possible line. For example, if the image size is 480×752, then two sub-lines can be used to define the possible line. Alternatively, if the image size is 240×376, then the possible line may be defined by only one sub-line. Thus, a possible line is defined by a set of sub-lines {L} according to:

$$\{L\} = \{(1, y_1+k) \text{ to } (M, y_2+k)\}, \text{where}$$

k=0, 1, 2, . . . , ($N_y$−1), $N_y$=the number of sub-lines used to define the possible line; and where:

$$y_1 = \text{round}\left(\frac{-TOL1 + \rho(\varphi) + \sin\varphi}{\cos\varphi}\right)$$

and $$y_2 = \text{round}\left(\frac{-TOL1 + \rho(\varphi) + M\sin\varphi}{\cos\varphi}\right)$$

given that:

ρ(φ)=an orthogonal distance from the origin point in the Ro image to the corresponding possible line at angle φ calculated from Equation 5 above;

φ=an angle within the range of angles;

TOL1=an empirically determined fixed value (equal to 0.5 in the illustrated embodiment);

M=number of horizontal pixels in each row of the Ro image (480 or 240 pixels in the illustrated embodiment); and $y_1$=y or vertical coordinate value for the left end point of the possible line if it extended, along the angle φ, to the left-most image pixel column, x=1; and $y_2$=y or vertical coordinate value for the right end point of the possible line if it extended, along the angle φ, to the right-most image pixel column x=M.

As mentioned, for a 240×376 size image, $N_y$ may equal "1"; and for a 480×752 size image, $N_y$ may equal "2". If $N_y$="1", then the set of sub-lines {L} has only a single sub-line, $L_A$, that has a left end point (1, $y_1$) and a right end point (M, $y_2$). Only points on this sub-line are used when evaluating the possible line. If, however, a larger image size were used (e.g., 480×752), then each possible line is defined by combining points from a first sub-line $L_A$ and a second sub-line $L_B$, in order to acquire a sufficient number of points. According to the above equation, the value k ranges from 0 to 1 and respective end points for the two sub-lines $L_A$ and $L_B$ are calculated such that:

the end points for the first sub-line $L_A$ comprise:

(1,$y_1$) and (M,$y_2$); and the end points for the second sub-line $L_B$ comprise:

(1,$y_1$+1) and (M,$y_2$+1)

The computer 110 then generates first intermediate points between the end points for the first sub-line $L_A$ and intermediate points between the end points for the second sub-line $L_B$ (if a second sub-line $L_B$ is present). The respective intermediate points for both the first and second sub-lines $L_A$ and $L_B$ are determined using Bresenham's line algorithm. As is well known to one of ordinary skill in the art, the Bresenham line algorithm determines which points in a pixilated display should be selected in order to form a close approximation to a straight line between two given points. In practice, the algorithm can be efficiently implemented by calculating an error value for each incremental step of the algorithm wherein the error value is representative of the fractional portion of the actual y value at a point x on the line. Accordingly, that error value is used to determine whether to increase the y coordinate value or have it remain unchanged. Because, the error value at each step is an easily computed function of the previous error value and the slope of the line, the computational expense of implementing the algorithm can be minimal. The following pseudo code effectively computes the intermediate points on the sub-lines with the constraint that the respective slope of each sub-line is between −1 and +1; thus the pseudo code can be utilized for both positive sloped lines and negative sloped lines.

```
/*
Draw a line from (x1, y1) to (x2, y2)
It is assumed that x2 > x1
*/
error = 0
y = y1
deltax = x2 − x1
deltay = y2 − y1
If (deltax and deltay have the same sign)
    Sign = 1
Else
    Sign = −1
For (x=x1 to x2){
    Draw line at (x,y)
    error = error + deltay
    If (2*sign*error >= deltax){
        error = error − sign * deltax
        y = y + sign
    }
}
```

However, one of ordinary skill will recognize that if points on a line having a slope outside the range of −1 to +1 need to be calculated, then the above pseudo code can be easily adapted to perform such calculations as well, without departing from the scope of the intended invention.

Next, the computer 110 evaluates the following expression for each point on each possible line, i.e., this expression is evaluated for each point on each sub-line ($L_A$, $L_B$, . . . ) corresponding to each possible line:

$$|\rho_{left}(X,Y) - \rho(\phi)| \leq TOL2 * \rho(\phi) \quad \text{Equation 6}$$

wherein:

(X,Y)=one of the points on a possible line;

$\rho_{left}(X,Y)$=value from the first Ro image at a point X,Y on the possible line;

$\rho(\phi)$=an orthogonal distance from the origin point in the Ro image to the possible line at angle $\phi$ calculated from Equation 5 above;

$\phi$=an angle within the range of angles; and

TOL2=an empirically determined fixed value (equal to 0.15 in the illustrated embodiment).

A respective counter, Accumulator Count($\phi$), may be associated with the possible line having the angle $\phi$, and can be incremented each time the expression of Equation 6 is true for a point X, Y on the possible line having the angle $\phi$. Thus, there are 61 counters, each having a respective value. As mentioned above, in some instances, to get a sufficient number of points, more than one sub-line may be associated with a counter. After all points on all 61 possible lines have been evaluated using Equation 6, the computer 110 identifies the line having the greatest count value as the line most likely to be an actual line passing through the prequalified pallet left corner LLC, hereinafter referred to as a bottom pallet board line. The bottom pallet board line is assigned a confidence score, Score$_{BaseboardLine}$, based on the maximum value of the 61 counters, according to the following equation:

$$Score_{BaseboardLine} = \max\left(\frac{AccumulatorCount(\varphi)}{M \times N_y}\right)$$

wherein:

M=a number of horizontal pixels in each row of the Ro image (480 or 240 pixels in the illustrated embodiments); and $N_y$=the number of sub-lines used to define each possible line.

Figure 17:
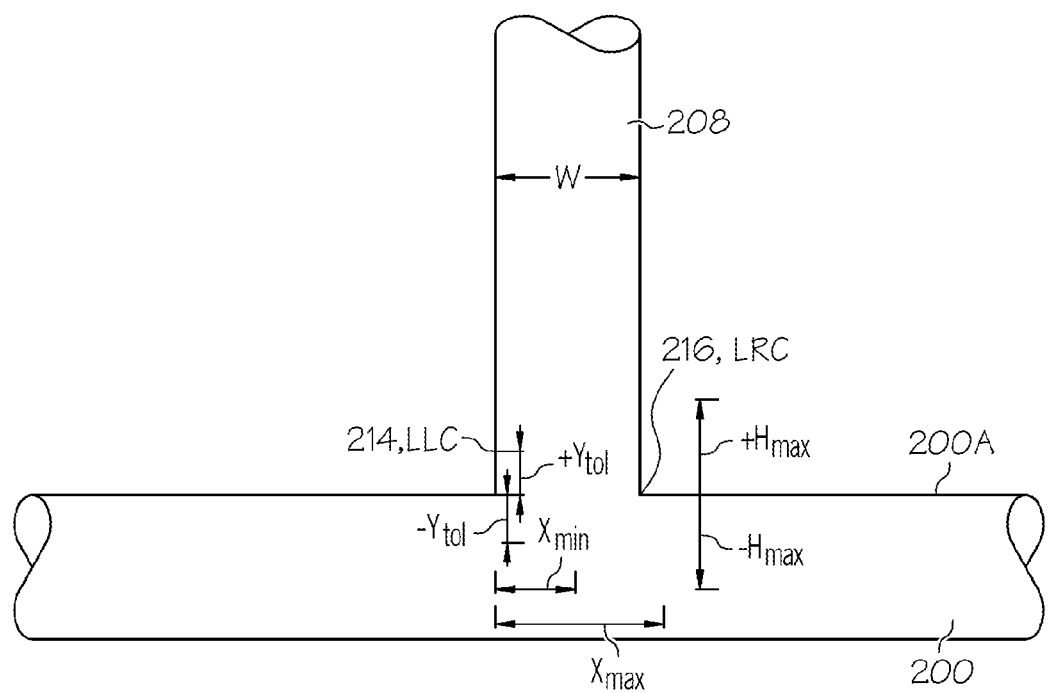
FIG. 17 is a view of a portion of a pallet illustrating lower left and right corners.

Once the computer 110 identifies the line most likely to be an actual line passing through the prequalified pallet lower left corner LLC, this line is presumed to represent a possible upper surface 200A of a bottom or lower pallet board 200 associated with this particular prequalified pallet lower left corner LLC. The location of the prequalified lower left corner LLC and the possible upper surface of the bottom pallet board can then be used in process 238, noted above, which attempts to identify a set of possible lower right corners corresponding to the prequalified lower left corner. The set of possible lower right corners will satisfy certain criteria with respect to the prequalified lower left corner and the corresponding bottom pallet board upper surface, which are as follows:

1) A corresponding lower right corner will likely be located within a certain horizontal range of the prequalified possible lower left corner LLC. Hence, the computer 110 reviews all of the possible lower right corners as defined by the third set of possible second corners and discards those located closer than a minimum horizontal distance ($x_{min}$) to the prequalified lower left corner LLC or farther than a maximum horizontal distance ($x_{max}$) from the prequalified lower left corner LLC. The particular $X_{min}$ and $X_{max}$ values are measured in "pixels" and depend on the range of center pallet stringer sizes being visualized and how far the rack R is from the vehicle 10. For typical rack to vehicle distances of from about 50 inches to about 60 inches and pallets made of wood or a polymeric material having a center stringer with a width W of from about 2 inches to about 12 inches, $x_{min}$ may equal 5 pixels and $x_{max}$ may equal 150 pixels, wherein the field of view is 480 pixels×752 pixels, see FIG. 17.

2) A corresponding lower right corner will likely be located within a certain vertical distance, or skew, defining a vertical range of $+/-Y_{tol}$ from the prequalified lower left corner LLC. Thus, the computer 110 discards any possible lower right corner that falls outside of a vertical skew as defined by $+/-Y_{tol}$, which, for example, may equal $+/-10$ pixels, see FIG. 17.

3) An actual lower right corner will likely be located within a certain vertical distance range from the bottom pallet board line. Thus, the computer 110 discards any possible lower right corner that falls outside a distance, $+H_{max}$, above the bottom pallet board line or extends beyond a distance, $-H_{max}$, below the bottom pallet board line. For example, $+H_{max}$ may equal 4 pixels above the bottom pallet board upper surface and $-H_{max}$ may equal 4 pixels below the bottom pallet board line, see FIG. 17.

The location criteria associated with locating possible lower right corners may be adjusted according to the image size. For example, the values provided above may be appropriate for images which are 480×752 pixels in size. However, for images which are 240×376 pixels in size, the values may be adjusted so that each is approximately half of the example values provided above. The vertical skew, for example, may equal $+/-5$ pixels, the value for $+H_{max}$ may equal 2 pixels above the bottom pallet board surface and the value for $-H_{max}$ may equal 2 pixels below the bottom pallet board line. Similarly, $x_{mm}$ may equal 2 pixels and $x_{max}$ may equal between 50 to 75 pixels.

A single prequalified lower left corner LLC and a corresponding bottom pallet board line may be paired with one or multiple possible lower right corners defining one or multiple candidate objects. A "candidate object" is also referred to herein as a "possible pallet object."

In the further embodiment noted above, where the imaging camera is located above the forks 42A, 42B looking down, one or multiple possible upper right corners are paired with each prequalified possible upper left corner, wherein the limits on the search for the upper right corners are similar to those for the lower right corners.

For each candidate object comprising a prequalified lower left corner LLC, a corresponding bottom pallet board line and a corresponding possible lower right corner, the image analysis computer 110 attempts to identify a distance between a point on the upper pallet board 202 and the prequalified lower left corner LLC such that a pallet hole or fork-receiving opening lies in between. Using the first Ro image, the image analysis computer 110 steps horizontally left from the prequalified lower left corner LLC a predetermined number of pixels (e.g., 10 pixels) and moves upward until the pixels transition from positive to negative to positive. The step to the left ensures the traversal upward occurs in a region where there is an opening rather than only pallet structure above the starting point. The positive-to-negative-to-positive transition estimates the location of a potential point on the upper pallet board 202 relative to the upper surface 200A of the bottom pallet board 200, wherein the distance between the point on the upper pallet board 202 and the upper surface 200A of the bottom pallet board 200 is a rough estimate of the distance between a lower surface 202A of the upper pallet board 202 and the upper surface 200A of the bottom pallet board 200, see FIG. 3. Additionally, another method of estimating the distance from the bottom pallet board upper surface to a possible point on the upper pallet board 202 is performed by the computer 110 by moving upward from the prequalified lower left corner LLC until a negative pixel value in the first Ro image is encountered. A negative pixel is encountered when a positive vertical sequence expires before reaching the upper pallet board 202, such as due to noise or a lighting variation, or the positive vertical sequence expires upon reaching the upper pallet board 202. The maximum of these two estimates is selected as a determination of the distance from the prequalified lower left corner to the point on the upper pallet board 202.

The distance from the prequalified lower left corner/upper surface 200A of the bottom pallet board 200 to the point on the upper pallet board 202 is then used to roughly estimate the locations of the possible upper left corner and the possible upper right corner. The possible upper left corner is presumed located in alignment with and above the prequalified lower left corner by a distance equal to the distance from the prequalified lower left corner to the point on the upper pallet board 202. The possible upper right corner is presumed located in alignment with and above the possible lower right corner by a distance equal to the distance from the prequalified lower left corner to the point on the upper pallet board 202.

For each candidate object comprising a prequalified lower left corner 214, a corresponding bottom pallet board line (i.e., a possible upper surface 200A of a bottom pallet board 200) and a corresponding possible lower right corner, and for which locations of corresponding upper left and right corners were estimated, possible left and right vertical stringer edges or lines may be calculated according to a method described below. However, an alternative method is also presented further below that does not explicitly calculate both left and right stringer edges.

For a potential left vertical stringer line, an orthogonal distance, $\rho_{1desired}$, and an angle, $\phi_1$, are calculated from Equations (7a and 7b) below:

$$\varphi_1 = \tan^{-1}\left(\frac{P_{LowerLeft}(y) - P_{UpperLeft}(y)}{P_{LowerLeft}(x) - P_{UpperLeft}(x)}\right) \quad \text{Equation 7a}$$

$$\rho_{1desired} = -P_{LowerLeft}(x)\sin\varphi_1 + P_{LowerLeft}(y)\cos\varphi_1 \quad \text{Equation 7b}$$

where:

$\phi_1$=is an angle between a horizontal line and a potential left stringer line, wherein the potential left stringer line extends from the prequalified lower left corner to the estimated upper left corner;

$P_{LowerLeft}(y)$=the Y coordinate value for the prequalified lower left corner;

$P_{UpperLeft}(y)$=the Y coordinate value for the estimated upper left corner;

$P_{LowerLeft}(X)$=the X coordinate value for the prequalified lower left corner;

$P_{UpperLeft}(X)$=the X coordinate value for the estimated upper left corner; and $\rho_{1desired}$=the orthogonal distance from the origin point on the normalized gray scale image to a vertical line passing through the prequalified lower left corner and the upper left corner.

For a potential right vertical stringer line, an orthogonal distance, $\rho_{2desired}$, and an angle, $\phi_2$, are calculated from Equations (8a and 8b):

$$\varphi_2 = \tan^{-1}\left(\frac{P_{LowerRight}(y) - P_{UpperRight}(y)}{P_{LowerRight}(x) - P_{UpperRight}(x)}\right) \quad \text{Equation 8a}$$

$$\rho_{2desired} = -P_{LowerRight}(x)\sin\varphi_2 + P_{LowerRight}(y)\cos\varphi_2 \quad \text{Equation 8b}$$

where $\phi_2$=is an angle between a horizontal line and a potential right stringer line, wherein the potential right stringer line extends from the lower right corner to the estimated upper right corner;

$P_{LowerRight}(y)$=the Y coordinate value for the lower right corner;

$P_{UpperRight}(y)$=the Y coordinate value for the estimated upper right corner;

$P_{LowerRight}(x)$=the X coordinate value for the lower right corner;

$P_{UpperRight}(x)$=the X coordinate value for the estimated upper right corner; and $\rho_{2desired}$=the orthogonal distance from an origin point on the normalized gray scale image to a vertical line passing through the lower right corner and the upper right corner.

Figure 19A:
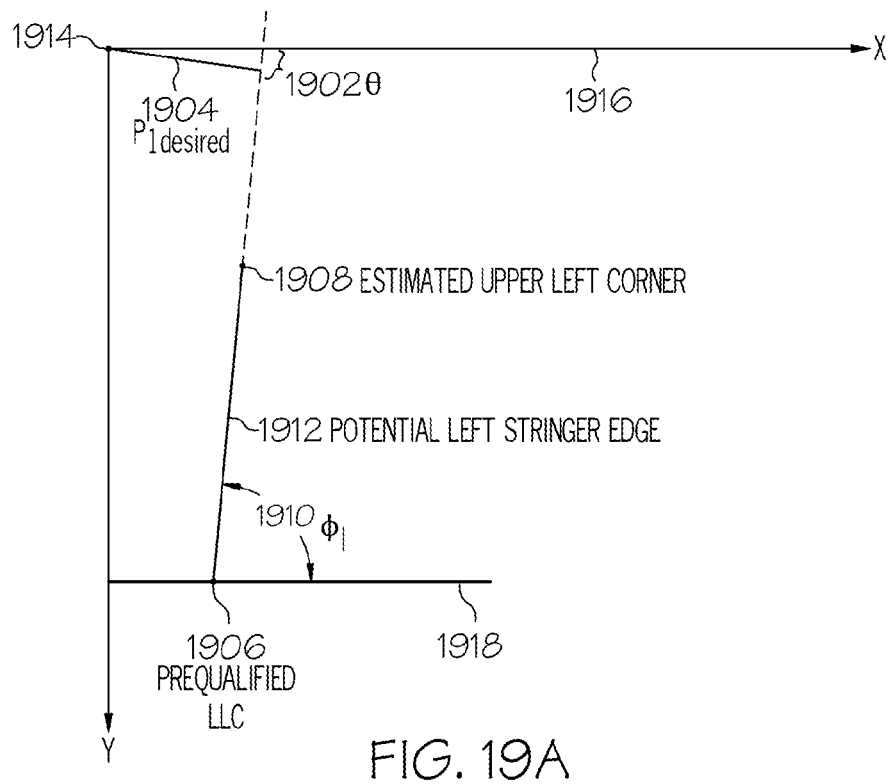
FIG. 19A illustrates a geometrical framework for estimating a height of a center stringer in accordance with the principles of the present invention.

FIG. 19A is illustrative of using the above equations to calculate values that represent a potential left stringer line or a potential right stringer line. FIG. 19A does not represent actual pixel values of any of the images previously discussed (e.g., gray scale image, Ro image, etc.) but, instead provides a framework to help understand the geometry used for Equations 7a, 7b, 8a and 8b. However, one correlation with the earlier discussed figures is that the (x, y) coordinates of the different points in FIG. 19A, as well as the origin, do correspond to the coordinate system and origin of the gray scale image. The prequalified lower left corner is located at point 1906 in FIG. 19A and the corresponding upper left corner location estimated earlier is located at point 1908. The estimated upper left corner is presumed to be located horizontally in line with the prequalified lower left corner, such that they have identical X coordinates, but is shown slightly offset from the prequalified lower left corner in FIG. 19A. The potential stringer line 1912 extends between the two corners 1906, 1908. The potential left stringer line 1912 can be characterized by a pair of values ($\rho_{1desired}$, $\theta$), where, as shown in FIG. 19A, $\rho_{1desired}$ is designated by line 1904 which represents the orthogonal distance of the line 1912 from the origin 1914, and the angle $\theta$ is designated by the angle 1902 which is the angle of line 1904 relative to the x-axis 1916. The parameter $\phi_1$ is designated by the angle 1910 and is the angle formed by the potential left stringer line 1912 and a horizontal line 1918. Because $\theta=\pi/2+\phi_1$, the orthogonal distance $\rho_{1desired}$ can be determined according to Equation 7b above. Although the above discussion describing FIG. 19A relates to a potential left stringer line, a similar approach can be used when solving Equations 8a and 8b for a potential right stringer line.

Figure 20A:
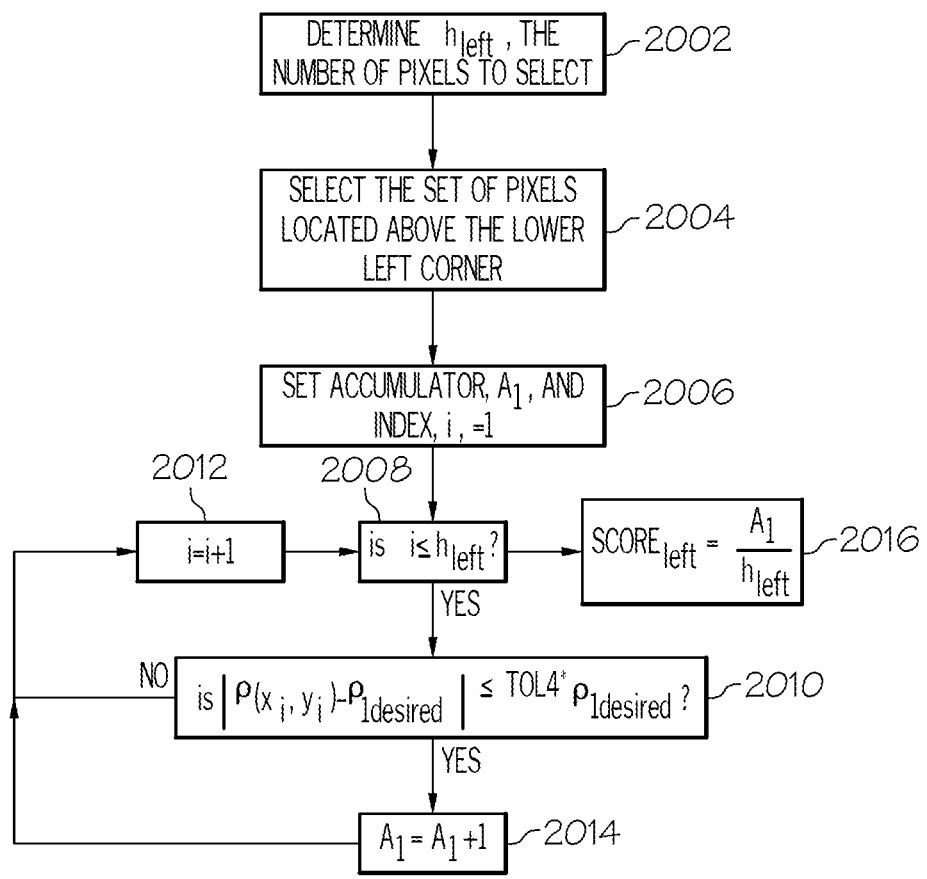
FIG. 20A is a flow chart illustrating steps implemented by the image analysis computer in accordance with the present invention for analyzing a possible left edge of a center stringer.
Figure 20B:
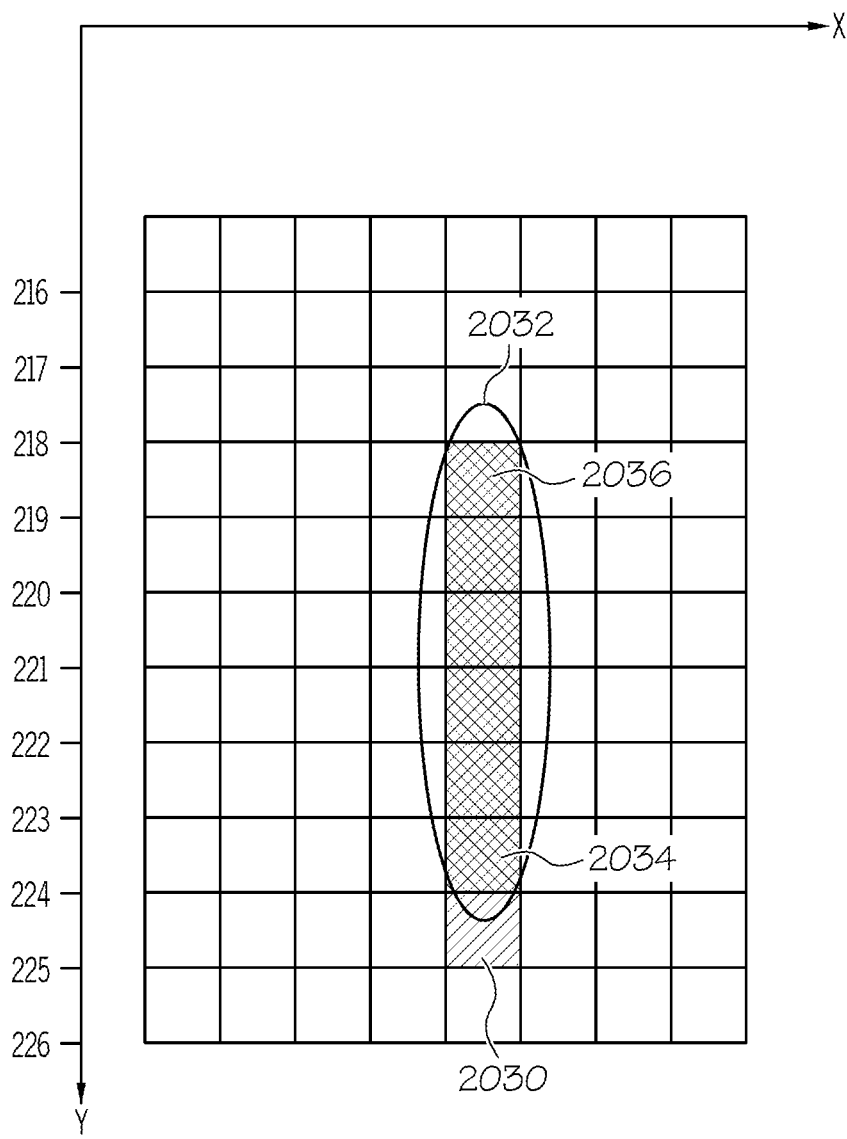
FIG. 20B illustrates an example of pixels in an image portion analyzed according to the flowchart of FIG. 20A.

With the angle $\phi_1$ (1910) calculated using Equation 7a above, it can then be determined whether a first set of pixels defining a left vertical line above the prequalified lower left corner from the first Ro image match the calculated orthogonal distance $\rho_{1desired}$ by using pixel values from the first Ro image that are vertically in-line with, and extend upward from above the prequalified lower left corner to the estimated upper left corner. Using these pixels, a score value $Score_{left}$ is calculated that represents a value that is related to the likelihood that a potential left vertical stringer line is actually a left edge of a pallet stringer in the gray scale image. One method for calculating this score value, $Score_{left}$, is provided with reference to FIG. 20A and FIG. 20B. FIG. 20A depicts a flowchart for scoring a potential left stringer line for a prequalified lower left corner and FIG. 20B depicts a region of pixels from the first Ro image located near the prequalified lower left corner. For the prequalified lower left corner 2030, see FIG. 20B, the vertical line being calculated represents a possible left vertical edge of the stringer and, thus, values from the first or left Ro image are used. For example, a set of Ro image values are selected above the prequalified lower left corner; the set can be limited to a maximum number of pixels such as ten pixels. In other words, for the prequalified lower left corner, the number of pixels to be selected from the left Ro image is determined in step 2002, using Equation 9a:

$$h_{left} = \min(P_{LowerLeft}(y) - P_{UpperLeft}(y), 10)$$

According to the above equation, one of two values is used to determine the number of pixels to be selected; either a height of the stringer in pixels (i.e., $P_{LowerLeft}(y)-P_{UpperLeft}(y)$) or 10 pixels, whichever value is lower. Thus, in step 2004, a set 2032, see FIG. 20B, of pixels is selected from the left Ro image, wherein the set of pixels has $h_{left}$ members in the set. Each member is a pixel having an (x,y) coordinate and a pixel value. As an example, if the prequalified lower left corner 2030 is located at (x, 225) and the estimated upper left corner 2036 was located at (x, 219), then $h_{left}=6$ and the members of the set 2032 of pixels selected are shown with hash marks in FIG. 20B.

The image analysis computer 110, in step 2006, initializes an accumulator $A_1$ and an index value i, for later calculation steps. The index value i according to a particular example of the flowchart in FIG. 20A ranges from 1 to $h_{left}$ and is used to uniquely designate a respective member of the set of pixels 2032. The calculations involving the pixels values within the set 2032 of pixels are not direction dependent and, thus, the lowest index value can refer to the top-most pixel 2036 of the set 2032 and increase while moving down the set towards the bottom-most pixel 2034 of the set 2032. However, the index value can be reversed without affecting the calculations described below. The index value i is tested by the image analysis computer 110 at step 2008 and if the index value indicates that there are more pixels in the set 2032 left to evaluate, then the process moves to step 2010. At step 2010, the image analysis computer 110 determines if the following inequality is true:

$$|\rho(x_i,y_i)-\rho_{1desired}| \leq TOL4 * \rho_{1desired}$$

wherein:

i=the index value referring to a respective member of the first set of pixels 2032;

$\rho(x_i,y_i)$=a value of the $i^{th}$ pixel taken from the first set 2032 of pixels in the first Ro image located directly above the prequalified lower left corner 2030;

$\rho_{1desired}$=the orthogonal distance from the origin point on the normalized gray scale image to a line passing through the prequalified lower left corner and the upper left corner which was calculated above with respect to Equation 7b; and TOL4=an empirically determined value (equal to 0.5 in the illustrated embodiment).

If the inequality is true for the particular, indexed pixel in step 2010, then the accumulator $A_1$ is incremented, in step 2014, for this set 2032 of pixels and the index value is incremented in step 2012 to then repeat the steps starting with step 2008. If the inequality is not true in step 2010, then the index value is incremented in step 2012 to then repeat the steps starting with 2008. Once the image analysis computer 110 determines, in step 2008, that all the members of the set 2032 of pixels have been evaluated, a left vertical line score value is calculated, in step 2016, which represents the confidence level of whether or not the selected pixels 2032 located above the prequalified lower left corner 2030 represent an actual stringer left edge. The left vertical line score value is the ratio of the respective accumulator bin count $A_1$ to the total count of the pixels selected for a particular line:

$$Score_{left} = \frac{A_1}{h_{left}} \qquad \text{Equation 9b}$$

A process similar to that of FIG. 20A can be used to determine a right vertical line score value as well. With the angle $\phi_2$ calculated using Equation 8a above, it can then be determined whether a second set of pixels defining a right vertical line above a possible lower right corner from the second or right Ro image matches the calculated orthogonal distance $\rho_{2desired}$ by using the pixel values from the second Ro image that extend from above the possible lower right corner upwards to the estimated upper right corner. For the possible lower right corner, the vertical line being calculated represents a possible right vertical edge of the stringer and, thus, values from the second or right Ro image are used. For example, a set of Ro image values are selected above the possible lower right corner; the set can be limited to a maximum number of pixels such as ten pixels. In other words, above the possible lower right corner, the number of pixels selected from the right Ro image are:

$$h_{right}=\min(P_{LowerRight}(y)-P_{UpperRight}(y),10) \qquad \text{Equation 10a}$$

Thus, starting at the possible lower right corner, the $h_{right}$ numbers of pixels are selected that are located above the possible lower right corner.

A second accumulator bin $A_2$ is incremented by one if the following expression is true for a pixel from second set of pixels:

$$|\rho(x_j,y_i)-\rho_{2desired}| \leq TOL4 * \rho_{2desired}$$

wherein:

j=the index value referring to a respective member of the second set of pixels;

$\rho(x_j, y_i)$=a value of the $i^{th}$ pixel taken from the second set of pixels in the second Ro image located directly above the lower right corner;

$\rho_{2desired}$=the orthogonal distance from the origin point on the normalized gray scale image to a line passing through the possible lower right corner and the upper right corner which was calculated above with respect to Equation 8b;

TOL4=an empirically determined value (equal to 0.5 in the illustrated embodiment).

A right vertical line score value is calculated which represents the confidence level of whether or not the selected pixels located above the lower right corner represent an actual stringer right edge. The right vertical line score value is the ratio of the respective accumulator bin count $A_2$ to the total count of the pixels selected for a particular line:

$$Score_{right} = \frac{A_2}{h_{right}} \qquad \text{Equation 10b}$$

A candidate object that was potentially thought to include a center stringer is rejected if either the left or the right score is less than a threshold, 0.1 in the preferred embodiment, or the sum of the $Score_{left}$ and $Score_{right}$ is less than a second threshold, 0.5 in the preferred embodiment.

Figure 19B:
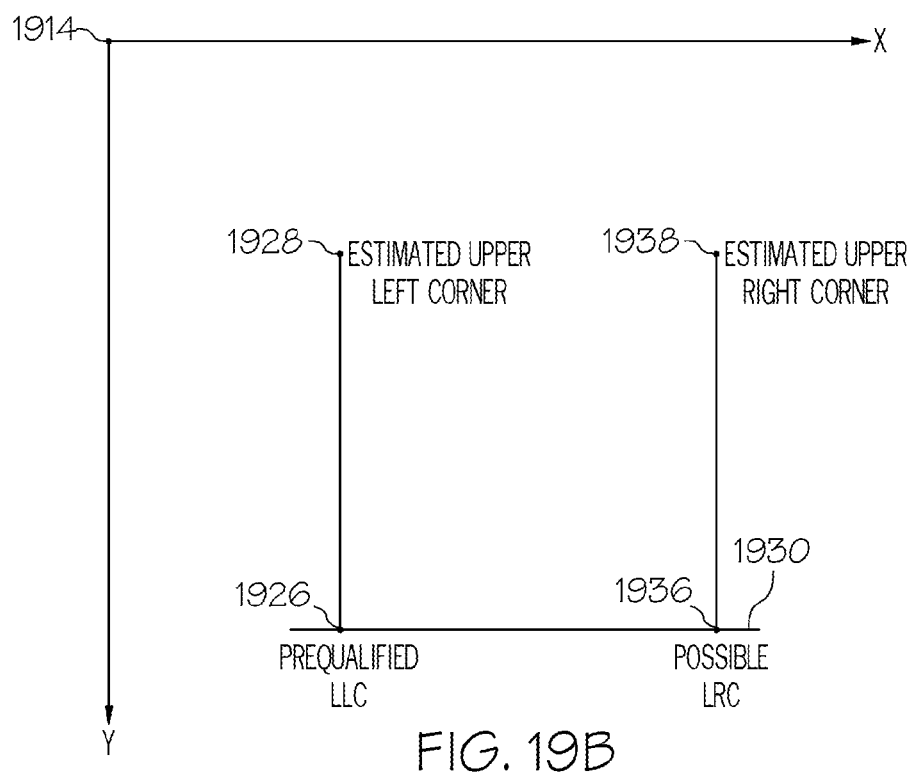
FIG. 19B illustrates a geometrical framework for evaluating possible left and right vertical edges of a center stringer in accordance with the principles of the present invention.

As mentioned above, an alternative method of evaluating a possible stringer is also contemplated. FIG. 19B provides a geometrical framework helpful in describing this alternative embodiment. As before, a prequalified lower left corner 1926 and a bottom pallet board line 1930 are identified. As described above, these possible pallet object features are used to determine a possible lower right corner 1936, an estimated upper left corner 1928, and an estimated upper right corner 1938. In particular, as defined above, the following values are determined by utilizing the assumptions that a) the prequalified lower left corner 1926 and the estimated upper left corner 1928 have the same x coordinate; and b) the possible lower right corner 1936 and the estimated upper right corner 1938 have the same x coordinate:

$P_{LowerLeft}(y)$=the Y coordinate value for the prequalified lower left corner 1926;

$P_{UpperLeft}(y)$=the Y coordinate value for the estimated upper left corner 1928;

$P_{LowerLeft}(X)$=the X coordinate value for the prequalified lower left corner 1926;

$P_{UpperLeft}(X)$=the X coordinate value for the estimated upper left corner 1928;

$P_{LowerRight}(y)$=the Y coordinate value for the possible lower right corner 1936;

$P_{UpperRight}(y)$=the Y coordinate value for the estimated upper right corner 1938;

$P_{LowerRight}(X)$=the X coordinate value for the possible lower right corner 1936; and $P_{UpperRight}(X)$=the X coordinate value for the estimated upper right corner 1938.

Using these coordinate values along with the pixel values of the horizontal gradient image described above, an alternative $Score_{left}$ and $Score_{right}$ can be calculated instead of those described earlier. In particular, the alternative $Score_{left}$ value can be calculated according to:

$$Score_{left} = \frac{1}{P_{LowerLeft}(y) - P_{UpperLeft}(y)} \sum_{k=1}^{(P_{LowerLeft}(y) - P_{UpperLeft}(y))} g_x(P_{LowerLeft}(x), (P_{LowerLeft}(y) - k))$$

where:

$P_{LowerLeft}(y)$=the Y coordinate value for a prequalified lower left corner;

$P_{UpperLeft}(y)$=the Y coordinate value for an estimated upper left corner;

$P_{LowerLeft}(X)$=the X coordinate value for the prequalified lower left corner;

k=an index value for the summation, wherein k varies from 1 to a maximum value of $P_{LowerLeft}(y) - P_{UpperLeft}(y)$; and $g_x(P_{LowerLeft}(x),(P_{LowerLeft}(y)-k))$=the pixel value from the horizontal gradient image for the pixel having an x-coordinate of $P_{LowerLeft(x)}$ and a y-coordinate of $(P_{LowerLeft}(y)-k)$.

A candidate object that was potentially thought to include a center stringer may be rejected if its left stringer score, $Score_{left}$, is less than a threshold. For example, in this alternative embodiment, the threshold value for the alternative $Score_{left}$ may be 5.0.

Additionally, an alternative $Score_{right}$ may also be calculated and used in conjunction with the alternative $Score_{left}$ value to determine whether or not to reject a candidate object. In particular, the alternative $Score_{right}$ value can be calculated according to:

$$Score_{right} = \frac{1}{P_{LowerRight}(y) - P_{UpperRight}(y)} \sum_{k=1}^{(P_{LowerRight}(y) - P_{UpperRight}(y))} g_x(P_{LowerRight}(x), (P_{LowerRight}(y) - k))$$

where:

$P_{LowerRight}(y)$=the Y coordinate value for a possible lower right corner;

$P_{UpperRight}(y)$=the Y coordinate value for an estimated upper right corner;

$P_{LowerRight}(X)$=the X coordinate value for the possible lower right corner;

k=an index value for the summation, wherein k varies from 1 to a maximum value of $P_{LowerRight}(y)-P_{UpperRight}(y)$; and $P_{UpperRight}(y)$ the pixel value from the horizontal gradient image for the pixel having an x-coordinate of $P_{LowerRight}(x)$ and a y-coordinate of $(P_{LowerRight}(y)-k)$ As before, a candidate object that was potentially thought to include a center stringer may be rejected if its right stringer score, $Score_{right}$, is less than a threshold. For example, in this alternative embodiment, the threshold value for $Score_{right}$ may be the same as for the left vertical stringer for the alternative $Score_{left}$ (e.g., 5.0). If either $Score_{right}$ or $Score_{left}$ are below their respective threshold values, or their sum is below some other threshold, then the candidate object may be rejected from further consideration.

Additionally, a candidate object that was potentially thought to include a center stringer may be deleted if its hotness is too great. In FIG. 19B a region of pixels that might be a center stringer are defined by the prequalified lower left corner 1926, the possible lower right corner 1936, the estimated upper right corner 1938 and the estimated upper left corner 1928. If the variance of the pixel values in the normalized gray scale image for this region of pixels is greater than a predetermined threshold, then this candidate object may be rejected. An example is an object produced by imaging a ceiling light. Ceiling lamps may emit near infrared illumination and show up as very bright irregular regions on a dark background giving a high hotness level. The predetermined hotness threshold may, for example, be about 1200.

A variance, $H_{var}$, for this potential center stringer region can be calculated according to:

$$H_{var} = \frac{1}{k} \sum_{i=1}^{k} (GSPV(\text{pixel}(i)) - \overline{GSPV})^2$$

where:

k=the number of pixels in the region bounded by the corners 1926, 1928, 1936, and 1938;

i=an index value uniquely referring to one of the k pixels in the region bounded by the corners 1926, 1928, 1936, and 1938;

GSPV(pixel(i))=a gray scale pixel value (GSPV) of a particular one of the k pixels (i.e., pixel(i)) from the normalized gray scale image in the region bounded by the corners 1926, 1928, 1936, and 1938; and $\overline{GSPV}$=an average of all the k pixels' gray scale pixel values pixel from the normalized gray scale image in the region bounded by the corners 1926, 1928, 1936, and 1938.

A further criterion involves the object area of the region that may be a center stringer of a candidate object. If the region bounded by the corners 1926, 1928, 1936 and 1938 includes less than 50 pixels, then the candidate object may be rejected.

A pallet object may be defined by first, second and third rectangles 1802, 1804 and 1810, respectively, as shown in FIG. 18, wherein the first and second rectangles 1802, 1804 may correspond to at least portions of the first and second fork receiving openings 210 and 212 of the pallet P illustrated in FIG. 3 and the third rectangle 1810 may corresponds to a center stringer 208 of the pallet P. Given the estimated upper left hand corner and the estimated upper right hand corner of the center stringer, a height h, of the rectangles 1802, 1804, and 1810 can be calculated using the following process depicted in FIG. 21A. FIG. 21B provides a framework to help understand the geometry used for the calculations of the process of FIG. 21A.

The image analysis computer 110, in step 2101, retrieves a number of values that were previously calculated or determined. The term "retrieve" is not meant to convey any particular storage/retrieval device, method or protocol but simply that these values are accessible by the image analysis computer 110 when making additional calculations. Some of the values retrieved are the coordinates for the estimated upper left corner and the estimated upper right corner, wherein the Y value for the upper left corner and the Y value for the upper right corner were found by determining the distance from the prequalified lower left corner/upper surface 200A of the bottom pallet board to the point on the upper pallet board 202, which distance was then subtracted from each of the Y values for the prequalified lower left corner and the possible lower right corner (the distance is subtracted because y-coordinate values decrease as a point moves upwards in the first Ro image). Other values include the parameters ($\rho_{BPBL}$, $\phi_{BPBL}$) defining the bottom pallet board line $L_{BPB}$ passing through the prequalified lower left corner.

In step 2103, the image analysis computer 110 calculates a value h according to the following equation:

$$h = \max \begin{Bmatrix} \text{round}\begin{pmatrix} \rho_{BPBL} + x_{UpperLeft}\sin\varphi_{BPBL} - \\ y_{UpperLeft}\cos\varphi_{BPBL} \end{pmatrix} \\ \text{round}\begin{pmatrix} \rho_{BPBL} + x_{UpperRight}\sin\varphi_{BPBL} - \\ y_{UpperRight}\cos\varphi_{BPBL} \end{pmatrix} \end{Bmatrix} \quad \text{Equation 11}$$

$\rho_{BPBL}$=the orthogonal distance from the origin point on the normalized gray scale image to the bottom pallet board line $L_{BPB}$ passing through the prequalified lower left corner;

$\phi_{BPBL}$=is an angle between a horizontal line and the bottom pallet board line $L_{BPB}$;

$y_{UpperLeft}$=the Y coordinate value for the estimated upper left corner;

$y_{UpperRight}$=the Y coordinate value for the estimated upper right corner;

$x_{UpperLeft}$=the X coordinate value for the estimated upper left corner; and $x_{UpperRight}$=the X coordinate value for the estimated upper right corner.

Figure 21A:
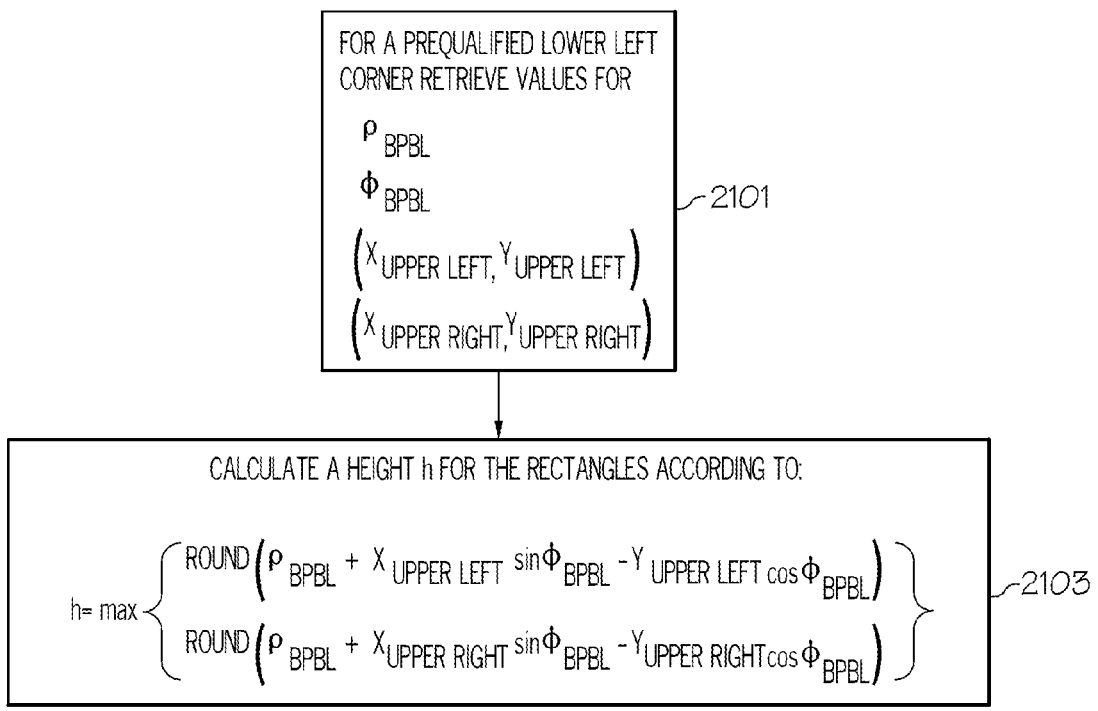
FIG. 21A is a flow chart illustrating steps implemented by the image analysis computer in accordance with the present invention for determining a height of a plurality of rectangles that potentially represent various portions of a pallet.
Figure 21B:
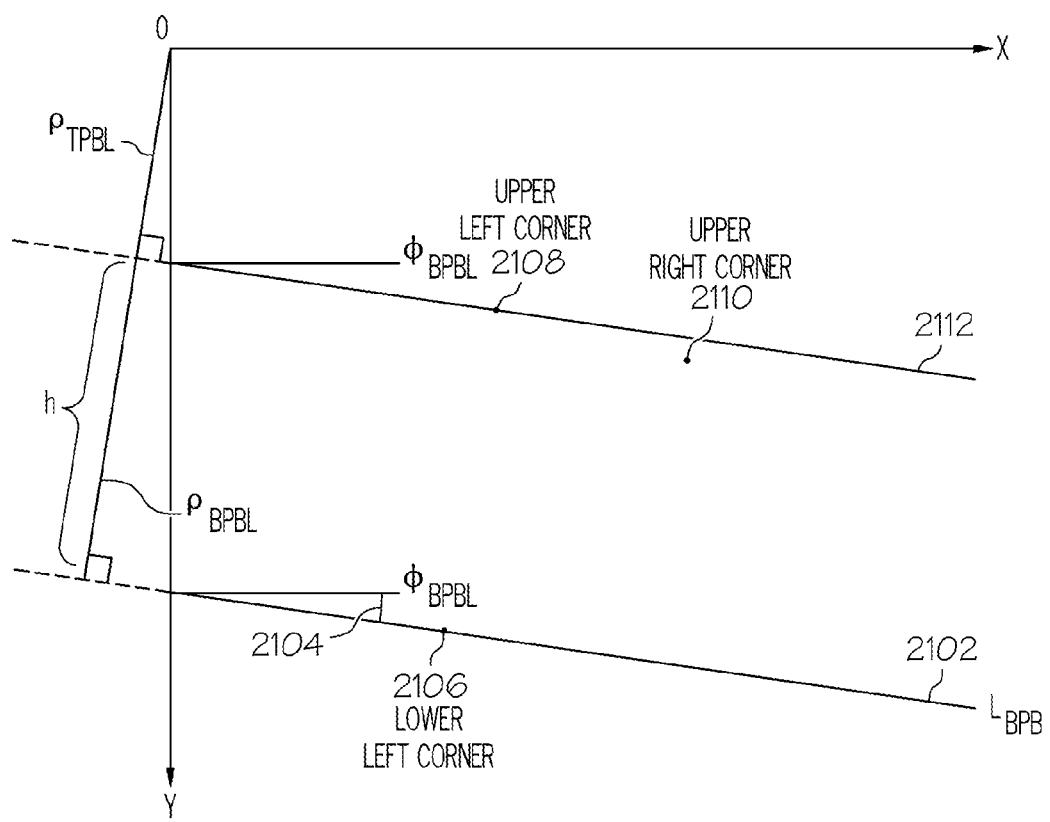
FIG. 21B illustrates a geometrical framework that graphically explains aspects of the operation of the flowchart of FIG. 21A.

Referring to FIG. 21B, the process of FIG. 21A may be more easily understood. A prequalified lower left corner 2106, an estimated upper left corner 2108, and an estimated upper right corner 2110 are depicted. The bottom pallet board line 2102 calculated earlier and passing through the lower left corner 2106, has an orthogonal distance $\rho_{BPBL}$ from the origin O, calculated from Equation 5 above, and forms an angle $\phi_{BPBL}$ 2104 relative to a horizontal line. That same angle $\phi_{BPBL}$ can be used to draw a first line 2112 that passes through the estimated upper left corner 2108 and a second line (not shown) that passes through the estimated upper right corner 2110. If the estimated upper left corner 2108 is appropriately aligned with the estimated upper right corner 2110 then the same line may pass through both corners. However, it is more likely that two different lines could be drawn. Each of these two lines will have a respective orthogonal distance from the origin O. Equation 11, uses these respective orthogonal distances to determine which of the two possible lines is closer to the origin O and produces the higher value for h.

In FIG. 21B, the upper left corner 2108 was chosen, simply by way of example, as producing the line 2112 with the smaller orthogonal distance from the origin O and thus the higher value for h. Thus the line 2112 is drawn through the estimated upper left corner 2108 and its orthogonal distance to the origin can be represented by $$\rho_{TPBL} = -x_{UpperLeft}\sin\phi_{BPBL} + y_{UpperLeft}\cos\phi_{BPBL}$$

Thus, the h found from Equation 11 is the difference between the orthogonal distance $\rho_{BPBL}$ to the bottom pallet board line 2102 and the orthogonal distance $\rho_{TPBL}$ to the upper line 2112. In making the determination in Equation 11, the image analysis computer 110 can round each of the two values to the nearest respective integer before comparing them or can compare the raw values and then round just the maximum value to determine h.

As mentioned earlier with regards to FIG. 18, a pallet object may be defined by first, second and third rectangles 1802, 1804 and 1810, respectively, that may represent at least portions of the first and second fork receiving openings and a vertical, center stringer of a pallet.

The first rectangle 1802 can be defined such that it extends at most 200 pixels to the left of the prequalified lower left corner 1806 along the bottom pallet board line $L_{BPB}$ 1805 and extends orthogonally to the line 1805 over y by h pixels. As noted above, the first rectangle 1802 potentially represents a portion of the first fork receiving opening 210 to the left of a pallet center stringer. Also, the second rectangle 1804 can be defined such that it extends at most 200 pixels to the right of the possible lower right corner 1808, which possible lower right corner 1808 comprises a candidate object with the prequalified lower left corner 1806, along a line 1825 and extends orthogonally to the line 1825 over y by h pixels. The line 1825 may or may not pass through the prequalified lower left corner 1806; however, it is oriented with respect to the x-axis by the same angle $\phi_{BPBL}$. The second rectangle 1804 potentially represents a portion of the second fork receiving opening 212 to the right of the center stringer (corresponding to the third rectangle 1810). The third rectangle 1810 extends horizontally from the prequalified lower left corner 1806 to the candidate object's possible lower right corner 1808 and extends orthogonally, over y, by h pixels to potentially represent a pallet center stringer.

The width of the first rectangle 1802 and the second rectangle 1804 can vary depending on the size of the image, the x-coordinate value of the prequalified lower left corner $X_{LLC}$ and the x-coordinate value of the possible lower right corner, $X_{LRC}$. For an image that is 480×752 pixels in size, the respective maximum width of the first and second rectangles 1802, 1804 may be 200 pixels. For an image that is 240×376 pixels in size, the respective maximum width of the first and second rectangles 1802, 1804 may be 100 pixels. However, the candidate object may have a prequalified lower left corner and possible lower right corner located in the image such that an edge of the image area is within 200 pixels (or 100 pixels) of one of the corners. In this instance, the width of a rectangle (e.g., 1802, 1804) may have to be less than 200 pixels (or 100 pixels if the camera does 2×2 binning). Thus, as explained in more detail below, a leftWidth value is calculated and a right-Width value is calculated that determine the respective width of the first rectangle 1802 and the second rectangle 1804.

For example, if the prequalified lower left corner 1806 is located at a position (145, 250), the possible lower right corner 1808 is located at a position (155, 252), the width of each rectangle is a respective calculated value, h=10, and the angle $\phi_{BPBL}$=8°, then all of the corners 1801, 1821, 1803, 1815, 1806, 1808, 1809, 1811, 1823, 1813, 1817, and 1807 of each of the three triangles 1802, 1804, and 1810 can be calculated. As described more fully below, the values of the pixels from the normalized gray scale image that form the different rectangles 1802, 1804, and 1810 may then be used to calculate a value that represents the confidence that these rectangles actually correspond to pallet holes and a center stringer.

While the precise bounds of the rectangles 1802, 1804, and 1810 can be calculated and used in producing such a confidence value, some assumptions and approximations can alternatively be made that simplify some of the computational steps described below. In particular each of the rectangles 1802, 1804, and 1810 can be approximated by a respective parallelogram, wherein each parallelogram is constructed from h lines of pixels wherein each line of pixels is parallel to the bottom pallet board line 1805. Thus, as the term is used herein, "rectangle" is also intended to encompass a "parallelogram" as well. As explained earlier, a quick line drawing algorithm, such as Bresenham's algorithm, can be used to identify intermediate pixels for inclusion on a line when the two endpoints of the line are known.

Figure 22A:
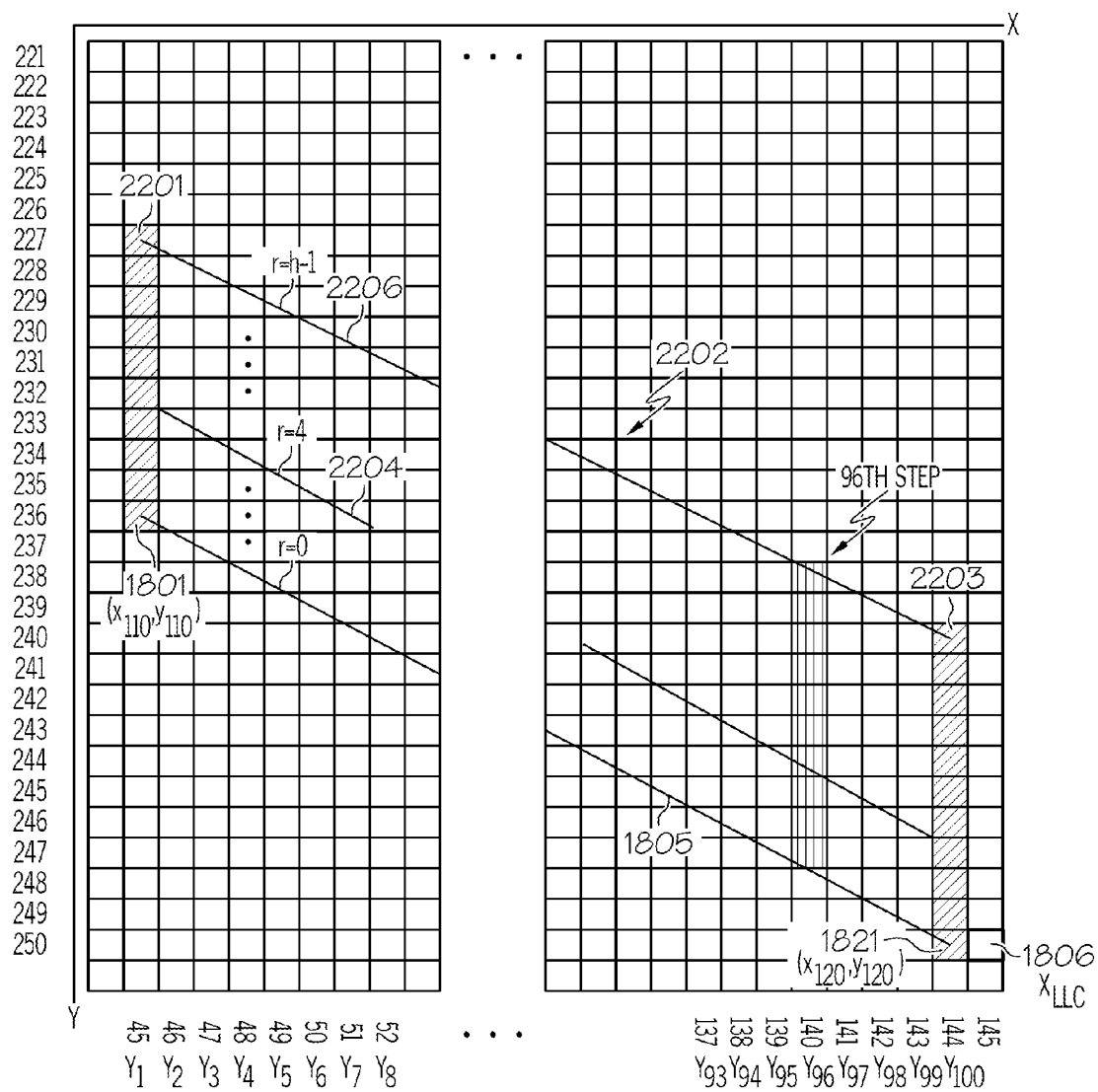
FIG. 22A illustrates an example of first rectangle that possibly represents a fork opening located to the left of a pallet center stringer.
Figure 23A:
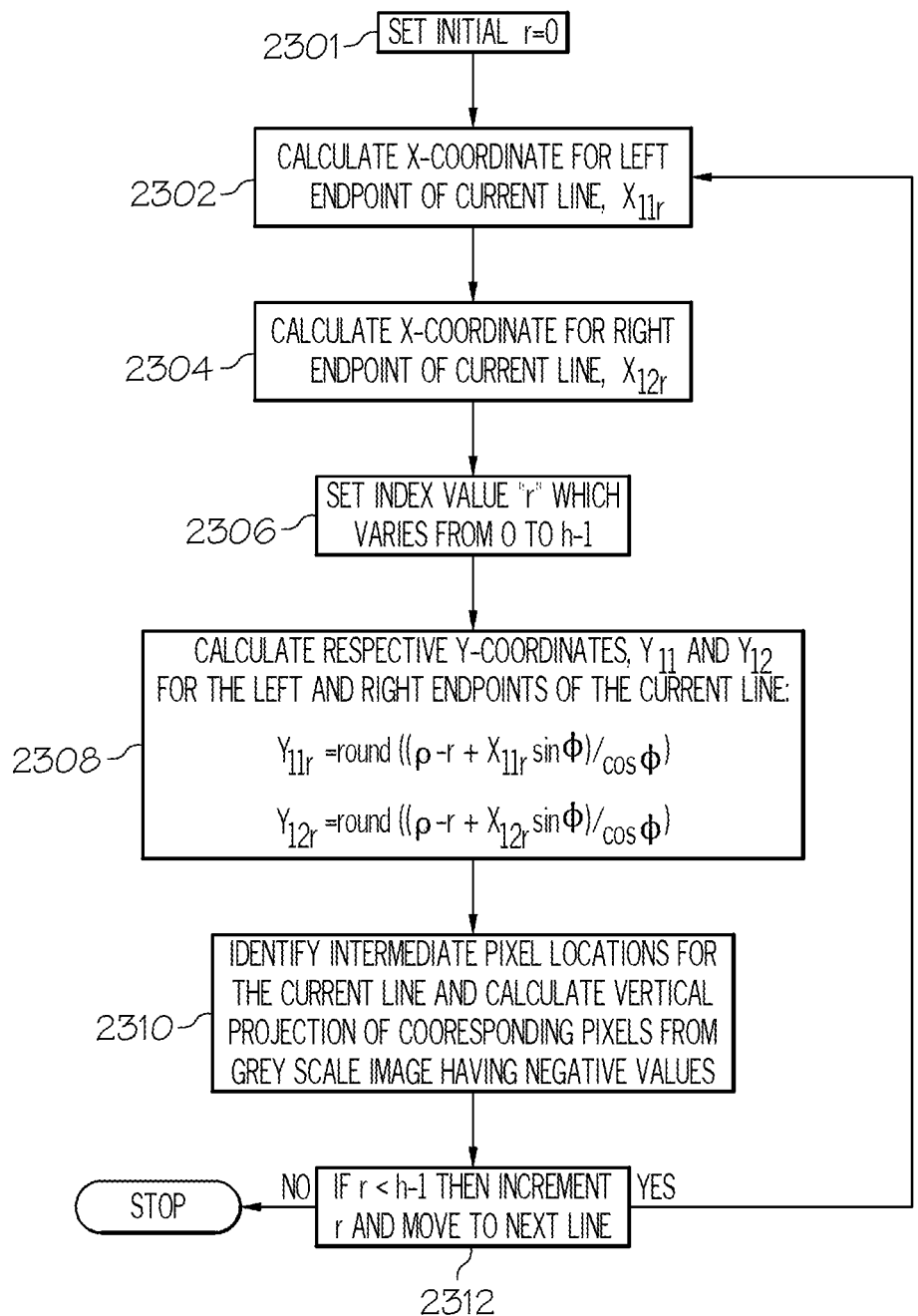
FIG. 23A is a flow chart illustrating steps implemented by the image analysis computer in accordance with the present invention for calculating the pixels that comprise the first second and third rectangles.

FIG. 23A provides a flowchart of one example process that may be used to construct the respective parallelograms that approximate the rectangles 1802, 1804 and 1810. FIG. 22A illustrates a parallelogram corresponding to the first rectangle 1802. In general terms, the parallelogram is constructed by a) determining the pixels of a first line drawn between the two lower corners, b) identifying the two endpoints of a next line, c) identifying the pixels for inclusion in this next line, and d) repeating these steps for h lines. Ultimately, all the pixels of a particular parallelogram will have been identified and can logically be grouped into h different lines, if desired.

As shown in FIG. 22A, using the lower corners 1801 and 1821 of the first rectangle 1802, the calculated value h, and the angle $\phi_{BPBL}$, a parallelogram 2202 can be constructed that approximates the first rectangle 1802 utilizing the process of FIG. 23A. The process of FIG. 23A may be used with any of the three parallelograms but the example discussion that follows happens to involve the first parallelogram 2202 corresponding to the first rectangle 1802.

At step 2302, the x-coordinate, $x_{11}$, of the left endpoint (i.e., the lower left corner 1801 for the first line of the parallelogram 2202) is calculated according to:

$$x_{11} = \text{round}(X_{LLC} - \text{leftWidth}*\cos(\phi_{BPBL})), \text{ see FIG. } 18,$$

and the x-coordinate, $x_{12}$, of the right endpoint (i.e., the lower right corner 1821 for the first line of the parallelogram 2202) is calculated according to:

$$x_{12} = X_{LLC} - 1.$$

In the equations above the first number in the subscript refers to the rectangle corresponding to the parallelogram and the second number in the subscript refers to the endpoint for a particular line in the parallelogram. For example, "$x_{12}$" refers to the x-coordinate of the second (i.e., right) endpoint of a current line for the parallelogram 2202 corresponding to the first rectangle 1802. However, as more fully described below with respect to the y-coordinates of the respective endpoints, each parallelogram includes h different lines. Therefore, another index value, r, can be added in the subscript to distinguish which of the particular one of the h lines is being utilized in an equation. This index value, r, ranges in value from r=0 to r=h−1 with r=0 referring to the bottom-most line of a parallelogram. Thus, an initial step 2301 may be performed which initializes the value of r to be equal to zero. Using this subscript convention, see FIG. 18, the x-coordinates of the endpoints for the first line in each of the three parallelograms can be calculated according to:

$$x_{11,r} = \text{round}(X_{LLC} - \text{leftWidth}*\cos(\phi_{BPBL}))$$

$$x_{12,r} = X_{LLC} - 1$$

$$x_{21,r} = X_{LRC} + 1$$

$$x_{22,r} = \text{round}(X_{LRC} + \text{rightWidth}*\cos(\phi_{BPBL}))$$

$$x_{31,r} = X_{LLC}$$

$$x_{32,r} = X_{LRC}$$

where for the first line, r=0; and $$\text{leftWidth} = \min\left(\text{floor}\left(\frac{X_{LLC}}{\cos\varphi_{BPBL}}\right), \text{maxWidth}\right)$$

$$\text{rightWidth} = \min\left(\text{floor}\left(\frac{\text{imageWidth} - X_{LRC}}{\cos\varphi_{BPBL}}\right), \text{maxWidth}\right)$$

$$\text{maxWidth} = \begin{cases} 100, \text{ for } 240 \times 376 \text{ image size} \\ 200, \text{ for } 480 \times 752 \text{ image size} \end{cases}$$

and imageWidth is the number of columns of pixels in the image.

In an example above, the prequalified lower left corner 1806 is located at a position (145, 250), the possible lower right corner 1808 is located at a position (155, 252) and the angle $\phi_{BPBL} = 8°$. If the image size is assumed to be 240×376 pixels, then according to the above equations leftWidth=100 and rightWidth=100. In an alternative example with the image size being 480×752 pixels, the above equations provide that leftWidth=146 and rightWidth=200. According to the above calculations, the lower right corner 1821 of the parallelogram 2202 is at the same x-location, $x_{12}$, as the lower right corner 1821 of the first rectangle 1802 and is selected to be one pixel to the left of the prequalified lower left corner 1806. The lower left corner 1801 of the parallelogram 2202 is at the same x-location, $X_{11}$, as the lower left corner 1801 of the rectangle 1802 and is located leftWidth pixels, along the bottom pallet board line 1805, to the left of the prequalified lower left corner 1806.

Next, the image analysis computer 110 can calculate the y-coordinates for these two endpoints, respectively, $y_{11}$ and $y_{12}$. For example, the y-coordinate for the lower left corner 1801 can be calculated from the equation for the orthogonal distance $\rho_{line}$ to a line that passes through a known point $(x_{11}, y_{11})$ at a known angle $\phi_{BPBL}$:

$$\rho_{line} = -x_{11} \sin \phi_{BPBL} + y_{11} \cos \phi_{BPBL}$$

solving for the y-coordinate of the point gives the equation:

$$y_{11} = (\rho_{line} + x_{11} \sin \phi_{BPBL})/\cos \phi_{BPBL}.$$

Figure 23B:
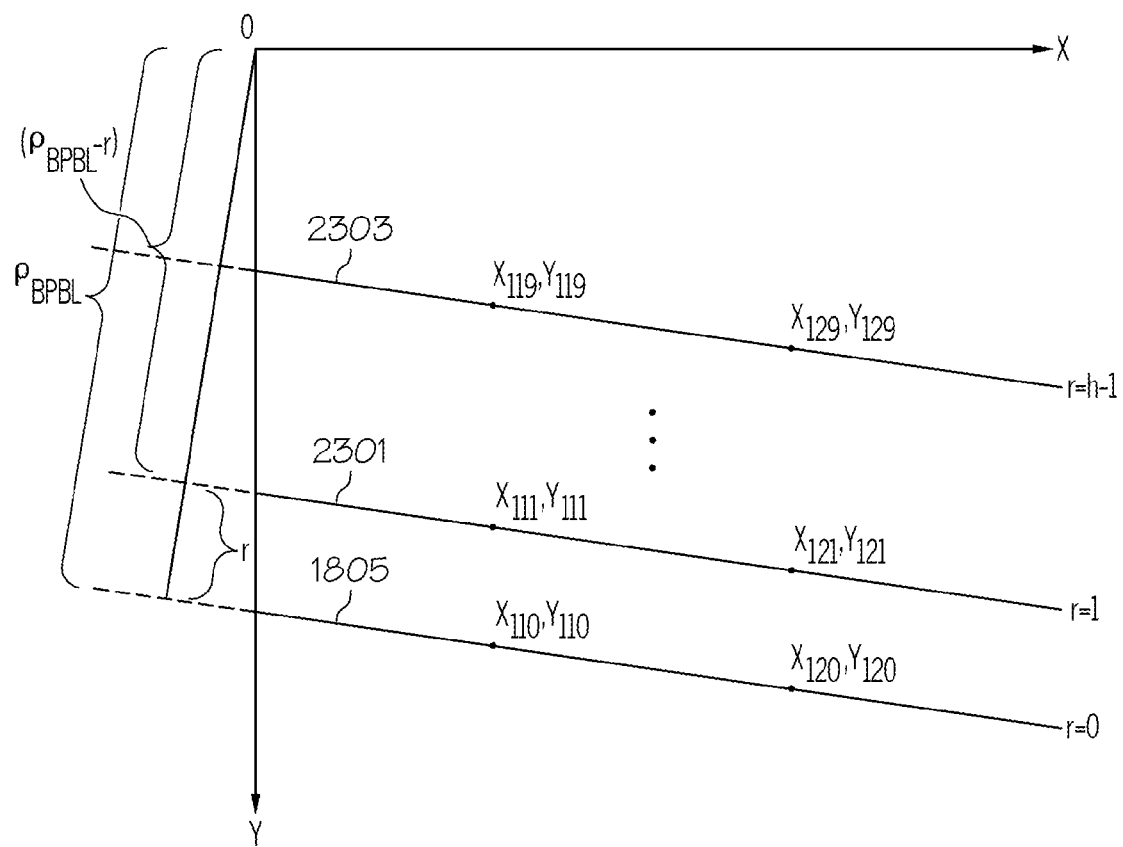
FIG. 23B illustrates a geometrical framework that graphically explains aspects of the operation of the flowchart of FIG. 23A.

However, as mentioned, the process of FIG. 23A automates the calculation of the endpoints for h different lines. Therefore, in step 2306, the image analysis computer 110 uses the integer, index value "r" which varies from 0 to h−1 to reference each individual line in the parallelogram 2202. FIG. 23B illustrates 3 of the h−1 lines that are calculated for the first parallelogram 2202. The bottom most line is the bottom pallet board line 1805 and corresponds to r=0. The next line up, line 2301, corresponds to r=1 and has an orthogonal distance from the origin equal to $(\rho_{BPBL} - r)$. There are h of these lines calculated with the last line, line 2303, corresponding to r=h−1 and having an orthogonal distance from the origin equal to $(\rho_{BPBL} - h + 1)$.

Thus, for any of the lines (e.g., r=0 to r=h−1) the y-coordinate of the left endpoint (i.e., $y_{1r}$) and the y-coordinate of the right endpoint (i.e., $y_{12r}$) can be calculated, by the image analysis computer 110 in step 2308, according to:

$$y_{11r}=\text{round}((\rho_{BPBL}-r+x_{11r}*\sin\phi_{BPBL})/\cos\phi_{BPBL}))$$

$$y_{12r}=\text{round}((\rho_{BPBL}-r+x_{12r}*\sin\phi_{BPBL})/\cos\phi_{BPBL})).$$

With the two coordinates of the two endpoints for the current line being known, the image analysis computer 110 can, in step 2310, identify the intermediate pixel locations to include in the current line extending between the two endpoints using a conventional line drawing algorithm such as Bresenham's algorithm. The pixel locations identified for inclusion in a line are then used to extract the pixel values at those locations in the normalized gray scale image. As described below, these pixel values are used to generate a respective vertical projection for each of the three parallelograms that correspond to the three rectangles 1802, 1804, and 1810.

In step 2312, the image analysis computer 110 determines if all h lines have been calculated or if more remain. If more remain, the new x-coordinates are calculated in steps 2302 and 2304 and the r index value is incremented in step 2306. In setting the new x-coordinate values in steps 2302 and 2304, an approximation is made that the sides of the parallelogram are orthogonal in the y direction. Thus, $x_{11r}$ and $x_{12r}$ are the same for each of the h lines and steps 2303 and 2304 need only calculate these values the first time the algorithm of FIG. 23A executes.

To summarize, the respective first and second endpoint coordinates for each of the h lines of the first parallelogram 2202 are calculated according to:

$$x_{11r}=\text{round}(X_{LLC}-\text{leftWidth}*\cos(\phi_{BPBL}));$$

$$x_{12r}=X_{LLC}-1;$$

$$y_{11r}=\text{round}((\rho_{BPBL}-r+x_{11r}*\sin\phi_{BPBL})/\cos\phi_{BPBL})),$$
and $$y_{12r}=\text{round}((\rho_{BPBL}-r+x_{12r}*\sin\phi_{BPBL})/\cos\phi_{BPBL}))$$

wherein:

$X_{LLC}$=an x-coordinate for the prequalified lower left corner through which the bottom pallet board line, $L_{BPB}$, passes, and r=an index value uniquely referring to one of the respective h lines in each of the first parallelogram 2202, the second parallelogram 2220 and the third parallelogram 2240, the value of which ranges from 0 to (h−1) with r=0 referring to a bottom-most of the h lines.

Also, the respective first and second endpoint coordinates for each of the h lines in the second parallelogram 2220 are calculated according to:

$$x_{21r}=X_{LRC}+1;$$

$$x_{22r}=\text{round}(X_{LRC}+\text{rightWidth}*\cos(\phi_{BPBL}));$$

$$y_{21r}=\text{round}((\rho_{BPBL}-r+x_{21r}*\sin\phi_{BPBL})/\cos\phi_{BPBL})),$$
and $$y_{22r}=\text{round}((\rho_{BPBL}-r+x_{22r}*\sin\phi_{BPBL})/\cos\phi_{BPBL}))$$

wherein:

$X_{LRC}$=an x-coordinate for a possible lower right corner of a possible center stringer, and r=an index value uniquely referring to one of the respective h lines in each of the first parallelogram 2202, the second parallelogram 2220 and the third parallelogram 2240, the value of which ranges from 0 to (h−1) with r=0 referring to a bottom-most of the h lines.

Finally, for the third parallelogram 2240, the respective first and second endpoint coordinates for each of the h lines are calculated according to:

$$x_{31r}=X_{LLC}$$

$$x_{32r}=X_{LRC};$$

$$y_{31r}=\text{round}((\rho_{BPBL}-r+x_{31r}*\sin\phi_{BPBL})/\cos\phi_{BPBL})),$$
and $$y_{32r}=\text{round}((\rho_{BPBL}-r+x_{32r}*\sin\phi_{BPBL})/\cos\phi_{BPBL})).$$

Figure 23C:
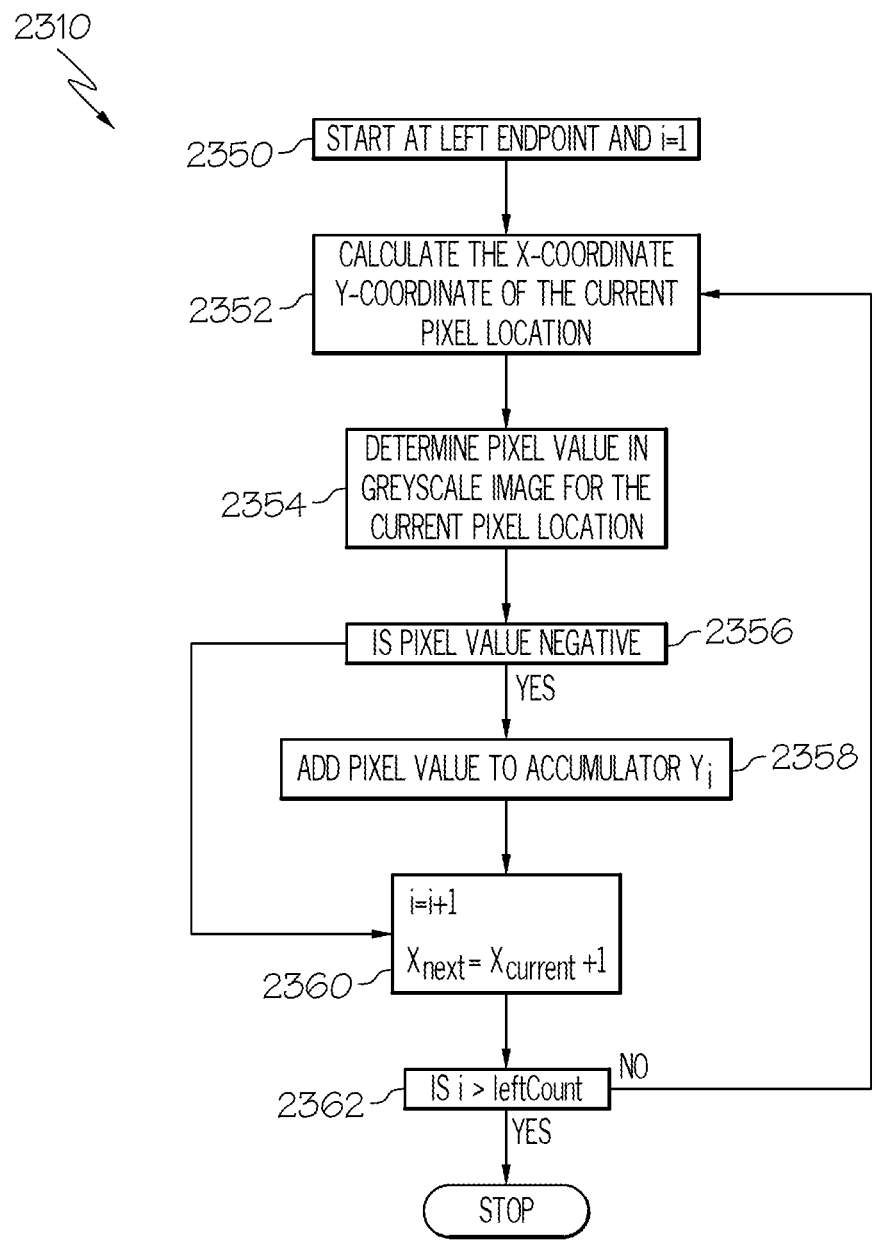
FIG. 23C is a flow chart illustrating steps implemented by the image analysis computer in accordance with the present invention for calculating a vertical projection of negative pixels of the first and second rectangles.

The process of FIG. 23A highlighted how the h lines were calculated. However, the reason the h lines are calculated relates to the vertical projection that was calculated in step 2310. The details of this step are illustrated in the flowchart of FIG. 23C. The process of FIG. 23C begins when two endpoints for a particular line of the parallelogram 2202 have been calculated. Based on these two endpoints, a fast line drawing algorithm can be used to determine which intermediate pixels are included in the particular line.

In step 2350, the image analysis computer 110, begins at the left endpoint on its first iteration (i.e., i=1). As described in more detail above, a fast line drawing algorithm, such as Bresenham's algorithm, in subsequent iterations, steps in the x-direction by one pixel each iteration using the slope of the line to determine the y coordinate value for that particular iteration of the algorithm. Thus, in step 2352, the image analysis computer 110 determines the x-coordinate and the y-coordinate for a current pixel location at the $i^{th}$ iteration of the algorithm for a particular line r. That value of the pixel in the normalized gray scale image at that pixel location is determined in step 2354.

In the example parallelogram 2202, each line of the parallelogram (i.e., each different value of "r") spans leftCount pixels in the x-direction, where leftCount=round (leftWidth*cos($\phi_{BPBL}$)), and, thus, there are leftCount iterations performed to determine the intermediate pixels of each line. A respective accumulator $Y_i$ is used to construct a vertical projection of negative pixels for each of the leftCount different iterations of the algorithm 2310. Hence, in the illustrated embodiment, leftCount accumulators are defined corresponding to leftCount iterations performed for each of the h lines of the parallelogram. Each accumulator also corresponds to a respective X-coordinate value for one of the leftCount pixels in each of the h lines.

In step 2356, it is determined if the pixel value of the normalized gray scale image at the pixel location just generated during the $i^{th}$ iteration is negative. If so, then that pixel value is added to the accumulator $Y_i$, in step 2358. The value of a pixel in the normalized gray scale image is negative when not over pallet structure and tends to be positive when over pallet structure. The image analysis computer 110, in step 2360, increments the index count, i, and the x-coordinate value. In step 2362, the image analysis computer 110 determines if all leftCount iterations have been completed. If not, then the process repeats starting at step 2352 with the next intermediate pixel location in the line.

At the end of the steps of the process of FIG. 23C, the intermediate pixel values for a particular line have been calculated and used to update a respective accumulator Y, for each iteration of the fast-line drawing algorithm. Because the over-arching process of FIG. 23A is repeated for the h lines, this process of FIG. 23C is repeated for each of the h lines and, therefore, the accumulators Y, represent data for all the lines that are used to construct the parallelogram 2202. Only negative pixels are accumulated into projections.

Another way to describe how the value in an accumulator $Y_i$ is calculated is to consider the process described above as accumulating in each respective accumulator $Y_i$ a sum according to:

$$Y_i = \sum_{r=0}^{r=h-1} GSPV_{ir}$$

where:
i=an index value referring a relative x-coordinate value of a particular pixel location in a particular line of the first parallelogram 2202, ranging in value from 1 to Q, where i=1 corresponds to the left-most pixel location in the particular line and i=Q corresponds to the right-most pixel location in the particular line;
r=an index value uniquely referring to one of the respective h lines in each of the first parallelogram 2202, the second parallelogram 2220 and the third parallelogram 2240, the value of which ranges from 0 to (h−1) with r=0 referring to a bottom-most of the h lines; and
$GSPV_{ir}$=a gray scale pixel value (GSPV) of a pixel from the normalized gray scale image at a pixel location indicated by an $i^{th}$ position in the $r^{th}$ line of the first parallelogram 2202, wherein $GSPV_{ir}$ is added to the respective accumulator sum $Y_i$ if $GSPV_{ir}$ is less than zero.

Referring back to FIG. 22A, the corners of example parallelogram 2202 have respective coordinate values of:
Lower left: (45,236)
Lower right: (144,250)
Upper left: (45,227)
Upper right: (144,240)

Each line of the parallelogram (i.e., each different value of "r") spans 100 pixels in the x-direction, in this particular example, and a respective accumulator Y, is used to construct a vertical projection for each of the 100 different columns of the parallelogram 2202. For example, for the bottom line 1805, the fast line drawing algorithm steps from x=45 to x=144 and calculates an appropriate y-coordinate value each step of the way. In the example of FIG. 22A, the $96^{th}$ step of the algorithm is highlighted for each line. For the line r=0, the $96^{th}$ step has a pixel location (140,247); for the line r=4, the $96^{th}$ step has a pixel location (140, 243); and for the line r=9, the $96^{th}$ step has a pixel location (140,238).

If the parallelogram 2202 is overlaid onto the normalized gray scale image, then the accumulator $Y_{96}$ can be seen as the vertical projection of the negative pixels from column x=140 of the normalized gray scale image within the y bounds of the parallelogram 2202 for that column.

Figure 22B:
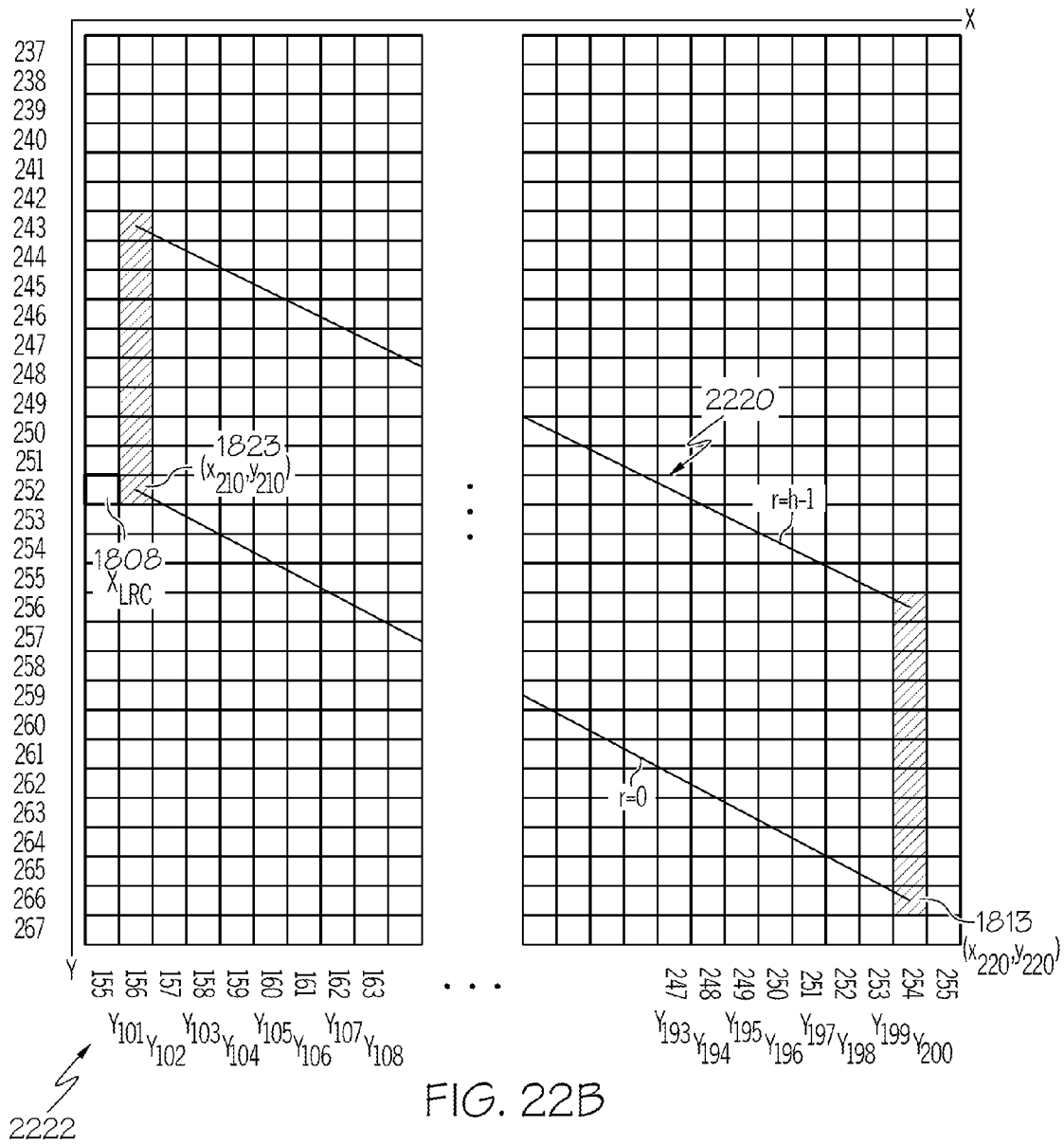
FIG. 22B illustrates an example of second rectangle that possibly represents a fork opening located to the right of a pallet center stringer.

As mentioned, the processes of FIG. 23A and FIG. 23B were described with respect to the parallelogram 2202 that corresponds to the first rectangle 1802. However, a parallelogram 2220 as shown in FIG. 22B can similarly be constructed that corresponds to the second rectangle 1804. Also, a parallelogram 2240 as shown in FIG. 22C can be similarly constructed that corresponds to the third rectangle 1810.

The parallelogram 2220 of FIG. 22B is substantially similar to first parallelogram 2202 in that there are rightCount accumulators 2222 that are used for determining the vertical projection of the pixels from the parallelogram 2220. More generally though, each line of the parallelogram 2220 spans rightCount pixels in the x-direction where rightCount=round (rightWidth*cos($\phi_{BPBL}$)), thereby dictating that there are rightCount accumulators 2222. However, in other examples, the values of leftCount and rightCount may be different so a different number of accumulators may be used. The parallelogram 2240 of FIG. 22C corresponds to the third rectangle 1810 which might represent a center stringer. Thus, the width of this parallelogram is not determined by rightWidth or leftWidth values but is determined by the coordinates of the prequalified lower left corner 1806 and the possible lower right corner 1808.

For purposes of generating a score for a "hole," the first and second parallelograms 2202 and 2220 are treated as one unit. Thus, one vertical projection for the first and second parallelograms 2202 and 2220 is calculated and a separate, second vertical projection for the third parallelogram 2240 is calculated.

As mentioned above, the first and second parallelograms 2202 and 2220 are treated as a single unit when calculating the vertical projection for these regions. Thus, according to the processes of FIG. 23A and FIG. 23C, 200 values of $Y_i$ are calculated, one for each column of the two parallelograms 2202 and 2220. Much like the process for calculating the accumulator values $Y_i$ for the first parallelogram 2202, the values of the accumulators $Y_i$ for the second parallelogram 2220 can also be calculated. For the second parallelogram 2220, the value in an accumulator $Y_i$ of negative pixels is calculated by accumulating in each respective accumulator $Y_i$ a sum according to:

$$Y_i = \sum_{r=0}^{r=h-1} GSPV_{ir}$$

where:
i=an index value referring a relative x-coordinate value of a particular pixel location in a particular line of the second parallelogram 2220, ranging in value from Q+1 to Q+rightWidth, where i=Q+1 corresponds to the left-most pixel location in the particular line and i=Q+rightWidth corresponds to the right-most pixel location in the particular line;
r=an index value uniquely referring to one of the respective h lines in each of the first parallelogram 2202, the second parallelogram 2220 and the third parallelogram 2240, the value of which ranges from 0 to (h−1) with r=0 referring to a bottom-most of the h lines; and
$GSPV_{ir}$=a gray scale pixel value (GSPV) of a pixel from the normalized gray scale image at a pixel location indicated by an $i^{th}$ position in the $r^{th}$ line of the second parallelogram 2220, wherein $GSPV_{ir}$ is added to the respective accumulator sum $Y_i$ if $GSPV_{ir}$ is less than zero.

Based on the different values for $Y_i$ for the first and second parallelograms 2202 and 2220 that are calculated, an average value can be determined according to Equation 12:

$$\overline{Y} = \frac{1}{N}\sum_{i=1}^{N} Y_i$$

where N represents the total number of columns in the combined two parallelograms 2202 and 2220 (e.g., using the previous example coordinates N=200). This average value can be used when determining a score for the third parallelogram 2240.

Referring to FIG. 22C, the shaded pixels represent the third parallelogram 2240. There is an index value j 2270 that varies from 1 to 11 (in this example) to uniquely identify each column of the parallelogram 2240. For each column, a value $Z_j$ 2272 is calculated, according to the process of FIG. 23D, that represents the sum of a portion of the negative pixel values in each column of the gray scale image.

Figure 23D:
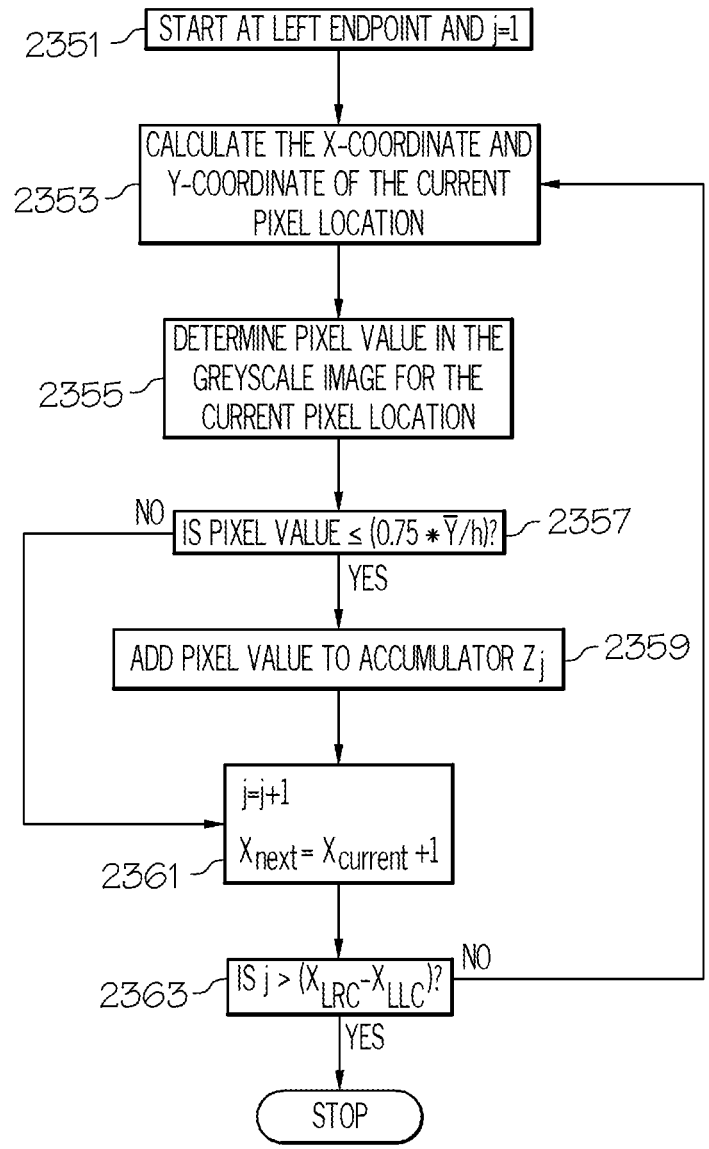
FIG. 23D is a flow chart illustrating steps implemented by the image analysis computer in accordance with the present invention for calculating a vertical projection of at least some of the negative pixels of the third rectangle.

The process of FIG. 23D is similar to that of FIG. 23C. As described above, the process of FIG. 23C is applied to the first and second parallelograms 2202 and 2202. The process of FIG. 23D is applied in a similar manner to the third parallelogram 2240. The process begins when two endpoints for a particular line of the parallelogram 2240 have been calculated (e.g., endpoints 1806 and 1808 of the first line of the third parallelogram 2240). Based on these two endpoints, a fast line drawing algorithm can be used to determine which intermediate pixels are included in the particular line.

In step 2351, the image analysis computer 110, begins at the left endpoint (i.e., j=1) on the current line (e.g., line r) of the parallelogram 2240. As described in more detail above, a fast line drawing algorithm, such as Bresenham's algorithm, in subsequent iterations, steps in the x-direction by one pixel each iteration using the slope of the line to determine the y coordinate value for that particular iteration of the process of FIG. 23D. Thus, in step 2353, the image analysis computer 110 determines the x-coordinate and the y-coordinate for a current pixel location at the $j^{th}$ iteration of the algorithm for a particular line r. That value of the pixel in the normalized gray scale image at that pixel location is determined in step 2355.

In the example parallelogram 2240, each line of the parallelogram (i.e., each different value of "r") spans from the x-coordinate value $X_{LLC}$ for the prequalified lower left corner 1806 to the x-coordinate value $X_{LRC}$ for the possible lower right corner 1808 and, thus, there are ($X_{LRC}-X_{LLC}$) iterations performed to determine the intermediate pixels of each line. A respective accumulator $Z_j$ is used to construct a vertical projection of some of the negative pixels for each of the different iterations of the process of FIG. 23D (e.g., in the example of FIG. 22C, there are 11 iterations). Hence, in the illustrated embodiment, 11 accumulators are defined corresponding to 11 iterations performed for each of the h lines of the parallelogram 2240. Each accumulator also corresponds to a respective X-coordinate value for one of the 11 pixels in each of the h lines.

Even if the pixel value for a current pixel location (in step 2355) is negative, it is not necessarily included in the vertical projection being calculated in a particular accumulator $Z_j$. Only those pixels that have a gray scale value that satisfies the inequality are included:

$$\text{pixel value} \leq \left(0.75 \times \frac{\overline{Y}}{h}\right)$$

wherein $\overline{Y}$ was calculated according to Equation 12 and h was calculated according to Equation 11.

Thus, in step 2357, it is determined if the pixel value of the normalized gray scale image at the pixel location just generated during the $j^{th}$ iteration satisfies the above inequality. If so, then that pixel value is added to the accumulator $Z_j$, in step 2359. The image analysis computer 110, in step 2361, increments the index count, j, and the x-coordinate value. In step 2363, the image analysis computer 110 determines if all iterations have been completed. If not, then the process repeats starting at step 2353 with the next intermediate pixel location in the current line.

At the end of the steps of the process of FIG. 23D, the intermediate pixel values for a particular line have been calculated and used to update a respective accumulator $Z_j$ for each iteration of the fast-line drawing algorithm. This process of FIG. 23D is repeated for each of the h lines so that eventually the accumulators $Z_j$ represent data for all the lines that are used to construct the parallelogram 2240.

Taken together, the values of $Z_j$ are the vertical projection of a portion of the negative-valued pixels of the normalized gray scale image corresponding to the pixel locations of the parallelogram 2240. Another way to describe how the value in an accumulator $Z_j$ is calculated is to consider the process described above accumulating in each respective accumulator $Z_j$ a sum according to:

$$Z_j = \sum_{r=0}^{r=h-1} GSPV_{jr}$$

where:
j=an index value referring a relative x-coordinate value of a particular pixel location in a particular line of the third parallelogram 2240, ranging in value from 1 to s, where j=1 corresponds to the left-most pixel location in the particular line and j=s corresponds to the right-most pixel location in the particular line;
r=an index value uniquely referring to one of the respective h lines in each of the first parallelogram 2202, the second parallelogram 2220 and the third parallelogram 2240, the value of which ranges from 0 to (h−1) with r=0 referring to a bottom-most of the h lines; and
$GSPV_{jr}$=a gray scale pixel value (GSPV) of a pixel from the normalized gray scale image at a pixel location indicated by a $j^{th}$ position in the $r^{th}$ line of the third rectangle 2240, wherein $GSPV_{jr}$ is added to the respective accumulator sum $Z_j$ if $GSPV_{jr}$ is less than or equal to $$\left(0.75 \times \frac{\overline{Y}}{h}\right)$$

A composite hole score is then calculated, for the three parallelograms using Equation 13:

$$Score_{hole} = 1 - \frac{1}{N}\sum_{i=1}^{N}\frac{|Y_i - \overline{Y}|}{|Y_i + \overline{Y}|} - \frac{\overline{Z}}{(\overline{Z}+\overline{Y})}$$

$$\text{where: } \overline{Y} = \frac{1}{N}\sum_{i=1}^{N}Y_i \text{ and } \overline{Z} = \frac{1}{s}\sum_{j=1}^{s}Z_j$$

In the above calculation, s represents the number of columns from the prequalified lower left corner to the potential lower right corner and N represents the total number of columns in the combined two parallelograms 2202 and 2220. Using the previous example coordinates s=11 and N=200.

If the respective average of either $\overline{Y}$ or $\overline{Z}$ is zero then the composite hole score is set to zero; otherwise a composite hole score is calculated according to the above equation. The middle term of the right hand side of Equation 13 is at a minimum for rectangular holes and the ratio of the mean of the Z projection to the sum of the Z mean and the Y mean (the right-most term in Equation 13) is at a minimum for the vertical stringer. Thus, according to the above equation, the value for $Score_{hole}$ is higher when the first and second parallelograms 2202 and 2220 are located over pallet holes and the third parallelogram 2240 is located over a pallet stringer.

For each candidate object that has a $Score_{left}$ (and/or $Score_{right}$, depending on the particular techniques used to calculate these values) that surpasses a predetermined threshold as described above, a composite object score is determined using the following equation:

$$Score_{Object} = (Score_{LowerLeftCorner} + Score_{LowerRightCorner}) * Score_{BaseboardLine} * \frac{Score_{hole}}{2}$$

where:

$Score_{Lower\ left\ corner}$=The calculated value from the lower-left corner image for the pixel location corresponding to the prequalified lower left corner of the candidate object;

$Score_{Lower\ right\ corner}$=The calculated value from the lower-right corner image for the pixel location corresponding to the possible lower right corner of the candidate object; and $$Score_{BaseboardLine} = \max\left(\frac{AccumulatorCount(\varphi)}{M \times N_y}\right) =$$

The calculated score according to the highest counter value of 61 lines that were evaluated with Equation 6.

The value "M" is the width, in pixels, of the Ro image and $N_y$ is the number of sub-lines associated with each counter; and $Score_{Hole}$=The value from Equation 13.

The above description for identifying candidate objects in a gray scale image that may correspond to a pallet related to a pallet that can be characterized as having one center stringer (e.g., 208) separating two holes or openings of a pallet P. One of ordinary skill will recognize that similar techniques may be used even if a different pallet structure is present. For example, some pallets may include two center stringers separating two holes or openings and having a central hole or opening between the two center stringers. In this case, each center stringer will have its own four corners that can be identified using the techniques described above. Also, the Y and Z values of Equation 13 may be modified to account for the additional center rectangular hole and the additional center stringer. Thus, an example composite score calculation may be different such as, for example:

$$Score_{Object} = (Score_{LowerLeftCorners} + Score_{LowerRightCorners}) * Score_{BaseboardLine} * \frac{Score_{hole}}{4}$$

Some pallets may have a center stringer with a portion that extends forward of a bottom pallet board line. The general techniques described above may still be used but compensation in the way the 61 lines of Equation 6 are scored may need to be made. Some pallets may have rounded corners, or other types of corners, occurring between a bottom pallet board line and a center stringer rather than the square corners discussed earlier with respect to pallet P of FIG. 3. Again the general techniques described above may be used, but a different mask structure than those of masks 300 and 310 (See FIG. 6 and FIG. 7) may provide beneficial results. There may be some pallets that do not include a lower pallet board. In this instance, a top of a rack shelf on which the pallet sits can be an alternative structure used to identify a bottom pallet board line and the same, or similar, techniques described above may be used to identify and score various candidate objects.

The candidate objects within an image for which a composite object score value "$Score_{Object}$" has been determined are referred to herein as "scored candidate objects" and define objects which are most likely to correspond to actual pallets in the image. Scored candidate objects typically have a $Score_{Object}$ value between 0 about 1.0 while scored candidate objects which actually correspond to a pallet typically have a score greater than 0.5, approaching 1.0 for either image size. However, there may be a relatively large number of such scored candidate objects identified in an image frame even though there are actually only a few pallets likely in an image frame. Accordingly, the number of scored candidate objects within each image frame can be further reduced to lessen the computational burden of subsequent analysis of the plurality of image frames.

As described in more detail below, the image analysis computer 110 acquires a series of image frames at different instances of time. In each image frame, candidate objects are identified and scored using the above-described techniques. One or more of these scored candidate objects are then tracked, if possible, between the image frames. To accomplish this tracking, the image analysis computer 110 maintains information about the existing scored candidate objects from the previous or prior image frames and the new scored candidate objects identified in the most recently acquired or next image frame. In the most recently acquired image frame the "new" scored candidate objects that are identified may include some scored candidate objects that have not previously been identified in any previous image frame but may also include scored candidate objects that may match, or correspond to, an existing scored candidate object previously identified in an earlier image frame.

One way for the image analysis computer 110 to maintain this information is to maintain a list of all scored candidate objects such that for each scored candidate object a respective record is stored that contains a number of corresponding object features. The object features can include, for example, the parameters ($\rho_{BPBL}$, $\phi_{BPBL}$) which are the orthogonal distance from the origin and an angle from horizontal for a corresponding bottom pallet board line, a corresponding composite object score value "$Score_{Object}$", x-y coordinates for a lower left corner of a corresponding center stringer, x-y coordinates for the other three corners of the center stringer, x-y coordinates for the rectangles 1802, 1804, 1810, see FIG. 18, associated with the scored candidate object that possibly correspond to left and right fork receiving openings and the center stringer respectively, the rectangles' height h, as calculated according to Equation 11 above, and corresponding individual component score values such as $Score_{LowerRightCorner}$, $Score_{LowerLeftCorner}$, and $Score_{Holes}$. As described in more detail below, there are other object features that can be included in each record which help track a scored candidate object between different image frames.

Figure 23E:
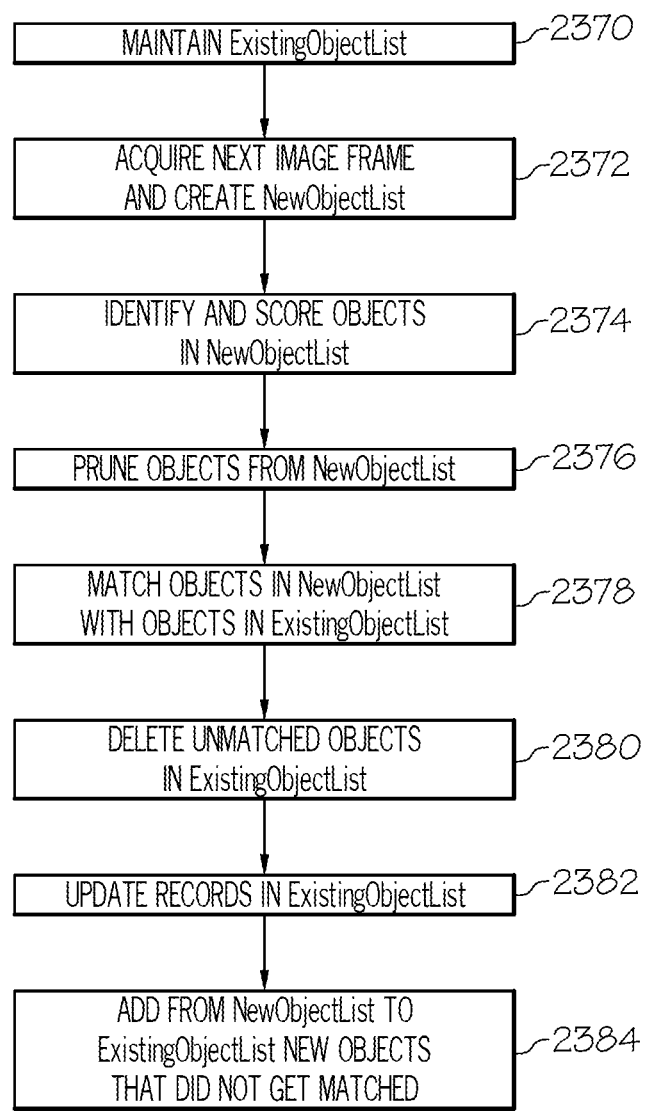
FIG. 23E depicts a flowchart for an exemplary algorithm for maintaining Objectlists for candidate objects in an image frame in accordance with the principles of the present invention.

This list of scored candidate objects, and its corresponding records, can be referred to as an Objectlist. The image analysis computer 110 can maintain two different Objectlists. An ExistingObjectlist can be maintained that includes existing scored candidate objects and a NewObjectlist can be maintained that includes the scored candidate objects in the most recently acquired image frame. FIG. 23E depicts a flowchart of an exemplary process for maintaining Objectlists in accordance with the principles of the present invention. In step 2370, the image analysis computer 110 maintains an ExistingObjectlist which, as mentioned above, includes a respective record for existing scored candidate objects, from one or more of the previous image frames, which are being tracked. The image analysis computer 110, in step 2372, acquires the next image frame or the next gray scale image. Additionally, the image analysis computer 110 creates a NewObjectlist for the eventual scored candidate objects in this next image frame. Using the techniques described above, the image analysis computer identifies and then scores the scored candidate objects in this next image frame, in step 2374. In a step more fully described below, the image analysis computer 110 can prune, in step 2376, scored candidate objects from the NewObjectlist to reduce the number of scored candidate objects that will be tracked. The scored candidate objects in the pruned NewObjectlist can be matched, or attempted to be matched, with corresponding objects in the ExistingObjectlist, in step 2378. Some scored candidate objects in the ExistingObjectlist may have no matches in the NewObjectlist and therefore may possibly be deleted, in step 2380, from the ExistingObjectlist so that they are no longer tracked. It may be beneficial to avoid deleting a scored candidate object the first time it is unmatched and to wait for either two or three sequential unmatched occurrences before deleting the scored candidate object. Also, some scored candidate objects in the NewObjectlist may have no corresponding matching objects in the ExistingObjectlist; these scored candidate objects are then added to the ExistingObjectlist.

Depending on how the scored candidate objects match, the records in the ExistingObjectlist can be updated to reflect new information from the NewObjectlist, in step 2382, to provide a current list of scored candidate objects that will continue to be tracked into the next image frame. Also, in step 2384, the image analysis computer 110 can add any newly identified objects in the NewObjectlist that do not find a match with an existing object in the ExistingObjectlist to the objects that are in the ExistingObjectlist. Control of the process then returns to step 2372 where a next image frame can be acquired and a new NewObjectlist can be created so the process can repeat.

As mentioned above with respect to step 2376 of FIG. 23E, the image analysis computer 110 can prune some of the scored candidate objects from the NewObjectlist if desired. In particular, using the object features associated with each scored candidate object, the image analysis computer 110 can eliminate some scored candidate objects from the NewObjectlist for an image frame that are unlikely to actually correspond to a pallet.

The steps shown in FIG. 23E are shown as occurring sequentially; however, one of ordinary skill will recognize that some of the steps can be performed concurrently without departing from the scope of the present invention. For example, it is not necessary to wait until all objects are matched in step 2378 to start the acquisition of a next image frame in step 2372.

Figure 24A:
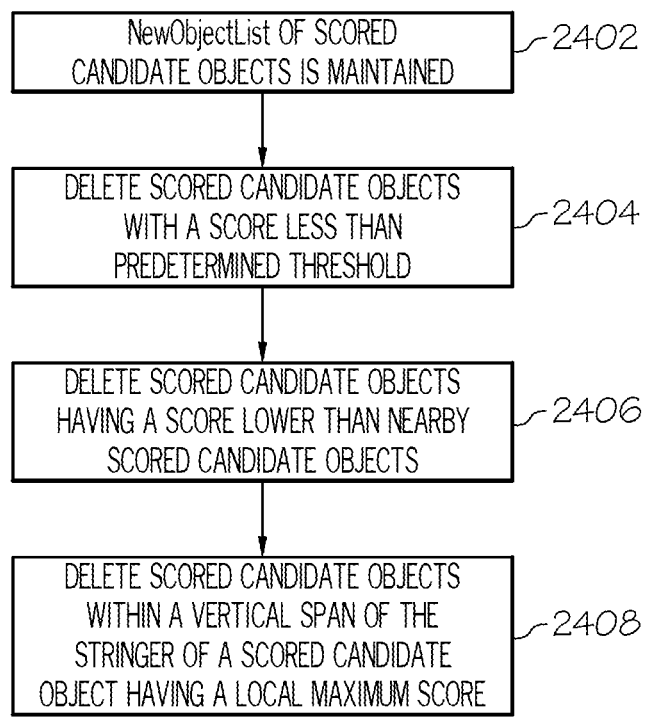
FIG. 24A depicts a flowchart for an exemplary algorithm to eliminate at least some of the candidate objects from an Objectlist for an image frame in accordance with the principles of the present invention.

FIG. 24A depicts a flowchart for an exemplary algorithm to eliminate at least some of the scored candidate objects from the NewObjectlist for an image frame. As mentioned above, and as shown in step 2402, the image analysis computer 110 maintains a NewObjectlist for the scored candidate objects in the current image frame being analyzed. Using the respective composite object score $Score_{Object}$ for each scored candidate object, the image analysis computer 110 can eliminate, in step 2404, all scored candidate objects that have a $Score_{Object}$ value below a predetermined minimum value. For example, all scored candidate objects with a $Score_{Object}$ score below 0.3 can be deleted from the NewObjectlist for the image frame.

In accordance with one example aspect of the present invention, a graphical display of the gray scale image can be provided to an operator of the vehicle 20 via an image monitor (not shown) on the vehicle 20, wherein the graphical display can be controlled by the vehicle computer 50. In this graphical display, information representing the scored candidate objects in the ExistingObjectlist can be overlayed onto the gray scale image. For example, a red line representing the bottom pallet board line of a scored candidate object can be visibly displayed over the area of the gray scale image where that bottom pallet board line is believed to be located. Similarly, information representing a center stringer for a scored candidate object can also be overlayed onto the gray scale image within the graphical display. For example, two vertical lines, each representing a respective left vertical edge and respective right vertical edge of the stringer can be displayed. Alternatively, a respective circle can be displayed that corresponds to a prequalified lower left corner and a possible lower right corner of a scored candidate object's center stringer. The graphically overlayed information can also be color coded so that different scored candidate objects can be easily distinguished within the graphical display. To reduce the potential of visual clutter on the display, the image analysis computer 110 may maintain scored candidate objects in the ExistingObjectlist and the NewObjectlist that have a composite object score greater than about 0.3 but only scored candidate objects in the ExistingObjectlist having a composite object score greater than or equal to about 0.5 are displayed by the vehicle computer 50.

Figure 24B:
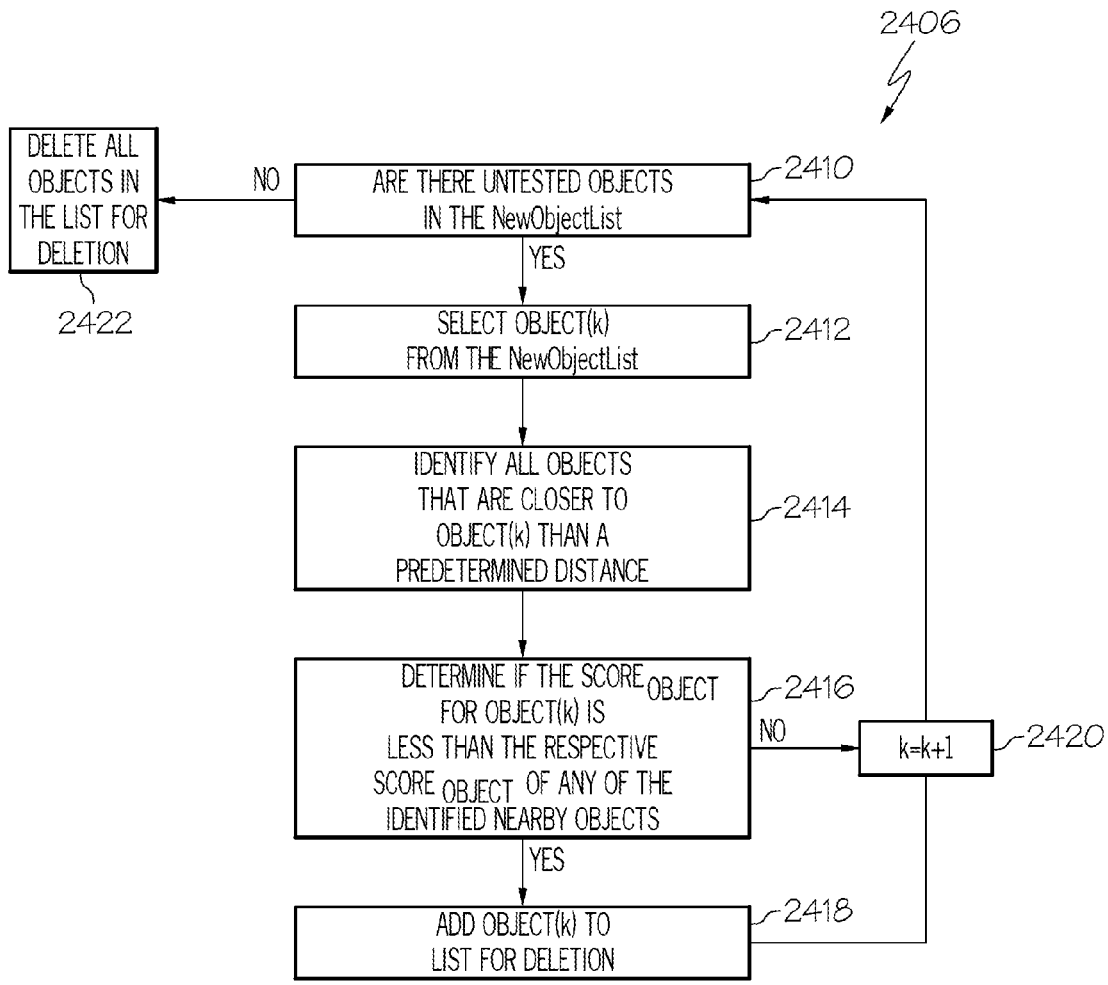
FIG. 24B depicts a flowchart for an exemplary algorithm to eliminate one or more candidate objects that are nearby one another, in accordance with the principles of the present invention.

In addition to eliminating some of the scored candidate objects in step 2404, the image analysis computer 110 can also determine if there are scored candidate objects that are too close to other scored candidate objects. In other words, two pallets cannot physically occupy the same space which means that if two scored candidate objects are closer to one another than the physical dimensions of a pallet would allow, then at least one of those scored candidate objects should be eliminated. Thus, in step 2406, the image analysis computer identifies and eliminates scored candidate objects that have $Score_{Object}$ values lower than the other scored candidate objects that are nearby. For example, the image analysis computer 110 may first determine the location of each scored candidate object in the NewObjectlist and then identify those scored candidate objects which are within a predetermined distance of one another. Scored candidate objects within this predetermined distance of one another are considered to be nearby one another. Of those scored candidate objects which are identified as being nearby one another, some of these scored candidate objects can be eliminated from the NewObjectlist for that image frame. FIG. 24B provides additional details of a process that can be implemented to accomplish step 2406.

Figure 24C:
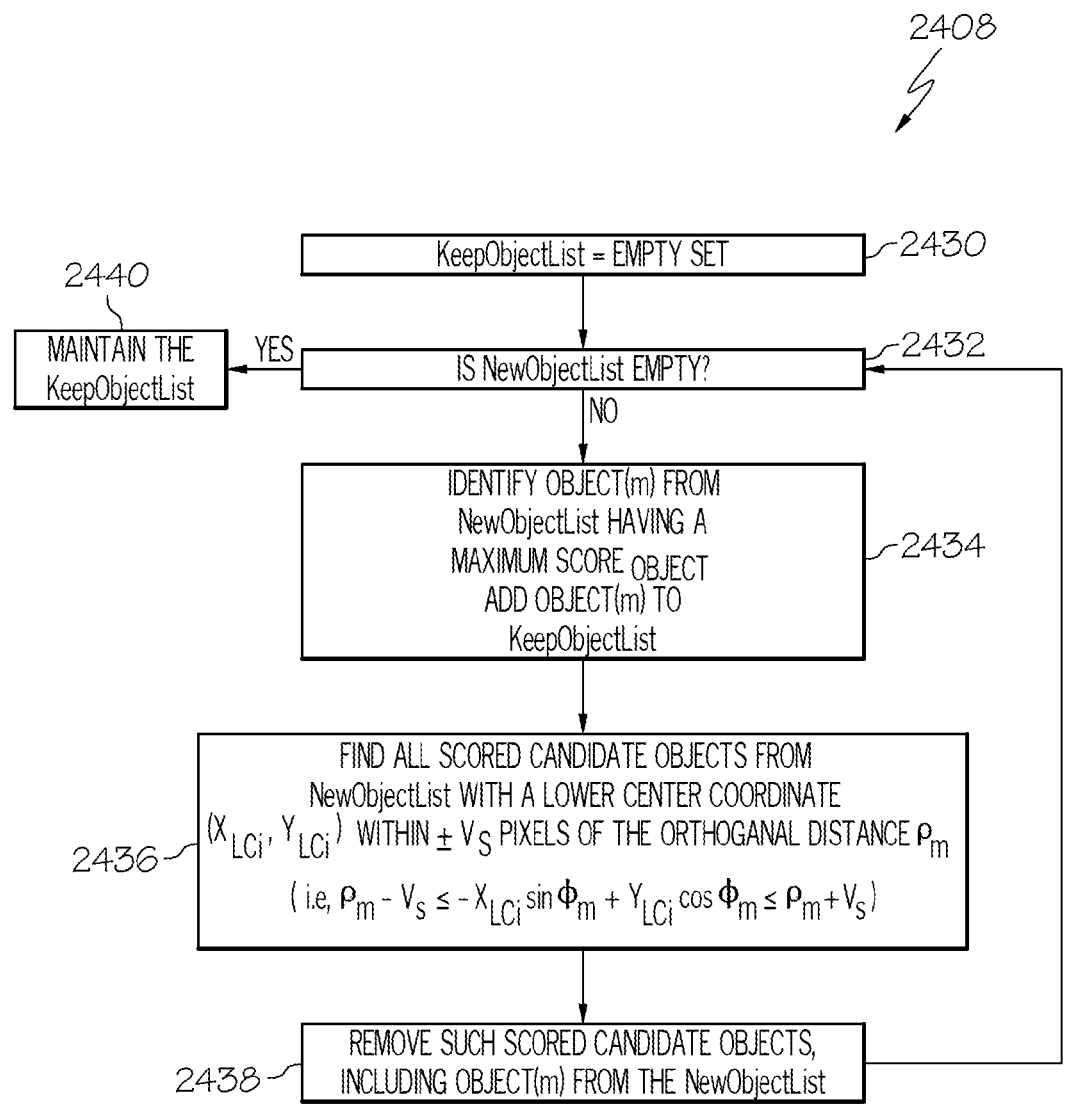
FIG. 24C depicts a flowchart for an exemplary algorithm to eliminate one or more candidate objects that are vertically local to one another, in accordance with the principles of the present invention.

Additional scored candidate objects can also be eliminated from the NewObjectlist by relying on the dimensions of a respective center stringer for each scored candidate object. Even though two scored candidate objects may be far enough from one another that they are not considered to be nearby one another, their coexistence may still be unlikely based on the vertical coordinates of their respective center stringers. Thus, a subset of scored candidate objects may be considered vertically local, or just "local," to one another if portions of their respective center stringers overlap a particular vertical span of coordinates regardless of their distance in the horizontal direction. Of those scored candidate objects considered local to one another, the scored candidate object having the maximum composite score $Score_{Object}$ can be retained in the NewObjectlist and the other scored candidate objects deleted. For example, given a particular scored candidate object (e.g., Object(m)) having a bottom pallet board line ($\rho_{BPBLm}$, $\phi_{BPBLm}$), and the maximum value $Score_{Object}$ as compared to other local candidate objects, where all the other local candidate objects are located within a predetermined number pixels of the bottom pallet board line, the other local candidate objects can be eliminated from the NewObjectlist, in step 2408. FIG. 24C provides additional details of a process that can be implemented to accomplish step 2408.

Thus, using the pruning steps 2404, 2406, and 2408, the NewObjectlist for an image frame can be reduced in size so that fewer scored candidate objects are included in the NewObjectlist during subsequent image processing and analysis as described herein.

As mentioned, FIG. 24B provides additional details of a process that can be implemented to accomplish step 2406 in which scored candidate objects in the NewObjectlist are further analyzed to determine if one or more of the scored candidate objects can be eliminated from the NewObjectlist for the image frame. Initially, in step 2410, the image analysis computer 110 determines if there are any scored candidate objects within the NewObjectlist that have not been tested. On the initial pass of the process 2406, the entire NewObjectlist remains untested and with each iteration another scored candidate object is tested until eventually all the scored candidate objects are tested. For example, the NewObjectlist may include a plurality of scored candidate objects (e.g., N) and each object can be uniquely referenced by an index value k that ranges in value from 1 to N. In other words, Object(k) can be used to uniquely denote one of the scored candidate objects included in the NewObjectlist. So, if there are any scored candidate objects that remain to be tested, the control passes on to step 2412; otherwise, control passes on to step 2422.

In step 2412, the image analysis computer 110 selects one of the candidate objects, Object(k), from the NewObjectlist. One straightforward way to select an object is to use the index value k which is incremented, in step 2420, during each iteration of the process 2406 such that for each step the particular scored candidate object being tested can be referred to as Object(k). In step 2414, the image analysis computer 110 identifies all the scored candidate objects that are closer than a predetermined distance to Object(k).

Figure 24D:
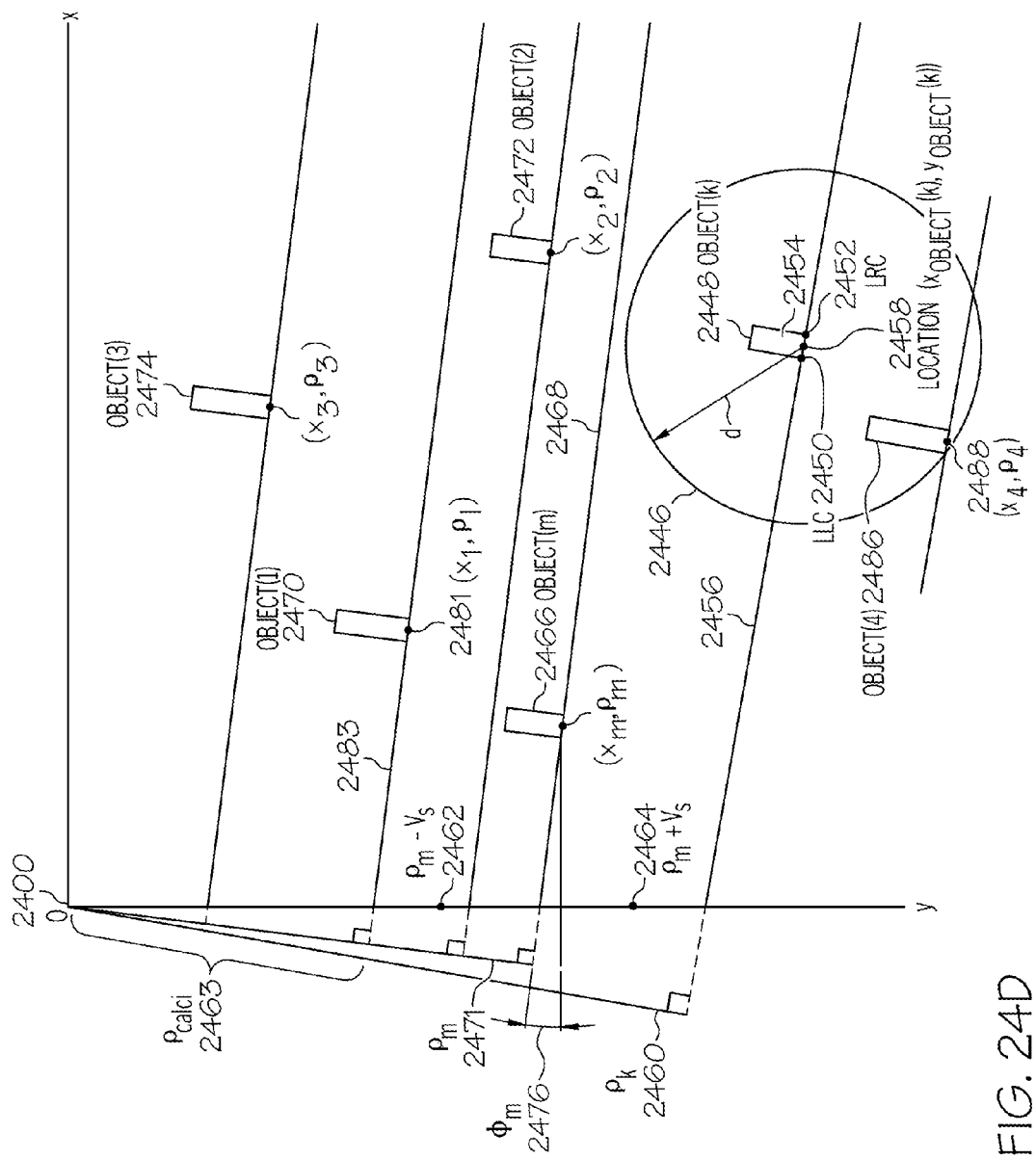
FIG. 24D depicts an example image frame with candidate objects in accordance with the principles of the present invention.

To accomplish the identification of nearby objects, the location of each scored candidate object may first be determined. As mentioned above, there are a number of object features associated with each of the scored candidate objects, including a variety of different x-y coordinate pairs that refer to different features (e.g., the center stringer lower left corner, center stringer lower right corner, etc.) of the candidate object. The location of a scored candidate object, Object(k), will be a set of x-y coordinates ($x_{object(k)}$, $y_{object(k)}$). One beneficial point of reference that can be considered to correspond to the location of the scored candidate object is the lower center of the center stringer of that scored candidate object. Referring to FIG. 24D, an Object(k) 2448 is illustrated by depicting a center stringer 2454. The center stringer 2454 includes a prequalified lower left corner 2450 and a possible lower right corner 2452. A bottom pallet board line 2456 drawn through the prequalified lower left corner 2450 has an orthogonal distance from the origin 2400 of $\rho_k$ 2460 in the first Ro image. The coordinates for location 2458, the object's Lower Center Point, of the scored candidate object 2448 (and the center stringer 2454) can be estimated from the object features related to the scored candidate object. For example, using the x coordinate of the lower left corner $X_{LLC}$ 2450 and the x coordinate of the lower right corner $X_{LRC}$ 2452 the x coordinate value $x_{object(k)}$ can be estimated to be equal to $$\frac{X_{LLC} + X_{LRC}}{2}.$$

Using the orthogonal distance $\rho_k$ 2460 from the first Ro image for the scored candidate object 2448, the coordinate $y_{object(k)}$ can be estimated to be equal to $\rho_k$ 2460. Thus, for each object within the NewObjectlist, a corresponding respective location can be determined. This "location" value may be one of the object features that are stored for each scored candidate object in the NewObjectlist for an image frame. Thus, when a particular scored candidate object is identified in the NewObjectlist, this object feature, or attribute, can be retrieved and used during image analysis and processing of the image frame. One of ordinary skill will recognize that the "location" of a scored candidate object can be defined by a feature of the scored candidate object other than the lower center of the center stringer, without departing from the scope of the present invention.

Once a respective location for each of the scored candidate objects is identified, then step 2414 can identify all those scored candidate objects which are closer than a predetermined distance to a particular scored candidate object, Object (k). In a two dimension image frame, such as the one depicted in FIG. 24D, the distance, d, between two points ($X_g$, $y_g$) and ($x_h$, $y_h$) can be calculated according to $d = \sqrt{(x_g - x_h)^2 + (y_g - y_h)^2}$. Using this calculation for distance, the image analysis computer, in step 2414, determines all scored candidate objects in the NewObjectlist that are nearby Object (k) as those scored candidate objects that satisfy the following equation:

$$d \geq \sqrt{(x_{object(k)} - x_{object(i)})^2 + (y_{object(k)} - y_{object(i)})^2}$$

where:

k: is an index value of a particular scored candidate object, Object(k), within the NewObjectlist for which the respective distance from Object(k) to all other scored candidate objects is to be determined; k can range from 1 to N;

($x_{object(k)}$, $y_{object(k)}$) are the x-y coordinate pair for the scored candidate object, Object(k);

i: is an index value of a particular scored candidate object, Object(i), in the NewObjectlist; other than the value k, the index value i ranges from 1 to N so that the distance of all other scored candidate objects from Object(k) can be determined;

($x_{object(i)}$, $y_{object(i)}$) are the x-y coordinate pair for the scored candidate object, Object(i); and d: is a predetermined allowable minimum distance between scored candidate objects, wherein two candidate objects having a distance from one another that is less than or equal to d are considered to be nearby one another. The value d, for example, can be 50 pixels.

As a result of testing the above equation, for a particular scored candidate object Object(k), against all the other scored candidate objects within the NewObjectlist, the image analysis computer 110 can determine if there are any scored candidate objects that are determined to be nearby Object(k).

Because the coordinate values for a scored candidate object refers to pixel locations, the distance between scored candidate objects refers to a distance between pixel locations. However, the distance between pixel locations corresponds to a physical distance between pallet structure, or potential pallet structure, that is being captured in the gray scale image. Accounting for the typical sizes of pallets, or a known range of sizes, and the corresponding scale of the gray scale image, a physical distance between pallet structure can be correlated to pixel distance of the gray scale image. If two (or more) scored candidate objects are closer in pixel distance, e.g., 50 pixels, when using a large image size (e.g., 480×752 pixels) or 25 pixels for a smaller image size (e.g., 240×376 pixels), than could be physically possible with two different pallets, then at least one of those candidate objects can be eliminated as a possible candidate object because both (or all) of them can not correspond to actual pallet structure in the gray scale image.

Thus, in step 2416, the image analysis computer 110 compares the respective $Score_{Object}$ for Object(k) to the respective $Score_{Object}$ value for all the nearby objects identified in step 2414. If the score of Object(k) is less than the score of any of the objects identified in step 2414, then Object(k) is placed on the list for future deletion, in step 2418.

In step 2420, the image analysis computer 110 increments k and repeats the testing process for the next scored candidate object of the NewObjectlist. Eventually, all the scored candidate objects in the NewObjectlist are tested and all the scored candidate objects added to the list for deletion can then be pruned from the NewObjectlist, in step 2422. Assuming that one or more scored candidate objects were added to the deletion list, in step 2418, the index value k for the NewObjectlist now ranges from 1 to M where M<N. Referring back to FIG. 24D, a circle 2446 is shown that circumscribes a region that is d pixels in radius and centered on the location 2458 of Object (k), i.e., scored candidate object 2448. Of the remaining scored candidate objects (2466, 2470, 2472, 2474, 2486) depicted in FIG. 24D, Object(4) 2486 is considered to be nearby Object(k) because its location $(x_4, \rho_4)$ 2488 is within the circle 2446. Assuming that Object(4) 2486 has a higher $Score_{Object}$ than Object(k) 2448, then Object(k) is added to the deletion list in step 2418.

Under the assumption that the true pallet has the greatest pallet score, it is not possible for the gray scale image to include two (or more) different pallet stringers that overlap within a relatively small band of y-pixel values. Thus, if two (or more) scored candidate objects have respective pallet stringers that do overlap in this small band of y-pixel values of the gray scale image, then all but one of these scored candidate objects can be eliminated. As described earlier, the y-pixel value for the lower center 2458 of the stringer 2454 can be estimated by drawing a substantially horizontal line 2456 (e.g., ±15°) through a prequalified lower left corner 2450 of a scored candidate object 2448 and calculating an orthogonal distance from the origin 2400 to that substantially horizontal line 2456 using the first Ro image. Thus, by comparing the respective orthogonal distances calculated for each respective center stringer of each scored candidate object, those scored candidate objects that have stringers within the same range of y-pixel values can be identified as being vertically local, or simply "local," to one another.

As noted above, FIG. 24D provides an example image frame having a plurality of scored candidate objects 2448, 2466, 2470, 2472, 2474, 2486 each represented by a corresponding, respective stringer. Of all the scored candidate objects that are in the NewObjectlist, the strongest, or highest, valued candidate object, i.e., the one having the highest $Score_{Object}$ value, for example, Object(m) 2466, can be selected to calculate the range of y-coordinate values that define the band of interest. Object(m) includes object feature $\rho_m$ 2471, an orthogonal distance from an origin to a bottom pallet board line of Object(m). Using this value, the upper y-pixel value 2462 of the band of interest is estimated to be at $\rho_m - V_s$ while the lower y-pixel value 2464 of the band is estimated to be at $\rho_m + V_s$, where $V_s$ represents a predetermined number of pixels referred to as the vertical span and can, for example, be about 50 pixels. All the scored candidate objects that happen to also have their respective center stringer located within this band can be identified for elimination because they have lower $Score_{Object}$ values than that of Object(m).

Thus, within that band of y-pixel values, one scored candidate object 2466 having the maximum $Score_{Object}$ of all the scored candidate objects within that band is selected to remain in the NewObjectlist while all other scored candidate objects in that band of y-pixel values are eliminated from the NewObjectlist.

As mentioned earlier, FIG. 24C provides additional details of a process that can be implemented to accomplish process 2408 that can eliminate scored candidate objects based on their y-coordinate values relative to one another. The process 2408 of FIG. 24C begins with the NewObjectlist of scored candidate objects, which may have been reduced following step 2406 in FIG. 24A, and produces a new, potentially smaller list of scored candidate objects referred to as KeepObjectlist. The use of two different lists of scored candidate objects is merely one example of a way to test and prune scored candidate objects from a list of scored candidate objects; one of ordinary skill will recognize that other functionally equivalent methods of maintaining list structures within a programmable computer can be utilized without departing from the scope of the present invention. Furthermore, the use of the term "KeepObjectlist" is used merely for clarity in the following description to distinguish the list of scored candidate objects in the NewObjectlist at the end of the process 2408 as compared to the list of scored candidate objects in the NewObjectlist at the beginning of the process 2408. At the end of the process 2408, in step 2440, the maintaining of a KeepObjectList refers to the further pruned NewObjectList after all the scored candidate objects identified for inclusion are identified. Thus, for a given image frame, there may be only one list of the scored candidate objects in that frame that is maintained by the image analysis computer 110 and that list continues to be referred to as the NewObjectlist.

In step 2430, the process is initialized with the KeepObjectlist being an empty set of scored candidate objects; as the process 2408 executes, this list will be populated with those scored candidate objects that will continue to be identified as scored candidate objects in this image frame. Next, in step 2432, the image analysis computer 110, determines if the list NewObjectlist is an empty set. Initially, the NewObjectlist contains all the remaining scored candidate objects from the image frame following step 2406 in FIG. 24A and so control passes to step 2434 to identify a first scored candidate object from the NewObjectlist. In particular, in step 2434, the image analysis computer 110 identifies the candidate object, Object (m), which has the maximum object composite score value $Score_{Object}$ of all the candidate objects within the NewObjectlist. Also, see FIG. 24D, this candidate object 2466 has associated object feature $\rho_m$ 2471, an orthogonal distance from an origin to a bottom pallet board line of Object(m). This particular scored candidate object is added to the list KeepObjectlist. Next, in step 2436, the image analysis computer 110 identifies all scored candidate objects in NewObjectlist that have a location whose y-coordinate location is within a particular span of values.

Similar to the process described with respect to FIG. 24B, the location of a scored candidate object can be defined a variety of different ways, but one way to define the location of a scored candidate object is to identify the x-y coordinates of the lower center of the center stringer as the object's location. For any particular scored candidate object, Object(i), those location coordinates can referred to as the pair $(x_{LCi}, y_{LCi})$. Using these respective coordinates for each of the scored candidate objects in the NewObjectlist, the image analysis computer 110, in step 2436, can determine which scored candidate objects in the NewObjectlist are located such that they have a y-coordinate value within $\pm V_s$ of the value $\rho_m$ 2471; $V_s$ can, for example, equal 50 pixels. More particularly, Object(m) has a bottom pallet board line 2468 with an orthogonal distance to the origin 2400 of $\rho_m$ 2471 and an associated angle $\phi_m$ 2476 from a horizontal line. Each of the other identified scored candidate objects, Object(i), has a respective location $(x_{LCi}, y_{VLi})$ through which a line can be drawn at the same angle as $\phi_m$ 2476 to calculate whether a scored candidate object is within the vertical range of interest with respect to Object(m).

In particular, Object(1) 2470, in FIG. 24D, can be used as an example. The object 2470 has a location 2481 of $(x_1, \rho_l)$ which can be referred to generically as $(x_{LCi}, y_{LCi})$. A line 2483 can be drawn at an angle the same as angle $\phi_m$ so as to pass through the location 2481. An orthogonal line drawn from the origin 2400 to the line 2483 will also be collinear with the orthogonal line $\rho_m$ 2471. The orthogonal distance from the origin 2400 to the line 2483 can be calculated and is referred to as $\rho_{calci}$ 2463. In particular, a similar orthogonal distance can be calculated for any Object(i) in the Objectlist according to the formula:

$$\rho_{calci} = x_{LCi} \sin \phi_m + y_{LCi} \cos \phi_m.$$

Thus, the image analysis computer 110 can use the location $(x_{LCi}, y_{LCi})$ of each object, Object(i), in the NewObjectlist to calculate a respective orthogonal distance, $\rho_{calci}$, from that object's location to the origin 2400 in order to identify all the other scored candidate objects that have a respective orthogonal distance within $\pm V_s$ of the bottom pallet board line 2468 of the Object(m). In other words, all scored candidate objects with stringers satisfying the following inequality are identified in step 2436:

$$\rho_m - V_s \le -x_{LCi} \sin \phi_m + y_{LCi} \cos \phi_m \le \rho_m + V_s \quad \text{Equation 14:}$$

All the scored candidate objects satisfying the above inequality, as well as Object(m), are then removed, in step 2438, from the NewObjectlist by the image analysis computer 110. As noted above, Object(m), i.e., scored candidate object 2466, was previously added to the list KeepObjectlist.

In the example image frame of FIG. 24D, only Object(2) 2472 satisfies the inequality of Equation 14 when Object(m) comprises scored candidate object 2466. When the process 2408 of FIG. 24C executes, Object(2) 2472 is eliminated from the NewObjectlist in step 2438.

Figure 25:
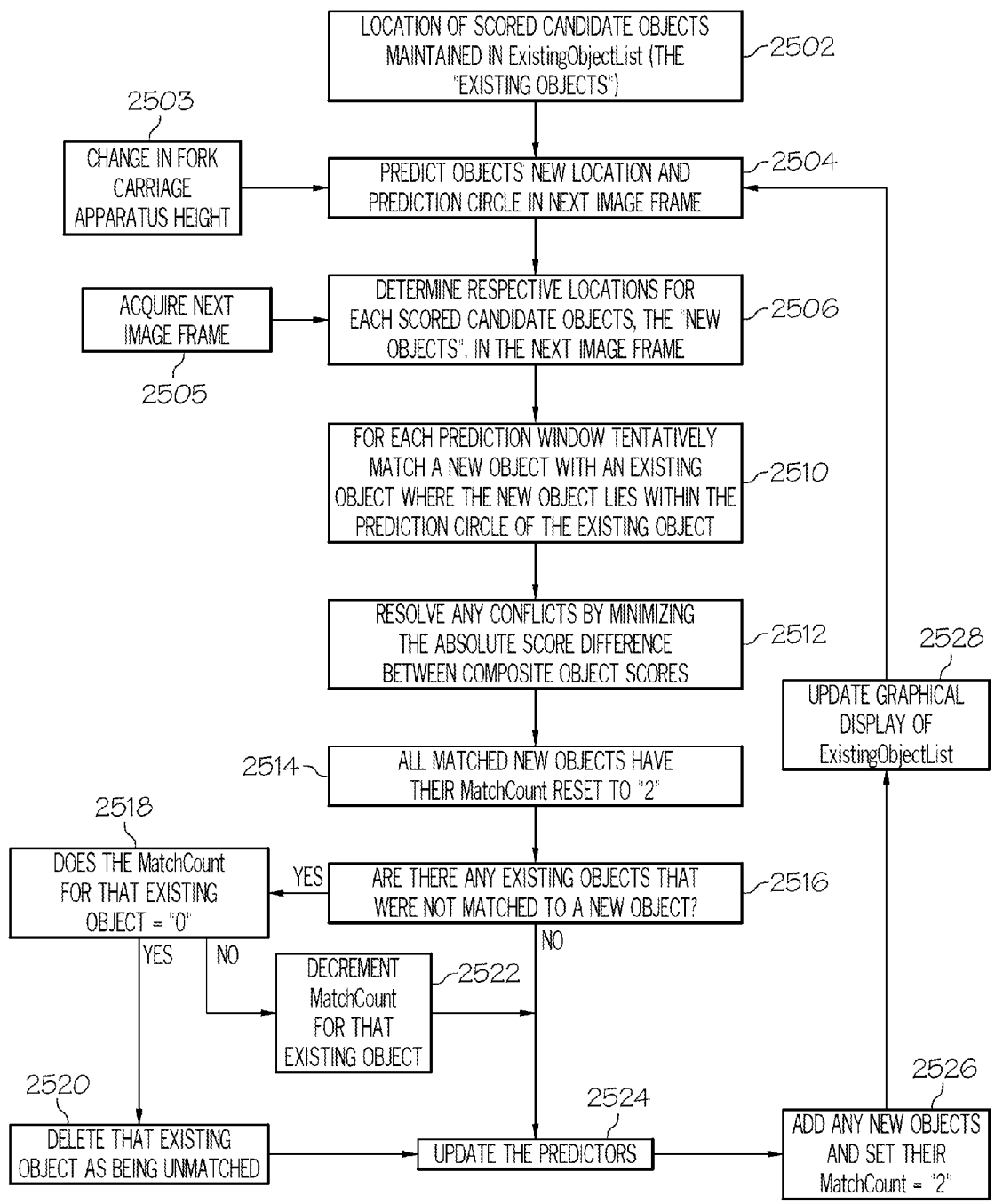
FIG. 25 is a flow chart for tracking candidate objects between different image frames in accordance with the principles of the present invention.

These steps are repeated until the image analysis computer 110 determines, in step 2432, that the NewObjectlist is empty. In step 2440, after the NewObjectlist is empty, the KeepObjectlist is defined as an updated NewObjectlist, which may comprise a pruned version of the previous NewObjectlist with which the process 2408 started. This version of the NewObjectlist is used in analyzing the current version of the ExistingObjectlist, as described in detail below. As a result of such analysis, the ExistingObjectlist is updated based on the information in the NewObjectlist. Once the ExistingObjectlist is updated, a next image frame may be available for which a next NewObjectlist is created. Thus, a NewObjectlist is conceptually the same for each image frame but the actual information and values in the NewObjectlist will differ for each acquired image frame. FIG. 25 depicts a flowchart of an exemplary process for tracking the scored candidate objects through different gray scale image frames to further refine the determination of where a pallet structure is located within the image frames. As the fork carriage apparatus 40 of the vehicle 10 moves, the location of the scored candidate objects within an image captured by an imaging camera 130 on the fork carriage apparatus 40 also appears to move within the different image frames. This information from a series of captured image frames assist in determining which scored candidate objects correspond to actual pallet structure.

In FIG. 25, step 2502 represents that the image analysis computer 110 maintains an ExistingObjectlist, as discussed above, that includes records from one or more previous image frames for the existing scored candidate objects that are presently being tracked. Scored candidate objects are assigned to separate threads of tracked objects with each thread having a unique identification tag, $\text{Tag}_{Object}$. As mentioned, one attribute of each of the scored candidate objects in the ExistingObjectlist is that object's respective location. As before, the location of a scored candidate object can refer to the coordinates of the lower center of the center stringer for that scored candidate object. For example, an object, Object(r), 2602, shown in FIG. 26A, has a location that is referred to by x-y coordinates $(x_r, y_r)$. These scored candidate objects 2602, 2604 of FIG. 26A are scored candidate objects that have been identified and scored according to the techniques described above. Each of the scored candidate objects are maintained in the ExistingObjectlist.

Each thread of tracked objects operates on a prediction and update cycle with each thread having its own predictor. As described below in detail, using a Kalman filter to accomplish such tracking is one approach; however, one of ordinary skill will recognize that there are other known techniques to accomplish such tracking, as well. Given a change in fork height a prediction is made of where the object moved to in the next image frame, observations are made of actual object locations, if the appropriate conditions are met, these new observations are matched to existing objects, and finally the object location predictor is either updated using the new observations or the object thread is terminated and deleted.

As described earlier, an imaging camera 130 can be coupled with the fork carriage apparatus 40 of a vehicle 10. Because the movement of the fork carriage apparatus 40 occurs in a controlled manner, the resulting displacement of the imaging camera 130 that occurs between two moments in time can be calculated. For example, knowing the velocity that the fork carriage apparatus 40 is moving allows the camera displacement between image frames to be easily calculated. Alternatively, an encoder and wire or cable assembly coupled between the fork carriage assembly 40 and the third weldment 36 may be provided for generating pulses to the vehicle computer 50 in response to movement of the fork carriage apparatus 40 relative to the third weldment 36 so as to allow the vehicle computer 50 to determine the linear displacement of the imaging camera 130. Because two successive image frames captured by the imaging camera 130 will have been taken from different perspectives, the scored candidate objects will appear to be in different locations in the two different image frames. These two successive image frames can be more easily referred to as "a prior image frame" and "a next image frame." Based on an amount that the height of the fork carriage apparatus 40 of a vehicle 10 changes between a prior image frame and a next image frame, in step 2503, the image analysis computer 110 can respectively predict, in step 2504, where each of the scored candidate objects from the prior image frame should be located in the next image frame that is captured from the new position of the imaging camera 130. The image analysis computer 110 will also define a prediction window surrounding each predicted location in the next image frame for each scored candidate object from the prior image frame. The prediction window(s) may be a variety of different sizes but embodiments herein contemplate prediction circles with a radius of about 50 pixels for a larger image size and 25 pixels for a smaller image size. One of ordinary skill will recognize that other sizes and shapes of prediction windows may be selected without departing from the scope of the present invention.

Figure 26B:
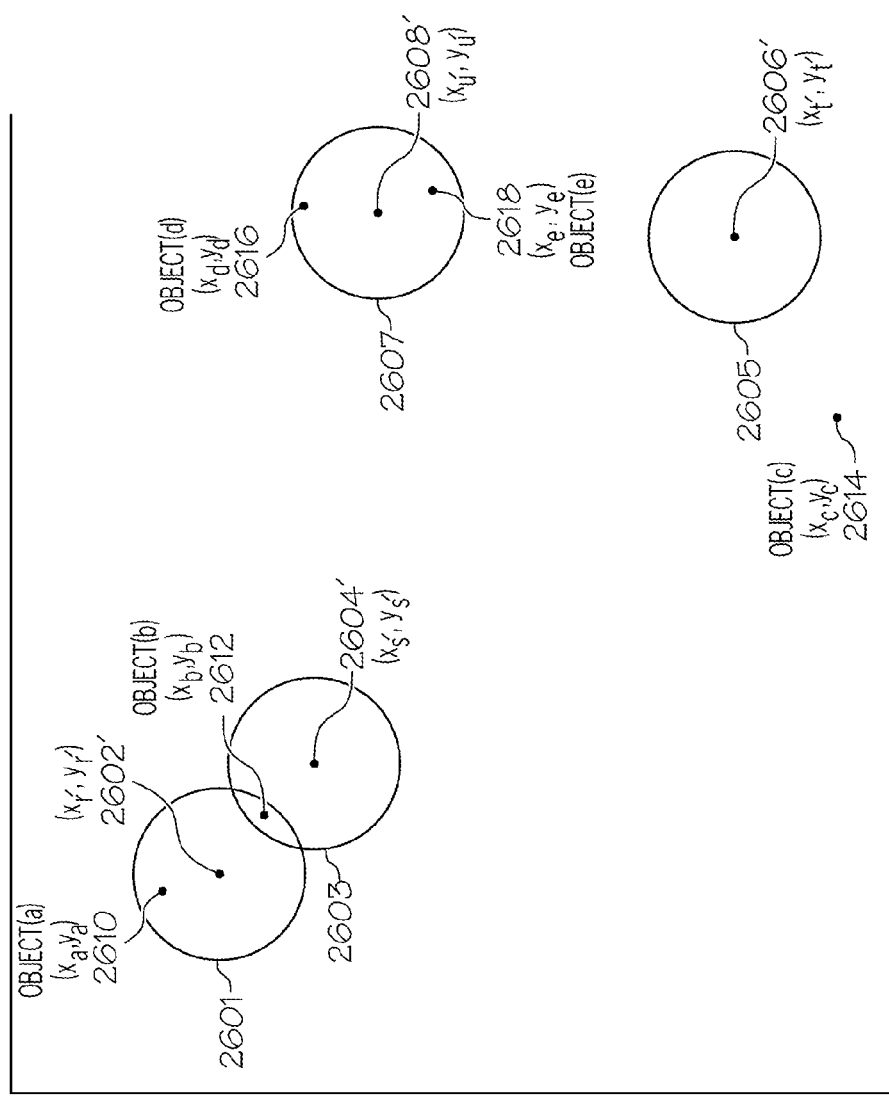

For example, referring to FIG. 26A, there are three candidate objects, Object(r) 2602, Object(s) 2604 and Object(t) 2606, in the ExistingObjectlist for the previous image frame. These objects can be referred to as "existing objects" or "existing scored candidate objects." They have respective locations $(x_r, y_r)$, $(x_s, y_s)$ and $(x_t, y_t)$ that represent their location at the time the prior image frame was taken or acquired. When a next image frame is captured, as shown in FIG. 26B, with the camera placement for the next image frame being a known distance from the camera placement for the prior image frame, then the respective locations $(x'_r, y'_r)$ 2602', $(x'_s, y'_s)$ 2604' and $(x'_t, y'_t)$ 2606' can be predicted in the next image frame of FIG. 26B. Further in FIG. 26B, prediction window 2601 defines a circular region centered around the predicted location 2602' of Object(r), prediction window 2603 defines a circular region centered around the predicted location 2604' of Object(s) and prediction window 2605 defines a circular region centered around the predicted location 2606' of Object(t).

The image analysis computer 110 acquires, in step 2505, the next image frame at the new camera location and then, in step 2506, determines the scored candidate objects in that next image frame and their respective locations. Thus, concurrent with acquiring the next image frame in step 2505, the image analysis computer 110 may also acquire, in step 2503, the amount that the height of the fork carriage apparatus 40 of the vehicle 10 changes between the prior image frame and the next image frame. As noted above, objects in a next image frame can be referred to as "new objects" or "new scored candidate objects." As shown in FIG. 26B, the NewObjectlist for the next image frame includes five new objects, Object(a) 2610, Object(b) 2612, Object(c) 2614, Object(d) 2616 and Object(e) 2618. These scored candidate objects are considered to be a new set of scored candidate objects from the next image frame. Using the newly determined locations of the new set of scored candidate objects, the image analysis computer 110 further determines, in step 2510, if there are any new scored candidate objects that are located in each prediction window 2601, 2603, 2605.

The image analysis computer may identify a prediction window in the next image frame that does contain one or more scored candidate objects. In this case the image analysis computer 110, in step 2510, tentatively identifies that the existing scored candidate object from the prior image frame has a matching new scored candidate object in the next image frame. If only one new scored candidate object is within the prediction window in the next image frame, then that new scored candidate object is considered tentatively matched with the existing scored candidate object from the prior image frame (that was used to calculate the prediction window). If, however, two or more new scored candidate objects are within a prediction window in the next image frame, then further analysis is performed to select only one of these scored candidate objects. As the same new object could conceivably match to more than one existing object all matches are considered tentative and are resolved in step 2512.

The prediction window 2601 of FIG. 26B is an example of two or more new scored candidate objects being located within a prediction window. In particular, the NewObjectlist for the next image frame includes Object(a) 2610 and Object (b) 2612, which are both within the prediction window 2601 that corresponds to the predicted location of Object(r) from the first image frame. Each of these candidate objects has a respective composite object score $Score_{Object}$ that is used, in step 2512, by the image analysis computer to determine whether Object(a) or Object(b) is matched to Object(r). Each existing object is not considered to be truly matched until all matches are resolved by step 2512.

In particular, the absolute values: $|Score_{Object}(r) - Score_{Object}(a)|$ and $|Score_{Object}(r) - Score_{Object}(b)|$ are evaluated such that the new object having the smallest absolute value (i.e., the new object that has the closest $Score_{Object}$ value compared to Object(r)) is considered the tentatively matching new scored candidate object within the prediction window 2601. The absolute score difference is minimized over all tentatively matched objects for a particular existing object. In other words, for a particular existing scored candidate object, the new scored candidate object in its tentative match list will be chosen as the existing scored candidate object's final match that minimizes the absolute score difference.

For example, in the image frame of FIG. 26B, the new scored candidate object Object(b) may be tentatively matched with both Object(r) and Object(s) because it is located in both prediction circles 2601 and 2603. Thus in step 2512, the image analysis computer 110 also evaluates the absolute values: $|Score_{Object}(s) - Score_{Object}(b)|$ and $|Score_{Object}(r) - Score_{Object}(b)|$, with the smallest absolute value revealing which of the existing objects is matched with the new object Object(b). When a new object is matched with an existing object, then the record for that existing object in the ExistingObjectlist will include updated information such as the new object's new location, updated prediction factors, and its MatchCount value (the prediction factors and MatchCount value are described in more detail below).

If a respective prediction window for a scored candidate object from the existing objects does not include any new scored candidate objects, then the existing scored candidate object is likely a falsely identified scored candidate object and may be discarded. However, because of lighting, shadows or other artifacts introduced during acquisition of a gray scale image, an actual pallet object may not be discernible in a particular image frame even though it is discernible in other image frames. Thus, a single instance of an existing object not being matched with a new object may not result in the existing object being identified as an object to be discarded. A value, MatchCount, can be introduced as one of the attributes that are stored for an existing object in the ExistingObjectlist.

As mentioned, the current version of the ExistingObjectlist includes scored candidate objects. At least some of these scored candidate objects were also in the previous version of the ExistingObjectlist. That previous version of the ExistingObjectlist had its own corresponding NewObjectlist with which it was analyzed. Based on that prior analysis, the previous version of the ExistingObjectlist was updated based upon the information about scored candidate objects from its corresponding NewObjectlist. The updating of the previous version of the ExistingObjectlist resulted in the current version of the ExistingObjectlist and this current version of the ExistingObjectlist is now being analyzed with respect to its own corresponding NewObjectlist of scored candidate objects in the next image frame.

During this present analysis, the respective value for MatchCount for an existing object in the current version of the ExistingObjectlist provides an indication of whether that object failed to have a matching new object in the old NewObjectlist that was compared with the previous version of the ExistingObjectlist. For example, during the current analysis, if MatchCount presently equals "1", then that indicates that this existing scored candidate object failed to have a match in the previous analysis when the previous version of the ExistingObjectlist was analyzed with respect to its own corresponding NewObjectlist.

When an existing object is ultimately resolved to match a new object, in step 2512, the MatchCount for that existing object in the ExistingObjectlist is set to a predetermined value, such as "2", by the image analysis computer 110 in step 2514.

In step 2516, the image analysis computer 110, identifies existing scored candidate objects, if any, that were not matched with one of the new objects. The image analysis computer 110, in step 2518, then evaluates the respective MatchCount value for that existing object to determine if it is equal to "0". If so, then that existing object is no longer considered a scored candidate object to be tracked in subsequent image frames and, in step 2520, it is discarded. If the MatchCount value for the unmatched existing object is not equal to "0", then the existing object is not discarded but, in step 2522, its MatchCount value is decremented. In FIG. 26B, there is no new object located within the prediction window 2605 for Object(t). Thus, in this example, existing scored candidate Object(t) would not have a matching new object in the NewObjectlist.

As will be described in more detail below, the past locations of the scored candidate objects and the accuracy with which a prediction window was calculated and matched can be useful in refining the way in which subsequent prediction windows are calculated. Thus, in step 2524, the image analysis computer 110 updates the factors that it uses to calculate a respective prediction window in a subsequent image frame for each of the scored candidate objects.

The image analysis computer 110, in step 2526, identifies new scored candidate objects in the next image frame that do not correspond to any existing scored candidate objects from the previous image frames. For example, in FIG. 26B, there is a new scored candidate object Object(c) 2614 that is located outside of the prediction windows 2601, 2603, 2605 and 2607. Thus, this is a new scored candidate object that has no corresponding existing scored candidate object in the ExistingObjectlist. In step 2526, the image analysis computer 110 adds this new candidate object to the ExistingObjectlist and sets its MatchCount value equal to "2".

As mentioned above, Object(c) 2614 is a new object with no matching existing object so Object(c) is added to the updated ExistingObjectlist. There is also another possibility of a new object with no matching existing object. In FIG. 26A, there is an existing Object(u) 2608. In FIG. 26B there is a predicted location 2608' and a prediction window 2607. Within the prediction window 2607 are two new scored candidate objects, Object(d) 2616 and Object(e) 2618. As mentioned above, in step 2512, the respective composite object scores of Object(u), Object(e) and Object(d) are used to resolve the matching pair of objects. If for example, Object(e) 2618 is determined to be the match for Object(u) 2608, then Object(d) 2616 does not match any existing object in the ExistingObjectlist. Thus, Object(d) 2616 is added to the updated ExistingObjectlist as a new scored candidate object to start tracking.

Using the updated ExistingObjectlist, the image analysis computer 110 in step 2528, can provide updated object information to the vehicle computer 50 so that the graphical display of the existing scored candidate objects can be updated.

The process of FIG. 25 then repeats itself for a third image frame, a fourth image frame, etc. by returning to step 2504 for each iteration.

The values associated with pruning and predicting scored candidate objects may be adjusted according to the image size. For example, the values provided above may be appropriate for images which are 480×752 pixels in size. However, for images which are 240×376 pixels in size, the values may be adjusted so that each is approximately half of the example values provided above. For example $V_S$ can be 25 pixels instead of 50 pixels, the prediction window (e.g., 2607 of FIG. 26B) can have a radius of about 25 pixels instead of 50 pixels, and the value for defining nearby objects (see step 2406 of FIG. 24A) can be 25 pixels instead of 50 pixels.

Figure 27A:
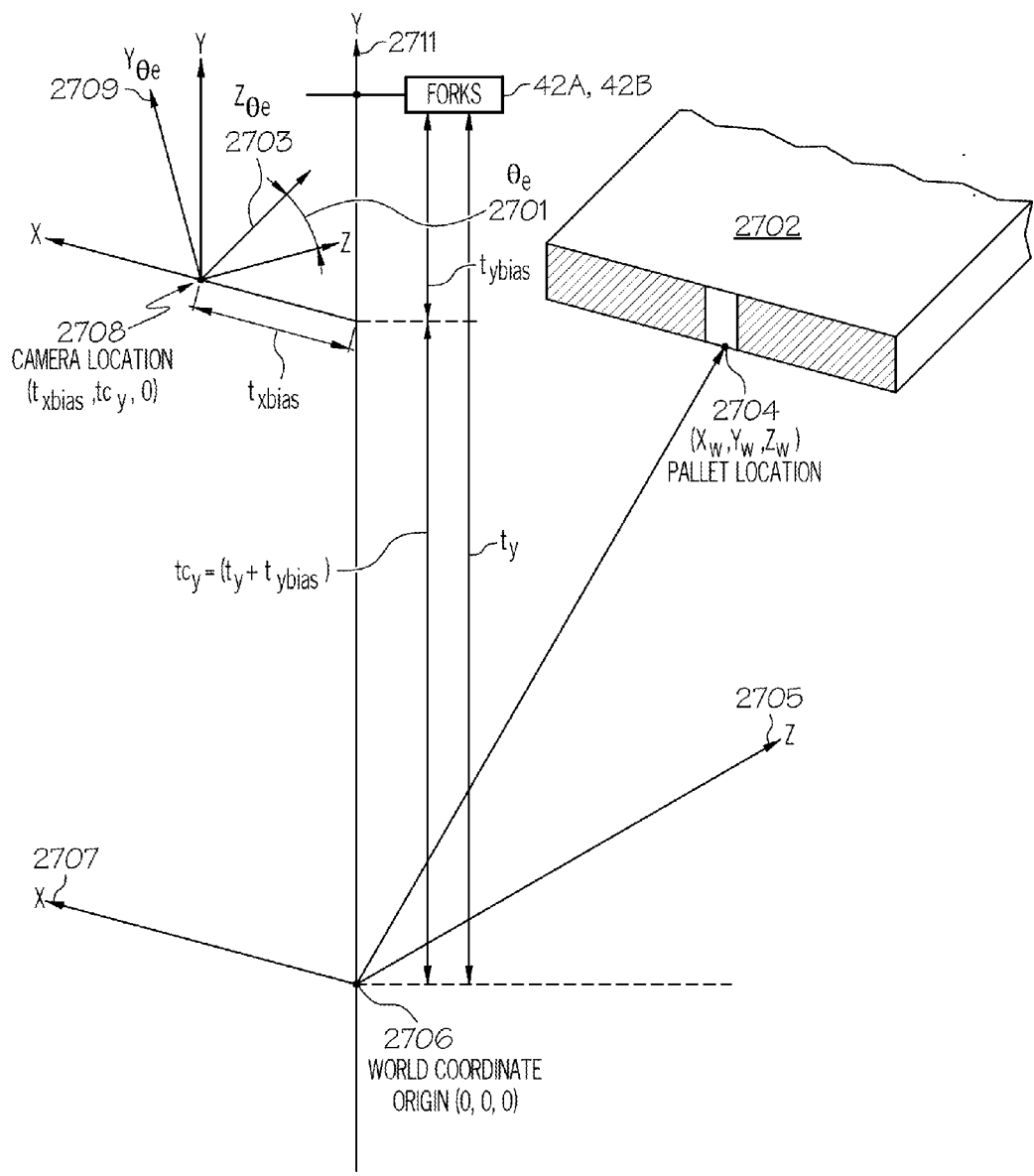
FIG. 27A illustrates a pallet in the physical world with a location that may be calculated relative to more than one frame of reference.

FIG. 27A depicts a pallet 2702 in the physical world that has a lower center point that represents the location 2704 of the pallet 2702. The location 2704 of the pallet 2702 depends on what frame of reference, or 3D coordinate system, is used to define the coordinates for the pallet location 2704. As mentioned earlier, one aspect of the present invention relates to detecting information beneficial to placing forks 42A, 42B of a vehicle 10 at one or more openings of a pallet. Thus, a world 3D coordinate system (also referred to herein as "the world coordinate system") used to define the location of the pallet 2702 can have its origin 2706 located at a fixed location either on or near the vehicle 10, such as a fixed location on the mast assembly having substantially the same Y location as the forks 42A, 42B when in their lower, home position. In this embodiment, the world coordinate origin 2706 is fixed such that the fork carriage apparatus 40 and the forks 42A, 42B move relative to the fixed world coordinate origin. If the world coordinate system is oriented such that the Z direction is parallel with the forks 42A, 42B and the Y direction is parallel to the direction of vertical movement the forks 42A, 42B up and down, then the world coordinate origin 2706 can be defined such that coordinates $(X_w, Y_w, Z_w)$ of the pallet location 2704 can be determined. In particular, these coordinates essentially represent a vector from the world coordinate origin 2706 to the lower center point (i.e., the location 2704) of the pallet 2702. The world 3D coordinate system could also be located in front of the vehicle 10 on the floor and below the forks 42A, 42B. In such an embodiment, the world 3D coordinate system would still be fixed with respect to the vehicle 10 and move with the vehicle 10. Truck motion in the X and Z directions may be accounted for via truck odometry.

The scene in the physical world being imaged by the imaging camera 130 can also be referred to with reference to a location 2708 of the imaging camera 130. This is helpful because transformation operations between pixel locations in an image and locations of physical objects may be simplified when the locations of the physical objects are considered as being relative to the camera location 2708. The camera coordinate system is also a 3D coordinate system having three mutually orthogonal direction axes extending from an origin point. Both the orientation of the camera coordinate system's directional vectors and the location of the camera coordinate system's origin can differ from those of the world coordinate system. Conventionally, it is known that transformation from one 3D coordinate system to another can be accomplished using a rotation matrix and a translation vector that represent the differences between the two coordinate systems. If $(X_c, Y_c, Z_c)$ are the coordinates of the pallet location 2704 in terms of the camera coordinate system, then $$\begin{bmatrix} X_c \\ Y_c \\ Z_c \end{bmatrix} = [R_{cam}] \begin{bmatrix} X_w \\ Y_w \\ Z_w \end{bmatrix} + \begin{bmatrix} tc_x \\ tc_y \\ tc_z \end{bmatrix} \quad \text{Equation 15A}$$

The coordinates $(X_w, Y_w, Z_w)$ and the coordinates $(X_c, Y_c, Z_c)$ both identify the location of the same point 2704 in the physical world. One set of coordinates $(X_w, Y_w, Z_w)$ is with reference to the world coordinate origin 2706 and the other set of coordinates $(X_c, Y_c, Z_c)$ is with reference to the camera location 2708. In Equation 15A, [$R_{cam}$] is a 3×3 rotation matrix between the two coordinate systems' axes and the right-most term is the translation vector, $T_{cam}=[tc_x, tc_y, tc_z]^T$, representing the translation between the origin 2706 of the world coordinate system relative to the origin 2708 of the camera coordinate system. If the imaging camera 130 is attached to the carriage apparatus 40, then as the carriage apparatus 40 including the forks 42A and 42B move up and down, the translation, $tc_y$, of the imaging camera 130 relative to the world coordinate origin 2706 will vary. As shown in FIG. 27A, this translation value, $tc_y$, can have one component, $t_y$, that represents an amount of movement along the mast assembly 30 that the forks 42A and 42B have moved relative to the fixed world coordinate origin 2706 and can have a second component, $t_{ybias}$, that represents a fixed vertical offset between the imaging camera 130 relative to the forks 42A and 42B. As the forks 42A and 42B move, the value of $t_y$ may vary; but the value of $t_{ybias}$ will remain the same. As mentioned earlier, the imaging camera 130 may be fixed to the carriage apparatus such that it is in a position below the forks 42A and 42B (i.e., $t_{ybias}<0$) but as the imaging camera moves upward, the Y-coordinate of the camera coordinate system origin location 2708 may be located above the world coordinate system origin 2706 (i.e., $(t_y+t_{ybias})>0$) as shown in FIG. 27A. Also, as discussed below there may be a horizontal offset value $t_{xbias}$ as well.

FIG. 27A depicts an embodiment in which the camera coordinate system has its axes rotated about the X-axis 2707 by an angle $\theta_e$ 2701. Thus, the Z-axis of the camera coordinate system is referred to as $Z_{\theta e}$ 2703 to distinguish it from the world coordinate origin Z-axis 2705 and the Y-axis of the camera coordinate system is referred to as $Y_{\theta e}$ 2709 to distinguish it from the world coordinate origin Y-axis 2711. The magnitude of the angle $\theta_e$ 2701 may, for example, be about 2.2263°; and, from the point of reference of the camera coordinate system, the Z-axis of the world coordinate system is tilted downward at an angle of about −2.2263°. In this embodiment, the coordinates ($X_c$, $Y_c$, $Z_c$) of the pallet location 2704 in Equation 15A would be defined in terms of the camera coordinate system axes ($X_{\theta e}$, $Y_{\theta e}$, $Z_{\theta e}$).

Figure 27B:
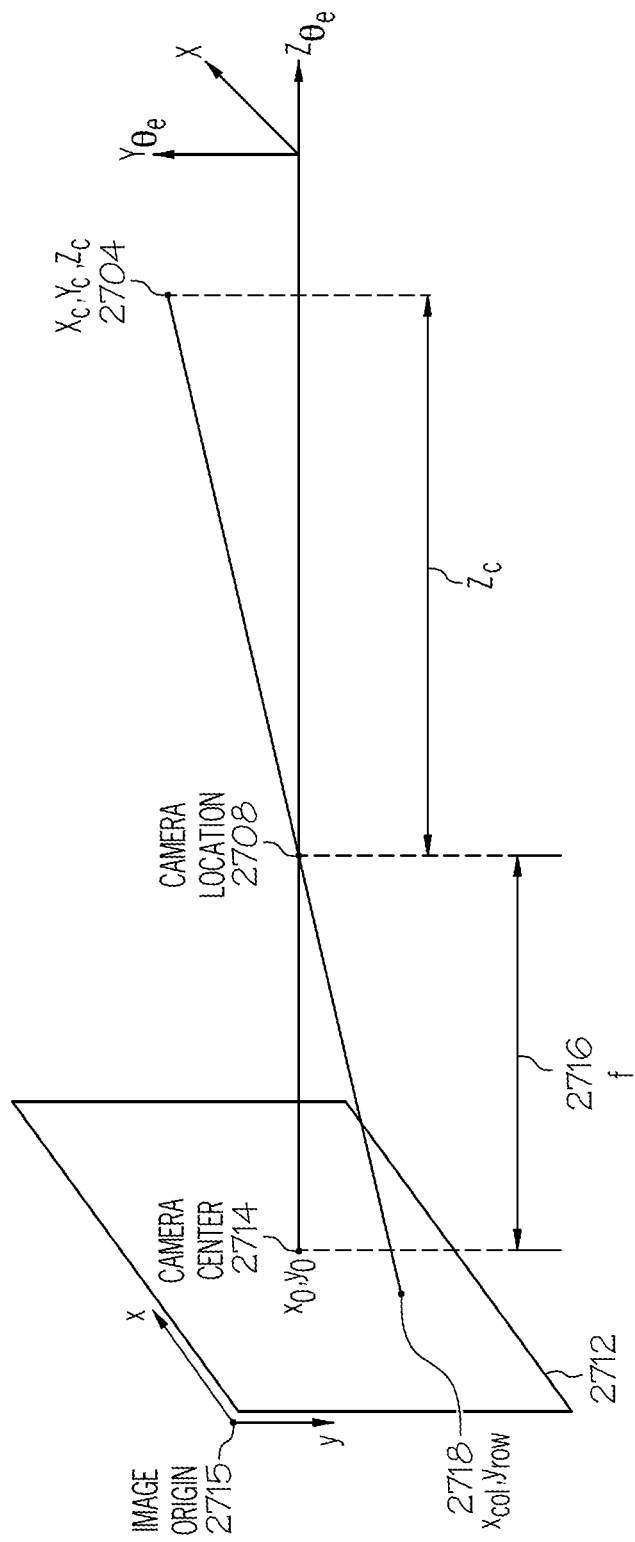
FIG. 27B illustrates a pinhole camera model for projecting a physical world location onto an image plane.

FIG. 27B depicts the geometry of an ideal pinhole camera model. The model for an ideal pinhole camera involves a projection of the point ($X_c$, $Y_c$, $Z_c$) 2704 through the camera location 2708 onto an image plane 2712 that is a distance f, in the $Z_{\theta e}$ direction, from the camera location 2708. There is a camera center 2714 which is the projection of the camera location 2708 in the $Z_{\theta e}$ direction onto the image plane 2712. In the illustrated embodiment, distance f is a fixed distance equal to the camera focal length in the $Z_{\theta e}$ direction.

Thus, the geometry of FIG. 27B provides the basis for the well-known pinhole camera projection model for the pixel image coordinates:

$$x_{col} = f_x \frac{X_c}{Z_c} + x_0$$

$$y_{row} = f_y \frac{Y_c}{Z_c} + y_0$$

where:
($X_C$, $Y_C$, $Z_C$) are the three dimensional coordinates of the pallet location 2704 in the camera coordinate system;
($x_{col}$, $y_{row}$) are the pixel location coordinates on the image plane 2712 of where the pallet location 2704 projects according to the pinhole camera model;

($x_0$, $y_0$) is the camera center 2714 and is the pixel location coordinates on the image plane 2712 where the camera center (or the camera coordinate system origin) 2708 projects according to the pinhole camera model;
$f_x$ is the focal length, f, expressed in x-direction, or horizontal, pixel-related units; and
$f_y$ is the focal length, f, expressed in y-direction, or vertical, pixel related units.

The above equations can be written in homogenous coordinates according to:

$$\lambda \begin{bmatrix} x_{col} \\ y_{row} \\ 1 \end{bmatrix} = \begin{bmatrix} f_x & 0 & x_0 \\ 0 & f_y & y_0 \\ 0 & 0 & 1 \end{bmatrix} \begin{bmatrix} X_c \\ Y_c \\ Z_c \end{bmatrix} \text{ where } \lambda = Z_c \quad \text{Equation 16}$$

Equation 15, from earlier, can also be written as:

$$\begin{bmatrix} X_c \\ Y_c \\ Z_c \end{bmatrix} = [R_{cam}] \begin{bmatrix} tc_x \\ tc_y \\ tc_z \end{bmatrix} \begin{bmatrix} X_w \\ Y_w \\ Z_w \\ 1 \end{bmatrix} \quad \text{Equation 17A}$$

Using Equation 17A, the projection transformation of Equation 16 can be written as:

$$\lambda \begin{bmatrix} x_{col} \\ y_{row} \\ 1 \end{bmatrix} = \begin{bmatrix} f_x & 0 & x_0 \\ 0 & f_y & y_0 \\ 0 & 0 & 1 \end{bmatrix} [R_{cam}] \begin{bmatrix} tc_x \\ tc_y \\ tc_z \end{bmatrix} \begin{bmatrix} X_w \\ Y_w \\ Z_w \\ 1 \end{bmatrix} \quad \text{Equation 18}$$

In general terms, Equation 18 can be written as:

$$\lambda \begin{bmatrix} x_{col} \\ y_{row} \\ 1 \end{bmatrix} = [K][R_{cam} | T_{cam}] \begin{bmatrix} X_w \\ Y_w \\ Z_w \\ 1 \end{bmatrix} \quad \text{Equation 19A}$$

$$\text{where } [K] = \begin{bmatrix} f_x & 0 & x_0 \\ 0 & f_y & y_0 \\ 0 & 0 & 1 \end{bmatrix}$$

The 3×4 matrix [$R_{cam}|T_{cam}$] is often referred to as the extrinsic camera matrix. The matrix [K] can be referred to as the intrinsic camera matrix for the imaging camera 130. Typically, the values for the matrix [K] may be determined using a camera resectioning process, as is known in the art. In general, an intrinsic camera matrix has the form:

$$[K] = \begin{bmatrix} f_x & \gamma & x_0 \\ 0 & f_y & y_0 \\ 0 & 0 & 1 \end{bmatrix}$$

where:
($x_0$, $y_0$) is the camera center 2714 and is the pixel location coordinates on the image plane 2712 where the camera center (or the camera coordinate system origin) 2708 projects according to the pinhole camera model;

$f_x$ is the focal length, f, expressed in x-direction, or horizontal, pixel-related units; and $f_y$ is the focal length, f, expressed in y-direction, or vertical, pixel related units, and γ represents a skew factor between the x and y axes, and is often "0".

Example values for the intrinsic camera matrix, for a 480× 752 pixel image, can be:

$f_x$=783.1441, $f_y$=784.4520, γ=0, $x_0$=237.8432, $y_0$=380.7313

Example values for the intrinsic camera matrix, for a 240× 376 pixel image, can be:

$f_x$=458.333344, $f_y$=458.333344, γ=0, $x_0$=142.282608, $y_0$=171.300568

Equation 19A relates the pallet location 2704, up to a scale factor λ, with a gray scale image pixel location ($x_{col}$, $y_{row}$). This implies that the left and right sides of Equation 19A are collinear vectors which results in a zero cross-product. The cross product equation is:

$$\begin{bmatrix} x_{col} \\ y_{row} \\ 1 \end{bmatrix} \times [K][R_{cam} \mid T_{cam}] \begin{bmatrix} X_w \\ Y_w \\ Z_w \\ 1 \end{bmatrix} = 0 \quad \text{Equation 20A}$$

Prudent selection of the rotation matrix [$R_{cam}$] and the translation vector $T_{cam}$ can simplify the calculations involved in Equation 20A. In particular, if the world coordinate system axes and the camera coordinate system axes are mutually aligned with one another, then the rotation matrix is simply a 3×3 identity matrix. However, the camera may typically be rotated upwards an elevation angle, $θ_e$, as shown in FIG. 27A, such that relative to the camera $Z_{θe}$-axis, the world coordinate Z-axis is tilted downward by an angle $-θ_e$. Such a difference in the axes results one possible rotation matrix of:

$$[R_{cam_1}] = \begin{bmatrix} 1 & 0 & 0 \\ 0 & \cos θ_e & -\sin θ_e \\ 0 & \sin θ_e & \cos θ_e \end{bmatrix} \quad \text{Equation 21}$$

Additionally, the camera location 2708 can be selected so that it is translated relative to the world coordinate origin 2706 by a translation vector, as mentioned above, of:

$$\begin{bmatrix} tc_x \\ tc_y \\ tc_z \end{bmatrix}.$$

In an exemplary embodiment, the imaging camera 130 is attached to the vehicle frame in such a way that it has the same Z-coordinate value as the world coordinate origin 2706 (i.e., $tc_z$=0) but has an X-coordinate value offset from the world coordinate origin 2706 by a bias value (i.e., $tc_x$=$t_{xbias}$). As mentioned above, as the fork carriage apparatus 40 moves up and down, the translation of the camera 130 relative to the world coordinate origin 2706 also changes in the Y direction. Accordingly, the camera translation vector may be realized as:

$$\begin{bmatrix} tc_x \\ tc_y \\ tc_z \end{bmatrix} = \begin{bmatrix} t_{xbias} \\ t_y + t_{ybias} \\ 0 \end{bmatrix}$$

Given that:

$$[K] = \begin{bmatrix} f_x & 0 & x_0 \\ 0 & f_y & y_0 \\ 0 & 0 & 1 \end{bmatrix},$$

$$[R_{cam_1} \mid T_{cam}] = \begin{bmatrix} 1 & 0 & 0 & t_{xbias} \\ 0 & \cos θ_e & -\sin θ_e & (t_y + t_{ybias}) \\ 0 & \sin θ_e & \cos θ_e & 0 \end{bmatrix}$$

Equation 20A simplifies to:

$$\begin{bmatrix} x_{col} \\ y_{row} \\ 1 \end{bmatrix} \times$$

$$\begin{bmatrix} f_x & x_0 \sin θ_e & x_0 \cos θ_e & f_x t_{xbias} \\ 0 & f_y \cos θ_e + y_0 \sin θ_e & -f_y \sin θ_e + y_0 \cos θ_e & f_y(t_y + t_{ybias}) \\ 0 & \sin θ_e & \cos θ_e & 0 \end{bmatrix} \begin{bmatrix} X_w \\ Y_w \\ Z_w \\ 1 \end{bmatrix} = 0$$

which simplifies to Equation 22:

$$\begin{bmatrix} x_{col} \\ y_{row} \\ 1 \end{bmatrix} \times$$

$$\begin{bmatrix} X_w f_x + Y_w x_0 \sin θ_e + Z_w x_0 \cos θ_e + f_x(t_{xbias}) \\ Y_w(f_y \cos θ_e + y_0 \sin θ_e) + Z_w(-f_y \sin θ_e + y_0 \cos θ_e) + f_y(t_y + t_{ybias}) \\ Y_w \sin θ_e + Z_w \cos θ_e \end{bmatrix} = 0$$

calculating the first two elements of the cross product provides two linear equations referred to collectively as Equation 23:

$-X_w f_x - Y_w x_0 \sin θ_e - Z_w x_0 \cos θ_e + x_{col}(Y_w \sin θ_e + Z_w \cos θ_e) - f_x(t_{xbias}) = 0$ $y_{row}(Y_w \sin θ_e + Z_w \cos θ_e) - Y_w(f_y \cos θ_e + y_0 \sin θ_e) - Z_w(-f_y \sin θ_e + y_0 \cos θ_e) - f_y(t_y + t_{ybias}) = 0$ In matrix form, the above two equations can be written as Equation 24A:

$$\begin{bmatrix} -f_x & (x_{col} - x_0)\sin θ_e & (x_{col} - x_0)\cos θ_e \\ 0 & (y_{row} - y_0)\sin θ_e - f_y \cos θ_e & (y_{row} - y_0)\cos θ_e + f_y \sin θ_e \end{bmatrix} \begin{bmatrix} X_w \\ Y_w \\ Z_w \end{bmatrix} =$$

$$\begin{bmatrix} f_x(t_{xbias}) \\ f_y(t_y + t_{ybias}) \end{bmatrix}$$

Thus, for a particular gray scale image which is acquired when the imaging camera 130 is positioned at a location ($t_{xbias}$, ($t_y$+$t_{ybias}$)) relative to the world coordinate origin 2706, there is an image pixel location ($x_{col}$, $y_{row}$) which corresponds to the location ($X_w$, $Y_w$, $Z_w$) 2704 of the pallet 2702. Thus, a scored candidate object having an image pixel location ($x_{col}$, $y_{row}$) (See, for example, FIG. 24D object 2448 and location 2458) also has an associated location ($X_w$, $Y_w$, $Z_w$) 2704 in the physical world. Thus, this scored candidate object in image space has associated with it a height $Y_w$ that is the height in the physical world of the pallet that corresponds to that scored candidate object. The height $Y_w$ can simply be referred to as "the height of the scored candidate object" as a shorthand way of stating that the scored candidate object at location ($x_{col}$, $y_{row}$) in image space has an associated height $Y_w$ in the physical world of a corresponding pallet at location 2704. As discussed below, the image pixel location ($x_{col}$, $y_{row}$) corresponds to a measured value in image space. If the imaging camera 130 changes its position and a second gray scale image is acquired then Equation 24A still holds true for ($X_w$, $Y_w$, $Z_w$) but there will be different values for $t_y$ and ($x_{col}$, $y_{row}$). Thus, for each different image frame acquired there are respective values for $t_y$ and ($x_{col}$, $y_{row}$), so Equation 24A can more clearly be written as:

Equation 25A $$\begin{bmatrix} -f_x & (x_{col_n} - x_0)\sin\theta_e & (x_{col_n} - x_0)\cos\theta_e \\ 0 & (y_{row_n} - y_0)\sin\theta_e - f_y\cos\theta_e & (y_{row_n} - y_0)\cos\theta_e + f_y\sin\theta_e \end{bmatrix} \begin{bmatrix} X_w \\ Y_w \\ Z_w \end{bmatrix} = \begin{bmatrix} f_x t_{xbias} \\ f_y(t_{y_n} + t_{ybias}) \end{bmatrix}$$

where n is an index value denoting the image frame in a sequence of acquired image frames, $t_{xbias}$ is the horizontal translation of the imaging camera 130 from the world coordinate origin 2706, and $t_{y_n} + t_{ybias}$ is the vertical translation of the imaging camera 130 from the world coordinate origin 2706 corresponding to when image frame n is acquired. The image pixel location ($x_{col_n}, y_{row_n}$) can be referred to as one "observation" of the pallet location 2704 in image space. The pair of equations in Equation 25A can be collected together for multiple observations of the same pallet location 2704 to provide a series of equations, as follows:

Equation 26A $$\begin{bmatrix} -f_x & (x_{col_1} - x_0)\sin\theta_e & (x_{col_1} - x_0)\cos\theta_e \\ 0 & (y_{row_1} - y_0)\sin\theta_e - f_y\cos\theta_e & (y_{row_1} - y_0)\cos\theta_e + f_y\sin\theta_e \\ -f_x & (x_{col_2} - x_0)\sin\theta_e & (x_{col_2} - x_0)\cos\theta_e \\ 0 & (y_{row_2} - y_0)\sin\theta_e - f_y\cos\theta_e & (y_{row_2} - y_0)\cos\theta_e + f_y\sin\theta_e \\ -f_x & (x_{col_3} - x_0)\sin\theta_e & (x_{col_3} - x_0)\cos\theta_e \\ 0 & (y_{row_3} - y_0)\sin\theta_e - f_y\cos\theta_e & (y_{row_3} - y_0)\cos\theta_e + f_y\sin\theta_e \\ \vdots & \vdots & \vdots \end{bmatrix} \begin{bmatrix} X_w \\ Y_w \\ Z_w \end{bmatrix} = \begin{bmatrix} f_x t_{xbias} \\ f_y(t_{y_1} + t_{ybias}) \\ f_x t_{xbias} \\ f_y(t_{y_2} + t_{ybias}) \\ f_x t_{xbias} \\ f_y(t_{y_3} + t_{ybias}) \\ \vdots \end{bmatrix}$$

This equation can be conceptually written as Equation 27:

$$[A]\begin{bmatrix} X_w \\ Y_w \\ Z_w \end{bmatrix} = [B]$$

which can be manipulated to form:

Equation 28A $$\begin{bmatrix} X_w \\ Y_w \\ Z_w \end{bmatrix} = ([A]^T[A])^{-1}[A]^T[B]$$

where:

$$[A] = \begin{bmatrix} -f_x & (x_{col_1} - x_0)\sin\theta_e & (x_{col_1} - x_0)\cos\theta_e \\ 0 & (y_{row_1} - y_0)\sin\theta_e - f_y\cos\theta_e & (y_{row_1} - y_0)\cos\theta_e + f_y\sin\theta_e \\ -f_x & (x_{col_2} - x_0)\sin\theta_e & (x_{col_2} - x_0)\cos\theta_e \\ 0 & (y_{row_2} - y_0)\sin\theta_e - f_y\cos\theta_e & (y_{row_2} - y_0)\cos\theta_e + f_y\sin\theta_e \\ -f_x & (x_{col_3} - x_0)\sin\theta_e & (x_{col_3} - x_0)\cos\theta_e \\ 0 & (y_{row_3} - y_0)\sin\theta_e - f_y\cos\theta_e & (y_{row_3} - y_0)\cos\theta_e + f_y\sin\theta_e \\ \vdots & \vdots & \vdots \end{bmatrix}$$

and $$[B] = \begin{bmatrix} f_x t_{xbias} \\ f_y(t_{y_1} + t_{ybias}) \\ f_x t_{xbias} \\ f_y(t_{y_2} + t_{ybias}) \\ f_x t_{xbias} \\ f_y(t_{y_3} + t_{ybias}) \\ \vdots \end{bmatrix}$$

Once there are two or more observations for a pallet location 2704, Equation 28A provides more equations than unknowns and can be solved using a least-squares method to estimate the pallet location ($X_w, Y_w, Z_w$) in terms of the world coordinate origin 2706. Additionally, waiting until there is at least some minimum distance between two observations is beneficial as well. For example, it is preferred that there be at least a minimum fork difference (i.e., $|t_{y_{(i+1)}} - t_{y_i}| \geq 1$ inch), before a pallet location ($X_w, Y_w, Z_w$) is estimated.

Figure 27C:
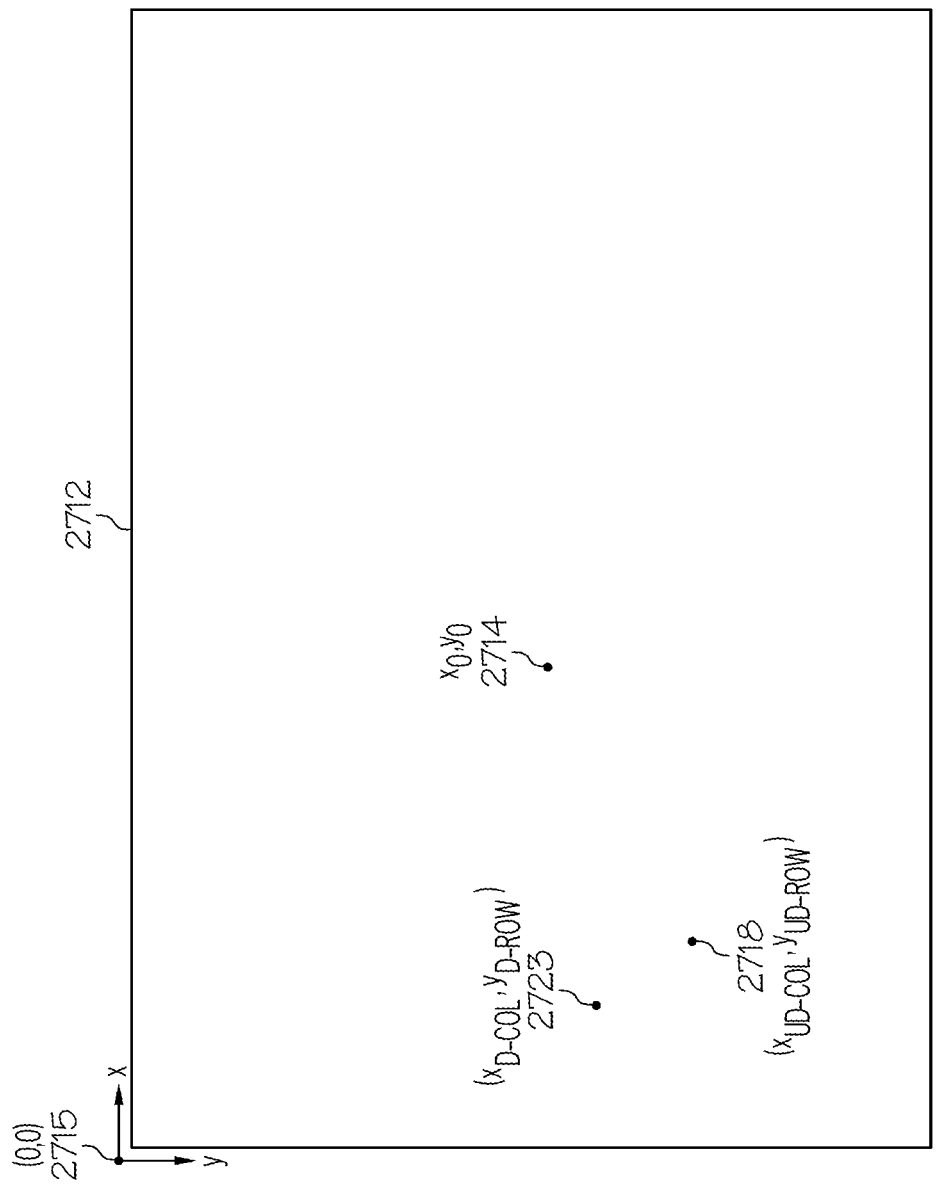
FIG. 27C illustrates a gray scale image having different pixel locations in accordance with the principles of the present invention.

The rotation matrix $[R_{cam_1}]$ of Equation 21, developed using the configuration of FIG. 27A, only contemplates rotation of the camera coordinate system relative to the X-axis (e.g., angle $\theta_e$ 2701) of the world coordinate system. However, the rotation matrix for a camera can be generalized to account for rotation of the camera coordinate system relative to all three axes of the world coordinate system, as shown in FIG. 27E. In FIG. 27E, the axes (2707', 2711', and 2705') of the camera coordinate system are shown relative to the axes of the world coordinate system (2707, 2711, 2705). In particular, $\theta_x$ 2762 can represent the rotation of the camera coordinate system relative to the X-axis 2707 (referred to as an elevation angle), $\theta_y$ 2764 can represent the rotation of the camera coordinate system relative to the Y-axis 2711 (referred to as a pitch angle), and $\theta_z$ 2766 can represent the rotation of the camera coordinate system relative to the Z-axis 2705 (referred to as a deflection angle). As a result a camera coordinate system will result having its axes (2707', 2711', and 2705') rotated with respect to the world coordinate system axes (2707, 2711 and 2705) by an amount that represents a combination of the individual rotation angles $\theta_x$ 2762, $\theta_y$ 2764, and $\theta_z$ 2766. Each angle of rotation provides one component of the overall rotation matrix for the camera.

$$[R_{cam_x}] = \begin{bmatrix} 1 & 0 & 0 \\ 0 & \cos\theta_x & -\sin\theta_x \\ 0 & \sin\theta_x & \cos\theta_x \end{bmatrix} \quad \text{Equation 29A}$$

$$[R_{cam_y}] = \begin{bmatrix} \cos\theta_y & 0 & \sin\theta_y \\ 0 & 1 & 0 \\ -\sin\theta_y & 0 & \cos\theta_y \end{bmatrix} \quad \text{Equation 29B}$$

-continued $$[R_{cam_z}] = \begin{bmatrix} \cos\theta_z & -\sin\theta_z & 0 \\ \sin\theta_z & \cos\theta_z & 0 \\ 0 & 0 & 1 \end{bmatrix} \quad \text{Equation 29C}$$

The more generalized, or full, rotation matrix is the multiplication of these three component matrices together to provide Equation 29D:

$$[R_{cam_{full}}] = \begin{bmatrix} \cos\theta_y\cos\theta_z & -\sin\theta_z\cos\theta_y & \sin\theta_y \\ \sin\theta_x\sin\theta_y\cos\theta_z + \cos\theta_x\sin\theta_z & -\sin\theta_x\sin\theta_y\sin\theta_z + \cos\theta_x\cos\theta_z & -\sin\theta_x\cos\theta_y \\ -\sin\theta_y\cos\theta_x\cos\theta_z + \sin\theta_x\sin\theta_z & \cos\theta_x\sin\theta_y\sin\theta_z + \sin\theta_x\cos\theta_z & \cos\theta_x\cos\theta_y \end{bmatrix}$$

However, rather than a full rotation matrix, aspects of the present invention contemplate a rotation matrix with one rotational degree of freedom about the x-axis and another rotational degree of freedom about the z-axis. As described above, the angle of rotation about the x-axis is typically referred to as the elevation angle $\theta_e$. The angle of rotation about the z-axis can be referred to as the deflection angle and denoted by $\varphi_{defl}$. The three components of this particular example rotation matrix are provided by:

$$[R_{cam_x}] = \begin{bmatrix} 1 & 0 & 0 \\ 0 & \cos\theta_e & -\sin\theta_e \\ 0 & \sin\theta_e & \cos\theta_e \end{bmatrix} \quad \text{Equation 30A}$$

$$[R_{cam_y}] = \begin{bmatrix} 1 & 0 & 0 \\ 0 & 1 & 0 \\ 0 & 0 & 1 \end{bmatrix} \quad \text{Equation 30B}$$

$$[R_{cam_z}] = \begin{bmatrix} \cos\varphi_{defl} & -\sin\varphi_{defl} & 0 \\ \sin\varphi_{defl} & \cos\varphi_{defl} & 0 \\ 0 & 0 & 1 \end{bmatrix} \quad \text{Equation 30C}$$

Multiplying these three component matrices together provides an exemplary rotation matrix provided by Equation 30D:

$$[R_{cam_2}] = \begin{bmatrix} \cos\varphi_{defl} & -\sin\varphi_{defl} & 0 \\ \sin\varphi_{defl}\cos\theta_e & \cos\varphi_{defl}\cos\theta_e & -\sin\theta_e \\ \sin\varphi_{defl}\sin\theta_e & \cos\varphi_{defl}\sin\theta_e & \cos\theta_e \end{bmatrix}$$

Using this rotation matrix (instead of the one of Equation 21) will produce a pair of linear equations analogous to those of Equation 24A. In particular, these two linear equations are provided by Equation 24B:

$$\begin{bmatrix} -f_x\cos\varphi_{defl} + (x_{col}-x_0)\sin\varphi_{defl}\sin\theta_e & (x_{col}-x_0)\cos\varphi_{defl}\sin\theta_e + f_x\sin\varphi_{defl} & (x_{col}-x_0)\cos\theta_e \\ \left(\dfrac{(y_{row}-y_0)\sin\theta_e}{f_y\cos\theta_e}\right)\sin\varphi_{defl} & \left(\dfrac{(y_{row}-y_0)\sin\theta_e -}{f_y\cos\theta_e}\right)\cos\varphi_{defl} & (y_{row}-y_0)\cos\theta_e + f_y\sin\theta_e \end{bmatrix} \begin{bmatrix} X_w \\ Y_w \\ Z_w \end{bmatrix} = \begin{bmatrix} f_x(t_{xbias}) \\ f_y(t_y + t_{ybias}) \end{bmatrix}$$

and can be collected together for multiple observations of the same pallet location 2704 to provide a series of equations that can be solved for $$\begin{bmatrix} X_w \\ Y_w \\ Z_w \end{bmatrix}$$

in a manner similar to that of Equation 28A.

For simplicity, the different rotation matrices of Equations 21, 29D, and 30D can be conceptualized as Equation 30E where:

$$[R_{cam}] = \begin{bmatrix} r_{00} & r_{01} & r_{02} \\ r_{10} & r_{11} & r_{12} \\ r_{20} & r_{21} & r_{22} \end{bmatrix}$$

Substituting the notation of Equation 30E into Equation 20A and assuming that $$[T_{cam}] = \begin{bmatrix} t_{xbias} \\ (t_{y_n} + t_{ybias}) \\ 0 \end{bmatrix},$$

a pair of linear equations analogous to those of Equation 25A can be determined for any rotation matrix $[R_{cam}]$. This pair of linear equations can be solved for the pallet location ($X_w, Y_w, Z_w$) and are given by Equation 30F:

$$\begin{bmatrix} a_n & b_n & c_n \\ d_n & e_n & f_n \end{bmatrix} \begin{bmatrix} X_w \\ Y_w \\ Z_w \end{bmatrix} = \begin{bmatrix} f_x(t_{xbias}) \\ f_y(t_{y_n} + t_{ybias}) \end{bmatrix}$$

where:

$$a_n = x_{col_n}r_{20} - f_xr_{00} - x_0r_{20}$$

$$b_n = x_{col_n}r_{21} - f_xr_{01} - x_0r_{21}$$

-continued $$c_n = x_{col_n} r_{22} - f_x r_{02} - x_0 r_{22}$$

$$d_n = y_{row_n} r_{20} - f_y r_{10} - y_0 r_{20}$$

$$e_n = y_{row_n} r_{21} - f_y r_{11} - y_0 r_{21}$$

$$f_n = y_{row_n} r_{22} - f_y r_{12} - y_0 r_{22}$$

Similar to before, multiple observations of a pallet location can be collected and used to solve for the pallet location ($X_w$, $Y_w$, $Z_w$) in a least squares manner. Thus, using this notation, an equation analogous to Equation 28A can be calculated according to:

$$\begin{bmatrix} X_w \\ Y_w \\ Z_w \end{bmatrix} = ([A]^T[A])^{-1}[A]^T[B] \text{ where:} \qquad \text{Equation 31A}$$

$$[A] = \begin{bmatrix} a_1 & b_1 & c_1 \\ d_1 & e_1 & f_1 \\ a_2 & b_2 & c_2 \\ d_2 & e_2 & f_2 \\ a_3 & b_3 & c_3 \\ d_3 & e_3 & f_3 \\ \vdots & \vdots & \vdots \end{bmatrix} \text{ and } [B] = \begin{bmatrix} f_x t_{xbias} \\ f_y(t_{y_1} + t_{ybias}) \\ f_x t_{xbias} \\ f_y(t_{y_2} + t_{ybias}) \\ f_x t_{xbias} \\ f_y(t_{y_3} + t_{ybias}) \\ \vdots \end{bmatrix}$$

The elevation angle, $\theta_e$, (or in the more general full rotation matrix, the angle $\theta_x$) which in the above equations, represents the rotation of the imaging camera axis about the X-axis may include more than one component that contributes to the overall angle. For example, the elevation angle $\theta_e$ may include a first component that corresponds to a fixed rotation angle $\theta_{ec}$ based on an angle at which the imaging camera 130 is mounted on the fork carriage apparatus 40 and a second component that corresponds to an angle $\theta_{ef}$ at which the vehicle forks 42A and 42B may be tilted relative to the carriage support structure 44A via the tilt piston/cylinder unit 44D. Thus, in the above equations, $\theta_e = (\theta_{ec} + \theta_{ef})$.

The contribution of the fork elevation angle $\theta_{ef}$ to the overall elevation angle $\theta_e$ can be measured by a conventional tilt angle sensor (not shown) associated with one or both of the carriage support structure 44A and the fork carriage frame 44B. This conventional tilt angle sensor may have a resolution of about 0.001 degrees and provide the tilt angle of the forks 42A, 42B to the vehicle computer 50, which can communicate this information to the image analysis computer 110. The contribution of the camera elevation angle $\theta_{ec}$ to the overall elevation angle $\theta_e$ can be determined by an extrinsic calibration routine, as explained in detail below.

If both components of angle $\theta_e$ (i.e., $\theta_{ec}$ and $\theta_{ef}$) are constant values, then determining and using the elevation angle $\theta_e$ for any of the above equations is relatively straightforward. In certain embodiments, the imaging camera 130 is mounted on the fork carriage apparatus 40 so that its elevation angle $\theta_{ec}$ does not change between image frames. However, the elevation angle component due to tilting of the forks, $\theta_{ef}$, may change between image frames. Under these circumstances, the rotation matrices discussed above can be manipulated to account for the potential variability of $\theta_{ef}$.

Referring back to Equation 21, one example rotation matrix is provided by:

$$[R_{cam_1}] = \begin{bmatrix} 1 & 0 & 0 \\ 0 & \cos\theta_e & -\sin\theta_e \\ 0 & \sin\theta_e & \cos\theta_e \end{bmatrix}$$

where, as mentioned, $\theta_e = (\theta_{ec} + \theta_{ef})$. An intermediate rotation matrix can be constructed that only accounts for the contribution of the camera angle $\theta_{ec}$ according to:

$$[R'_{cam_1}] = \begin{bmatrix} 1 & 0 & 0 \\ 0 & \cos\theta_{ec} & -\sin\theta_{ec} \\ 0 & \sin\theta_{ec} & \cos\theta_{ec} \end{bmatrix}$$

Using this intermediate rotation matrix, an intermediate extrinsic camera matrix can be written as:

$$[R'_{cam_1} | T_{cam}] = \begin{bmatrix} 1 & 0 & 0 & t_{xbias} \\ 0 & \cos\theta_{ec} & -\sin\theta_{ec} & (t_y + t_{ybias}) \\ 0 & \sin\theta_{ec} & \cos\theta_{ec} & 0 \end{bmatrix}$$

One way to modify this intermediate extrinsic camera matrix is to post-multiply by a rotation matrix that accounts only for the contribution of the fork tilt angle $\theta_{ef}$. To perform this multiplication, the typical 3×3 rotation matrix can be expanded to a 4×4 matrix according to:

$$\begin{bmatrix} 1 & 0 & 0 & 0 \\ 0 & \cos\theta_{ef} & -\sin\theta_{ef} & 0 \\ 0 & \sin\theta_{ef} & \cos\theta_{ef} & 0 \\ 0 & 0 & 0 & 1 \end{bmatrix}$$

and then performing the post-multiplication described above:

$$[R'_{cam_1} | T_{cam}] \times \begin{bmatrix} 1 & 0 & 0 & 0 \\ 0 & \cos\theta_{ef} & -\sin\theta_{ef} & 0 \\ 0 & \sin\theta_{ef} & \cos\theta_{ef} & 0 \\ 0 & 0 & 0 & 1 \end{bmatrix}$$

results in Equation 31B:

$$\begin{bmatrix} 1 & 0 & 0 & t_{xbias} \\ 0 & \cos\theta_{ec}\cos\theta_{ef} - \sin\theta_{ec}\sin\theta_{ef} & -\cos\theta_{ec}\sin\theta_{ef} - \sin\theta_{ec}\cos\theta_{ef} & \begin{pmatrix} t_y + \\ t_{ybias} \end{pmatrix} \\ 0 & \sin\theta_{ec}\cos\theta_{ef} + \cos\theta_{ec}\sin\theta_{ef} & -\sin\theta_{ec}\sin\theta_{ef} + \cos\theta_{ec}\cos\theta_{ef} & 0 \end{bmatrix}$$

Using the two geometrical identities:

$$\cos(a+b) = \cos(a)\cos(b) - \sin(a)\sin(b)$$

$$\sin(a+b) = \sin(a)\cos(b) + \cos(a)\sin(b)$$

Equation 31B can be simplified to:

$$\begin{bmatrix} 1 & 0 & 0 & t_{xbias} \\ 0 & \cos(\theta_{ec}+\theta_{ef}) & -\sin(\theta_{ec}+\theta_{ef}) & (t_y+t_{ybias}) \\ 0 & \sin(\theta_{ec}+\theta_{ef}) & \cos(\theta_{ec}+\theta_{ef}) & 0 \end{bmatrix}$$

Which can be further simplified to be:

$$\begin{bmatrix} 1 & 0 & 0 & t_{xbias} \\ 0 & \cos\theta_e & -\sin\theta_e & (t_y+t_{ybias}) \\ 0 & \sin\theta_e & \cos\theta_e & 0 \end{bmatrix}$$

which is simply $[R_{cam_1}|T_{cam_1}]$.

This technique may be used, in general, with any of the extrinsic camera matrices discussed above so that any extrinsic camera matrix which is formed using a rotation matrix based on $\theta_e$ (e.g., Equations 21, 29D, 30D or 30E) can be constructed from a respective intermediate extrinsic camera matrix using an intermediate rotation matrix based on $\theta_{ec}$ that is then post-multiplied by a rotation matrix that is based on $\theta_{ef}$.

As mentioned earlier, the amount that the forks 42A and 42B tilt (i.e., $\theta_{ef}$) may vary between each image frame that is acquired. Thus, the elevation angle $\theta_e$ (or more generally $\theta_x$) can vary between image frames as well. Accordingly, Equations 25A and 26A can be modified to account for the variability of the elevation angle $\theta_e$, as shown below:

$$\begin{bmatrix} -f_x & (x_{col_n}-x_0)\sin\theta_{e_n} & (x_{col_n}-x_0)\sin\theta_{e_n} \\ 0 & (y_{row_n}-y_0)\sin\theta_{e_n}-f_y\cos\theta_{e_n} & (y_{row_n}-y_0)\cos\theta_{e_n}-f_y\sin\theta_{e_n} \end{bmatrix} \quad \text{Equation 25B}$$

$$\begin{bmatrix} X_w \\ Y_w \\ Z_w \end{bmatrix} = \begin{bmatrix} f_x t_{xbias} \\ f_y(t_{y_n}+t_{ybias}) \end{bmatrix}$$

$$\begin{bmatrix} -f_x & (x_{col_1}-x_0)\sin\theta_{e_1} & (x_{col_1}-x_0)\cos\theta_{e_1} \\ 0 & (y_{row_1}-y_0)\sin\theta_{e_1}-f_y\cos\theta_{e_1} & (y_{row_1}-y_0)\cos\theta_{e_1}+f_y\cos\theta_{e_1} \\ -f_x & (x_{col_2}-x_0)\sin\theta_2 & (x_{col_2}-x_0)\cos\theta_{e_2} \\ 0 & (y_{row_2}-y_0)\sin\theta_{e_2}-f_y\cos\theta_{e_2} & (y_{row_2}-y_0)\cos\theta_{e_2}+f_y\sin\theta_{e_2} \\ -f_x & (x_{col_3}-x_0)\sin\theta_{e_3} & (x_{col_3}-x_0)\cos\theta_{e_3} \\ 0 & (y_{row_3}-y_0)\sin\theta_{e_3}-f_y\cos\theta_{e_3} & (y_{row_3}-y_0)\cos\theta_{e_3}+f_y\sin\theta_{e_3} \\ \vdots & \vdots & \vdots \end{bmatrix} \quad \text{Equation 26B}$$

$$\begin{bmatrix} X_w \\ Y_w \\ Z_w \end{bmatrix} = \begin{bmatrix} f_x t_{xbias} \\ f_y(t_{y_1}+t_{ybias}) \\ f_x t_{xbias} \\ f_y(t_{y_2}+t_{ybias}) \\ f_x t_{xbias} \\ f_y(t_{y_3}+t_{ybias}) \\ \vdots \end{bmatrix}$$

However, even with the variability of $\theta_e$ that can occur between image frames, the technique for solving for pallet location $(X_w, Y_w, Z_w)$ remains the same. Although, for each image frame, the image analysis computer 110 may also now store $\theta_{e_n}$ in addition to $(x_{col_n}, y_{row_n})$ and $t_{y_n}$. Accordingly, equations 25B and 26B can be rearranged to provide Equation 28B:

$$\begin{bmatrix} X_w \\ Y_w \\ Z_w \end{bmatrix} = ([A']^T[A'])^{-1}[A']^T[B] \text{ where:} \quad \text{Equation 28B}$$

$$[A'] = \begin{bmatrix} -f_x & (x_{col_1}-x_0)\sin\theta_{e_1} & (x_{col_1}-x_0)\cos\theta_{e_1} \\ 0 & (y_{row_1}-y_0)\sin\theta_{e_1}-f_y\cos\theta_{e_1} & (y_{row_1}-y_0)\cos\theta_{e_1}+f_y\cos\theta_{e_1} \\ -f_x & (x_{col_2}-x_0)\sin\theta_{e_2} & (x_{col_2}-x_0)\cos\theta_{e_2} \\ 0 & (y_{row_2}-y_0)\sin\theta_{e_2}-f_y\cos\theta_{e_2} & (y_{row_2}-y_0)\cos\theta_e+f_y\sin\theta_{e_2} \\ -f_x & (x_{col_3}-x_0)\sin\theta_{e_3} & (x_{col_3}-x_0)\cos\theta_{e_3} \\ 0 & (y_{row_3}-y_0)\sin\theta_{e_3}-f_y\cos\theta_{e_3} & (y_{row_3}-y_0)\cos\theta_e+f_y\sin\theta_{e_3} \\ \vdots & \vdots & \vdots \end{bmatrix}$$

and $$[B] = \begin{bmatrix} f_x t_{xbias} \\ f_y(t_{y_1} + t_{ybias}) \\ f_x t_{xbias} \\ f_y(t_{y_2} + t_{ybias}) \\ f_x t_{xbias} \\ f_y(t_{y_3} + t_{ybias}) \\ \vdots \end{bmatrix}$$

In the above examples, one assumption was that the movement of the forks $t_y$ occurs substantially in the direction of the Y-axis 2711 of the world coordinate system. However, the mast assembly 30 may not necessarily align with the direction of the world coordinate system Y-axis 2711. As shown in FIG. 27F, a vector 2775 may represent a direction of the mast assembly 30 with respect to the world coordinate system.

Thus, in FIG. 27F, there is a vector $\vec{V}_{mast}$ 2776 that represents a position 2770 of the forks 42A and 42B, along the vector direction 2775, in world system coordinates relative to the world coordinate origin 2706. The position 2770 of the forks 42A and 42B can be considered as an origin of a fork coordinate system that along with three orthogonal axes 2707A, 2711A, and 2705A define a fork coordinate system. Within the fork coordinate system a vector $\vec{V}_{forks}$ 2774 represents a location 2704 of a pallet in fork system coordinates relative to the fork location 2770. As discussed before, there is a camera location 2708 that defines an origin of a camera coordinate system that along with three orthogonal axes 2707B, 2711B, and 2705B define a camera coordinate system. Accordingly, there is a vector $\vec{V}_{cam}$ 2778 that represents the location 2704 of the pallet in camera system coordinates relative to the camera location 2708.

The axes 2707B, 2711B, 2705B of the camera coordinate system may be rotated relative to the axes 2707A, 2711A, 2705A of the fork coordinate system and may also be translated relative to the fork coordinate system as well. Thus, the pallet location 2704 in the fork coordinate system can be transformed into a location in the camera coordinate system according to Equation 15B:

$$\begin{bmatrix} X_c \\ Y_c \\ Z_c \end{bmatrix} = [R_{cam\text{-}forks}] \begin{bmatrix} X_f \\ Y_f \\ Z_f \end{bmatrix} + \begin{bmatrix} tcf_{xbias} \\ tcf_{ybias} \\ tcf_{zbias} \end{bmatrix}$$

where:

$$\vec{V}_{cam} = \begin{bmatrix} X_c \\ Y_c \\ Z_c \end{bmatrix}$$

the coordinates of the pallet location 2704 in camera system coordinates;

$$[R_{cam\text{-}forks}] = \begin{bmatrix} rcf_{00} & rcf_{01} & rcf_{02} \\ rcf_{10} & rcf_{11} & rcf_{12} \\ rcf_{20} & rcf_{21} & rcf_{22} \end{bmatrix}$$

a rotation matrix that represents the rotation of the camera coordinate system relative to the fork coordinate system;

$$\vec{V}_{forks} = \begin{bmatrix} X_f \\ Y_f \\ Z_f \end{bmatrix}$$

the coordinates of the pallet location 2704 in the fork coordinate system; and $$\begin{bmatrix} tcf_{xbias} \\ tcf_{ybias} \\ tcf_{zbias} \end{bmatrix}$$

is a translation vector representing a displacement of the camera coordinate system origin 2708 relative to the fork coordinate system origin 2770 along the direction of the axes 2707A, 2711A, and 2705A of the fork coordinate system.

The location of the fork coordinate system origin 2770 is provided according to Equation 15C:

$$\vec{V}_{mast} = [R_{mast\text{-}world}] \begin{bmatrix} 0 \\ t_y \\ 0 \end{bmatrix}$$

where:

$\vec{V}_{mast}$ is the location, in world system coordinates, of the fork location 2770;

$$[R_{mast\text{-}world}] = \begin{bmatrix} rmw_{00} & rmw_{01} & rmw_{02} \\ rmw_{10} & rmw_{11} & rmw_{12} \\ rmw_{20} & rmw_{21} & rmw_{22} \end{bmatrix}$$

a rotation matrix that represents the rotation of the mast assembly 30 relative to the world coordinate system axes 2707, 2711, and 2705; and $$\begin{bmatrix} 0 \\ t_y \\ 0 \end{bmatrix}$$

is a translation vector representing the displacement of the forks 42A and 42B from the world coordinate origin 2706 in a direction along the vector 2775.

If the axes 2707A, 2711A, and 2705A of the fork coordinate system are rotationally aligned with the axes 2707, 2711, and 2705 of the world coordinate system, then the vector $\vec{V}_{world}$ 2772 is, by vector addition, given according to Equation 15D:

$$\vec{V}_{world} = \vec{V}_{mast} + \vec{V}_{forks}$$

Multiplying both sides of Equation 15D by $[R_{cam\text{-}forks}]$ provides:

$$[R_{cam\text{-}forks}]\vec{V}_{world} = [R_{cam\text{-}forks}]\vec{V}_{mast} + [R_{cam\text{-}forks}]\vec{V}_{forks}$$

which, by substituting in Equation 15C, provides:

$$[R_{cam\text{-}forks}]\vec{V}_{world} = [R_{cam\text{-}forks}][R_{mast\text{-}world}]\begin{bmatrix} 0 \\ t_y \\ 0 \end{bmatrix} + [R_{cam\text{-}forks}]\vec{V}_{forks}$$

The terms of Equation 15B can be rearranged to provide that:

$$\begin{bmatrix} X_c \\ Y_c \\ Z_c \end{bmatrix} - \begin{bmatrix} tcf_{xbias} \\ tcf_{ybias} \\ tcf_{zbias} \end{bmatrix} = [R_{cam\text{-}forks}]\begin{bmatrix} X_f \\ Y_f \\ Z_f \end{bmatrix}$$

which can be substituted in the above equation to provide Equation 15E:

$$[R_{cam\text{-}forks}]\vec{V}_{world} = [R_{cam\text{-}forks}][R_{mast\text{-}world}]\begin{bmatrix} 0 \\ t_y \\ 0 \end{bmatrix} + \begin{bmatrix} X_c \\ Y_c \\ Z_c \end{bmatrix} - \begin{bmatrix} tcf_{xbias} \\ tcf_{ybias} \\ tcf_{zbias} \end{bmatrix}$$

The terms in Equation 15E can be rearranged to produce Equation 15F as follows:

$$[R_{cam\text{-}forks}]\vec{V}_{world} - [R_{cam\text{-}forks}][R_{mast\text{-}world}]\begin{bmatrix} 0 \\ t_y \\ 0 \end{bmatrix} + \begin{bmatrix} tcf_{xbias} \\ tcf_{ybias} \\ tcf_{zbias} \end{bmatrix} = \begin{bmatrix} X_c \\ Y_c \\ Z_c \end{bmatrix}$$

The two 3×3 rotation matrices $[R_{cam\text{-}forks}]$ and $[R_{mast\text{-}world}]$ multiply together to form a composite 3×3 rotation matrix with elements whose values depend on both $$\begin{bmatrix} rcf_{00} & rcf_{01} & rcf_{02} \\ rcf_{10} & rcf_{11} & rcf_{12} \\ rcf_{20} & rcf_{21} & rcf_{22} \end{bmatrix}$$

and $$\begin{bmatrix} rmw_{00} & rmw_{01} & rmw_{02} \\ rmw_{10} & rmw_{11} & rmw_{12} \\ rmw_{20} & rmw_{21} & rmw_{22} \end{bmatrix}.$$

However, when multiplied out with the translation vector $$\begin{bmatrix} 0 \\ t_y \\ 0 \end{bmatrix},$$

the result is a 3×1 translation vector that can be conceptualized as $$\begin{bmatrix} \alpha_r t_y \\ \beta_r t_y \\ \gamma_r t_y \end{bmatrix}$$

where the values for $\alpha_r$, $\beta_r$, and $\gamma_r$ depend on the elements of the composite rotation matrix. Thus, Equation 15F can be rearranged to provide Equation 15G:

$$\begin{bmatrix} X_c \\ Y_c \\ Z_c \end{bmatrix} = [R_{cam\text{-}forks}]\begin{bmatrix} X_w \\ Y_w \\ Z_w \end{bmatrix} - \begin{bmatrix} \alpha_r t_y \\ \beta_r t_y \\ \gamma_r t_y \end{bmatrix} + \begin{bmatrix} tcf_{xbias} \\ tcf_{ybias} \\ tcf_{zbias} \end{bmatrix}$$

where:

$$\vec{V}_{world} = \begin{bmatrix} X_w \\ Y_w \\ Z_w \end{bmatrix}$$

is the location in world system coordinates of the pallet location 2704.

Incorporating the negative sign into the values $\alpha_r$, $\beta_r$, and $\gamma_r$ allows Equation 15G to be written more simply as Equation 15H:

$$\begin{bmatrix} X_c \\ Y_c \\ Z_c \end{bmatrix} = [R_{cam\text{-}forks}]\begin{bmatrix} X_w \\ Y_w \\ Z_w \end{bmatrix} + \begin{bmatrix} \alpha_r t_y + tcf_{xbias} \\ \beta_r t_y + tcf_{ybias} \\ \gamma_r t_y + tcf_{zbias} \end{bmatrix}$$

which is similar in form to the original Equations 15A and 17A discussed above. Thus, similar to Equation 17A, Equation 15H can be rewritten in homogenous coordinates as Equation 17B:

$$\begin{bmatrix} X_c \\ Y_c \\ Z_c \end{bmatrix} = \begin{bmatrix} [R_{cam\text{-}forks}] & \begin{matrix} \alpha_r t_y + tcf_{xbias} \\ \beta_r t_y + tcf_{ybias} \\ \gamma_r t_y + tcf_{zbias} \end{matrix} \end{bmatrix}\begin{bmatrix} X_w \\ Y_w \\ Z_w \\ 1 \end{bmatrix}$$

Thus, Equation 17B represents an alternative way to calculate camera coordinates $$\begin{bmatrix} X_c \\ Y_c \\ Z_c \end{bmatrix}$$

of the pallet location 2704. This alternative method takes into account that the displacement $t_y$ along the direction of the vector 2775 (e.g., the mast assembly 30) does not necessarily occur in the same direction as the Y-axis 2711 of the world coordinate system. Similar to Equation 19A discussed above, camera coordinates in accordance with this alternative method are related to image pixel locations according to Equation 19B:

$$\lambda \begin{bmatrix} x_{col} \\ y_{row} \\ 1 \end{bmatrix} = [K] \begin{bmatrix} [R_{cam-forks}] \end{bmatrix} \begin{bmatrix} \alpha_r t_y + tcf_{xbias} \\ \beta_r t_y + tcf_{ybias} \\ \gamma_r t_y + tcf_{zbias} \end{bmatrix} \begin{bmatrix} X_w \\ Y_w \\ Z_w \\ 1 \end{bmatrix}$$

where $$[K] = \begin{bmatrix} f_x & 0 & x_0 \\ 0 & f_y & y_0 \\ 0 & 0 & 1 \end{bmatrix}$$

Parameter estimation practicalities suggest some changes may be made to Equation 19B. A non-zero value for $tcf_{zbias}$ may imply a multiplicity of solutions. Second, it has been observed that attempts to estimate $\beta_r$ tend to produce a trivial solution of all zeros. Hence, two assumptions may be made that help simplify Equation 19B: first, the value of $tcf_{zbias}=0$ and, secondly, $\beta_r=1$. Using these assumptions, Equation 19B can be written as Equation 19C:

$$\lambda \begin{bmatrix} x_{col} \\ y_{row} \\ 1 \end{bmatrix} = [K] \begin{bmatrix} [R_{cam-forks}] \end{bmatrix} \begin{bmatrix} \alpha_r t_y + tcf_{xbias} \\ t_y + tcf_{ybias} \\ \gamma_r t_y \end{bmatrix} \begin{bmatrix} X_w \\ Y_w \\ Z_w \\ 1 \end{bmatrix}$$

When solved, the particular form of Equation 19C shown above results in height estimates, i.e., values for $Y_W$, that have an appropriate magnitude but are negative in sign. Thus, other algorithms and methods that perform calculations using a $Y_W$ value can be appropriately designed to account for the negatively signed $Y_W$ values. Equation 19C relates the pallet location 2704, up to a scale factor $\lambda$, with a gray scale image pixel location ($x_{col}$, $y_{row}$). This implies that the left and right sides of Equation 19C are collinear vectors which results in a zero cross-product. The cross product equation, similar to Equation 20A is:

$$\begin{bmatrix} x_{col} \\ y_{row} \\ 1 \end{bmatrix} \times [K] \begin{bmatrix} [R_{cam-forks}] \end{bmatrix} \begin{bmatrix} \alpha_r t_y + tcf_{xbias} \\ t_y + tcf_{ybias} \\ \gamma_r t_y \end{bmatrix} \begin{bmatrix} X_w \\ Y_w \\ Z_w \\ 1 \end{bmatrix} = 0 \qquad \text{Equation 20B}$$

Similar to the steps discussed above, the cross-product equation of Equation 20B provides a pair of linear equations that can be collected for a number of observations and solved for the pallet location ($X_w$, $Y_w$, $Z_w$). For a single observation, n, of a pallet when the displacement of the forks 42A and 42B is $t_{y_n}$, the two linear equations are given by Equation 30G:

$$\begin{bmatrix} a_n & b_n & c_n \\ d_n & e_n & f_n \end{bmatrix} \begin{bmatrix} X_w \\ Y_w \\ Z_w \end{bmatrix} = \begin{bmatrix} f_x(tcf_{xbias} + \alpha_r t_{y_n}) - \gamma_r t_{y_n}(x_{col_n} - x_0) \\ f_y(t_{y_n} + tcf_{ybias}) - \gamma_r t_{y_n}(y_{row_n} - y_0) \end{bmatrix}$$

where:

$a_n = x_{col_n} rcf_{20} - f_x rcf_{00} - x_0 rcf_{20}$ $b_n = x_{col_n} rcf_{21} - f_x rcf_{01} - x_0 rcf_{21}$ $c_n = x_{col_n} rcf_{22} - f_x rcf_{02} - x_0 rcf_{22}$ $d_n = y_{row_n} rcf_{20} - f_y rcf_{10} - y_0 rcf_{20}$ $e_n = y_{row_n} rcf_{21} - f_y rcf_{11} - y_0 rcf_{21}$ $f_n = y_{row_n} rcf_{22} - f_y rcf_{12} - y_0 rcf_{22}$ Similar to before, multiple observations of a pallet location can be collected and used to solve for the pallet location ($X_w$, $Y_w$, $Z_w$) in a least squares manner.

The above methods for solving for the pallet location ($X_w$, $Y_w$, $Z_w$) may be susceptible to error in the sense that one bad observation may undesirably skew the least-squares estimate. Thus, in a set of observations ($x_{col_n}$, $y_{row_n}$) for a pallet location 2704 there may be one or more observations that should not be considered when solving Equation 28A (or Equation 28B or Equation 31A) for the pallet location. RANSAC is an abbreviation for "RANdom SAmple Consensus" which is an iterative method to estimate parameters of a mathematical model from a set of observed data which contains outliers. A basic assumption is that the data consists of "inliers" which are data whose distribution can be explained by some set of model parameters, and "outliers" which are data that do not fit the model. In addition to this, the data can be subject to noise. The outliers can come, for example, from extreme values of the noise or from erroneous measurements or incorrect hypotheses about the interpretation of data.

Figure 27D:
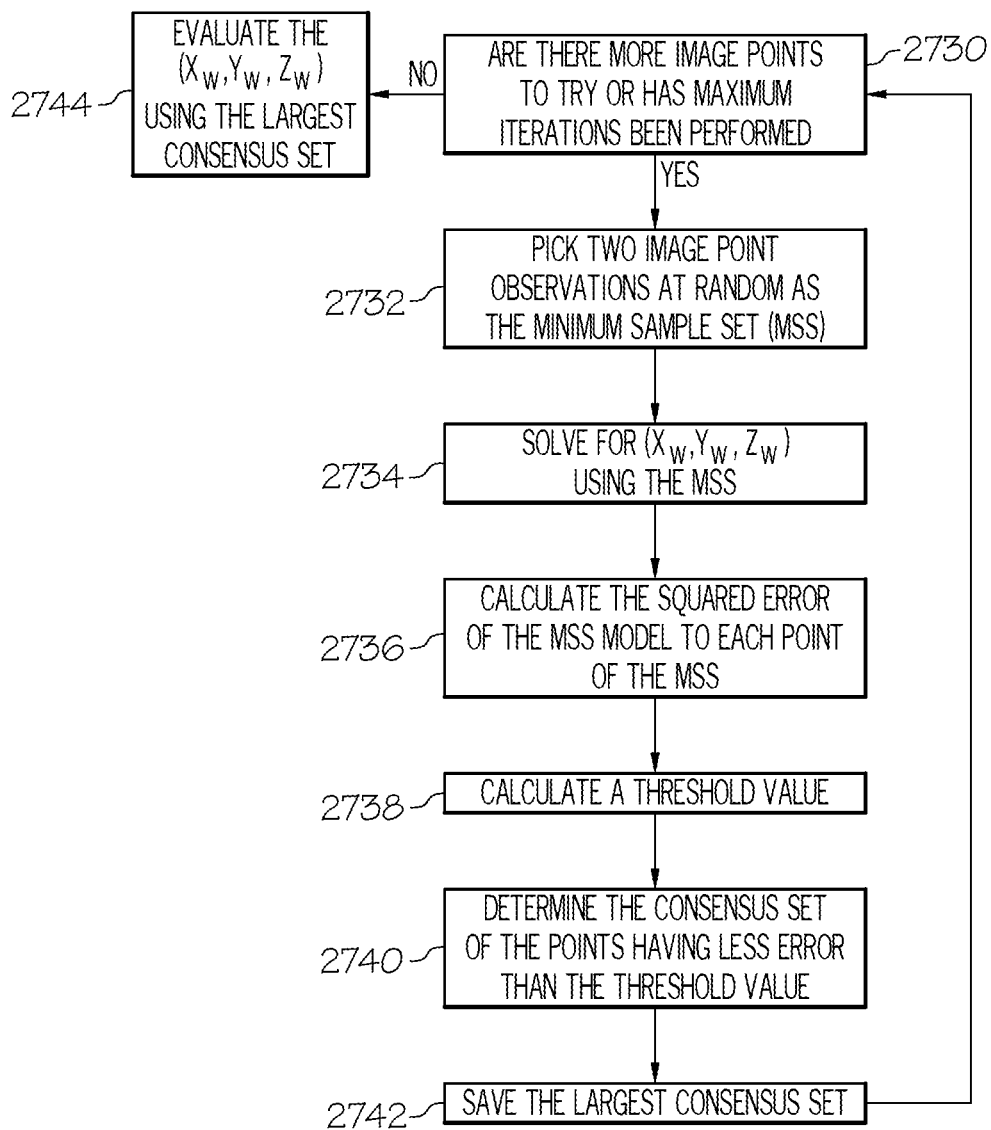
FIG. 27D is a flow chart illustrating steps implemented by the image analysis computer in accordance with the present invention for identifying outlier data.
Figure 27E:
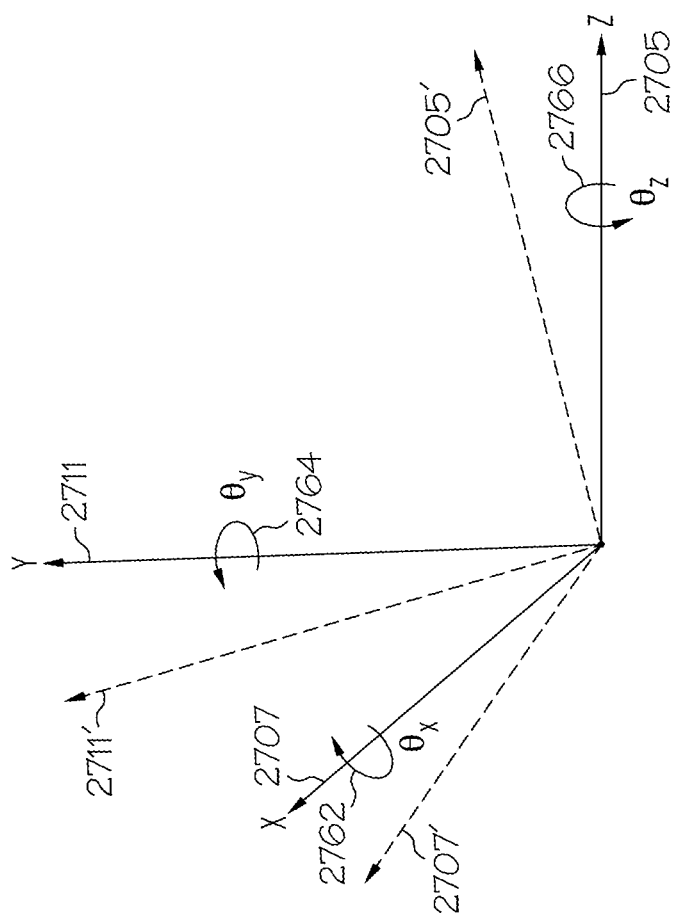
FIG. 27E illustrates relative rotation of a camera coordinate system axes with respect to a world coordinate system axes in accordance with the principles of the present invention.
Figure 27F:
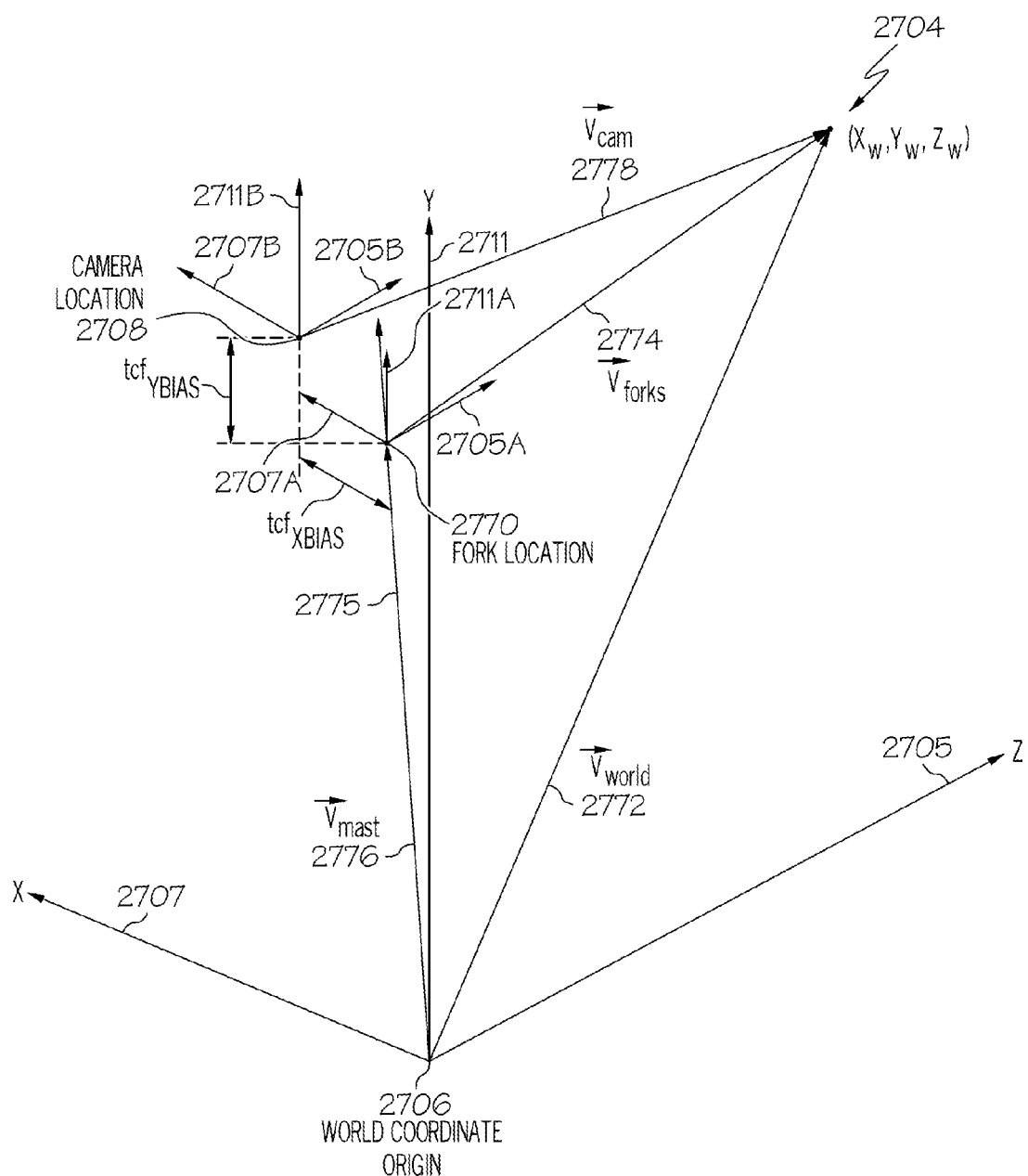
FIG. 27F illustrates a pallet location in the physical world that, in accordance with the principles of the present invention, may be calculated relative to more than one frame of reference.

FIG. 27D depicts a flowchart of an exemplary method of applying RANSAC to the multiple observation image pixel locations used to determine a pallet location ($X_w$, $Y_w$, $Z_w$). Each iteration of the RANSAC method selects a minimum sample set which is then used to identify a respective consensus set of data. By repeating such iterations for different minimum sample sets, more than one consensus set can be identified. Ultimately, the largest consensus set from among the different consensus sets can then be used when performing subsequent calculations.

For a scored candidate object in the ExistingObjectlist, there will be a number of different observation image pixel locations ($x_{col_n}$, $y_{row_n}$) collected from n image frames associated with that particular scored candidate object in the ExistingObjectlist, wherein the actual pixel location corrected for image distortion, as discussed below, is stored in the measurement list of the ExistingObjectlist. In step 2730, the image analysis computer 110 determines if there are more image pixel locations to test or if a predetermined maximum number of iterations have been performed already. Initially, all the different observation image pixel locations, i.e., which comprise actual pallet pixel coordinates corrected for image distortion, are available for selection, so the process continues with step 2732. In step 2732, the image analysis computer 110 randomly selects two of these observation image pixel locations, which can be referred to as a minimum sample set (MSS). The two observation image pixel locations are flagged so that they are not used again in a subsequent iteration. Using the MSS, the image analysis computer 110 solves Equation 28A (or equation 28B or equation 31A), in a least squares manner, for ($X_w$, $Y_w$, $Z_w$), in step 2734. For example, if respective image pixel locations from gray scale images n=3 and n=6 are randomly selected, then Equation 26B is realized as:

$$\begin{bmatrix} -f_x & (x_{col_3}-x_0)\sin\theta_{e_3} & (x_{col_3}-x_0)\cos\theta_{e_3} \\ 0 & (y_{row_3}-y_0)\sin\theta_{e_3}-f_y\cos\theta_{e_3} & (y_{row_3}-y_0)\cos\theta_{e_3}+f_y\sin\theta_{e_3} \\ -f_x & (x_{col_6}-x_0)\sin\theta_{e_6} & (x_{col_6}-x_0)\cos\theta_{e_6} \\ 0 & (y_{row_6}-y_0)\sin\theta_{e_6}-f_y\cos\theta_{e_6} & (y_{row_6}-y_0)\cos\theta_{e_6}+f_y\sin\theta_{e_6} \end{bmatrix}$$

$$\begin{bmatrix} X_w \\ Y_w \\ Z_w \end{bmatrix} = \begin{bmatrix} f_x t_{xbias} \\ f_y(t_{y_3}+t_{ybias}) \\ f_x t_{xbias} \\ f_y(t_{y_6}+t_{ybias}) \end{bmatrix}$$

and can be used, as shown in Equation 28B, for example, to estimate a least-squares solution for ($X_w$, $Y_w$, $Z_w$). This solution can be referred to as the "MSS model" as it is the estimate for ($X_w$, $Y_w$, $Z_w$) using only the MSS. In step 2736, an error value is calculated that is based on the error between each image pixel location in the MSS and the MSS model. In particular, the squared error of each observation image pixel location with the MSS model is calculated. For example, the squared error, $\epsilon_n$, where rotation of the camera coordinate system about only the X-axis is contemplated, may be calculated according to:

$$\epsilon_n = (Z_w(x_{col_{n_2}}-x_0)\cos\theta_{e_n} + Y_w(x_{col_n}-x_0)\sin\theta_{e_n} - X_w f_x - f_x t_{xbias})^2 + (Z_w(y_{row_n}-y_0)\cos\theta_{e_n} + f_y\sin\theta_{e_n}) + Y_w((y_{row_n}-y_0)\sin\theta_{e_n} - f_y\cos\theta_{e_n}) - f_y(t_{y_n}+t_{ybias}))^2 \quad \text{Equation 32A}$$

In the more general case, where the conceptual rotation matrix $[R_{cam}]$ of Equation 30E is used, then the squared error, $\epsilon_n$, may be calculated according to Equation 32B:

$$\epsilon_n = (a_n X_w + b_n Y_w + c_n Z_w - f_x t_{xbias})^2 + (d_n X_w + e_n Y_w + f_n Z_w - f_y(t_{y_n}+t_{ybias}))^2$$

In the specific MSS of this example, two squared error values (i.e., $\epsilon_3$ and $\epsilon_6$) are calculated in step 2736. Using these two squared error values, the standard deviation, $\sigma_\epsilon$, for the two error values is calculated and, in step 2738, the image analysis computer 110 calculates a threshold value, $\delta$, according to:

$$\delta = 1.0\sigma_\epsilon \quad \text{Equation 33}$$

In step 2740, the image analysis computer 110 determines, for this scored candidate object, a respective error for each of the remaining observation image pixels locations not in the MSS by employing Equation 32A (or Equation 32B) and the $X_w, Y_w, Z_w$ values, i.e., the MSS model, determined by way of Equation 28A (or Equation 28B or Equation 31A) using the MSS. The image analysis computer 110 then determines all of the observation image pixel locations, i.e., those not in the MSS, that have an error (according to Equation 32A or 32B) that is less than the threshold $\delta$. The observation image pixel locations which are identified in step 2740 are the consensus set for this particular iteration of the RANSAC method using this particular MSS. If this consensus set is larger than any previously determined consensus set, then it is stored in step 2742 as the largest consensus set. If this consensus set is not larger than any previously determined consensus set, then the largest consensus set that is stored remains stored.

The RANSAC method returns to step 2730 where the image analysis computer 110 determines if there are any more observation image pixel locations to try as the MSS or if the predetermined maximum number of iterations has been performed. For example, the iterations may be limited to about 20, if desired. Eventually, this threshold will be reached or all of the observation image pixel locations will have been selected for inclusion in at least one MSS. Once that happens, the image analysis computer 110 can use the observation image pixel locations in the largest consensus set to solve Equation 28A (or Equation 28B or Equation 31A) for ($X_w$, $Y_w$, $Z_w$) in step 2744. Thus, the solution for the pallet location 2704 may not necessarily use "outlier" observation image pixel locations that would introduce unwanted error into the solution. However, the outlier observation image pixel locations can remain in the record for this scored candidate object in the ExistingObjectlist.

Once the pallet location 2704 is determined, the vehicle computer 50 can control the placement of the forks 42A and 42B so that the forks can engage the pallet 2702, as discussed further below.

The above discussion about the projection of a pallet location 2704 ($X_w$, $Y_w$, $Z_w$) to an observation image pixel location ($x_{col}$, $y_{row}$) uses a simplified model that does not take into consideration distortion that may be introduced by the lens of the imaging camera 130. Thus, a measured image pixel location identified using an actual imaging camera 130 having lens distortion may be at a location 2723 (See FIG. 27C), which is different than if the pallet location 2704 had been projected through an ideal lens undistorted onto the image plane 2712 at point 2718 as was used to develop the equations described above. To account for the potential of lens distortion, the simplified projection model can be expanded. In the simplified projection model, Equation 16 can be rearranged to provide:

$$x_{col} = f_x x'' + x_0 \text{ and } y_{row} = f_y y'' + y_0 \quad \text{Equation 34}$$

where the undistorted camera coordinates are considered to be:

$$x'' = \frac{X_c}{Z_c} \text{ and } y'' = \frac{Y_c}{Z_c}$$

The distortion of a lens may include tangential distortion coefficients ($p_1$, $p_2$) and radial distortion coefficients ($k_1$, $k_2$, $k_3$), which coefficients are defined for a particular camera lens as is well known in the art. One common model to account for lens distortion is to extend the original transformation model, Equation 34, according to:

$$x_{col} = f_x x' + x_0 \text{ and } y_{row} = f_y y' + y_0 \quad \text{Equation 35}$$

where: x' and y' are considered to be the distorted camera coordinates and are related to the undistorted camera coordinates x", y" according to:

$$x'' = x'(1+k_1 r^2+k_2 r^4+k_3 r^6)+2p_1 x'y'+p_2(r^2+2x^2);$$

$$y'' = y'(1+k_1 r^2+k_2 r^4+k_3 r^6)+2p_2 x'y'+p_1(r^2+2y^2); \text{ and}$$

$$r^2 = x'^2 + y'^2$$

When identifying measured image pixel locations and when predicting where an image pixel location may be located in a subsequent image frame, to be discussed below, some of the calculations may occur within the projection model that has been expanded to consider lens distortion and other calculations may occur within the simplified projection model that does not consider lens distortion. With the addition of the expanded projection model there can now be two different types of image pixel locations—undistorted image pixel coordinates and distorted image pixel coordinates. Techniques for translating between distorted and undistorted values may simplify computations and calculations at different steps in the image analysis processes as more fully described below.

An actual gray scale image that is acquired by the imaging camera 130 and analyzed by the image analysis computer 110 involves an actual lens, not an ideal lens. Thus, when the image analysis computer 110 measures and analyzes image pixel locations for a gray scale image or other calculated images derived from the gray scale image, the image pixel coordinates may be in distorted image space. As mentioned above, it may be beneficial to translate those pixel coordinates into the projection model of Equation 34, which can be referred to as undistorted image space. To help distinguish between the pixel coordinates in the two different types of image space, an additional modifier can be added to the subscript for a coordinate location $(x_{col}, y_{row})$. Coordinates for pixel locations in distorted image space (according to Equation 35) can be referred to as $(x_{D-col}, y_{D-row})$ and the coordinates for pixel locations in undistorted image space (according to Equation 34) can be referred to as $(x_{UD-col}, y_{UD-row})$.

To convert undistorted pixel coordinates $(x_{UD-col}, y_{UD-row})$ to distorted image space, Equation 34 is used to determine x" and y" according to:

$$x''=(x_{UD-col}-x_0)/f_x \text{ and } y''=(y_{UD-row}-y_0)/f_y$$

using these values for x" and y", the terms x' and y' of Equation 35 are calculated according to:

$$x''=x'(1+k_1r^2+k_2r^4+k_3r^6)+2p_1x'y'+p_2(r^2+2x'^2)$$

$$y''=y'(1+k_1r^2+k_2r^4+k_3r^6)+2p_2x'y'+p_1(r^2+2y'^2)$$

The above two equations can be rearranged to produce:

$$x' = \frac{1}{(1+k_1r^2+k_2r^4+k_3r^6)}(x''-2p_1x'y'-p_2(r^2+2x'^2))$$

$$y' = \frac{1}{(1+k_1r^2+k_2r^4+k_3r^6)}(y''-2p_2x'y'-p_1(r^2+2y'^2))$$

Each of the above two equations cannot be solved directly but may be solved using an iterative approach that will converge to a respective value for x' and y' wherein:

$$x'(t+1) = \frac{1}{(1+k_1r^2+k_2r^4+k_3r^6)}(x''-2p_1x'(t)y'(t)-p_2(r^2+2x'(t)^2))$$

$$y'(t+1) = \frac{1}{(1+k_1r^2+k_2r^4+k_3r^6)}(y''-2p_2x'(t)y'(t)-p_1(r^2+2y'(t)^2))$$

where t is the index value denoting the iteration. Thus, the left hand sides of the equations are calculated and used in the next iteration in the right hand sides. The iterative process starts (i.e., t=0) with an initial estimate for x'(0) and y'(0) and continues for a number of iterations until the error between successive iterations is sufficiently small. As an example, the error can be the Euclidian distance between two estimates for (x', y'). Thus, the error can be calculated as:

$$\text{error}=\sqrt{((x'(t+1)-x'(t))^2+(y'(t+1)-y'(t))^2)}$$

The iterations continue until the error is smaller than a predetermined threshold value such as, for example, 0.0001.

In one example embodiment, the initial estimate values for the iterative process can be: x'(0)=x" and y'(0)=y".

Once the values for x' and y' are calculated, they can be used in Equation 35 to determine the distorted location coordinates:

$$x_{D-col}=f_x x'+x_0 \text{ and } y_{D-row}=f_y y'+y_0.$$

Conversion of distorted image space pixel coordinates $(x_{D-col}, y_{D-row})$ to undistorted image space pixel coordinates $(x_{UD-col}, y_{UD-row})$ can be accomplished in a similar manner. First, Equation 35 is used to determine x' and y' according to:

$$x'=(x_{D-col}-x_0)/f_x \text{ and } y'=(y_{D-row}-y_0)/f_y$$

using these values for x' and y', the terms x" and y" of Equation 34 are calculated according to:

$$x''=x'(1+k_1r^2+k_2r^4+k_3r^6)+2p_1x'y'+p_2(r^2+2x'^2)$$

$$y''=y'(1+k_1r^2+k_2r^4+k_3r^6)+2p_2x'y'+p_1(r^2+2y'^2)$$

Once the values for x" and y" are calculated, they can be used in Equation 34 to determine the undistorted location coordinates:

$$x_{UD-col}=f_x x''+x_0 \text{ and } y_{UD-row}=f_y y''+y_0$$

Example values for lens distortion coefficients, for a 480×752 pixel image captured using a 5.5 mm focal length lens focused at infinity, can be:

$$k_1=0.1260, k_2=-1.0477, k_3=2.3851, p_1=-0.0056, p_2=-0.0028$$

Example values for lens distortion coefficients, for a 240×376 pixel image captured using a 5.5 mm focal length lens focused at infinity, can be:

$$k_1=0.091604, k_2=-0.235003, k_3=0, p_1=-0.003286, p_2=-0.010984$$

One particular example of converting between distorted and undistorted image space can involve the locating of pallet lower center points for scored candidate objects and then predicting their location and calculating a corresponding prediction window in a subsequent image frame.

Returning to FIG. 25, for each image frame in which the scored candidate object is detected, a respective measured undistorted pixel location value $(x_{UD-col}, y_{UD-row})$ is maintained. As alluded to above, and discussed in more detail below, this value is an actual pixel location measured in a gray scale image by the imaging analysis computer 130 which may be corrected for distortion. A next image frame is to be acquired, in step 2505, such that between the two image frames, the imaging camera has moved a known distance, $t_{diff}$, in the y direction and has not moved in either the x direction or z direction.

In the simplified, or undistorted, projection model, the perspective projection equation (Equation 19A) provides that, in general, a world point is projected to a location on an image plane according to Equation 36A:

$$\begin{bmatrix} u \\ v \\ \xi \end{bmatrix} = [K][R_{cam} | T_{cam}] \begin{bmatrix} X_w \\ Y_w \\ Z_w \\ 1 \end{bmatrix}$$

where:

$$\begin{bmatrix} X_w \\ Y_w \\ Z_w \\ 1 \end{bmatrix}$$

are the homogenous coordinates for a world point located at ($X_W$, $Y_W$, $Z_W$) relative to a world coordinate system origin,

[K] is a 3×3 intrinsic camera matrix;

[$R_{cam}$] is a 3×3 rotation matrix describing the relative orientation of a coordinate system of the camera and the world coordinate system;

[$T_{cam}$] is 3×1 translation vector describing a displacement of the camera origin location between two image frames;

$$\begin{bmatrix} u \\ v \\ \xi \end{bmatrix}$$

are the homogenous coordinates for a projected pixel location on the image plane, which (referring back to Equation 19A) relate to pixel locations ($x_{col}$, $y_{row}$) such that $u = \xi x_{col}$ and $v = \xi y_{row}$; and $\xi$ represents an unknown scale factor that can be estimated as a state variable of a Kalman filter, as explained below.

Equation 36A can be used for two successive image frames in which the camera moves between the acquisition of each frame. As between two successive image frames, a $$\text{translation vector,} = \begin{bmatrix} 0 \\ t_{diff} \\ 0 \end{bmatrix},$$

represents the relative translation of the camera between the two image frames. In other words, if the camera position when the second image frame is acquired is considered as being relative to the camera position when the first image frame is acquired, then the translation vector for the first image frame to be used in Equation 36A is $$T_{cam} = \begin{bmatrix} 0 \\ 0 \\ 0 \end{bmatrix}$$

and the translation vector for the second image frame to be used in Equation 36A is $$T_{cam} = \begin{bmatrix} 0 \\ t_{diff} \\ 0 \end{bmatrix}.$$

Thus, for the first image frame, Equation 36A provides an Equation 36B:

$$\begin{bmatrix} u_1 \\ v_1 \\ \xi_1 \end{bmatrix} = [K] \begin{bmatrix} r_{00} & r_{01} & r_{02} & 0 \\ r_{10} & r_{11} & r_{12} & 0 \\ r_{20} & r_{21} & r_{22} & 0 \end{bmatrix} \begin{bmatrix} X_w \\ Y_w \\ Z_w \\ 1 \end{bmatrix}$$

This equation can be rearranged to provide Equation 36C:

$$[K]^{-1} \begin{bmatrix} u_1 \\ v_1 \\ \xi_1 \end{bmatrix} = \begin{bmatrix} r_{00} & r_{01} & r_{02} & 0 \\ r_{10} & r_{11} & r_{12} & 0 \\ r_{20} & r_{21} & r_{22} & 0 \end{bmatrix} \begin{bmatrix} X_w \\ Y_w \\ Z_w \\ 1 \end{bmatrix}$$

One property of any rotation matrix is that it is orthonormal which means that $[R]^T[R] = 1$. Multiplying both sides by $[R]^T$ and relabeling the left-hand side with the following Equation 36D:

$$\begin{bmatrix} a \\ b \\ c \end{bmatrix} = [K]^{-1} \begin{bmatrix} u_1 \\ v_1 \\ \xi_1 \end{bmatrix}$$

allows Equation 36C to be transformed into Equation 36E:

$$[R_{cam}]^T \begin{bmatrix} a \\ b \\ c \end{bmatrix} = [R_{cam}]^T \begin{bmatrix} r_{00} & r_{01} & r_{02} & 0 \\ r_{10} & r_{11} & r_{12} & 0 \\ r_{20} & r_{21} & r_{22} & 0 \end{bmatrix} \begin{bmatrix} X_w \\ Y_w \\ Z_w \\ 1 \end{bmatrix}$$

which simplifies to Equation 36F:

$$[R_{cam}]^T \begin{bmatrix} a \\ b \\ c \end{bmatrix} = \begin{bmatrix} 1 & 0 & 0 & 0 \\ 0 & 1 & 0 & 0 \\ 0 & 0 & 1 & 0 \end{bmatrix} \begin{bmatrix} X_w \\ Y_w \\ Z_w \\ 1 \end{bmatrix}$$

Because the location of the world point is in the form of homogeneous coordinates (i.e., $$\begin{bmatrix} X_w \\ Y_w \\ Z_w \\ 1 \end{bmatrix}),$$

an equivalent set of homogeneous coordinates for this same world point are also provided by:

$$\begin{bmatrix} \omega X_w \\ \omega Y_w \\ \omega Z_w \\ \omega \end{bmatrix}.$$

Using these equivalent homogeneous coordinates in Equation 36F provides for Equation 36G:

$$[R_{cam}]^T \begin{bmatrix} a \\ b \\ c \end{bmatrix} = \begin{bmatrix} 1 & 0 & 0 & 0 \\ 0 & 1 & 0 & 0 \\ 0 & 0 & 1 & 0 \end{bmatrix} \begin{bmatrix} \omega X_w \\ \omega Y_w \\ \omega Z_w \\ \omega \end{bmatrix}$$

and multiplying out the right-hand side produces Equation 36H:

$$[R_{cam}]^T \begin{bmatrix} a \\ b \\ c \end{bmatrix} = \begin{bmatrix} \omega X_w \\ \omega Y_w \\ \omega Z_w \end{bmatrix}$$

Using the homogenous coordinate representation of the world point that also includes ω, the projection equation for the second image frame is provided by Equation 36I:

$$\begin{bmatrix} u_2 \\ v_2 \\ \xi_2 \end{bmatrix} = [K] \begin{bmatrix} r_{00} & r_{01} & r_{02} & 0 \\ r_{10} & r_{11} & r_{12} & t_{diff} \\ r_{20} & r_{21} & r_{22} & 0 \end{bmatrix} \begin{bmatrix} \omega X_w \\ \omega Y_w \\ \omega Z_w \\ \omega \end{bmatrix}$$

where ω is another unknown scale factor that can be estimated as a state variable of a Kalman filter as described below. Equation 36I in condensed notation can be written as Equation 36J:

$$\begin{bmatrix} u_2 \\ v_2 \\ \xi_2 \end{bmatrix} = [K][R_{cam} \mid T_{cam}] \begin{bmatrix} \omega X_w \\ \omega Y_w \\ \omega Z_w \\ \omega \end{bmatrix}$$

$$\text{where } T_{cam} = \begin{bmatrix} 0 \\ t_{diff} \\ 0 \end{bmatrix}$$

using Equation 36H on the right-hand side of Equation 36J provides Equation 36K:

$$\begin{bmatrix} u_2 \\ v_2 \\ \xi_2 \end{bmatrix} = [K][R_{cam} \mid T_{cam}] \begin{bmatrix} [R_{cam}]^T \begin{bmatrix} a \\ b \\ c \end{bmatrix} \\ \omega \end{bmatrix}$$

The right-hand side of Equation 36K, when multiplied out becomes Equation 36L below. This result relies on the rotation matrix being orthonormal so that the rotation matrix multiplied by its transpose results in an identity matrix.

$$\begin{bmatrix} u_2 \\ v_2 \\ \xi_2 \end{bmatrix} = [K] \begin{bmatrix} \begin{bmatrix} a \\ b \\ c \end{bmatrix} + \omega[T_{cam}] \end{bmatrix} \quad \text{Equation 36L}$$

Equation 36D can be substituted into Equation 36L to provide Equation 36M:

$$\begin{bmatrix} u_2 \\ v_2 \\ \xi_2 \end{bmatrix} = [K][K]^{-1} \begin{bmatrix} u_1 \\ v_1 \\ \xi_1 \end{bmatrix} + \omega[T_{cam}]$$

This equation can be simplified to reveal Equation 36N:

$$\begin{bmatrix} u_2 \\ v_2 \\ \xi_2 \end{bmatrix} = \begin{bmatrix} u_1 \\ v_1 \\ \xi_1 \end{bmatrix} + [K][\omega[T_{cam}]]$$

Thus, Equation 36N provides a model that describes how the projection of a world point will change between successive image frames that are acquired such that the camera moves an amount $t_{diff}$ in the y-direction between the image frames. In particular, the model predicts that the projection location $$\begin{bmatrix} u_2 \\ v_2 \\ \xi_2 \end{bmatrix}$$

for the next image frame can be calculated based on the projection location $$\begin{bmatrix} u_1 \\ v_1 \\ \xi_1 \end{bmatrix}$$

of the previous image frame and the movement, $T_{cam}$, of the imaging camera 130 between the two image frames.

In particular, for $$[K] = \begin{bmatrix} f_x & \gamma & x_0 \\ 0 & f_y & y_0 \\ 0 & 0 & 1 \end{bmatrix},$$

Equation 36N provides $$u_2 = u_1 + \omega \gamma t_{diff} \text{ and } v_2 = v_1 + \omega f_y t_{diff} \quad \text{Equation 37}$$

Thus, Equation 37 reveals that, in undistorted image space, a subsequent state for a projection location can be calculated from the previous state and a value $t_{diff}$. The subsequent state relies on the values for $u_1$, $v_1$, $\gamma$, $\omega$, and $f_3$, and also a current value for $t_{diff}$.

This is the type of system or model with which a Kalman filter can be utilized to estimate the state of the system; in this particular example, the state of the system can include an estimate of the projected location of a scored candidate object being tracked between image frames.

In general, a Kalman filter is a recursive algorithm that operates in real time on a stream of noisy input observation data. In terms of the image analysis system described herein, the observation data for a scored candidate object are the sequence of location coordinates of that scored candidate object as it is identified and tracked through a sequence of images. The Kalman filter also generates a prediction of a future state of the system based on the model underlying the observation data. In terms of the image analysis system described herein, the prediction is performed in step 2504 of FIG. 25 when an unadjusted predicted location for a scored candidate object in a next image frame is calculated. The model's unadjusted predicted location, or preliminary predicted location, is compared to the scored candidate object's actual measured image pixel location for that image frame and this difference is scaled by a factor referred to as the "Kalman Gain". The scaled difference is provided as feedback into the model for the purpose of adjusting the preliminary or unadjusted predicted location and thereby improving subsequent predictions.

At each time step, or iteration, the Kalman filter produces estimates of unknown values, along with their uncertainties. Once the outcome of the next measurement is observed, these estimates are updated using a weighted average, with more weight given to estimates with lower uncertainty. The weights are calculated from the covariance, a measure of uncertainty, of the prediction of the system's state. The result is a new state estimate (or adjusted prediction) that lies in between the unadjusted or preliminary predicted system state and the measured, or observed, system state. In many applications, such as this one, the internal state of the modeled system can include more state variables than just the measurable or observable variables; however, the Kalman filter can be used to estimate all of the state variables. Thus, estimates for the variables $\gamma$, $\omega$, and $f_y$ can be calculated for different iterations of the Kalman filter and their respective values may vary over time such that respective values for $\gamma(t)$, $\omega(t)$, and $f_y(t)$ may be different for different iterations.

The Kalman filter begins with the following matrices: a state-transition model $\Phi$; an observation model H, a covariance of the modeled process noise Q; and a covariance of the observation noise R. The covariance matrices Q and R can be experimentally calculated by making multiple observations and analyzing the resulting data.

Using the conventional index "t" instead of the numerical subscripts of Equation 37 to represent the iterative sequence of the different variables in the Kalman filter, Equation 37 provides two equations that represent the model's current unadjusted prediction of the ($\hat{u}(t)$, $\hat{v}(t)$) projection location of a scored candidate object in undistorted image space in a next image frame based on its previous, estimated state or adjusted predicted projection location (u(t−1), v(t−1)) from a prior image frame where:

$$\hat{u}(t) = u(t-1) + (\omega(t-1)\gamma(t-1)t_{diff})$$

$$\hat{v}(t) = v(t-1) + (\omega(t-1)f_y(t-1)t_{diff})$$

As explained more fully below, there are some variables in the Kalman filter for which a preliminary or unadjusted prediction is calculated and then later adjusted. For a particular iteration of the Kalman filter an unadjusted predicted value for a variable is denoted with a ^ accent mark above the variable symbol. Based on the operation of the Kalman filter, however, this unadjusted predicted value can be adjusted with an updated prediction value and a variable for an adjusted predicted value is denoted by omitting the ^ accent mark above the variable symbol. Not all variables within the Kalman filter are first preliminarily predicted and then adjusted; those variables which are not adjusted may also typically be denoted by omitting the ^ accent mark above the variable name.

As discussed later, $\xi$, the scaling factor from the homogeneous coordinates of previous equations (e.g., Equation 36A) is also included as one of the state variables, or factors, that comprise the Kalman filter. Using these factors, one exemplary set of unadjusted prediction equations for a current unadjusted predicted state $\hat{Z}(t)$ of a Kalman filter can be defined as:

$$[\hat{Z}(t)] = \begin{bmatrix} \hat{u}(t) \\ \hat{v}(t) \\ \hat{\xi}(t) \\ \hat{\omega}(t) \\ \hat{\gamma}(t) \\ \hat{f}_y(t) \end{bmatrix}$$

where:

$\hat{u}(t) = u(t-1) + (\omega(t-1)\gamma(t-1)t_{diff})$ $\hat{v}(t) = v(t-1) + (\omega(t-1)f_y(t-1)t_{diff})$ $\hat{\xi}(t) = \xi(t-1)$ $\hat{\omega}(t) = \omega(t-1)$ $\hat{\gamma}(t) = \gamma(t-1)$ $\hat{f}_y(t) = f_y(t-1)$ As for the initial unadjusted prediction, $[\hat{Z}(1)]$, it can be calculated using an initial state, Z(0), which can be initialized as:

$$Z(0) = \begin{bmatrix} u(0) = x_{OBS}(0) \\ v(0) = y_{OBS}(0) \\ \xi(0) = 1 \\ \omega(0) = 0 \\ \gamma(0) = \gamma \\ f_y(0) = f_y \end{bmatrix}$$

In the initial state, Z(0), the values for $\gamma$ and $f_y$ are from the intrinsic camera matrix [K] which may be calculated according to known camera resectioning techniques as noted above. The coordinates ($x_{OBS}(0)$, $y_{OBS}(0)$) represent the new scored candidate object's measured or observed image location (in undistorted image space) in the initial gray scale image frame in which that new scored candidate object was first identified by the image analysis computer 110.

From these equations, the state transition matrix, [$\Phi(t)$] to be used in the Kalman filter can be determined to be:

$$\Phi(t) = \begin{bmatrix} 1 & 0 & 0 & \gamma(t-1)t_{diff} & \omega(t-1)t_{diff} & 0 \\ 0 & 1 & 0 & f_y(t-1)t_{diff} & 0 & \omega(t-1)t_{diff} \\ 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{bmatrix}$$

Because of the non-linearity of the first two unadjusted prediction equations (i.e., $\hat{u}(t)$ and $\hat{v}(t)$ with respect to the previous estimated state, or adjusted predicted state, of the system (i.e., u(t−1) and v(t−1)), each calculation of the unadjusted predicted state is estimated with a linearized model in the state transition matrix that takes the partial derivative of the state transition equations with respect to the appropriate state variable. For example, to arrive at the first row of the above example state transition matrix, $\Phi(t)$, which corresponds to ($\hat{u}(t)$, the following partial derivatives can be calculated for ($\hat{u}(t)$ to provide the coefficients in the first row of the state transition matrix $\Phi(t)$:

$$\frac{\partial \hat{u}(t)}{\partial u(t-1)} = 1$$

$$\frac{\partial \hat{u}(t)}{\partial v(t-1)} = 0$$

$$\frac{\partial \hat{u}(t)}{\partial \xi(t-1)} = 0$$

$$\frac{\partial \hat{u}(t)}{\partial \omega(t-1)} = \gamma(t-1)t_{diff}$$

$$\frac{\partial \hat{u}(t)}{\partial \gamma(t-1)} = \omega(t-1)t_{diff}$$

$$\frac{\partial \hat{u}(t)}{\partial f_y(t-1)} = 0$$

The remaining elements of the state transition matrix [Φ(t)] are calculated in a similar manner.

As mentioned briefly above, with Kalman filters, a current unadjusted predicted state of a system $\hat{Z}(t)$ is calculated from a previous estimated state of the system Z(t−1) according to the various state transition matrix coefficients. The notation $\hat{Z}(t)$ denotes an unadjusted predicted state estimate of the system that has not been updated with a current observation or measurement at iteration "t". The notation Z(t) denotes an adjusted predicted state estimate that takes into consideration the current observation or measurement at iteration "t".

As mentioned above, the current unadjusted predicted projection location values are (û(t), v̂(t)) and these values represent where a pallet object is predicted to be projected in undistorted image space in the next image frame. However, this current unadjusted predicted projection location is in terms of homogenous coordinates and includes a predicted scaling factor $\hat{\xi}(t)$. To convert the homogenous coordinates to current unadjusted predicted pixel locations (x̂(t),ŷ(t), in the image that are analyzed by the image analysis computer 110, the scale factor is removed by division according to:

$$\hat{x}(t) = \frac{\hat{u}(t)}{\hat{\xi}(t)} \text{ and } \hat{y}(t) = \frac{\hat{v}(t)}{\hat{\xi}(t)}$$

This current unadjusted predicted image pixel location is in undistorted image space and can be converted to distorted image space so that it can be used as the center of the prediction circle for the next image frame (See step 2504 of FIG. 25). In particular, the current unadjusted predicted image pixel location, mapped into distorted image space, is the center of a prediction window for identifying potentially matching new scored candidate objects identified in a next image frame associated with the NewObjectlist. As subsequent frames are acquired, a corresponding current unadjusted predicted pixel location (in distorted pixel coordinates) is calculated and used as the center of the prediction window for each most recent next image frame.

For purposes of the Kalman filter, a "measurement" at iteration "t" is the observed or measured location (i.e., image pixel coordinates) for the new scored candidate object at iteration "t," can be referred to as ($x_{OBS}(t), y_{OBS}(t)$) and is stored in the NewObjectslist. This observed location is an image location in the next frame identified by the image analysis computer 110 (measured in distorted image space and then converted into an undistorted image location) to be the lower center point of the new scored candidate object in the next image frame (i.e., the image frame used in conjunction with the NewObjectlist). Because the Kalman filter predicted variables (û(t), v̂(t)) are a predicted projection location using homogeneous coordinates and the observed, or measured, variable is a pixel location in the image, an observation matrix [H] is constructed that relates the predicted variable (i.e., in homogeneous coordinates) with the measured variable (i.e., in pixel locations in the image frame). Thus, the observation matrix is written in terms of (x̂(t),ŷ(t)) where, from above:

$$\hat{x}(t) = \frac{\hat{u}(t)}{\hat{\xi}(t)} \text{ and } \hat{y}(t) = \frac{\hat{v}(t)}{\hat{\xi}(t)}$$

These two equations are non-linear with respect to the current unadjusted predicted projection location (i.e., (û(t), v̂(t))) and a linearized observation matrix is constructed, similar to the state transition matrix above, by calculating partial derivatives of each equation with respect to the different state variables of the Kalman filter.

In other words, the observation matrix is constructed according to:

$$H(t) = \begin{bmatrix} \frac{\partial \hat{x}(t)}{\partial \hat{u}(t)} & \frac{\partial \hat{x}(t)}{\partial \hat{v}(t)} & \frac{\partial \hat{x}(t)}{\partial \hat{\xi}(t)} & \frac{\partial \hat{x}(t)}{\partial \hat{\omega}(t)} & \frac{\partial \hat{x}(t)}{\partial \hat{\gamma}(t)} & \frac{\partial \hat{x}(t)}{\partial \hat{f}_y(t)} \\ \frac{\partial \hat{y}(t)}{\partial \hat{u}(t)} & \frac{\partial \hat{y}(t)}{\partial \hat{v}(t)} & \frac{\partial \hat{y}(t)}{\partial \hat{\xi}(t)} & \frac{\partial \hat{y}(t)}{\partial \hat{\omega}(t)} & \frac{\partial \hat{y}(t)}{\partial \hat{\gamma}(t)} & \frac{\partial \hat{y}(t)}{\partial \hat{f}_y(t)} \end{bmatrix}$$

These equations provide an observation, or measurement, matrix H(t) for the Kalman filter where:

$$H(t) = \begin{bmatrix} \frac{1}{\hat{\xi}(t)} & 0 & -\frac{\hat{u}(t)}{\hat{\xi}^2(t)} & 0 & 0 & 0 \\ 0 & \frac{1}{\hat{\xi}(t)} & -\frac{\hat{v}(t)}{\hat{\xi}^2(t)} & 0 & 0 & 0 \end{bmatrix}$$

The residual of the Kalman filter, the difference between the observation, or measurement, at iteration "t" (i.e., ($x_{OBS}(t), y_{OBS}(t)$),) and the scaled current unadjusted predicted estimate from $\hat{Z}(t)$ (i.e., (x̂(t),ŷ(t), can be calculated as:

$$[\varepsilon_r(t)] = \begin{bmatrix} x_{OBS}(t) \\ y_{OBS}(t) \end{bmatrix} - \begin{bmatrix} \hat{x}(t) \\ \hat{y}(t) \end{bmatrix}$$

which can also be written as:

$$[\varepsilon_r(t)] = \begin{bmatrix} x_{OBS}(t) \\ y_{OBS}(t) \end{bmatrix} - \begin{bmatrix} \frac{\hat{u}(t)}{\hat{\xi}(t)} \\ \frac{\hat{v}(t)}{\hat{\xi}(t)} \end{bmatrix}$$

As known within Kalman filter techniques, an a priori predicted process covariance matrix can be calculated according to:

$$\hat{P}(t) = \Phi(t)P(t-1)\Phi(t)^T + Q$$

The residual covariance matrix can be calculated according to:

$$S(t) = H(t)\hat{P}(t)H(t)^T + R$$

The optimal Kalman Gain can be calculated according to:

$$G(t) = \hat{P}(t)H(t)^T S(t)^{-1}$$

The updated state estimate, Z(t), can then be calculated according to:

$$Z(t) = \hat{Z}(t) + G(t)[\epsilon_r(t)]$$

This current adjusted predicted state estimate Z(t) will have an updated prediction for the values (u(t), v(t)) which are considered to be the estimated values for these state variables to be used in a next iteration of the Kalman filter. The updated state estimate Z(t) will also have updated prediction values, or estimated values, for the other four state variables ω(t), γ(t), ξ(t), and $f_y(t)$ to also be used in the next iteration of the Kalman filter. In addition to storing the updated Kalman filter state (i.e., Z(t)) in the ExistingObjectlist for the new scored candidate object, the measured pixel location coordinates in undistorted image space (i.e., ($x_{OBS}$, $y_{OBS}$)) may be added as the next undistorted pixel location in the sequence of undistorted pixel locations stored in ExistingObjectlist for this particular scored candidate object. As described earlier, it is this sequence of undistorted pixel locations in an ExistingObjectlist record for a particular scored candidate object that are used in Equation 28A (or Equation 28B or Equation 31A) to calculate a pallet vector ($X_w$, $Y_w$, $Z_w$) for the scored candidate object.

The adjusted, a posteriori, process covariance matrix can be calculated according to:

$$P(t) = (1 - G(t)H(t))\hat{P}(t)$$

As for initializing the Kalman filter, P(0) can be a 6×6 identity matrix, Q can be a 6×6 matrix with every element=0, and R can be a 2×2 diagonal matrix with each diagonal element=0.001.

Figure 28:
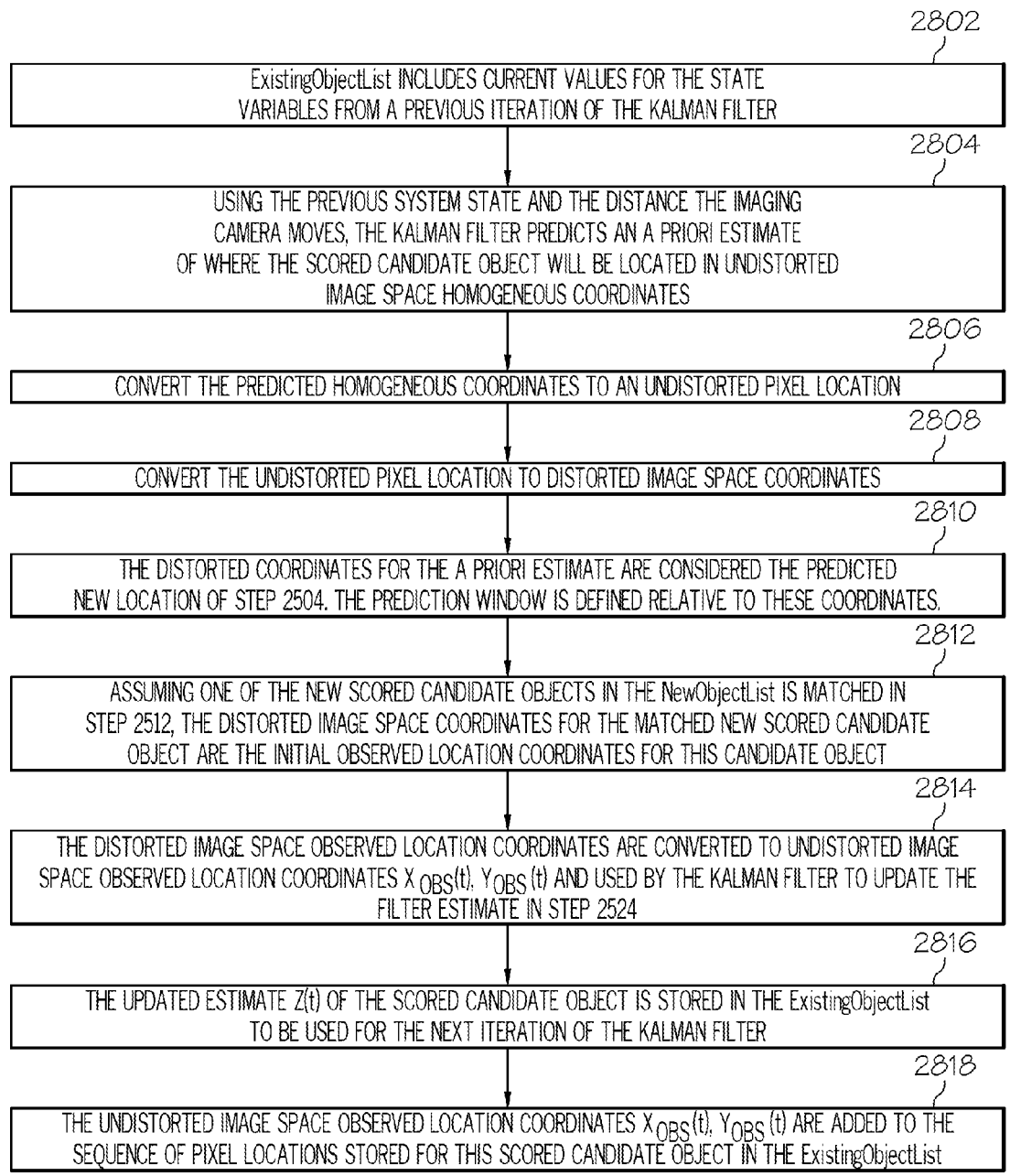
FIG. 28 is a flow chart illustrating steps implemented by the image analysis computer in accordance with the present invention for predicting state variables using a Kalman filter.

FIG. 28 is a flowchart of an exemplary process highlighting further details of portions of the process of FIG. 25. As mentioned above, the Kalman filter operates in undistorted image space with a current state estimate, or updated predicted projection locations, u(t), v(t) from the previous iteration of the Kalman filter.

For clarity, two particular image frames are selected to describe the operation of the process of FIG. 28 with respect to a particular one of the possible scored candidate objects in the ExistingObjectlist. If, for example, the prior image frame is n=4 and the next image frame is n=5, then the ExistingObjectlist will include the sequence of previously determined corrected actual/measured image pixel locations, in undistorted image space, for this scored candidate object. For example, the most recent corrected actual image pixel location for this scored candidate object in the ExistingObjectlist has coordinates ($x_{UD-col_4}$, $y_{UD-row_4}$). In addition, as shown in step 2802, the ExistingObjectlist will also store the current, adjusted predicted state variable values as calculated by the immediately previous iteration of the Kalman filter. In other words, for image frame n=4, the ExistingObjectlist stores (in terms of the Kalman filter variables, a current estimated state of the system state variables (u(t−1), v(t−1)), wherein the location values (u(t−1), v(t−1)) are defined by the updated predicted projection location values (u(t), v(t)) from the previous iteration of the Kalman filter.

In step 2804, the image analysis computer 110 implementing the Kalman filter, may use this current estimated state (u(t−1), v(t−1)) and the amount of camera movement $t_{diff}$ between image frames to calculate a current unadjusted predicted estimate $\hat{Z}(t)$. This prediction represents what the underlying physical model predicts (without any type of adjustment) the projection location (e.g., (û(t), v̂(y)) of the world point ($X_w$, $Y_w$, $Z_w$) in the next image frame (i.e., image frame n=5) will be because of the camera movement $t_{diff}$ that occurred between the two image frames.

The homogeneous coordinate values of the unadjusted predicted projection location (û(t), v̂(t)) are scaled, in step 2806, by dividing by $\hat{\xi}(t)$ to determine a corresponding unadjusted predicted pixel location (x̂(t), ŷ(t)) in the next image frame (i.e., frame n=5). This unadjusted predicted pixel location is in undistorted image space, and is converted, in step 2808, to distorted image pixel coordinates. These distorted image pixel coordinates are considered the scored candidate object's unadjusted predicted new pixel location (in distorted image space) in the next image frame n=5, as shown in step 2504 of FIG. 25. In step 2810, the unadjusted predicted new location and the prediction window are defined in image frame n=5 with reference to these distorted pixel coordinates.

Assuming that in step 2512 of FIG. 25, that a new scored candidate object in image frame n=5 is identified, located, and matched with this particular existing candidate object from the ExistingObjectlist, then that new scored candidate object will have an observed, or measured, image pixel location in distorted image space in image frame n=5 of $$(x_{D-col_5}, y_{D-row_5})$$

The image analysis computer 110, in step 2812, considers this image pixel location as the uncorrected measurement location for this scored candidate object to be used in the current iteration of the Kalman filter.

In step 2814, the image analysis computer corrects, or converts, the distorted image pixel location coordinates ($x_{D-col_5}$, $y_{D-row_5}$) into measured undistorted image location coordinates ($x_{UD-col_5}$, $y_{UD-row_5}$). These measured undistorted image location coordinates ($x_{UD-col_5}$, $y_{UD-row_5}$) are considered as the current measurement ($x_{OBS}(t)$, $y_{OBS}(t)$), and are compared to the unadjusted predicted pixel location (x̂(t), ŷ(t)), for frame n=5 by the Kalman filter to calculate the residual, [$\epsilon_r(t)$], and to update the state of the filter, as shown in step 2524 of FIG. 25.

Once the state of the Kalman filter is updated, the adjusted prediction, or estimated state, Z(t) will have adjusted prediction values for (u(t), v(t)) as well as for the other state variables for the new scored candidate object. There will also be an adjusted process covariance matrix P(t). These adjusted prediction values for (u(t), v(t)) are what the Kalman filter indicates are the current estimated values for these state variables that are to be used in the preliminary, or unadjusted, prediction during the next iteration of the Kalman filter. Thus, in step 2816, the image analysis computer 110 stores this adjusted prediction, or estimated state, Z(t) for this scored candidate object in the ExistingObjectlist.

In addition to storing the updated Kalman filter state in the ExistingObjectlist for the scored candidate object, the measured pixel location coordinates in undistorted image space (i.e., ($x_{OBS}$, $y_{OBS}$)) may then be added, in step 2818, as the next undistorted pixel location in the sequence of undistorted pixel locations stored in ExistingObject list for this particular scored candidate object.

It is these undistorted image pixel coordinates ($x_{OBS}$, $y_{OBS}$) that are stored as the corrected actual undistorted coordinates ($x_{UD-col_5}$, $y_{UD-row_5}$) for the object's location in image frame n=5. As mentioned above, it is the sequence of these undistorted coordinates that are used by other processes to periodically calculate a pallet vector ($X_W$, $Y_W$, $Z_W$) for the scored candidate object.

Application of the Kalman filter is repeatedly applied in a similar manner as this scored candidate object is tracked through subsequent image frames n=6, 7, 8, . . . .

The above description of acquiring images, tracking objects, and estimating a pallet vector assumes that the vehicle 20 is stationary while the carriage apparatus 40 with the imaging camera 130 travels up and down in the Y direction. However, even if the vehicle 20 is moving during a lift operation, this movement can be accounted for.

In particular, the vehicle 20 can move in the X direction (i.e., lateral to a pallet face) and the Z direction (i.e., towards or away from a pallet face) but it is presumed that the vehicle 20 does not move in the Y direction (i.e., float up or down). Also, the vehicle 20 is presumed not to rotate about the X axis (i.e., tilt forwards or back), presumed not to rotate about the Z axis (i.e., tilt side-to-side), and presumed to be able to rotate about the Y axis (i.e., adjust how square the vehicle 20 is relative to the pallet face).

Under the previous assumption of no vehicle movement, the origin of the physical world coordinate system was considered a constant. Thus, there were a series of image point pallet locations ($c_{col_n}$, $y_{row_n}$) which were different observations of the same physical world pallet location ($X_w$, $Y_w$, $Z_w$) and the index n referred to the image frame number. However, under the presumption that the vehicle may move between image frames, the location in physical world coordinates ($X_{w_n}$, $Y_{w_n}$, $Z_{w_n}$) now also includes the index value n because the coordinates in the physical world are relative to a world coordinate system origin, $O_n$, at a time when image frame n is acquired. For example, the world coordinate system origin, $O_n$, may be located on the frame of the vehicle 20. If between image frame n and image frame n+1 the vehicle 20 moves, then this origin, $O_n$, moves and the location 2704 of the pallet 2702 in the physical world will have coordinates ($X_{w_{n+1}}$, $y_{w_{n+1}}$, $Z_{w_{n+1}}$) relative to the world coordinate system origin, $O_{n+i}$, at a time that the image frame n+1 is acquired.

The concepts relating to transformation between two different coordinate systems have been described above with respect to Equations 15 and 21, which, applying these techniques in the context of movement of the truck 20 between images, provide $$\begin{bmatrix} X_{w_n} \\ X_{Y_n} \\ Z_{w_n} \end{bmatrix} = [R_{truck}]_{3\times 3} \begin{bmatrix} tt_{x_n} \\ tt_{y_n} \\ tt_{z_n} \end{bmatrix} \begin{bmatrix} X_{w_{(n-1)}} \\ Y_{w_{(n-1)}} \\ Z_{w_{(n-1)}} \\ 1 \end{bmatrix} \quad \text{Equation 38A}$$

which in homogenous coordinates is $$\begin{bmatrix} X_{w_n} \\ X_{Y_n} \\ Z_{w_n} \\ 1 \end{bmatrix} = \begin{bmatrix} [R_{truck_n}]_{3\times 3} & tt_{x_n} \\ & tt_{y_n} \\ & tt_{z_n} \\ 0 \quad 0 \quad 0 & 1 \end{bmatrix} \begin{bmatrix} X_{w_{(n-1)}} \\ Y_{w_{(n-1)}} \\ Z_{w_{(n-1)}} \\ 1 \end{bmatrix} \quad \text{Equation 38B}$$

where:

($X_{w_n}$, $Y_{w_n}$, $Z_{w_n}$) are the physical world coordinates of the scored candidate object relative to the world coordinate system origin location, $O_n$, when image frame n is acquired;

($X_{w_{(n-1)}}$, $Y_{w_{(n-1)}}$, $Z_{w_{(n-1)}}$) are the physical world coordinates of the scored candidate object relative to the world coordinate system origin location, $O_{n-1}$, when image frame n−1 is acquired;

$[R_{truck_n}]_{3\times 3}$ is the rotation matrix based on the rotation of the respective world origins between image frame n−1 and image frame n (i.e., the rotation of the vehicle 20 around the Y axis, $\theta_{y_n}$); and $$\begin{bmatrix} tt_{x_n} \\ tt_{y_n} \\ tt_{z_n} \end{bmatrix}$$

is the translation matrix based on the movement of the respective world origins between image frame n−1 and image frame n (i.e., the movement in the position of the vehicle 20 between the two image frames).

The amount that the vehicle 20 rotates or moves between frames can be measured, or calculated, by various sensors in communication with the vehicle computer 50. For example, a steering angle sensor can be coupled with a steering control mechanism of the vehicle 20 to provide the angle $\theta_{y_n}$ used in the rotation matrix of Equation 38B. Additionally, odometry data from wheel rotation sensors, or similar sensors and data from the steering angle sensor, can be used to calculate the translational movement of the vehicle 20, i.e., can be used to determine movement along the X and Z directions. The vehicle computer 50 can then communicate with the image analysis computer 110 to provide the appropriate information.

Equation 38B can be written as Equation 38C:

$$\begin{bmatrix} X_{w_n} \\ Y_{w_n} \\ Z_{w_n} \\ 1 \end{bmatrix} = [F_{truck_n}] \begin{bmatrix} X_{w_{(n-1)}} \\ Y_{w_{(n-1)}} \\ Z_{w_{(n-1)}} \\ 1 \end{bmatrix}$$

where, $[F_{truck_n}]$, given the presumptions about how the vehicle 20 can move between image frames, is:

$$[F_{truck_n}] = \begin{bmatrix} \cos\theta_{y_n} & 0 & \sin\theta_{y_n} & tt_{x_n} \\ 0 & 1 & 0 & 0 \\ -\sin\theta_{y_n} & 0 & \cos\theta_{y_n} & tt_{z_n} \\ 0 & 0 & 0 & 1 \end{bmatrix}$$

Rearranging Equation 38C can be accomplished to provide $$[F_{truck_n}^{-1}] \begin{bmatrix} X_{w_n} \\ Y_{w_n} \\ Z_{w_n} \\ 1 \end{bmatrix} = \begin{bmatrix} X_{w_{(n-1)}} \\ Y_{w_{(n-1)}} \\ Z_{w_{(n-1)}} \\ 1 \end{bmatrix} \quad \text{Equation 38D}$$

wherein the noted inverse matrix is given by:

$$[F_{truck_n}^{-1}] = \begin{bmatrix} \cos\theta_{y_n} & 0 & -\sin\theta_{y_n} & \sin\theta_{y_n} tt_{z_n} + \dfrac{(\sin\theta_{y_n} - 1)tt_{x_n}}{\cos\theta_{y_n}} \\ 0 & 1 & 0 & 0 \\ \sin\theta_{y_n} & 0 & \cos\theta_{y_n} & -(\cos\theta_{y_n} tt_{z_n} + \sin\theta_{y_n} tt_{x_n}) \\ 0 & 0 & 0 & 1 \end{bmatrix}$$

Under the presumption that the vehicle 20 may now move between image frames, Equation 19A can be augmented by adding appropriate subscripts to the different variables to provide Equation 39A:

$$\lambda \begin{bmatrix} x_{col_{(n-1)}} \\ y_{row_{(n-1)}} \\ 1 \end{bmatrix} = [K][R_{cam} \mid T_{cam_{(n-1)}}] \begin{bmatrix} X_{w_{(n-1)}} \\ Y_{w_{(n-1)}} \\ Z_{w_{(n-1)}} \\ 1 \end{bmatrix}$$

Equation 39A relates a physical world location ($X_{w_{(n-1)}}$, $Y_{w_{(n-1)}}$, $Z_{w_{(n-1)}}$), up to a scale factor $\lambda$, with a gray scale image pixel location ($x_{col_{(n-1)}}$, $y_{row_{(n-1)}}$). Substitution of the left side of Equation 38D into the right side of Equation 39A will yield Equation 39B:

$$\lambda \begin{bmatrix} x_{col_{(n-1)}} \\ y_{row_{(n-1)}} \\ 1 \end{bmatrix} = [K][R_{cam} \mid T_{cam_{(n-1)}}][F^{-1}_{truck_n}] \begin{bmatrix} X_{w_n} \\ Y_{w_n} \\ Z_{w_n} \\ 1 \end{bmatrix}$$

which provides the previous image location point ($x_{col_{(n-1)}}$, $y_{row_{(n-1)}}$) in terms of a physical world location ($X_{w_n}$, $Y_{w_n}$, $Z_{w_n}$) relative to a new world coordinate system origin, $O_n$, at the time the image frame n is acquired. An equivalent Equation 39B can be written for any of the previous image location points. For example, Equation 39B can be written as:

$$\lambda \begin{bmatrix} x_{col_{(n-2)}} \\ y_{row_{(n-2)}} \\ 1 \end{bmatrix} = [K][R_{cam} \mid T_{cam_{(n-2)}}][F^{-1}_{truck_{(n-1)}}] \begin{bmatrix} X_{w_{(n-1)}} \\ Y_{w_{(n-1)}} \\ Z_{w_{(n-1)}} \\ 1 \end{bmatrix} \quad \text{Equation 39C}$$

and substituting Equation 38D into Equation 39C provides Equation 39D:

$$\lambda \begin{bmatrix} x_{col_{(n-2)}} \\ y_{row_{(n-2)}} \\ 1 \end{bmatrix} = [K][R_{cam} \mid T_{cam_{(n-2)}}][F^{-1}_{truck_{(n-1)}}][F^{-1}_{truck_n}] \begin{bmatrix} X_{w_n} \\ Y_{w_n} \\ Z_{w_n} \\ 1 \end{bmatrix}$$

Thus, Equations 39C and 39D can be generalized as Equation 39E:

$$\lambda \begin{bmatrix} x_{col_{(n-N)}} \\ y_{row_{(n-N)}} \\ 1 \end{bmatrix} = [K][R_{cam} \mid T_{cam_{(n-N)}}]\left( \prod_{k=N...1} [F^{-1}_{truck_{(n-k+1)}}] \right) \begin{bmatrix} X_{w_n} \\ Y_{w_n} \\ Z_{w_n} \\ 1 \end{bmatrix}$$

This Equation allows any previous image location coordinates ($x_{col_{(n-N)}}$, $y_{row_{(n-N)}}$) from image frame (n-N) to be expressed in terms of a physical world location ($X_{w_n}$, $Y_{w_n}$, $Z_{w_n}$) relative to the new world coordinate system origin, $O_n$, at the time the image frame n is acquired. "N" corresponds to a desired previous image frame and is equal to the number of frames it is located prior to current frame "n." In Equation 39E, the multiplication series is performed from k=N to k=1.

Equation 39E is similar in structure to Equation 19A, which from above:

$$\lambda \begin{bmatrix} x_{col} \\ y_{row} \\ 1 \end{bmatrix} = [K][R_{cam} \mid T_{cam}] \begin{bmatrix} X_w \\ Y_w \\ Z_w \\ 1 \end{bmatrix} \quad \text{Equation 19A}$$

Thus, a cross-product equation similar to Equation 20 can be written as Equation 40:

$$\begin{bmatrix} x_{col_{(n-N)}} \\ y_{row_{(n-N)}} \\ 1 \end{bmatrix} \times [K][R_{cam} \mid T_{cam_{(n-N)}}]\left( \prod_{k=N...1} [F^{-1}_{truck_{(n-k+1)}}] \right) \begin{bmatrix} X_{w_n} \\ Y_{w_n} \\ Z_{w_n} \\ 1 \end{bmatrix} = 0$$

In Equation 20A, the extrinsic camera matrix $[R_{cam} \mid T_{cam}]$ is a 3×4 matrix. In Equation 40, a similar but more complex 3×4 extrinsic camera matrix $$[R_{cam} \mid T_{cam_{(n-N)}}]\left( \prod_{k=N...1} [F^{-1}_{truck_{(n-k+1)}}] \right)$$

is present as well, but Equation 40 is conceptually the same as Equation 20A. Thus, similar to how Equation 20A was manipulated to produce two linear equations in Equation 23, Equation 40 can also be manipulated to produce two similar, but more complex, linear equations as well. In particular, the two linear equations will provide equations that relate an image pixel location, ($x_{col_{(n-N)}}$, $y_{row_{(n-N)}}$), for an image frame n-N, to physical world location coordinates ($X_{w_n}$, $Y_{w_n}$, $Z_{w_n}$) of a physical object relative to the world coordinate system origin, $O_n$, when the image frame n is acquired. This is true even though that same physical object had different physical world location coordinates ($X_{w_{(n-N)}}$, $Y_{w_{(n-N)}}$, $Z_{w_{(n-N)}}$) relative to the world coordinate system origin, $O_{(n-N)}$, when the image frame (n-N) is acquired. As described before, with respect to Equation 25A and Equation 26A, these pairs of linear equations can be collected, respectively, for multiple observations of the physical object so that a pallet vector ($X_{w_n}$, $Y_{w_n}$, $Z_{w_n}$) can be calculated that may represent, for example, the location of the lower center point of a physical pallet relative to the world coordinate system origin, $O_n$, when the image frame n is acquired. As discussed above, an encoder may be provided to generate pulses to the vehicle computer 50 in response to movement of the fork carriage apparatus 40 relative to the third weldment 36. The world coordinate origin, $O_n$, when the image frame n is acquired, is fixed relative to the third weldment so as to allow the vehicle computer 50 to determine the linear displacement of the imaging camera 130 and the forks 42A and 42B relative to the world coordinate origin, $O_n$, when the image frame n is acquired. Hence, the location of the imaging camera 130 and the forks 42A and 42B relative to the world coordinate origin, $O_n$, when the image frame n is acquired, can be provided by the vehicle computer 50 to the image analysis computer 110. This pallet vector can then be used by vehicle computer 50 to guide the forks 42A and 42B to engage the physical pallet.

As described above, the image analysis computer 110 identifies and tracks a number of scored candidate objects through a series of images. A respective record for each scored candidate object is maintained in the ExistingObjectlist. A corresponding record for a particular scored candidate object can include, among other values, the current position ($X_W$, $Y_W$, $Z_W$) of the scored candidate object as well as the composite object score, $Score_{Object}$, for the scored candidate object. The corresponding record for a scored candidate object can also include a value $Tag_{Object}$ that, as discussed below, can be associated with a cutout, but is more generally associated with a thread of matched objects, where the cutout is defined as the height where the forks 42A and 42B are to stop at a pallet. Cutouts themselves have a tag, $Tag_{cutout}$. Cutouts are updated whenever certain conditions, described below, of a scored candidate object are met or when $Tag_{Object}$ equals $Tag_{cutout}$.

The $Y_W$ coordinate can be used to refer to the scored candidate object's height in the physical world where the vehicle 20 operates. Using this information for all of the scored candidate objects, the image analysis computer can calculate cutout location information, discussed below, that can be communicated to the vehicle computer 50 for use in controlling operations such as, for example, fork placement and movement. For example, once a scored candidate object has been identified in two different image frames that were respectively acquired by the imaging camera 130 when the vehicle forks 42A and 42B were at different heights, a pallet vector, or current position, ($X_W$, $Y_W$, $Z_W$) of the scored candidate object relative to the world coordinate origin 2706 can be estimated. As discussed above, an encoder may be provided to generate pulses to the vehicle computer 50 in response to movement of the fork carriage apparatus 40 relative to the third weldment 36, which is fixed relative to the world coordinate origin 2706, so as to allow the vehicle computer 50 to determine the linear displacement along the length of the mast assembly 30 of the forks 42A and 42B and the imaging camera 130. Hence, the location of the forks 42A and 42B relative to the world coordinate origin 2706 can be provided by the vehicle computer 50 to the image analysis computer 110. Because the vehicle computer 50 provides the image analysis computer 110 with the value $t_y$, the imaging analysis computer 110 can determine the location of the imaging camera 130 relative to the world coordinate origin 2706 by summing the values of $t_y$ and $t_{ybias}$. As described below, the pallet vectors for the scored candidate objects within a current field of view of the imaging camera 130 can be used, by the image analysis computer 110, to calculate "cutouts," i.e., a height of fork receiving openings 210 and 212 within a pallet relative to the world coordinate origin 2706, at which the forks 42A and 42B are to stop. The image analysis computer 110 can then periodically send this cutout location information to the vehicle computer 50. For example, the cutout location information can be communicated every time it is updated or a message with the cutout information can be communicated on a predetermined periodic schedule.

As noted above, in operation, an operator raises the forks 42A and 42B vertically in the Y-direction via actuation of the multifunction controller 14 to a position above the last pallet P which is to be ignored. Then, while the forks 42A and 42B are still moving, the operator actuates the trigger switch 140. Independent of the actuation of the trigger switch 140, the image analysis computer 110 causes the imaging camera 130 to take image frames, such as at a rate of 10-30 fps (frames/second), as the fork carriage apparatus 40 continues to move vertically. The image analysis computer 110 analyzes the images, identifies one or more objects in the image frames, determines which of the one or more objects most likely comprises a pallet, tracks the one or more objects in a plurality of image frames, determines the locations of the one or more objects relative to the world coordinate origin 2706 and generates and transmits object location information, in the form of cutout location values, to the vehicle computer 50. After receiving such cutout location values, the vehicle computer 50 controls the fork movement such that it automatically stops the forks, once the trigger switch 140 is actuated, at a new first current stop height or cutout location value.

It is noted that one or more heights or cutout location values at which the forks can be automatically stopped can be calculated by the image analysis computer 110. For example, a new first stop height can be associated with a scored candidate object that has a vertical height that is closest to the present fork height of the vehicle 20. Also, there may be additional stop heights calculated that respectively correspond to scored candidate objects above the new first stop height.

As mentioned, these stop heights can be conveniently referred to as "cutouts" or "cutout location values" and the image analysis computer 110 may, for example, calculate three different cutouts (or more or less) that respectively correspond to a first scored candidate object near the current fork position, a second scored candidate object above the first scored candidate object, and a third scored candidate object above the second scored candidate object. In particular, as described in more detail below, a cutout can be set equal to, or otherwise calculated from, the current $Y_W$ value that is associated with a scored candidate object from its record in the ExistingObjectlist. Accordingly, each cutout is inherently associated with a particular scored candidate object that was used to set that particular cutout value. As mentioned above, each scored candidate object also has a tag value, $Tag_{Object}$, in its record in the ExistingObjectlist. Therefore, in addition to merely maintaining one or more cutout values, each cutout value also has a corresponding tag value, $Tag_{Cutout}$, that is equal to the $Tag_{Object}$ value of the scored candidate object that was used to set the cutout value.

FIGS. 29A-29F depict flowcharts of an exemplary method for calculating cutouts in accordance with the principles of the present invention. As mentioned above, one or more of the cutout location values may then be used by the vehicle computer 50 along with the trigger switch 140 to control movement of the forks 42A and 42B. In particular, operator actuation of the trigger switch 140 while the forks 42A and 42B are being raised will cause the vehicle computer 50 to, first, slow the speed at which the forks 42A and 42B are rising (e.g., to about 14 inches/second) and, secondly, cause the forks 42A and 42B to stop at a new first stop height or cutout location value that was provided by the image analysis computer 110, as will be discussed below with regards to step 2982. As explained below with respect to the method of FIGS. 29A-29F, this new first cutout location value is an adjusted cutout value calculated by the imaging analysis computer 110 to be closest to, and greater than, a current height of the forks 42A and 42B.

Initially, in step 2902, the image analysis computer 110, as part of its initialization steps to begin image acquisition, object locating, and object tracking, also initializes all cutouts to equal zero. Secondly, there is an adjusted cutout value, described below, that the image analysis computer uses to adjust the first cutout value to a new first cutout location value and this is initialized to zero as well. The adjusted cutout value defining the new first cutout location value is equal to an estimated height of the first cutout value plus 1.5 inches in the illustrated embodiment relative to the world coordinate origin and is based on the $Y_w$ coordinate of a pallet vector ($X_w$, $Y_w$, $Z_w$) of a corresponding scored candidate object whose values are also relative to the world coordinate origin. (See, for example, pallet location 2704 of FIG. 27A. The additional amount of 1.5 inches in the illustrated embodiment corresponds to 3 inch high fork receiving openings 210 and 212 and is added to the cutout location value so as to ensure that the forks 42A and 42B enter the fork receiving openings 210 and 212 and don't contact the bottom pallet board 200. Also, a counter is initialized wherein the counter has a value that reflects a certainty, or confidence, of whether an adjustment should be made to the first cutout value to arrive at an adjusted cutout value that is communicated to the vehicle computer 50. Additionally, other values used throughout the process of FIGS. 29A-29F are initialized as well in step 2902. As noted above, in operation, the vehicle computer 50 moves the truck forks based on the control input by an operator via the multifunction controller 14. This fork movement is depicted in the flowchart as step 2904 and at a given moment in time the forks are at a particular "fork height". The vehicle computer 50 can communicate this information to the image analysis computer 110 to allow the image analysis computer 110 to perform the cutout calculations described below.

As noted above, initially, all the cutout values equal zero. However, as described below, a cutout value is eventually set equal or nearly equal to the height (e.g., the $Y_W$ coordinate) of a particular scored candidate object. As mentioned, the image analysis computer 110 can maintain a plurality of cutouts. In the example flowcharts of FIGS. 29A-29F, three cutouts are maintained. The first cutout relates to a current cutout height or current cutout location value and the second and third cutouts relate to cutout heights above the first cutout.

Once the image analysis computer 110 has pallet vectors available for one or more scored candidate objects, the computer 110 knows the distance in the Y direction for those one or more scored candidate objects relative to the world coordinate origin. Once the computer 110 knows the height of the one or more scored candidate objects relative to the world coordinate origin, the subsequent steps of the process of FIGS. 29A-29F will set one or more of the three cutout values based on those various scored candidate objects. Once the forks 42A and 42B of the vehicle are raised above a current first cutout location value (e.g., cutout[0]), the current first cutout value is no longer needed and the second cutout location value can become the first cutout value. In turn, the second cutout value can be set to equal the third cutout location value and the third cutout value is initialized to be equal to zero. As described later (in step 2946), the third cutout can be set to a new value under certain circumstances as well. In this way, the image analysis computer 110 may maintain three cutout values but they can be updated to ensure that all three cutout values are above the current height of the forks 42A and 42B. Because there can be some uncertainty in a scored object's actual height (e.g., its $Y_W$ coordinate), the image analysis computer 110 can check to see if the first cutout value is less than the current fork height minus a small amount, e.g., ("fork height"—1.5 inches (the "put-to-center value")) rather than determining if the first cutout value is less than precisely the current "fork height". Based on this determination, in step 2906, the image analysis computer 110 can shift the cutout values, in step 2908, as described above or proceed directly to step 2910. The counter that was initialized in step 2902 was associated with a confidence in the current first cutout value. Thus, once the current first cutout value is discarded and replaced with the current second cutout value in step 2908, this counter is re-initialized as well. Also, in step 2908, the corresponding tag values (e.g., $\text{Tag}_{cutout}[k]$) of the different cutouts can be shifted left similar to the way the cutout values were shifted.

Figure 29A:
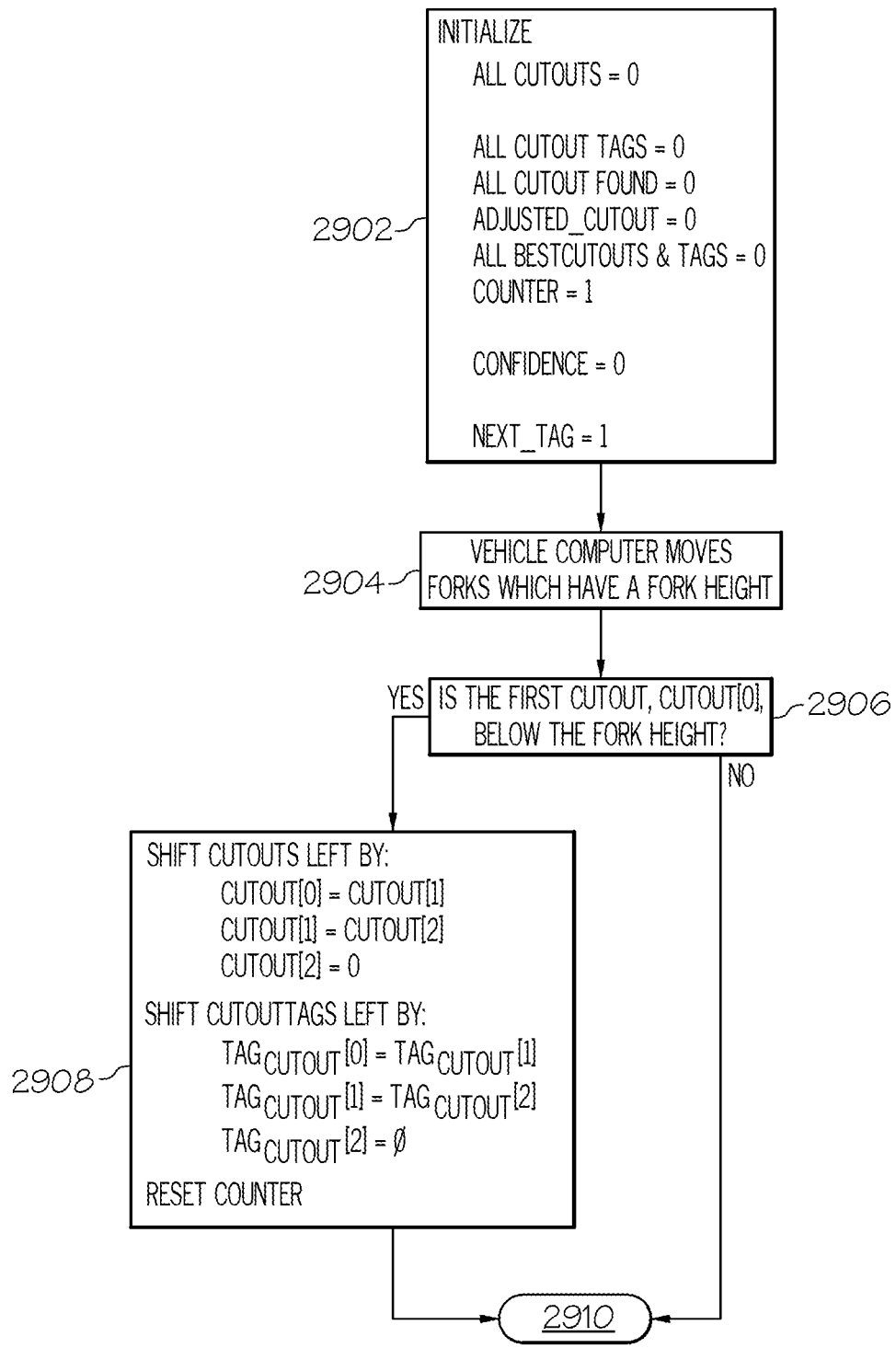
FIGS. 29A-29F are flowcharts illustrating for determining cutout locations in accordance with the principles of the present invention.
Figure 29B:
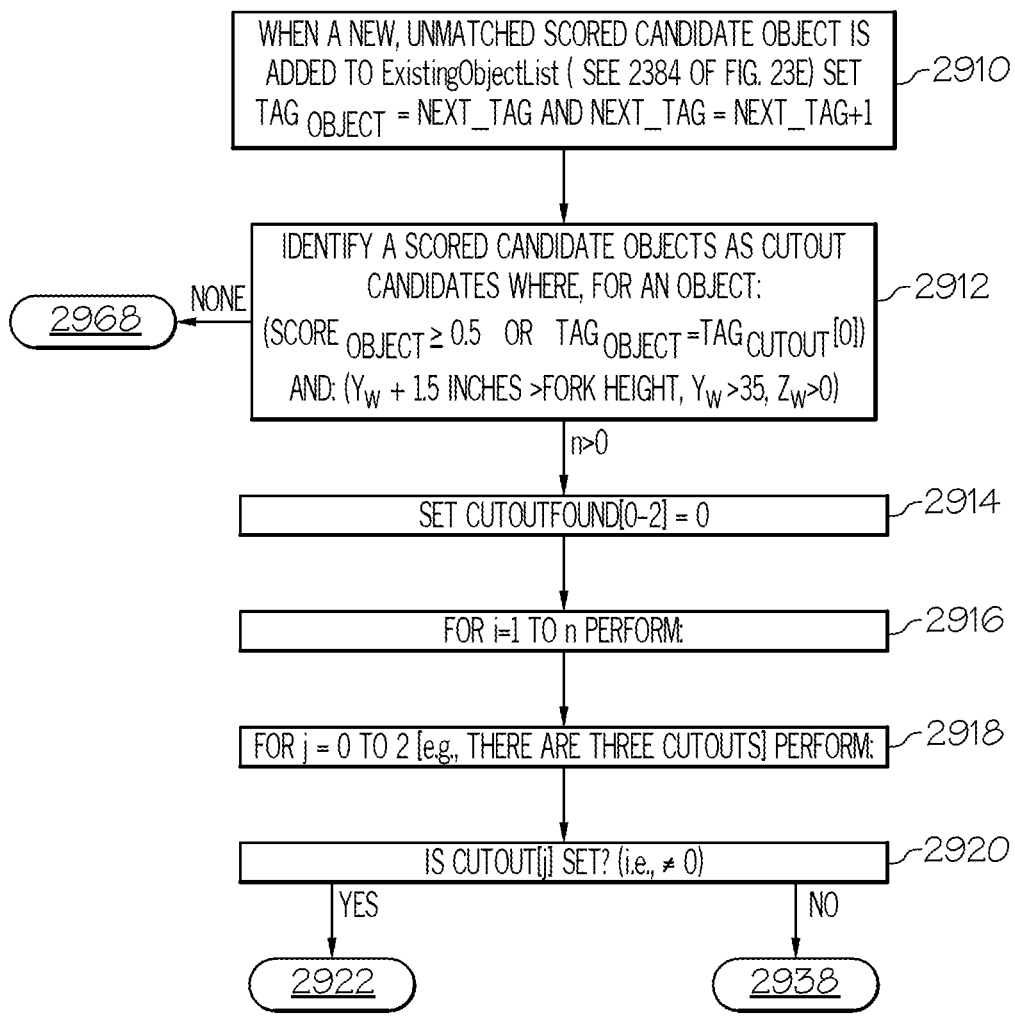
Figure 29C:
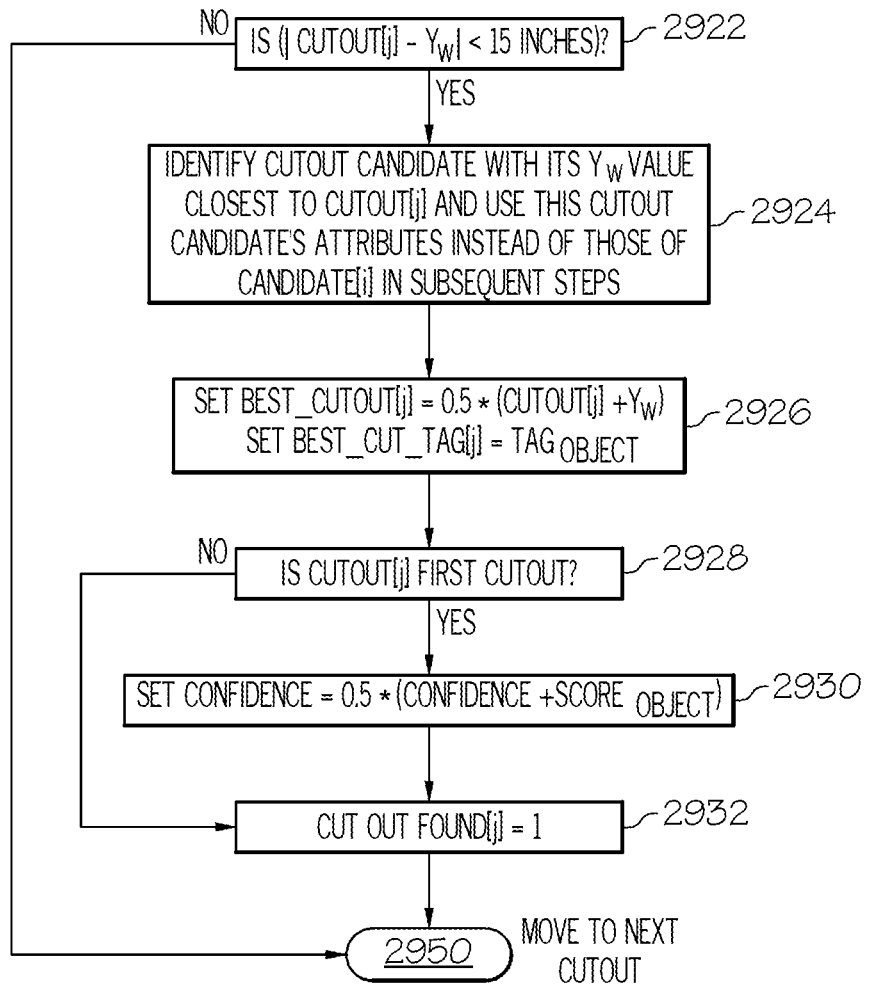
Figure 29D:
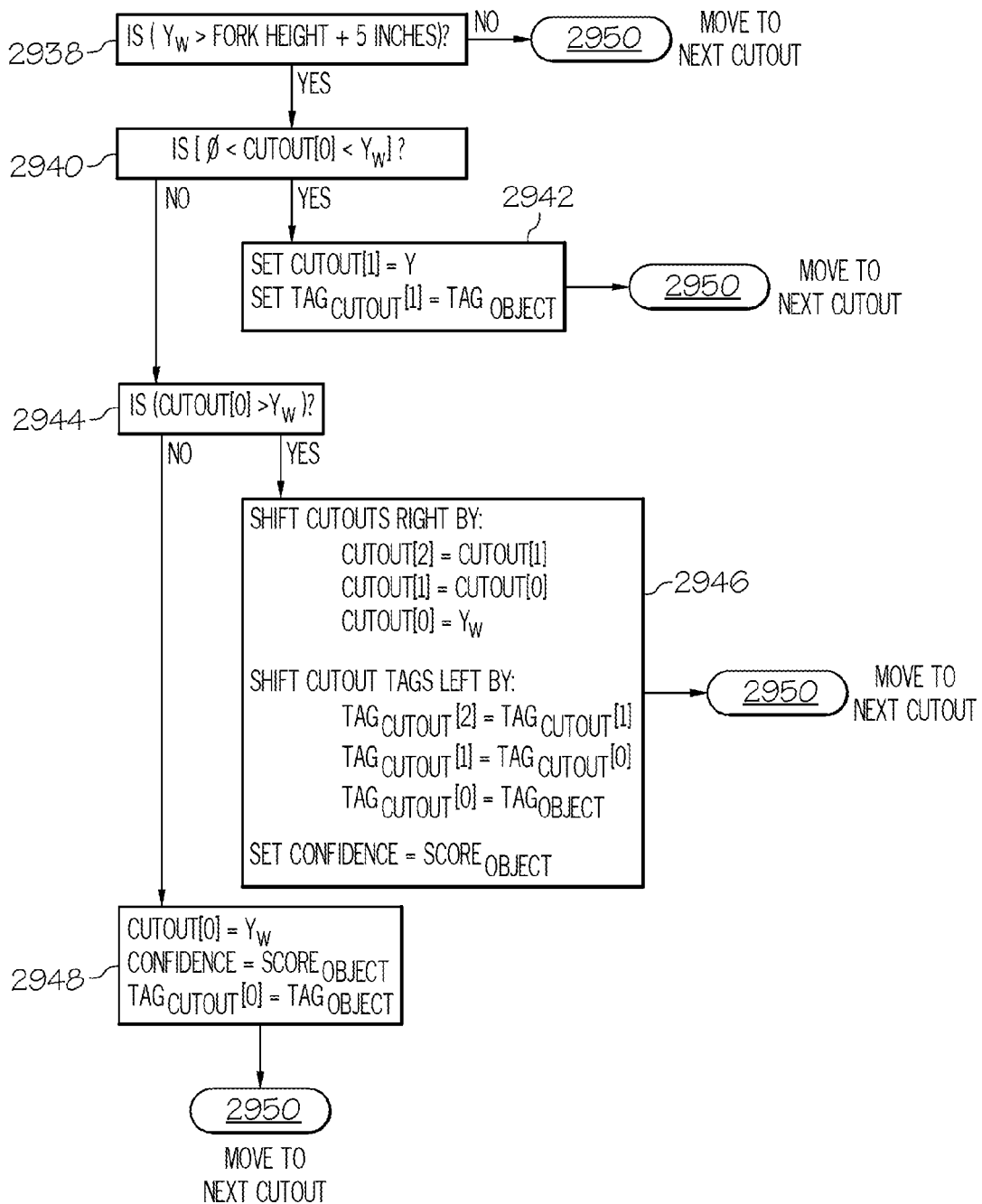
Figure 29E:
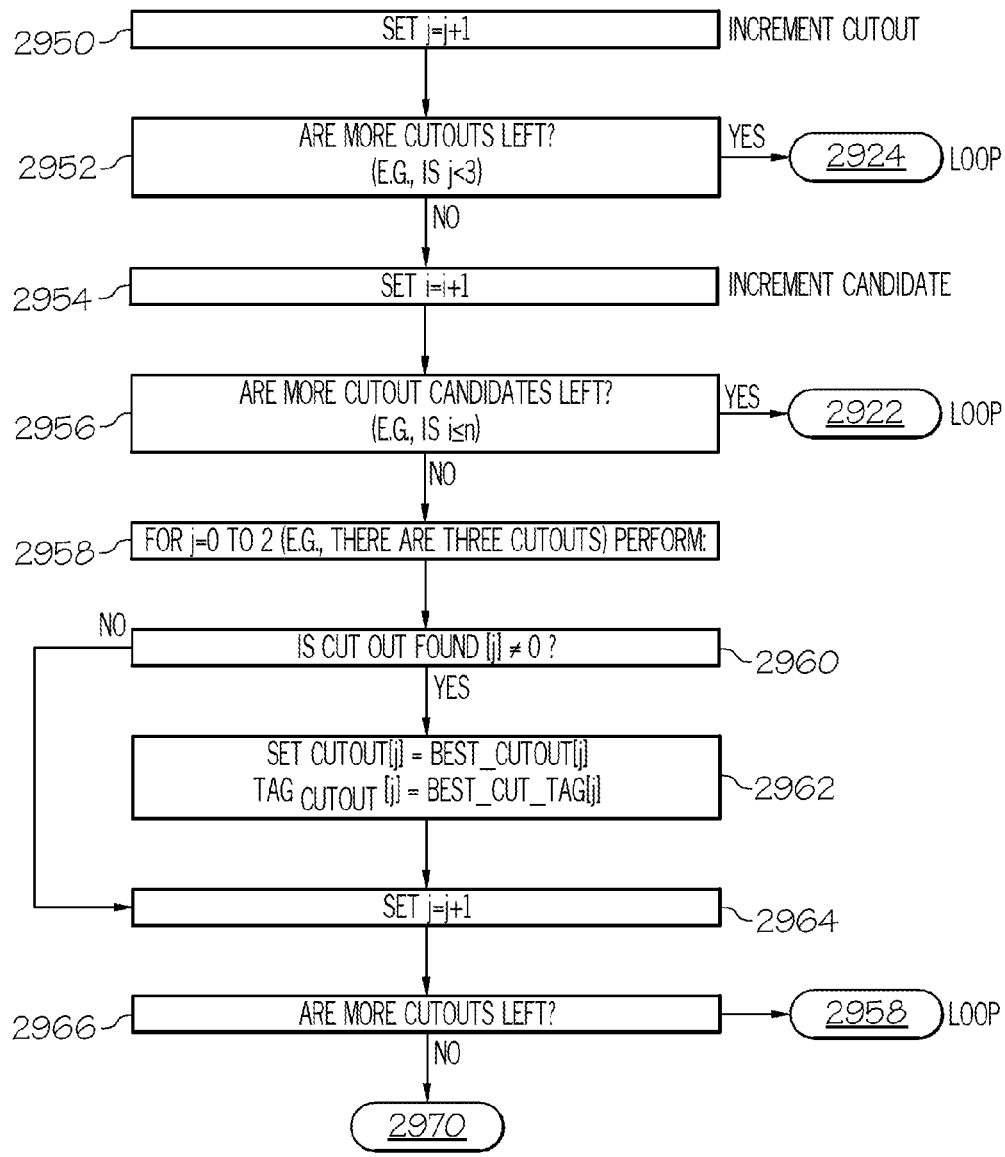
Figure 29F:
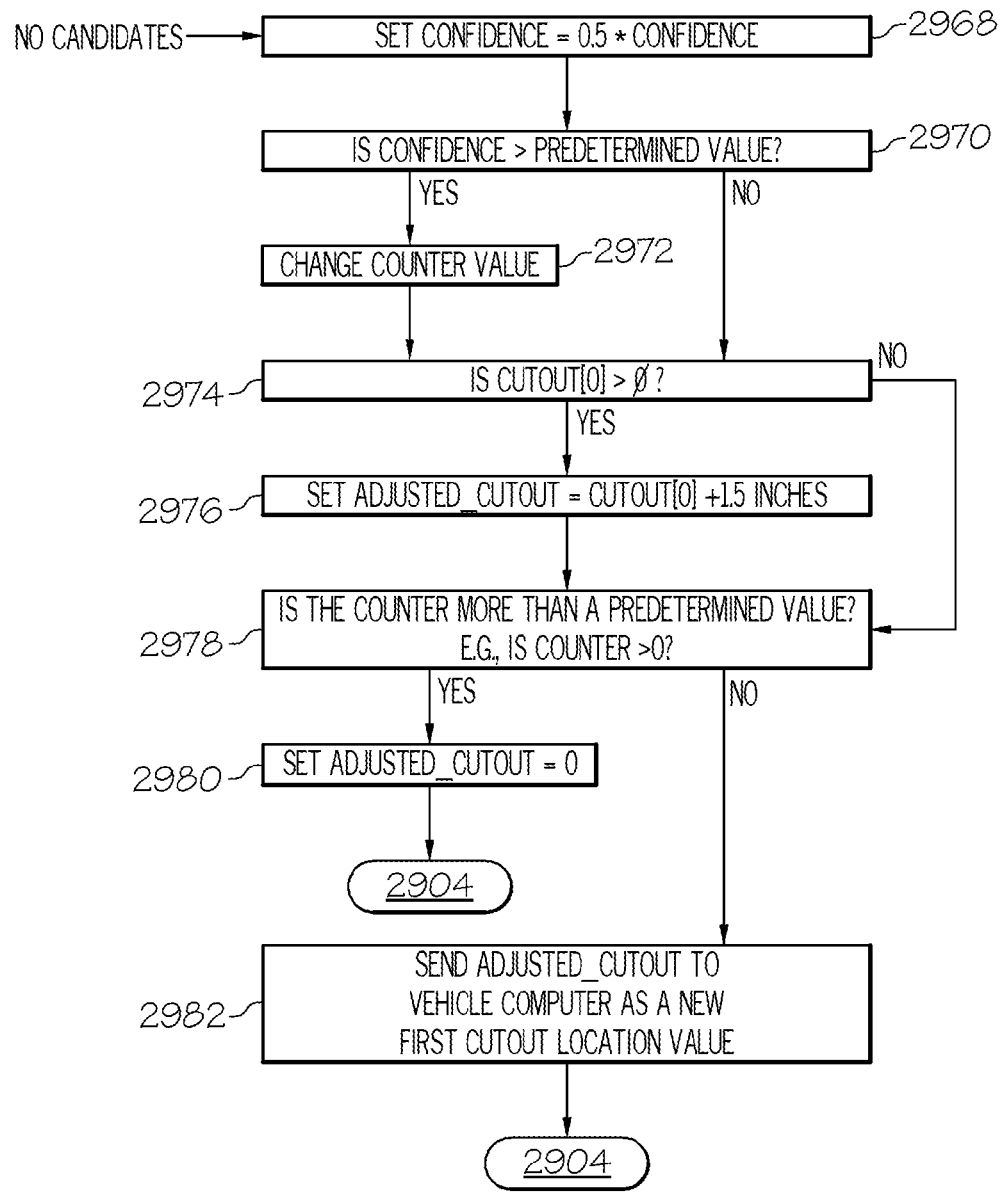

The activity occurring in step 2910 can occur outside of the logical flow of the process depicted in FIGS. 29A-29F. However, it is depicted in FIG. 29B to indicate that the activity of step 2910 occurs so that the results of this activity can be used in the later steps of the flowcharts. In particular, in step 2910, the image analysis computer 110 ensures that as each new scored candidate objects is first added to the ExistingObjectlist, the record for that object includes a respective value for $\text{Tag}_{Object}$.

As shown in step 2902, a value next_Tag is initialized equal to one. When the very first scored candidate object is added to the ExistingObjectlist, its corresponding $\text{Tag}_{Object}$ value is set equal to next_Tag (i.e., set equal to "1"), in step 2910. The value for next_Tag is also incremented in step 2910 so that the next newly identified scored candidate object (i.e., see step 2384 of FIG. 23E) that is added to ExistingObjectlist has its $\text{Tag}_{Object}$ value set equal to next_Tag (i.e., set equal to "2") by step 2910. Thus, the activity of step 2910 represents how each newly identified object that is added to ExistingObjectlist is assigned a unique "tag" value based on a current value of next_Tag.

In step 2912, the image analysis computer 110 identifies n scored candidate objects in the ExistingObjectlist which meet certain criteria to be cutout candidates. For example, those scored candidate objects which have a) either a composite object score, $\text{Score}_{Object}$, greater than a predetermined threshold (e.g., 0.5), or a tag value, $\text{Tag}_{Object}$ equaling $\text{Tag}_{cutout}[0]$, the tag currently associated with the first cutout, cutout[0] and b) a $Y_W$ coordinate that is greater than a predetermined minimum height (e.g., 35 inches) and greater than the current "fork height" (e.g., (fork height—1.5 inches), and a $Z_W$ coordinate greater than zero can be identified as possible scored candidate objects to use as cutout candidates for setting cutout values. If no such cutout candidates are identified, the image analysis computer can continue with step 2968.

As discussed with relation to FIG. 24B, in the ExistingObjectlist, the image analysis computer 110 can uniquely refer to each scored candidate object by a respective index value and, thus, at the conclusion of step 2912 a list of these index values can be identified that reference those n scored candidate objects in the ExistingObjectlist that remain as possible candidates to use for setting cutout values. As shown in step 2916, the image analysis computer 110 can perform a number of steps for each of the remaining scored candidate objects with index values in the list. Once all of these scored candidate objects, or cutout candidates, have been utilized, this portion of the process is finished and, in step 2966, the image analysis computer continues with step 2970. As described later with respect to step 2922, there are instances in which it is beneficial to determine if there are cutout candidates within a predetermined distance of each of the cutouts. Thus, in step 2914, a value cutoutFound[k] is initialized before the loop of step 2916 begins. As described below, the actual value for cutoutFound[k] will reflect if step 2922 was satisfied for cutout[k].

In step 2918, for a particular one of the remaining scored candidate objects, or cutout candidates, the image analysis computer 110 loops through and performs a number of steps for each of the three cutouts. In step 2920, the image analysis computer 110 determines if the current cutout value has been set, or in other words, is the current cutout value not equal to zero. If the current cutout value has been set, then the image analysis computer continues with step 2922. If the current cutout value has not been set, then the image analysis computer continues with step 2938.

In step 2922, the image analysis computer 100 determines if the current cutout value is within a predetermined height difference as compared to $Y_W$ of the scored candidate object of the current iteration of the loop initiated in step 2916. The cutouts can generically be referred to as an array cutout[j] where j=0, 1 or 2 (in the example where there are three cutouts). Thus in step 2922, the image analysis computer can determine if |cutout[j]−$Y_W$|<15 inches. If so, then the image analysis computer can perform steps 2924, 2926 and 2928. If not, then the image analysis computer 110 continues with step 2950 to move to the next cutout value (i.e., cutout[j+1]) if available. Typically, only one cutout will be within 15 inches of the current scored candidate object. It is assumed that no pallets are closer than a predetermined distance (e.g., 15 inches) to one another. Thus, if there are more than one scored candidate object closer than that predetermined distance to a particular current cutout value, the image analysis computer 110 identifies, in step 2924, the cutout candidate (i.e., those n scored candidate objects determined in step 2912) with a height $Y_W$ closest to the current cutout value and uses the attributes from the ExistingObjectlist record for this identified scored candidate object to potentially update the current cutout value, cutout[j].

In particular, in step 2926, the $Y_W$ value for the identified closest cutout candidate is used to set a value for best_Cutout [j]. This value for best_Cutout[j] represents a potentially more accurate value for cutout[j] than its current value. Because step 2926 may potentially be repeated for each of the n different cutout candidates, the value for best_Cutout[j] may change during later iterations of the loop initiated in step 2916. Because cutout[j] also has an associated $Tag_{cutout}$ [j], there is also a value best_cut_tag[j] that is set to correspond to the $Tag_{Object}$ value of the closest identified cutout candidate that was used to set best_Cutout[j].

Thus, in step 2924, the image analysis computer 110 identifies the cutout candidate with its $Y_W$ value being closest to the current cutout, cutout[j] identified in step 2922. If, for example, the $Y_W$ value for the current cutout candidate is within 15 inches of cutout[2] as determined in step 2922, then the image analysis computer 110 determines which of the cutout candidates (from step 2912) has a respective $Y_W$ value that is closest to the current value of cutout[2]. Once this closest cutout candidate is identified, then its $Y_W$ value is used to set best_Cutout[2] which is a potentially better value for cutout[2]. For example, best_Cutout[2] can rely partly on the current value for cutout[2] and partly on the identified $Y_W$ value. One possible formula for setting the value for best_Cutout[2], as shown in step 2926, may be:

best_Cutout[2]=0.5×(cutout[2]+$Y_W$)

In step 2928 the image analysis computer 110 determines if the cutout identified in step 2922 is the first cutout. As described above, the three cutouts may be stored as an array (cutout [0], cutout [1] and cutout [2]) and their respective tag values $Tag_{cutout}$ may also be stored as an array ($Tag_{cutout}$[0], $Tag_{cutout}$[1] and $Tag_{cutout}$[2]). The image analysis computer 110 can determine if the one cutout[j] identified in step 2922 is the first cutout by checking its index value in the stored array. If the identified cutout is not the first cutout, then the image analysis computer 110 continues with step 2932, where cutoutfound[j] is set equal to 1, and then continues the loop started in step 2918. If the identified cutout is the first cutout, then in step 2930 a prior confidence value previously calculated and associated with this first cutout is adjusted based on the composite object score, $Score_{Object}$, of the cutout candidate identified in step 2924 as being closest to the one cutout value. For example, the "confidence" value can be calculated according to:

confidence=0.5(prior confidence+composite object score (i.e., $Score_{Object}$))

Once the confidence value is calculated, the image analysis computer 110 continues with step 2932 to continue the loop started in step 2918. In step 2932, the image analysis computer 110 sets a value for cutoutfound[j] equal to 1, as noted above, so as to indicate that step 2922 was satisfied for cutout [j]. The image analysis computer 110 continues with step 2950 to move to the next cutout value (i.e., cutout[j+1]) if available.

If, in step 2920, the current cutout[j] is identified as not being set, then the image analysis computer 110, in step 2938, determines if the $Y_W$ of the current object, i.e., the scored candidate object of the current iteration of the loop initiated in step 2916, is greater than the fork height. If not, then the current loop for the current cutout value, cutout[j], is complete and the index value "j" is incremented in step 2950 so that a new iteration with a new cutout value can begin in step 2918 if the incremented value of j is less than three, for example, in step 2952. When comparing the $Y_w$ value with the fork height in step 2938, it may be beneficial to add a relatively small predetermined value to the fork height so that, for example the image analysis computer 110 might determine whether or not: $Y_w$>(fork height+5 inches) rather than making a strict comparison with the exact fork height value.

If, however, the criteria of step 2938 are satisfied, then the image analysis computer 110 continues with step 2940. In step 2940, the image analysis computer 110 determines if the first cutout is between zero and the $Y_W$ value of the particular scored candidate object, or cutout candidate, being utilized in this particular iteration of step 2916. If so, then the image analysis computer 110, in step 2942, sets the second cutout value to equal $Y_W$ for this particular scored candidate object and sets the second cutout tag value, $Tag_{cutout}$[1], to the $Tag_{Object}$ value for this particular cutout candidate. The image analysis computer then moves to step 2950 so that a new iteration with a new cutout value can begin in step 2918 if the incremented value of j is less than three, for example, in step 2952. If the criteria of step 2940 are not satisfied, then the image analysis computer 110 proceeds to step 2944.

In step 2944, the image analysis computer 110 determines if the first cutout is greater than $Y_W$ of the particular scored candidate object, or cutout candidate, being utilized in this particular iteration of step 2916. If so, then in step 2946, the image analysis computer 110 shifts the three cutouts right such that the third cutout value is set to the current second cutout value, the second cutout value is set to the current first cutout value, and the first cutout value is set equal to $Y_W$. The image analysis computer also shifts the corresponding first, second and third $Tag_{cutout}$ values in a similar manner. In addition, the image analysis computer 110 also sets a confidence score for the new first cutout value based on a composite object score for the currently considered scored candidate object, or cutout candidate, according to:

confidence=$Score_{Object}$

Once the cutout values and their respective associated tag values are shifted in step 2946 and the confidence score set, the image analysis computer 110 continues with step 2950 so that a new iteration with a new cutout value can begin in step 2918 if the incremented value of j is less than three, for example, in step 2952. If, in step 2944, the image analysis computer 110 determines that the first cutout value is not greater than $Y_W$, then the analysis computer 110, in step 2948, sets the first cutout to equal the $Y_w$ value of the particular cutout candidate being utilized in this particular iteration of step 2916, sets the first cutout tag value, $Tag_{cutout}[0]$, equal to the $Tag_{Object}$ value for this particular cutout candidate, sets the "confidence" value for the first cutout to equal the composite object score, $Score_{Object}$, for this particular cutout candidate, and continues with step 2950 so that a new iteration with a new cutout value can begin in step 2918 if the incremented value of j is less than three, for example, in step 2952. Step 2948 is typically reached when the first cutout value equals "0". This can occur when all the cutout values are initially set to equal "0" or if a right shift of cutout values happens, in step 2908, results in a value of "zero" being assigned to the first cutout value. Eventually, repeated execution of step 2950 will result in the index value, j, for the loop initiated in step 2918 equaling the number of cutout values (e.g., three) in step 2952. In this instance, the loop of step 2918 is completed and, in step 2954, a new cutout candidate index value i is identified, in step 2956, for a next iteration of the loop initiated in step 2916. Eventually, i is incremented in step 2956 until it exceeds the number n of cutout candidates in step 2956. In this instance, the loop of step 2916 is completed and the image analysis computer continues with step 2958.

In step 2958, a loop through the different cutout values is initiated (e.g., j=0 to 2). First, in step 2960, the image analysis computer 110 determines if cutoutfound[j] is not equal to zero. This criterion is true when step 2922 was satisfied at least once for cutout[j]. As a result, a potentially better value for cutout[j] was also calculated as best_Cutout[j] which has a corresponding tag value of best_cut_tag[j]. Accordingly, in step 2962, cutout[j] and $Tag_{cutout}[j]$ are updated to reflect the values of best_Cutout[j] and best_cut_tag[j], respectively.

Once step 2962 is completed, or if cutout[j] equals "0", in step 2960, the image analysis computer 110 increments j in step 2964 and loops back to step 2958 if there are more cutouts remaining as determined by step 2966. Once the loop of step 2958 completes for all the cutouts, the image analysis computer 110 continues with step 2970.

If no possible scored candidate objects were identified in step 2912 for the current fork height, then the image analysis computer 110 continues with step 2968. In step 2968, the confidence value that is associated with the first cutout value is reduced. For example, a new confidence value can be calculated according to:

confidence=0.5(confidence).

Once the confidence score is adjusted in step 2968 or once all the steps of the loop of 2958 completes, the image analysis computer 110 continues with step 2970. In particular, if the image analysis computer 110 determines, in step 2970, that the confidence value for the first cutout is above a predetermined threshold (e.g., 0.5), then a counter associated with the confidence value may, for example, be decremented in step 2972. For example, if the counter is set equal to three and is decremented each time the confidence value is above the predetermined threshold, then the value of the counter will be lower the more times a higher confidence value for the first cutout is encountered. One of ordinary skill will recognize that this counter value may vary and may, for example, be greater than three (e.g., five) or less than three (e.g., one).

If the confidence value is not above the predetermined threshold, as determined in step 2970, or once the counter is adjusted, as in step 2972, then the image analysis computer 110 determines if the first cutout value is greater than zero, in step 2974. If so, then an adjusted first cutout value for the first cutout is calculated by the image analysis computer 110 in step 2976. For example, the adjusted first cutout value can be calculated according to:

adjusted value=cutout[0]+1.5 inches wherein a predetermined offset value (e.g., 1.5 inches) is added to the value for cutout[0]. Once the adjusted value is calculated in step 2976 or if the first cutout value is not greater than zero, as determined in step 2974, then the image analysis computer 110 continues with step 2978. In step 2978, the image analysis computer 110 determines if the counter is more than a predetermined value. If, for example, the counter value is greater than zero, then a minimum number of "confidence" values over the predetermined threshold have not occurred (see step 2970 and 2972). Under these circumstances, the image analysis computer 110, in step 2980, resets the adjusted value to equal zero and repeats the process by returning to step 2904.

If however, the counter value indicates that a minimum number of "confidence" values have occurred that are over the predetermined threshold, then the image analysis computer 110, in step 2982, communicates the "adjusted" value (e.g., first cutout value+1.5 inches) to the vehicle computer 50 as a new first cutout location value or stop height and may also communicate the second and third cutout values as well. The process then repeats by returning to step 2904.

The above description assumed that the forks are being raised upwards and that the operator desires for the forks to stop at the next higher cutout. However, one of ordinary skill will recognize that the algorithm of FIGS. 29A-29F may be modified to also operate appropriately when the forks are traveling downward and the operator desires for the forks to stop at the next lower cutout.

The accuracy with which scored candidate objects may be detected and tracked through a series of image frames can be improved by performing intrinsic and extrinsic calibration of the camera. As mentioned previously, an intrinsic camera matrix has the form:

$$[K] = \begin{bmatrix} f_x & \gamma & x_0 \\ 0 & f_y & y_0 \\ 0 & 0 & 1 \end{bmatrix}$$

where:
($x_0$, $y_0$) is the camera center 2714 and is the pixel location coordinates on the image plane 2712 where the camera center (or the camera coordinate system origin) 2708 projects according to the pinhole camera model;
$f_x$ is the focal length, f, expressed in x-direction, or horizontal, pixel-related units; and
$f_y$ is the focal length, f, expressed in y-direction, or vertical, pixel related units, and
$\gamma$ represents a skew factor between the x and y axes, and is often "0".

The values for the elements of this matrix can be determined using known camera resectioning techniques and can be performed as part of the manufacturing process of the camera. As for extrinsic calibration of the imaging camera 130, other techniques are useful for determining values for the previously discussed extrinsic camera matrix $[R_{cam}|T_{cam}]$. As these values may depend on the specific manner in which the camera is mounted relative to the vehicle 20, extrinsic calibration may beneficially be performed at a site where the vehicle 20 will be used. For example, values may be determined for:

$t_{ybias}$ (the fixed vertical offset between the imaging camera 130 and the location of the forks 42A and 42B), $t_{xbias}$ (the fixed horizontal offset between the imaging camera 130 and the location of the world coordinate origin 2706), $\theta_x$ (the rotation of the camera coordinate system relative to the X-axis 2707, referred to as an elevation angle, designated $\theta_e$ in FIG. 27A). Ideally the elevation angle may be calibrated when the forks 42A and 42B have a tilt angle of zero. As noted above, if the tilt angle $\theta_{ef}$ of the forks 42A and 42B, which can be provided by a tilt angle sensor in communication with the vehicle computer 50, is not zero, then the overall elevation angle $\theta_e = (\theta_{ec} + \theta_{ef})$ of the imaging camera 130 will include a portion $\theta_{ef}$ due to the tilting of the forks 42A and 42B and a portion $\theta_{ec}$ due to the tilt of the camera 130, $\theta_y$ (the rotation of the camera coordinate system relative to the Y-axis 2711, referred to as a pitch angle), and $\theta_z$ (the rotation of the camera coordinate system relative to the Z-axis 2705, referred to as a deflection angle).

An initial estimate can be assigned to these values in order to begin the extrinsic camera calibration process. For example, when considering only an elevation angle, an estimated initial value of $\theta_x$ may be 0 degrees and an initial estimated value for $t_{ybias}$ may be a physically measured height of the imaging camera 130 from the forks 42A and 42B. The horizontal offset $t_{xbias}$, the pitch angle and deflection angle may be considered to be equal to zero. Using these initial estimated values more than one scored candidate object (i.e., a potential pallet) may be acquired in an image of a known, or measured, world geometry. For example, based on a respective, manually pre-measured distance and height of more than one pallet relative to the world coordinate origin 2706, which, as noted above, is located at a known location on the vehicle 10, corresponding world coordinate locations $(X_w, Y_w, Z_w)$ can be determined (where the value of $X_w$ may not necessarily be measured when only an elevation angle is non-zero and camera has no translation offset, as described more fully below, in the X-direction (i.e., $t_{xbias}=0$). Alternatively, a similar technique can be accomplished which uses respective measurement information about a single potential pallet from multiple image frames taken from different camera positions.

Figure 30:
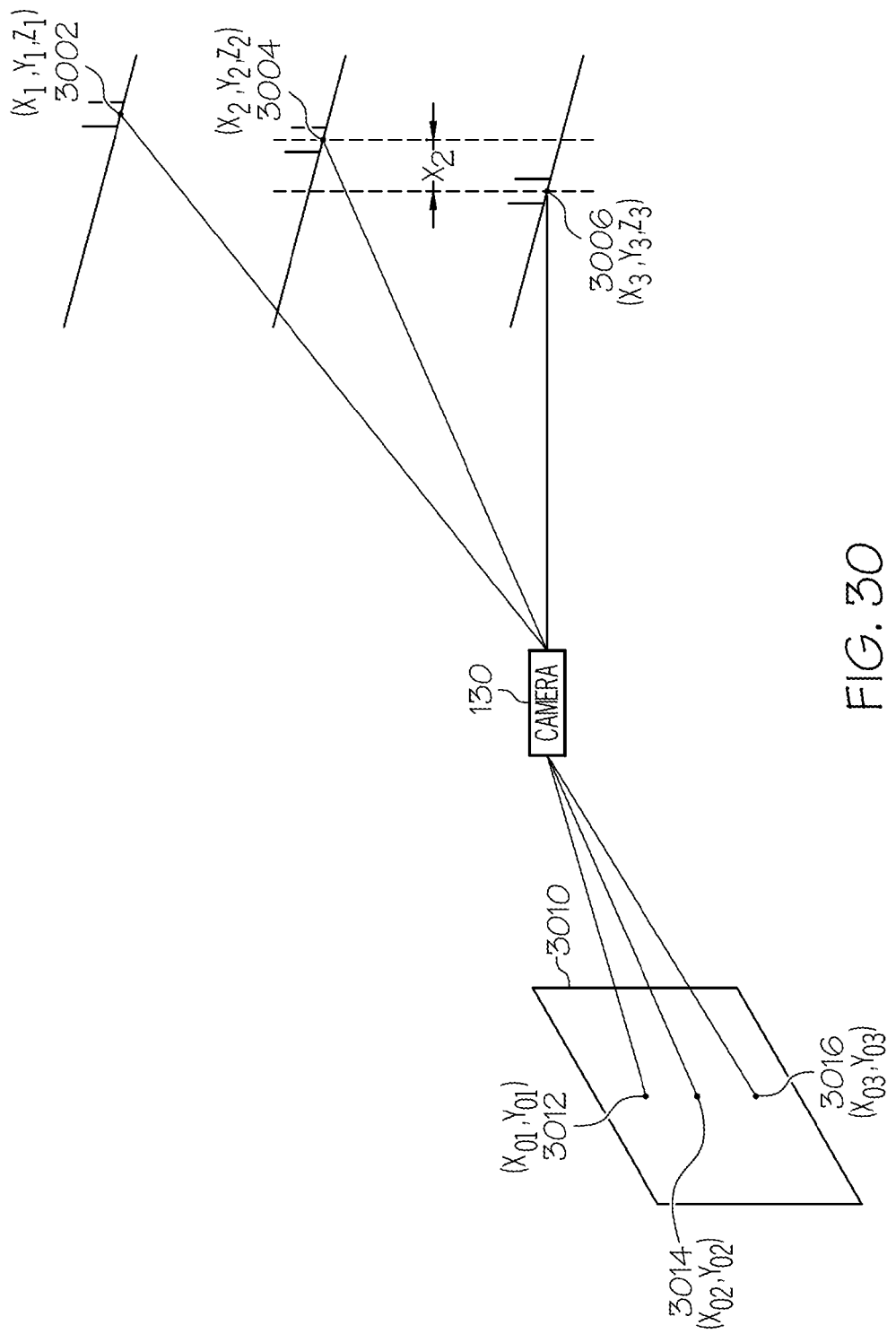
FIG. 30 illustrates an image projection configuration of multiple pallets useful for performing extrinsic camera calibration in accordance with the principles of the present invention

FIG. 30 depicts an image frame in a series of image frames for one example scenario in which three potential pallet locations 3002, 3004, 3006 have been captured by the imaging camera 130 and projected onto an image plane 3010 as three respective pixel locations 3012, 3014, and 3016. It is also possible to acquire calibration data from multiple views of chessboards where the corner locations substitute for the lower stringer point. As discussed earlier, these pixel locations may be corrected for distortion such that the locations 3012, 3014, and 3016 are in undistorted image space. In the depicted scenario, the following values have been determined:

the translation of the forks, $t_y$, when the image frame 3010 is captured can be determined from the vehicle computer 50;

the first potential pallet location 3002 is projected to undistorted image pixel location $(x_1, y_1)$ 3012 and is measured relative to a world coordinate origin to have a corresponding world coordinate location of $(X_1, Y_1, Z_1)$;

the second potential pallet location 3004 is projected to undistorted image pixel location $(x_2, y_2)$ 3014 and is measured relative to a world coordinate origin to have a corresponding world coordinate location of $(X_2, Y_2, Z_2)$; and the third potential pallet location 3006 is projected to undistorted image pixel location $(x_3, y_3)$ 3016 and is measured relative to a world coordinate origin to have a corresponding world coordinate location of $(X_3, Y_3, Z_3)$.

In a configuration where there is only an elevation angle (i.e., $\theta_x$), the second linear equation of Equation 23 provides Equation 41A (where $\theta_x$ denotes the elevation angle):

$$y_{row}(Y_w \sin\theta_x + Z_w \cos\theta_x) - Y_w(f_y \cos\theta_x + y_0 \sin\theta_x) - Z_w(-f_y \sin\theta_x + y_0 \cos\theta_x) = f_y(t_y + t_{ybias})$$

This equation can be rearranged to provide a first equation useful in performing the extrinsic camera calibration. In particular, Equation 41A can be rearranged into Equation 41B:

$$\cos\theta_x(-f_y Y_w + (y_{row}-y_0)Z_w) + \sin\theta_x((y_{row}-y_0)Y_w + f_y Z_w) = f_y(t_y + t_{ybias})$$

As mentioned previously, the elevation angle $\theta_x$, can include a portion $\theta_{ec}$ that is from a tilt angle of the imaging camera 130 and a portion $\theta_{ef}$ that is from angle of the forks 42A and 42B such that:

$$\theta_x = \theta_{ec} + \theta_{ef}$$

A second equation can be derived from the well-known trigonometrical principle of Equation 42:

$$\cos^2\theta_{ec} + \sin^2\theta_{ec} = 1.$$

Using these two equations, appropriate values for $t_{ybias}$ and $\theta_x$ can be determined using an iterative process as described below. In general, the iterative process first defines two residual functions based on Equation 41B and Equation 42. In particular, the two residual functions are defined by Equation 43A:

$$f = f_y(t_y + t_{ybias}) - \cos\theta_x(-f_y Y_w + (y_{row}-y_0)Z_w) - \sin\theta_x((y_{row}-y_0)Y_w + f_y Z_w)$$

However, Equation 43A can relate to more than one potential pallet (or scored candidate object); thus, it can be more generally written as Equation 43B:

$$f(i) = f_y(t_y + t_{ybias}) - \cos\theta_x(-f_y Y_i + (y_i - y_0)Z_i) - \sin\theta_x((y_i - y_0)Y_i + f_y Z_i)$$

where i is an index used to distinguish between different scored candidate objects (e.g., 3002, 3004, 3006) that may be observed in the image frame 3010. Each such scored candidate object, in Equation 43B, has a respective residual equation f(i) and has a respective manually measured world coordinate location $(X_i, Y_i, Z_i)$ and an image pixel location height value of $y_i$. The format of Equation 43B can be simplified by writing it as Equation 43C:

$$f(i) = f_y(t_y + t_{ybias}) - \cos\theta_x(q_i) - \sin\theta_x(r_i)$$

where:

$q_i = (-f_y Y_i + (y_i - y_0)Z_i)$ $r_i = ((y_i - y_0)Y_i + f_y Z_i)$

Using the two geometrical identities:

$$\cos(\theta_x) = \cos(\theta_{ec} + \theta_{ef}) = \cos(\theta_{ec})\cos(\theta_{ef}) - \sin(\theta_{ec})\sin(\theta_{ef})$$

$$\sin(\theta_x) = \sin(\theta_{ec} + \theta_{ef}) = \sin(\theta_{ec})\cos(\theta_{ef}) + \cos(\theta_{ec})\sin(\theta_{ef})$$

allows Equation 43C to be written as Equation 43D:

$$f(i) = f_y(t_y + t_{ybias}) - [\cos(\theta_{ec})\cos(\theta_{ef}) - \sin(\theta_{ec})\cos(\theta_{ef})](q_i) - [\sin(\theta_{ec})\sin(\theta_{ef}) + \cos(\theta_{ec})\sin(\theta_{ef})](r_i)$$

The second residual equation based on Equation 42 is defined by Equation 44:

$$g_e = 1 - \cos^2\theta_{ec} - \sin^2\theta_{ec}$$

By finding the respective roots of each residual equation (i.e., those values of the variables that result in f(i) and $g_e$ equaling zero), appropriate values for determining the extrinsic camera calibration values can be calculated. In the above notation, f(i) represents the residual equation for the scored candidate object i and does not denote that f is a function of an independent variable i.

In general, a function w can be evaluated at a point $(n_0+e)$ using a Taylor, or power, series where:

$$w(n_0+e) = w(n_0) + w'(n_0)e + \tfrac{1}{2}w''(n_0)e^2 \ldots$$

Taking just the first two terms of the series provides an approximation of w where:

$$w(n_0+e) \approx w(n_0) + w'(n_0)e$$

In this Taylor approximation, $n_0$ may be considered as an initial guess at a root of the function w and e is an initial offset intended to locate a value closer to an actual root of w than $n_0$. Setting $w(n_0+e)=0$ and solving for "e", provides an initial estimated value for the offset "e". This use of the Taylor series can be iteratively performed such that each previous calculation of "e" is used in the next iteration of solving for the root of w according to the Newton-Rhapson method.

In other words, using a current guess, n(t), for the root of w provides:

$$0 \approx w(n(t)) + w'(n(t))*e(t)$$

which can then be solved to estimate a value for an offset, or "step" used in the iterative $$-\frac{w(n(t))}{w'(n(t))} \approx e(t)$$

Using the newly calculated estimate for the step e(t), the updated guess, n(t+1), for the root of w is provided by:

$$n(t+1) = n(t) + e(t)$$

It is this value n(t+1) that is used in the next iteration of calculating the estimated offset, or step, value. This iterative process can be repeated until e(t) reaches a predetermined threshold value. In this way, the Taylor series approximation may be iteratively used to solve for a root of the function w.

For multivariable functions, such as for example, w(m, m), the first two terms of a Taylor series approximation around the point $(n_0+e_1, m_0+e_2)$ is formed by taking partial derivatives according to:

$$w(n_0+e_1, m_0+e_2) \approx w(n_0, m_0) + \left(\frac{\partial w(n_0, m_0)}{\partial n}(e_1) + \frac{\partial w(n_0, m_0)}{\partial m}(e_2)\right)$$

For each of the residual equations related to the extrinsic camera calibration in this first configuration, the variables of interest are $\cos\theta_{ec}$, $\sin\theta_{ec}$, and $t_{ybias}$ and each has a respective estimated offset $p_0$, $p_1$, and $p_2$. If there are at least two scored candidate objects, then using the above-described principles about Taylor series approximations provides the following residual equations for performing an extrinsic camera calibration:
Equation 45A:

$$g_e = 1 - \cos^2\theta_{ec} - \sin^2\theta_{ec}$$

$$f(0) = f_y(t_y + t_{ybias}) - [\cos(\theta_{ec})\cos(\theta_{ef}) - \sin(\theta_{ec})\sin(\theta_{ef})]$$
$$(q_0) - [\sin(\theta_{ec})\cos(\theta_{ef}) + \cos(\theta_{ec})\sin(\theta_{ef})](r_0)$$

$$f(1) = f_y(t_y + t_{ybias}) - [\cos(\theta_{ec})\cos(\theta_{ef}) - \sin(\theta_{ec})\sin(\theta_{ef})]$$
$$(q_1) - [\sin(\theta_{ec})\cos(\theta_{ef}) + \cos(\theta_{ec})\sin(\theta_{ef})](r_1)$$

If there are additional scored candidate objects available, then additional residual equations may be used as well; these additional residual equations would have the form of:

$$f(i) = f_y(t_y + t_{ybias}) - [\cos(\theta_{ec})\cos(\theta_{ef}) - \sin(\theta_{ec})\sin(\theta_{ef})](q_i) - [\sin(\theta_{ec})\cos(\theta_{ef}) + \cos(\theta_{ec})\sin(\theta_{ef})](r_i)$$

where i refers to an index value that uniquely identifies the scored candidate object.

The respective Taylor series approximations of the residual equations are Equation 46A:

$$g_e \approx 1 - \cos^2\theta_{ec} - \sin^2\theta_{ec} - 2\cos\theta_{ec}*p_0 - 2\sin\theta_{ec}*p_1$$

$$f(0) \approx f_y(t_y + t_{ybias}) - [\cos(\theta_{ec})\cos(\theta_{ef}) - \sin(\theta_{ec})\sin(\theta_{ef})](q_0) -$$
$$[\sin(\theta_{ec})\cos(\theta_{ef}) + \cos(\theta_{ec})\sin(\theta_{ef})](r_0) - [q_0\cos(\theta_{ef}) + r_0\sin(\theta_{ef})]*$$
$$p_0 - [-q_0\sin(\theta_{ef}) + r_0\cos(\theta_{ef})]*p_1 + f_y*p_2$$

$$f(1) \approx f_y(t_y + t_{ybias}) - [\cos(\theta_{ec})\cos(\theta_{ef}) - \sin(\theta_{ec})\sin(\theta_{ef})](q_1) -$$
$$[\sin(\theta_{ec})\cos(\theta_{ef}) + \cos(\theta_{ec})\sin(\theta_{ef})](r_1) - [q_1\cos(\theta_{ef}) + r_1\sin(\theta_{ef})]*$$
$$p_0 - [-q_1\sin(\theta_{ef}) + r_1\cos(\theta_{ef})]*p_1 + f_y*p_2$$

Setting each of the Equations from Equation 46A equal to zero to solve for the respective roots provides Equation 47A:

$$2\cos\theta_{ec}*p_0 + 2\sin\theta_{ec}*p_1 \approx 1 - \cos^2\theta_{ec} - \sin^2\theta_{ec}$$

$$[q_0\cos(\theta_{ef}) + r_0\sin(\theta_{ef})]*p_0 + [-q_0\sin(\theta_{ef}) + r_0\cos(\theta_{ef})]*p_1 -$$
$$f_y*p_2 \approx f_y(t_y + t_{ybias}) - [\cos(\theta_{ec})\cos(\theta_{ef}) - \sin(\theta_{ef})]$$
$$(q_0) - [\sin(\theta_{ec})\cos(\theta_{ef}) + \cos(\theta_{ec})\sin(\theta_{ef})](r_0)$$

$$[q_1\cos(\theta_{ef}) + r_1\sin(\theta_{ef})]*p_0 + [-q_1\sin(\theta_{ef}) + r_1\cos(\theta_{ef})]*p_1 - f_y*p_2 \approx$$
$$f_y(t_y + t_{ybias}) - [\cos(\theta_{ec})\cos(\theta_{ef}) - \sin(\theta_{ec})\sin(\theta_{ef})]$$
$$(q_1) - [\sin(\theta_{ec})\cos(\theta_{ef}) + \cos(\theta_{ec})\sin(\theta_{ef})](r_1)$$

The three equations of Equation 47A can be written in matrix notation as Equation 48A:

$$\begin{bmatrix} 2\cos\theta_{ec} & 2\sin\theta_{ec} & 0 \\ q_0\cos\theta_{ef}+r_0\sin\theta_{ef} & -q_0\sin\theta_{ef}+r_0\cos\theta_{ef} & -f_y \\ q_1\cos\theta_{ef}+r_1\sin\theta_{ef} & -q_1\sin\theta_{ef}+r_1\cos\theta_{ef} & -f_y \\ \vdots & \vdots & \vdots \end{bmatrix} \begin{bmatrix} p_0 \\ p_1 \\ p_2 \end{bmatrix} = \begin{bmatrix} g_e \\ f(0) \\ f(1) \\ \vdots \end{bmatrix}$$

where:

$$q_i = (-f_y Y_i + (y_i - y_0) Z_i)$$

$$r_i = ((y_i - y_0) Y_i + f_y Z_i)$$

$$f(i) = f_y(t_y + t_{ybias}) - [\cos(\theta_{ec})\cos(\theta_{ef}) - \sin(\theta_{ec})\sin(\theta_{ef})]$$
$$(q_i) - [\sin(\theta_{ec})\cos(\theta_{ef}) + \cos(\theta_{ec})\sin(\theta_{ef})](r_i)$$

$$g_e = 1 - \cos^2\theta_{ec} - \sin^2\theta_{ec}$$

As mentioned, there may be more than just two scored candidate objects within the image frame 3010 and, as a result, Equation 48A would have additional rows of values $q_i$, $r_i$, and $f_i$. The general form of Equation 48A is that shown in Equation 49A:

$$[J]\begin{bmatrix} p_0 \\ p_1 \\ p_2 \end{bmatrix} = [F]$$

where:

$$[J] = \begin{bmatrix} 2\cos\theta_{ec} & 2\sin\theta_{ec} & 0 \\ q_0\cos\theta_{ef} + r_0\sin\theta_{ef} & -q_0\sin\theta_{ef} + r_0\cos\theta_{ef} & -f_y \\ q_1\cos\theta_{ef} + r_1\sin\theta_{ef} & -q_1\sin\theta_{ef} + r_1\cos\theta_{ef} & -f_y \\ \vdots & \vdots & \vdots \end{bmatrix}$$

and $$[F] = \begin{bmatrix} g_e \\ f(0) \\ f(1) \\ \vdots \end{bmatrix}$$

which can be manipulated to form Equation 49B:

$$\begin{bmatrix} p_0 \\ p_1 \\ p_2 \end{bmatrix} = ([J]^T[J])^{-1}[J]^T[F]$$

Accordingly, Equation 49B reveals that respective observations of multiple pallets and a respective estimate for $\cos\theta_{ec}$, $\sin\theta_{ec}$, and $t_{ybias}$ can be used to provide a least squares solution for the vector of values $$\begin{bmatrix} p_0 \\ p_1 \\ p_2 \end{bmatrix}.$$

This vector of values $$\begin{bmatrix} p_0 \\ p_1 \\ p_2 \end{bmatrix}$$

can be used to iteratively update the respective estimate for $\cos\theta_{ec}$, $\sin\theta_{ec}$, and $t_{ybias}$ according to Equation 50:

$$\cos\theta_{ec}(t+1) = \cos\theta_{ec}(t) + p_0$$

$$\sin\theta_{ec}(t+1) = \sin\theta_{ec}(t) + p_1$$

$$t_{ybias}(t+1) = t_{ybias}(t) + p_2$$

The updated estimates for $\cos\theta_{ec}$, $\sin\theta_{ec}$, and $t_{ybias}$ can then be used in Equation 49B to find new values for $$\begin{bmatrix} p_0 \\ p_1 \\ p_2 \end{bmatrix}.$$

This iterative process may be repeated until each of the calculated values for $$\begin{bmatrix} p_0 \\ p_1 \\ p_2 \end{bmatrix}$$

are smaller than a predetermined threshold. For example, this predetermined threshold may be $10^{-6}$. Once the iterative process completes, a respective value for $\cos\theta_{ec}$, $\sin\theta_{ec}$, and $t_{ybias}$ has been calculated according to Equation 50 and the camera's contribution to the elevation angle, $\theta_{ec}$, can be determined from $$\theta_{ec} = \tan^{-1}\left(\frac{\sin\theta_{ec}}{\cos\theta_{ec}}\right).$$

The camera's contribution to the elevation angle, $\theta_{ec}$, and $t_{ybias}$ comprise the extrinsic camera calibration values for this embodiment.

In the configuration described above, using only one of the linear equations from Equation 23 was sufficient (along with $g_e$) in order for multiple pallet observations to be used to solve for the two extrinsic camera calibration values $\theta_{ec}$ and $t_{ybias}$. However, in a configuration in which only an elevation angle $\theta_x$ is present, there may still be instances in which $t_{ybias} \neq 0$. In this instance, manually measuring the horizontal offset between a location of the imaging camera 130 and a world coordinate origin 2706 location may provide sufficient accuracy for this value. However, performing extrinisc camera calibration to determine a calibration value for $t_{xbias}$ can also be accomplished as well but will utilize additional equations than those of Equation 48A. A full explanation of how $t_{xbias}$ may be defined to simplify physical measurement of an $X_w$ coordinate for a particular pallet location is provided below with respect to a camera configuration in which there is both an elevation angle $\theta_x$ and a deflection angle $\theta_z$.

In a configuration in which there is no deflection angle $\theta_z$ but the value for $t_{xbias} \neq 0$, the first linear equation of Equation 23 was given by:

$$-X_w f_x - Y_w x_0 \sin\theta_x - Z_w x_0 \cos\theta_x + x_i(Y_w \sin\theta_x + Z_w \cos\theta_x) - f_x(t_{xbias}) = 0$$

which can be rearranged to provide an additional residual equation for a particular pallet location i that is useful for determining $t_{xbias}$:

$$f^*(i) = X_w f_x + f_x(t_{xbias}) - ((x_i - x_0)Z_w)\cos\theta_x - ((x_i - x_0)Y_w)\sin\theta_x$$

where the notation $f^*(i)$ is used for convenience to distinguish this additional residual equation from the previously discussed residual equation $f(i)$. This additional residual equation can be written as Equation 43E:

$$f^*(i) = X_w f_x + f_x(t_{xbias}) - \cos\theta_x(q_i^*) - \sin\theta_x(r_i^*)$$

where:
$q_i^* = ((x_i - x_0)Z_w)$
$r_i^* = ((x_i - x_0)Y_w)$

Again, using the two geometrical identities:

$$\cos(\theta_x) = \cos(\theta_{ec} + \theta_{ef}) = \cos(\theta_{ec})\cos(\theta_{ef}) - \sin(\theta_{ec})\sin(\theta_{ef})$$

$$\sin(\theta_x) = \sin(\theta_{ec} + \theta_{ef}) = \sin(\theta_{ec})\cos(\theta_{ef}) + \cos(\theta_{ec})\sin(\theta_{ef})$$

allows Equation 43E to be written as Equation 43F:

$$f^*(i) = X_w f_x + f_x(t_{xbias}) - [\cos(\theta_{ec})\cos(\theta_{ef}) - \sin(\theta_{ec})\sin(\theta_{ef})](q_i^*) - [\sin(\theta_{ec})\cos(\theta_{ef}) + \cos(\theta_{ec})\sin(\theta_{ef})](r_i^*)$$

Using this additional residual equation related to the extrinsic camera calibration in this modified first configuration, the variables of interest are $\cos\theta_{ec}$, $\sin\theta_{ec}$, $t_{ybias}$ and $t_{xbias}$ and each has a respective estimated offset $p_0$, $p_1$, $p_2$, and $p_3$. If there are at least two scored candidate objects, then using the above-described principles about Taylor series approximations provides the following residual equations for performing an extrinsic camera calibration:

$$g_e = 1 - \cos^2\theta_{ec} - \sin^2\theta_{ec} \qquad \text{Equation 45B}$$

$$f(0) = f_y(t_y + t_{ybias}) - [\cos(\theta_{ec})\cos(\theta_{ef}) - \sin(\theta_{ec})\sin(\theta_{ef})](q_0) - [\sin(\theta_{ec})\cos(\theta_{ef}) + \cos(\theta_{ec})\sin(\theta_{ef})](r_0)$$

$$f^*(0) = X_w f_x + f_x(t_{xbias}) - [\cos(\theta_{ec})\cos(\theta_{ef}) - \sin(\theta_{ec})\sin(\theta_{ef})](q_0^*) - [\sin(\theta_{ec})\cos(\theta_{ef}) + \cos(\theta_{ec})\sin(\theta_{ef})](r_0^*)$$

$$f(1) = f_y(t_y + t_{ybias}) - [\cos(\theta_{ec})\cos(\theta_{ef}) - \sin(\theta_{ec})\sin(\theta_{ef})](q_1) - [\sin(\theta_{ec})\cos(\theta_{ef}) + \cos(\theta_{ec})\sin(\theta_{ef})](r_1)$$

$$f^*(1) = X_w f_x + f_x(t_{xbias}) - [\cos(\theta_{ec})\cos(\theta_{ef}) - \sin(\theta_{ec})\sin(\theta_{ef})](q_1^*) - [\sin(\theta_{ec})\cos(\theta_{ef}) + \cos(\theta_{ec})\sin(\theta_{ef})](r_1^*)$$

If there are additional scored candidate objects available, then additional residual equations may be used as well; these additional residual equations would have the form of:

$$f^*(i) = X_w f_x + f_x(t_{xbias}) - [\cos(\theta_{ec})\cos(\theta_{ef}) - \sin(\theta_{ec})\sin(\theta_{ef})](q_i^*) - [\sin(\theta_{ec})\cos(\theta_{ef}) + \cos(\theta_{ec})\sin(\theta_{ef})](r_i^*)$$

where i refers to an index value that uniquely identifies the scored candidate object.

The respective Taylor series approximations of the residual equations of Equation 45B are Equation 46B:

$$g_e \approx 1 - \cos^2\theta_{ec} - \sin^2\theta_{ec} - 2\cos\theta_{ec}*p_0 - 2\sin\theta_{ec}*p_1$$

$$f(0) \approx f_y(t_y + t_{ybias}) - [\cos(\theta_{ec})\cos(\theta_{ef}) - \sin(\theta_{ec})\sin(\theta_{ef})](q_0) - [\sin(\theta_{ec})\cos(\theta_{ef}) + \cos(\theta_{ec})\sin(\theta_{ef})](r_0) - [q_0\cos(\theta_{ef}) + r_0\sin(\theta_{ef})]*p_0 - [-q_0\sin(\theta_{ef}) + r_0\cos(\theta_{ef})]*p_1 + f_y*p_2$$

$$f^*(0) \approx X_w f_x + f_x(t_{xbias}) - [\cos(\theta_{ec})\cos(\theta_{ef}) - \sin(\theta_{ec})\sin(\theta_{ef})](q_0^*) - [\sin(\theta_{ec})\cos(\theta_{ef}) + \cos(\theta_{ec})\sin(\theta_{ef})](r_0^*) - [q_0^*\cos(\theta_{ef}) + r_0^*\sin(\theta_{ef})]*p_0 - [-q_0^*\sin(\theta_{ef}) + r_0^*\cos(\theta_{ef})]*p_1 + f_x*p_3$$

$$f(1) \approx f_y(t_y + t_{ybias}) - [\cos(\theta_{ec})\cos(\theta_{ef}) - \sin(\theta_{ec})\sin(\theta_{ef})](q_1) - [\sin(\theta_{ec})\cos(\theta_{ef}) + \cos(\theta_{ec})\sin(\theta_{ef})](r_1) - [q_1\cos(\theta_{ef}) + r_1\sin(\theta_{ef})]*p_0 - [-q_1\sin(\theta_{ef}) + r_1\cos(\theta_{ef})]*p_1 + f_y*p_2$$

$$f^*(1) \approx X_w f_x + f_x(t_{xbias}) - [\cos(\theta_{ec})\cos(\theta_{ef}) - \sin(\theta_{ec})\sin(\theta_{ef})](q_1^*) - [\sin(\theta_{ec})\cos(\theta_{ef}) + \cos(\theta_{ec})\sin(\theta_{ef})](r_1^*) - [q_1^*\cos(\theta_{ef}) + r_1^*\sin(\theta_{ef})]*p_0 - [-q_1^*\sin(\theta_{ef}) + r_1^*\cos(\theta_{ef})]*p_1 + f_x*p_3$$

Similar to before, setting each of the Equations from Equation 46B equal to zero to solve for the respective roots provides Equation 47B:

$$2\cos\theta_{ec}*p_0 + 2\sin\theta_{ec}*p_1 \approx 1 - \cos^2\theta_{ec} - \sin^2\theta_{ec}$$

$$[q_0\cos(\theta_{ef}) + r_0\sin(\theta_{ef})]*p_0 + [-q_0\sin(\theta_{ef}) + r_0\cos(\theta_{ef})]*p_1 - f_y*p_2 \approx f_y(t_y + t_{ybias}) - [\cos(\theta_{ec})\cos(\theta_{ef}) - \sin(\theta_{ec})\sin(\theta_{ef})](q_0) - [\sin(\theta_{ec})\cos(\theta_{ef}) + \cos(\theta_{ec})\sin(\theta_{ef})](r_0)$$

$$[q_0^*\cos(\theta_{ef}) + r_0^*\sin(\theta_{ef})]*p_0 + [-q_0^*\sin(\theta_{ef}) + r_0^*\cos(\theta_{ef})]*p_1 - f_x*p_3 \approx X_w f_x + f_x(t_{xbias}) - [\cos(\theta_{ec})\cos(\theta_{ef}) - \sin(\theta_{ec})\sin(\theta_{ef})](q_0^*) - [\sin(\theta_{ec})\cos(\theta_{ef}) + \cos(\theta_{ec})\sin(\theta_{ef})](r_0^*)$$

$$[q_1\cos(\theta_{ef}) + r_1\sin(\theta_{ef})]*p_0 + [-q_1\sin(\theta_{ef}) + r_1\cos(\theta_{ef})]*p_1 - f_y*p_2 \approx f_y(t_y + t_{ybias}) - [\cos(\theta_{ec})\cos(\theta_{ef}) - \sin(\theta_{ec})\sin(\theta_{ef})](q_1) - [\sin(\theta_{ec})\cos(\theta_{ef}) + \cos(\theta_{ec})\sin(\theta_{ef})](r_1)$$

$$[q_1^*\cos(\theta_{ef}) + r_1^*\sin(\theta_{ef})]*p_0 + [-q_1^*\sin(\theta_{ef}) + r_1^*\cos(\theta_{ef})]*p_1 - f_x*p_3 \approx X_w f_x + f_x(t_{xbias}) - [\cos(\theta_{ec})\cos(\theta_{ef}) - \sin(\theta_{ec})\sin(\theta_{ef})](q_1^*) - [\sin(\theta_{ec})\cos(\theta_{ef}) + \cos(\theta_{ec})\sin(\theta_{ef})](r_1^*)$$

The five equations of Equation 47B can be written in matrix notation as Equation 48B:

$$\begin{bmatrix} 2\cos\theta_{ec} & 2\sin\theta_{ec} & 0 & 0 \\ q_0\cos\theta_{ef} + r_0\sin\theta_{ef} & -q_0\sin\theta_{ef} + r_0\cos\theta_{ef} & -f_y & 0 \\ q_0^*\cos\theta_{ef} + r_0^*\sin\theta_{ef} & -q_0^*\sin\theta_{ef} + r_0^*\cos\theta_{ef} & 0 & -f_x \\ q_1\cos\theta_{ef} + r_1\sin\theta_{ef} & -q_1\sin\theta_{ef} + r_1\cos\theta_{ef} & -f_y & 0 \\ q_1^*\cos\theta_{ef} + r_1^*\sin\theta_{ef} & -q_1^*\sin\theta_{ef} + r_1^*\cos\theta_{ef} & 0 & -f_x \\ \vdots & \vdots & \vdots & \vdots \end{bmatrix} \begin{bmatrix} p_0 \\ p_1 \\ p_2 \\ p_3 \end{bmatrix} = \begin{bmatrix} g_e \\ f(0) \\ f^*(0) \\ f(1) \\ f^*(1) \\ \vdots \end{bmatrix}$$

where:

$$q_i = (-f_y Y_i + (y_i - y_0)Z_i)$$

$$r_i = ((y_i - y_0)Y_i + f_y Z_i)$$

$$q_i^* = ((x_i - x_0)Z_w)$$

$$r_i^* = ((x_i - x_0)Y_w)$$

$$f(i) = f_y(t_y + t_{ybias}) - [\cos(\theta_{ec})\cos(\theta_{ef}) - \sin(\theta_{ec})\sin(\theta_{ef})](q_i) - [\sin(\theta_{ec})\cos(\theta_{ef}) + \cos(\theta_{ec})\sin(\theta_{ef})](r_i)$$

$$f^*(i) = X_w f_x + f_x(t_{xbias}) - [\cos(\theta_{ec})\cos(\theta_{ef}) - \sin(\theta_{ec})\sin(\theta_{ef})](q_i^*) - [\sin(\theta_{ec})\cos(\theta_{ef}) + \cos(\theta_{ec})\sin(\theta_{ef})](r_i^*)$$

and $$g_e = 1 - \cos^2\theta_{ec} - \sin^2\theta_{ec}$$

Equation 48B can then be used in a similar manner to Equations 48A, 49A, 49B, and 50 to iteratively solve for the three extrinsic camera calibration values: the camera's contribution to the elevation angle, $\theta_{ec}$, $t_{xbias}$, and $t_{ybias}$ which comprise the extrinsic camera calibration values for this modified first configuration having a non-zero elevation angle $\theta_x$ and X-direction offset $t_{xbias}$.

When both an elevation angle $\theta_x$ and a deflection angle $\theta_z$ are present, then all three of the respective world coordinate values ($X_w$, $Y_w$, $Z_w$) for each pallet location may be used to calculate the extrinsic camera calibration values. In particular, the $X_w$ value for a particular pallet location may be considered as being relative to a reference pallet location such as, for example, the bottom most pallet location (e.g., 3006 of FIG. 30). In order to do so, the horizontal offset value, $t_{xbias}$, may be defined in a particular manner to aid the calibration process. As discussed earlier, the imaging camera 130 may be attached to the vehicle frame in such a way that it has an X-coordinate value offset from the world coordinate origin 2706 by a bias value (i.e., $tc_x = t_{xbias}$). During calibration, the vehicle 20 can be carefully positioned so that the location on the vehicle 20 that has been designated as the world origin 2706 is substantially aligned in the X-direction with the bottom most pallet location (e.g., 3006 of FIG. 30). As a result, a horizontal world coordinate $X_3$ may be defined as equal to zero and the horizontal world coordinate $X_2$ may be obtained by measuring a horizontal distance between a lower center of a central pallet stringer at pallet location 3004 and a center of the lower central pallet stringer at pallet location 3006. A horizontal coordinate $X_i$ for pallet location 3002 may be measured in a similar fashion. As a result, the process described below will permit a calibration value for $t_{xbias}$ to be determined.

When a deflection angle is also present, the linear equations of Equation 24B can be rearranged to provide the residual equations, for a scored candidate object i, of Equation 51A:

$$f_1(i) = ((x_i - x_0)\sin\theta_x \sin\theta_z - f_x \cos\theta_z)X_i +$$
$$((x_i - x_0)\cos\theta_z \sin\theta_x)Y_i + ((x_i - x_0)\cos\theta_x)Z_i - f_x t_{xbias}$$
$$f_2(i) = (((y_i - y_0)\sin\theta_x - f_y \cos\theta_x)\sin\theta_z)X_i +$$
$$(((y_i y_0)\sin\theta_x - f_y \cos\theta_x)\cos\theta_z)Y_i +$$
$$((y_i y_0)\cos\theta_x + f_y \sin\theta_x)Z_i - f_y(t_y + t_{ybias})$$

The two other residual equations are provided by Equation 51B:

$$g_e = \cos^2\theta_{ec} + \sin^2\theta_{ec} - 1$$

$$g_d = \cos^2\theta_z + \sin^2\theta_z - 1$$

where $\theta_x = \theta_{ec} + \theta_{ef}$.

The Newton-Rhapson iterative method described above with respect to the elevation angle-only scenario may be applied in a similar manner to the present scenario where the extrinsic camera parameters to be calculated are a deflection angle $\theta_z$, a camera elevation angle, $\theta_{ec}$, an x-bias value, $t_{xbias}$, and a y bias value, $t_{ybias}$. For at least two potential pallet locations in the image plane 3010, a matrix [F'] can be defined as Equation 52:

$$F' = \begin{bmatrix} g_e \\ g_d \\ f_1(0) \\ f_2(0) \\ f_1(1) \\ f_2(1) \\ \vdots \end{bmatrix}$$

Based on the matrix [F'] a corresponding Jacobian matrix [J'] can be calculated according to Equation 53:

$$J' = \begin{bmatrix} \frac{\partial}{\partial \cos\theta_{ec}}g_e & \frac{\partial}{\partial \sin\theta_{ec}}g_e & \frac{\partial}{\partial \cos\theta_z}g_e & \frac{\partial}{\partial \sin\theta_z}g_e & \frac{\partial}{\partial t_{xbias}}g_e & \frac{\partial}{\partial t_{ybias}}g_e \\ \frac{\partial}{\partial \cos\theta_{ec}}g_d & \frac{\partial}{\partial \sin\theta_{ec}}g_d & \frac{\partial}{\partial \cos\theta_z}g_d & \frac{\partial}{\partial \sin\theta_z}g_d & \frac{\partial}{\partial t_{xbias}}g_d & \frac{\partial}{\partial t_{ybias}}g_d \\ \frac{\partial}{\partial \cos\theta_{ec}}f_1(0) & \frac{\partial}{\partial \sin\theta_{ec}}f_1(0) & \frac{\partial}{\partial \cos\theta_z}f_1(0) & \frac{\partial}{\partial \sin\theta_z}f_1(0) & \frac{\partial}{\partial t_{xbias}}f_1(0) & \frac{\partial}{\partial t_{ybias}}f_1(0) \\ \frac{\partial}{\partial \cos\theta_{ec}}f_2(0) & \frac{\partial}{\partial \sin\theta_{ec}}f_2(0) & \frac{\partial}{\partial \cos\theta_z}f_2(0) & \frac{\partial}{\partial \sin\theta_z}f_2(0) & \frac{\partial}{\partial t_{xbias}}f_2(0) & \frac{\partial}{\partial t_{ybias}}f_2(0) \\ \frac{\partial}{\partial \cos\theta_{ec}}f(1) & \frac{\partial}{\partial \sin\theta_{ec}}f(1) & \frac{\partial}{\partial \cos\theta_z}f(1) & \frac{\partial}{\partial \sin\theta_z}f(1) & \frac{\partial}{\partial t_{xbias}}f(1) & \frac{\partial}{\partial t_{ybias}}f(1) \\ \frac{\partial}{\partial \cos\theta_{ec}}f_2(1) & \frac{\partial}{\partial \sin\theta_{ec}}f_2(1) & \frac{\partial}{\partial \cos\theta_z}f_2(1) & \frac{\partial}{\partial \sin\theta_z}f_2(1) & \frac{\partial}{\partial t_{xbias}}f_2(1) & \frac{\partial}{\partial t_{ybias}}f_2(1) \\ \vdots & \vdots & \vdots & \vdots & \vdots & \vdots \end{bmatrix}$$

Investigating just the first row of [F'] and [J'] reveals how these matrices can be used to perform the iterative process to solve for the extrinsic camera calibration values for this configuration where both an elevation angle and deflection angle are present. For example, the first row of [F'] provides:

$$g_e = \cos^2\theta_{ec} \sin^2\theta_{ec} - 1$$

and the first row of [J'] provides:

$$[2\cos\theta_{ec} \; 2\sin\theta_{ec} \; 0 \; 0 \; 0 \; 0]$$

The Taylor series expansion of the first row of [F'] (set equal to zero) provides:

$$0 = \cos^2\theta_{ec} + \sin^2\theta_{ec} - 1 + (2\cos\theta_{ec} * p_0) + (2\sin\theta_{ec} * p_1)$$

which can be rearranged to provide Equation 54:

$$(2\cos\theta_{ec} * p_0) + (2\sin\theta_{ec} * p_1) = -\cos^2\theta_{ec} - \sin^2\theta_{ec} + 1$$

As a result, an equation analogous to Equation 49B for this current configuration for performing extrinsic camera calibration is provided by Equation 55A:

$$[J']\begin{bmatrix} p_0 \\ p_1 \\ p_2 \\ p_3 \\ p_4 \\ p_5 \end{bmatrix} = -[F']$$

which can be manipulated to form Equation 55B:

$$\begin{bmatrix} p_0 \\ p_1 \\ p_2 \\ p_3 \\ p_4 \\ p_5 \end{bmatrix} = -([J']^T[J'])^{-1}[J']^T[F']$$

Accordingly, Equation 55B reveals that respective observations of multiple pallets and a respective estimate for $\cos\theta_{ec}$, $\sin\theta_{ec}$, $\cos\theta_z$, $\sin\theta_z$, $t_{xbias}$ and $t_{ybias}$ can be used to provide a least squares solution for the vector of values $$\begin{bmatrix} p_0 \\ p_1 \\ p_2 \\ p_3 \\ p_4 \\ p_5 \end{bmatrix}.$$

This vector of values $$\begin{bmatrix} p_0 \\ p_1 \\ p_2 \\ p_3 \\ p_4 \\ p_5 \end{bmatrix}$$

can be used to iteratively update the respective estimate for $\cos\theta_{ec}$, $\sin\theta_{ec}$, $\cos\theta_z$, $\sin\theta_z$, $t_{xbias}$ and $t_{ybias}$ according to Equation 56A:

$\cos\theta_{ec}(t+1) = \cos\theta_{ec}(t) + p_0$ $\sin\theta_{ec}(t+1) = \sin\theta_{ec}(t) + p_1$ $\cos\theta_z(t+1) = \cos\theta_z(t) + p_2$ $\sin\theta_z(t+1) = \sin\theta_z(t) + p_3$ $t_{xbias}(t+1) = t_{xbias}(t) + p_4$ $t_{ybias}(t+1) = t_{ybias}(t) + p_5$ The updated estimates for $\cos\theta_{ec}$, $\sin\theta_{ec}$, $\cos\theta_z$, $\sin\theta_z$, $t_{xbias}$ and $t_{ybias}$ can then be used in Equation 55B to find new values for $$\begin{bmatrix} p_0 \\ p_1 \\ p_2 \\ p_3 \\ p_4 \\ p_5 \end{bmatrix}.$$

This iterative process may be repeated until each of the calculated values for $$\begin{bmatrix} p_0 \\ p_1 \\ p_2 \\ p_3 \\ p_4 \\ p_5 \end{bmatrix}$$

are smaller than a predetermined threshold. For example, this predetermined threshold may be $10^{-6}$. Once the iterative process completes, a respective value for $\cos\theta_{ec}$, $\sin\theta_{ec}$, $\cos\theta_z$, $\sin\theta_z$, $t_{xbias}$ and $t_{ybias}$ has been calculated and the camera's contribution to the elevation angle, $\theta_{ec}$, can be determined from $$\theta_{ec} = \tan^{-1}\left(\frac{\sin\theta_{ec}}{\cos\theta_{ec}}\right),$$

while the deflection angle, $\theta_z$ can be determined from $$\theta_z = \tan^{-1}\left(\frac{\sin\theta_z}{\cos\theta_z}\right).$$

The camera's contribution to the elevation angle, $\theta_{ec}$, the deflection angle, $\theta_z$, $t_{xbias}$, and $t_{ybias}$ comprise the extrinsic camera calibration values for this embodiment.

A number of the above equations are nonlinear and a variety of techniques may be employed to the iterative process to aid convergence to a solution for the extrinsic camera calibration values. First, an allowable maximum value maxSizeofp for the norm $\|P\|$ of the vector $$[P] = \begin{bmatrix} p_0 \\ p_1 \\ p_2 \\ p_3 \\ p_4 \\ p_5 \end{bmatrix}$$

may be arbitrarily selected so as to limit, or adjust, the size of [P] according to the following Equation 57:

$$[P'] = \begin{cases} maxSizeofp * \frac{[P]}{\|P\|}, & \text{if } \|P\| > maxSizeofp \\ [P], & \text{otherwise} \end{cases}$$

where, for example, maxSizeofp=10;

[P'] potentially comprises a scaled vector [P]; and the norm $\|P\|$ of the vector [P] may be, for example, the Euclidean norm such that $\|P\| = \sqrt{p_0^2 + p_1^2 + p_3^2 ... + p_n^2}$.

Another technique for avoiding divergence in the iterative process described above involves specifying a step size that reduces the effect of the offset, or step, values (e.g., $p_n$) calculated for each iteration. The vector $$[P] = \begin{bmatrix} p_0 \\ p_1 \\ p_2 \\ p_3 \\ p_4 \\ p_5 \end{bmatrix},$$

in this example, has six elements and, therefore, represents a particular direction in 6-dimensional space. For convenience, this direction can be referred to as the Newton direction. This vector [P] also represents a "step" used to calculate the updated values for Equation 56A and can conveniently be referred to as the Newton step. In some instances, using the full Newton step in the Newton direction to calculate the next iterate values in the Newton-Rhapson method may not provide the best results. While the Newton direction can be assumed to be a correct direction in which to make the step, in some instances reducing an amount of that step may be better than using the full Newton step. Accordingly, a "step-size", $\lambda$, may be calculated that is multiplied with [P] (where $0<\lambda \leq 1$) in order to determine a modified Newton step (e.g., $\lambda[P]$) that can be used to calculate the updated values for Equation 56A.

In particular, this technique involves performing a line search at each iteration of the Newton-Rhapson method to determine the step size $\lambda$ to be used when updating the values of Equation 56A. In particular, Equation 56A implies using the full Newton step or, in other words, using a step size at each iteration of $\lambda(t)=1$. However, as mentioned, a smaller step size may be used that has a value between zero and one (e.g., $0<\lambda(t)\leq 1$) which provides Equation 56B:

$$\cos \theta_{ec}(t+1) = \cos \theta_{ec}(t) + \lambda(t)p_0$$

$$\sin \theta_{ec}(t+1) = \sin \theta_{ec}(t) + \lambda(t)p_1$$

$$\cos \theta_z(t+1) = \cos \theta_z(t) + \lambda(t)p_2$$

$$\sin \theta_z(t+1) = \sin \theta_z(t) + \lambda(t)p_3$$

$$t_{xbias}(t+1) = t_{xbias}(t) + \lambda(t)p_4$$

$$t_{ybias}(t+1) = t_{ybias}(t) + \lambda(t)p_5$$

As known in the art, for example in *Numerical Recipes in C: The Art of Scientific Computing* (2nd ed.), Press, et al., 1992, Cambridge University Press, New York, N.Y., USA, a line search about a point first uses a descent direction along which an objective function will be reduced and then computes a step size that decides how far to move in that direction. The step size represents a distance from a starting point that minimizes, or generally reduces, the objective function a desired amount. One example objective function, [E], useful in the above-described process for extrinsic camera calibration is provided by Equation 58:

$$[E] = \frac{1}{2}[F']^T[F']$$

The goal of the line search technique is to find a step size $\lambda$ such that [E] has decreased a sufficient amount relative to a previous value. As described later, the "sufficiency" of the decrease amount is defined by acceptance conditions for a particular line search strategy. In general, the line search first calculates a value based on [E] using a full Newton step (i.e., $\lambda=1$) and determines if the acceptance conditions are met. If so, then the line search is complete. If not, then in each subsequent iteration the line search backtracks along the line that extends in the Newton direction by using a smaller value for $\lambda$. This process can repeat with smaller and smaller values of $\lambda$ until the acceptance conditions are satisfied.

A variety of different line search techniques may be used such as, for example, an interpolated line search, a bisection line search, a Regula-Falsi line search, a secant line search, and others. One example line search technique, the Armijo Rule line search, is more fully explained below. In this example, $\lambda(t)$ refers to the eventual step size that is calculated for a current iteration of the Newton-Rhapson method. However, the line search method itself is also iterative and an index symbol "n" refers to a current iteration of the line search.

As mentioned above, the line search first calculates a value based on the objective function [E]. The function [E] at a particular iteration of the Newton-Rhapson method can be calculated using current iterate values and a current Newton step but with different test values for a step size $\lambda$. Thus, for an iteration t, the objective function [E] can be considered a function that is dependent on the value of a step size $\lambda$. In particular, the iterate values calculated by the Newton-Rhapson method, in this particular configuration of the imaging camera 130, from Equation 56B along with the Newton step [P] can be used to define Equation 56C:

$$[V(n+1)] = [V(n)] + \lambda(n)[P]$$

where $$[V(n+1)] = \begin{bmatrix} \cos\theta_{ec}(n+1) \\ \sin\theta_{ec}(n+1) \\ \cos\theta_z(n+1) \\ \sin\theta_z(n+1) \\ t_{xbias}(n+1) \\ t_{ybias}(n+1) \end{bmatrix}$$

and $$[V(n)] = \begin{bmatrix} \cos\theta_{ec}(n) \\ \sin\theta_{ec}(n) \\ \cos\theta_z(n) \\ \sin\theta_z(n) \\ t_{xbias}(n) \\ t_{ybias}(n) \end{bmatrix}$$

Equation 56C reveals how the values [V(n)] that are used to determine [F] (and, thus, also determine [E]) can change based on a particular step size $\lambda(n)$ that is chosen. In particular, in Equation 56C, the values for [V(n)] correspond to the iterate values for the current iteration of the Newton-Rhapson method and [P] is the Newton step from the current iteration of the Newton-Rhapson method. Accordingly, for a particular iteration, n, of the line search a changing value for the step size $\lambda(n)$ is tested that results in different values for [V(n+1)] that are used when calculating a value for [E]. Thus, a line search function $G(\lambda)$, for a particular iteration of the Newton-Rhapson method can be defined according to:

$$G(\lambda)=[E]$$

where $G(\lambda)$ denotes that G is a function of a step size, $\lambda$, and [E] denotes a value of the objective function [E] for iteration t of the Newton-Rhapson method.

A first order approximation of G(λ) is given by Equation 56D:

$$\hat{G}(\lambda) = G(0) + \lambda \varepsilon \frac{dG(0)}{d\lambda}$$

Using a full Newton step, the line search starts with n=1 and λ(1)=1. The line search iteratively determines if the acceptance condition: $G(\lambda(n)) \leq \hat{G}(\lambda(n))$ is satisfied. If so, then λ(n) is considered an acceptable step size and used as λ(t) in Equation 56B. If the inequality fails, however, then the step size is reduced according to:

$$\lambda(n+1) = \frac{\lambda(n)}{2}$$

and the line search continues with a next iteration. The value for ε in Equation 56D can be arbitrarily chosen to be between 0 and 1 such as, for example ε=0.5.

Thus, the previously described Newton-Rhapson iterative process described above with respect to Equation 56A may be modified for each iteration, t, to help ensure convergence by first calculating the solution for Equation 55B, as previously described, according to:

$$\begin{bmatrix} p_0 \\ p_1 \\ p_2 \\ p_3 \\ p_4 \\ p_5 \end{bmatrix} = -([J']^T[J'])^{-1}[J']^T[F']$$

However, before using these values to update the values for cos θ$_{ec}$, sin θ$_{ec}$, cos θ$_z$, sin θ$_z$, t$_{xbias}$ and t$_{ybias}$ to be used in the next iteration, (t+1), they are adjusted using the techniques just described. In particular, the values for [P] can potentially be limited according to Equation 57:

$$[P'] = \begin{cases} maxSizeofp * \frac{[P]}{\|P\|}, & \text{if } \|P\| > maxSizeofp \\ [P], & \text{otherwise} \end{cases}$$

to produce limited offset values:

$$\begin{bmatrix} p'_0 \\ p'_1 \\ p'_2 \\ p'_3 \\ p'_4 \\ p'_5 \end{bmatrix}$$

The vector [P'] is considered to specify a full Newton step and Newton direction for a current iteration of the Newton-Rhapson method. Additionally, using the values, a line search using the function [E] for the current iteration, t, may be performed in order to calculate a step size λ(t) to be used when updating the values for cos θ$_{ec}$, sin θ$_{ec}$, cos θ$_z$, sin θ$_z$, t$_{xbias}$ and t$_{ybias}$. Thus, an analogous equation for Equation 56B is provided by Equation 56E:

$$\cos \theta_{ec}(t+1)' = \cos \theta_{ec}(t) + \lambda(t) p_0'$$

$$\sin \theta_{ec}(t+1)' = \sin \theta_{ec}(t) + \lambda(t) p_1'$$

$$\cos \theta_z(t+1)' = \cos \theta_z(t) + \lambda(t) p_2'$$

$$\sin \theta_z(t+1)' = \sin \theta_z(t) + \lambda(t) p_3'$$

$$t_{xbias}(t+1) = t_{xbias}(t) + \lambda(t) p_4'$$

$$t_{ybias}(t+1) = t_{ybias}(t) + \lambda(t) p_5'$$

It is these new values for cos θ$_{ec}$', sin θ$_{ec}$', cos θ$_z$', sin θ$_z$', t$_{xbias}$' and t$_{ybias}$' that are then used in the next iteration of the process for extrinsic camera calibration.

A third configuration of calibrating the imaging camera 130 involves a full rotation matrix that includes a non-zero value for θ$_x$, the elevation angle, θ$_y$, the pitch angle, θ$_z$ the deflection angle, t$_{xbias}$, and t$_{ybias}$. Similar to Equation 30F, the following residual equations can be defined to address the elements of a full rotation matrix for each potential pallet object.

$$f_1(k) = (a_k X_w + b_k Y_w + c_k Z_w - f_x t_{xbias})$$

$$f_2(k) = (d_k X_w + e_k Y_w + f_k Z_w - f_y(t_y + t_{ybias})) \qquad \text{Equation 59A}$$

where: $a_k = x_k r_{20} - f_x r_{00} - x_0 r_{20}$ $b_k = x_k r_{21} - f_x r_{01} - x_0 r_{21}$ $c_k = x_k r_{22} - f_x r_{02} - x_0 r_{22}$ $d_k = y_k r_{20} - f_y r_{10} - y_0 r_{20}$ $e_k = y_k r_{21} - f_y r_{11} - y_0 r_{21}$ $f_k = y_k r_{22} - f_y r_{12} - y_0 r_{22}$ Additional residual equations can be provided by Equation 59B:

$$g_e = \cos^2 \theta_{ec} + \sin^2 \theta_{ec} - 1$$

$$g_p = \cos^2 \theta_y \sin^2 \theta_y - 1$$

$$g_d = \cos^2 \theta_z + \sin^2 \theta_z - 1$$

where $\theta_x = \theta_{ec} + \theta_{ef}$.

Using these residual equations produces analogous matrices to Equations 52 and 53. For example:

$$F'' = \begin{bmatrix} g_e \\ g_p \\ g_d \\ f_1(0) \\ f_2(0) \\ f_1(1) \\ f_2(1) \\ \vdots \end{bmatrix}$$

$$J'' = \begin{bmatrix} \frac{\partial}{\partial \cos\theta_{ec}} g_e & \frac{\partial}{\partial \sin\theta_{ec}} g_e & \frac{\partial}{\partial \cos\theta_y} g_e & \frac{\partial}{\partial \sin\theta_y} g_e & \frac{\partial}{\partial \cos\theta_z} g_e & \frac{\partial}{\partial \sin\theta_z} g_e & \frac{\partial}{\partial t_{xbias}} g_e & \frac{\partial}{\partial t_{ybias}} g_e \\ \frac{\partial}{\partial \cos\theta_{ec}} g_p & \frac{\partial}{\partial \sin\theta_{ec}} g_p & \frac{\partial}{\partial \cos\theta_y} g_p & \frac{\partial}{\partial \sin\theta_y} g_p & \frac{\partial}{\partial \cos\theta_z} g_p & \frac{\partial}{\partial \sin\theta_z} g_p & \frac{\partial}{\partial t_{xbias}} g_p & \frac{\partial}{\partial t_{ybias}} g_p \\ \frac{\partial}{\partial \cos\theta_{ec}} g_d & \frac{\partial}{\partial \sin\theta_{ec}} g_d & \frac{\partial}{\partial \cos\theta_y} g_d & \frac{\partial}{\partial \sin\theta_y} g_d & \frac{\partial}{\partial \cos\theta_z} g_d & \frac{\partial}{\partial \sin\theta_z} g_d & \frac{\partial}{\partial t_{xbias}} g_d & \frac{\partial}{\partial t_{ybias}} g_d \\ \frac{\partial}{\partial \cos\theta_{ec}} f_1(0) & \frac{\partial}{\partial \sin\theta_{ec}} f_1(0) & \frac{\partial}{\partial \cos\theta_y} f_1(0) & \frac{\partial}{\partial \sin\theta_y} f_1(0) & \frac{\partial}{\partial \cos\theta_z} f_1(0) & \frac{\partial}{\partial \sin\theta_z} f_1(0) & \frac{\partial}{\partial t_{xbias}} f_1(0) & \frac{\partial}{\partial t_{ybias}} f_1(0) \\ \frac{\partial}{\partial \cos\theta_{ec}} f_2(0) & \frac{\partial}{\partial \sin\theta_{ec}} f_2(0) & \frac{\partial}{\partial \cos\theta_y} f_2(0) & \frac{\partial}{\partial \sin\theta_y} f_2(0) & \frac{\partial}{\partial \cos\theta_z} f_2(0) & \frac{\partial}{\partial \sin\theta_z} f_2(0) & \frac{\partial}{\partial t_{xbias}} f_2(0) & \frac{\partial}{\partial t_{ybias}} f_2(0) \\ \frac{\partial}{\partial \cos\theta_{ec}} f(1) & \frac{\partial}{\partial \sin\theta_{ec}} f(1) & \frac{\partial}{\partial \cos\theta_y} f(1) & \frac{\partial}{\partial \sin\theta_y} f(1) & \frac{\partial}{\partial \cos\theta_z} f(1) & \frac{\partial}{\partial \sin\theta_z} f(1) & \frac{\partial}{\partial t_{xbias}} f(1) & \frac{\partial}{\partial t_{ybias}} f(1) \\ \frac{\partial}{\partial \cos\theta_{ec}} f_2(1) & \frac{\partial}{\partial \sin\theta_{ec}} f_2(1) & \frac{\partial}{\partial \cos\theta_y} f_2(1) & \frac{\partial}{\partial \sin\theta_y} f_2(1) & \frac{\partial}{\partial \cos\theta_z} f_2(1) & \frac{\partial}{\partial \sin\theta_z} f_2(1) & \frac{\partial}{\partial t_{xbias}} f_2(1) & \frac{\partial}{\partial t_{ybias}} f_2(1) \\ \vdots & \vdots & \vdots & \vdots & \vdots & \vdots & \vdots & \vdots \end{bmatrix}$$

As a result, an equation analogous to Equation 49B for this current configuration for performing extrinsic camera calibration is provided by Equation 60A:

$$[J''] \begin{bmatrix} p_0 \\ p_1 \\ p_2 \\ p_3 \\ p_4 \\ p_5 \\ p_6 \\ p_7 \end{bmatrix} = -[F'']$$

which can be manipulated to form Equation 60B:

$$\begin{bmatrix} p_0 \\ p_1 \\ p_2 \\ p_3 \\ p_4 \\ p_5 \\ p_6 \\ p_7 \end{bmatrix} = -([J'']^T [J''])^{-1} [J'']^T [F'']$$

Accordingly, Equation 60B reveals that respective observations of multiple pallets and a respective estimate for $\cos\theta_{ec}$, $\sin\theta_{ec}$, $\cos\theta_y$, $\sin\theta_y$, $\cos\theta_z$, $\sin\theta_z$, $t_{xbias}$ and $t_{ybias}$ can be used to provide a least squares solution for the vector of values $$\begin{bmatrix} p_0 \\ p_1 \\ p_2 \\ p_3 \\ p_4 \\ p_5 \\ p_6 \\ p_7 \end{bmatrix}.$$

This vector of values $$\begin{bmatrix} p_0 \\ p_1 \\ p_2 \\ p_3 \\ p_4 \\ p_5 \\ p_6 \\ p_7 \end{bmatrix}$$

can be used to iteratively update the respective estimate for $\cos\theta_{ec}$, $\sin\theta_{ec}$, $\cos\theta_y$, $\sin\theta_y$, $\cos\theta_z$, $\sin\theta_z$, $t_{xbias}$ and $t_{ybias}$ according to Equation 61A:

$\cos\theta_{ec}(t+1) = \cos\theta_{ec}(t) + p_0$ $\sin\theta_{ec}(t+1) = \sin\theta_{ec}(t) + p_1$ $\cos\theta_y(t+1) = \cos\theta_y(t) + p_2$ $\sin\theta_y(t+1) = \sin\theta_y(t) + p_3$ $$\cos\theta_z(t+1) = \cos\theta_z(t) + p_4$$

$$\sin\theta_z(t+1) = \sin\theta_z(t) + p_5$$

$$t_{xbias}(t+1) = t_{xbias}(t) + p_6$$

$$t_{ybias}(t+1) = t_{ybias}(t) + p_7$$

The updated estimates for $\cos\theta_{ec}$, $\sin\theta_{ec}$, $\cos\theta_y$, $\sin\theta_y$, $\cos\theta_z$, $\sin\theta_z$, $t_{xbias}$ and $t_{ybias}$ can then be used in Equation 60B to find new values for $$\begin{bmatrix} p_0 \\ p_1 \\ p_2 \\ p_3 \\ p_4 \\ p_5 \\ p_6 \\ p_7 \end{bmatrix}.$$

This iterative process may be repeated until each of the calculated values for $$\begin{bmatrix} p_0 \\ p_1 \\ p_2 \\ p_3 \\ p_4 \\ p_5 \\ p_6 \\ p_7 \end{bmatrix}$$

are smaller than a predetermined threshold. For example, this predetermined threshold may be $10^{-6}$. Once the iterative process completes, a respective value for each of $\cos\theta_{ec}$, $\sin\theta_{EC}$, $\cos\theta_y$, $\sin\theta_y$, $\cos\theta_z$, $\sin\theta_z$, $t_{xbias}$ and $t_{ybias}$ has been calculated and the camera's contribution to the elevation angle, $\theta_{EC}$, can be determined from $$\theta_{ec} = \tan^{-1}\left(\frac{\sin\theta_{ec}}{\cos\theta_{ec}}\right),$$

the pitch angle $\theta_y$, can be determined from $$\theta_y = \tan^{-1}\left(\frac{\sin\theta_y}{\cos\theta_y}\right),$$

and the deflection angle, $\theta_z$, can be determined from $$\theta_z = \tan^{-1}\left(\frac{\sin\theta_z}{\cos\theta_z}\right).$$

Additionally, the previously described techniques for avoiding divergence may be applied as well to this particular configuration for performing extrinsic camera calibration.

While the foregoing disclosure discusses illustrative aspects and/or embodiments, it should be noted that various changes and modifications could be made herein without departing from the scope of the described aspects and/or embodiments as defined by the appended claims. For example, a number of two-dimensional image analysis techniques are described above for analyzing an image frame in order to identify, locate, score and prune potential pallet objects and some of their individual features. These techniques are equally applicable to image frames captured using a single camera system or a dual camera system. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for evaluating a possible center stringer of a pallet comprising:
providing a first Ro image comprising pixels that may generally correspond to an orthogonal distance from an origin point to one or more possible vertical left lines in a corresponding gray scale image;
providing a second Ro image comprising pixels that may generally correspond to an orthogonal distance from an origin point to one or more possible vertical right lines in the corresponding gray scale image;
identifying, using a computer, a possible lower left corner location of a center stringer in the corresponding gray scale image;
determining, using the computer, an upper left corner location based on the possible lower left corner location;
identifying, using the computer, a possible lower right corner location of the center stringer in the corresponding gray scale image; and
determining, using the computer, an upper right corner location based on the possible lower right corner location.

2. The method of claim 1, wherein the upper left corner location is horizontally aligned with the possible lower left corner location and located a predetermined number of pixels above the possible lower left corner location.

3. The method of claim 2, wherein the upper right corner location is horizontally aligned with the possible lower right corner location and located the predetermined number of pixels above the possible lower right corner location.

4. The method of claim 1, further comprising:
calculating a left vertical stringer line extending between the possible lower left corner location and the upper left corner location.

5. The method of claim 4, wherein calculating a left vertical stringer line further comprises calculating:

$$\varphi_1 = \tan^{-1}\left(\frac{P_{LowerLeft}(y) - P_{UpperLeft}(y)}{P_{LowerLeft}(x) - P_{UpperLeft}(x)}\right)$$

$$\rho_{1desired} = -P_{LowerLeft}(x)\sin\varphi_1 + P_{LowerLeft}(y)\cos\varphi_1$$

wherein:
$\phi_1$=is an angle between a horizontal line and the left vertical stringer line;
$P_{LowerLeft}(y)$=a Y coordinate value for the possible lower left corner location;
$P_{UpperLeft}(y)$=a Y coordinate value for the upper left corner location;
$P_{LowerLeft}(x)$=an X coordinate value for the possible lower left corner location;

$P_{UpperLeft}(x)$=an X coordinate value for the upper left corner location;

$\rho_{1desired}$=an orthogonal distance from an origin point on the corresponding gray scale image to a vertical line passing through the possible lower left corner location and the upper left corner location.

6. The method of claim 5, further comprising:
identifying a plurality of contiguous pixel locations adjacent the possible lower left corner location and extending vertically upwards, the plurality of pixel locations comprising $h_{left}$ pixels.

7. The method of claim 6, wherein:

$$h_{left} = \min(P_{LowerLeft}(y) - P_{UpperLeft}(y), 10).$$

8. The method of claim 7, further comprising:
calculating a score value, $\text{Score}_{left}$, that represents a likelihood that the plurality of contiguous pixel locations correspond to an actual stringer left edge in the corresponding gray scale image, wherein:

$$Score_{left} = \frac{A_1}{h_{left}}$$

where $A_1$ is an accumulator value that is incremented each time the following inequality is true:

$$|\rho(x_i, y_i) - \rho_{1desired}| \le TOL4 * \rho_{1desired}$$

wherein:
i=an index value referring to x and y coordinates of one particular pixel location of the plurality of contiguous pixel locations, the index value ranging from 1 to $h_{left}$;
$\rho(x_i, y_i)$=a value of an $i^{th}$ pixel in the first Ro image at the one particular pixel location of the plurality of contiguous pixel locations;
TOL4=an empirically determined value equal to 0.5.

9. The method of claim 1, further comprising:
calculating a right vertical stringer line extending between the possible lower right corner location and the upper right corner location.

10. The method of claim 9, wherein calculating a right vertical stringer line further comprises calculating:

$$\varphi_2 = \tan^{-1}\left(\frac{P_{LowerRight}(y) - P_{UpperRight}(y)}{P_{LowerRight}(x) - P_{UpperRight}(x)}\right)$$

$$\rho_{2desired} = -P_{LowerRight}(x)\sin\varphi_2 + P_{LowerRight}(y)\cos\varphi_2$$

wherein:
$\phi_2$=is an angle between a horizontal line and the right vertical stringer line;
$P_{LowerRight}(y)$=a Y coordinate value for the possible lower right corner location;
$P_{UpperRight}(y)$=a Y coordinate value for the upper right corner location;
$P_{LowerRight}(x)$=an X coordinate value for the possible lower right corner location;
$P_{UpperRight}(x)$=an X coordinate value for the upper right corner location;
$\rho_{2desired}$=an orthogonal distance from an origin point on the corresponding gray scale image to a vertical line passing through the possible lower right corner location and the upper right corner location.

11. The method of claim 10, further comprising:
identifying a plurality of contiguous pixel locations adjacent the possible lower right corner and extending vertically upwards, the plurality of pixel locations comprising $h_{right}$ pixels.

12. The method of claim 11, wherein:

$$h_{right} = \min(P_{LowerRight}(y) - P_{UpperRight}(y), 10).$$

13. The method of claim 12, further comprising:
calculating a score value, $\text{Score}_{right}$, that represents a likelihood that the plurality of contiguous pixel locations correspond to an actual stringer right edge in the corresponding gray scale image, wherein:

$$Score_{right} = \frac{A_2}{h_{right}}$$

where $A_2$ is an accumulator value that is incremented each time the following inequality is true:

$$|\rho(x_j, y_j) - \rho_{2desired}| \le TOL4 * \rho_{2desired}$$

wherein:
j=an index value referring to x and y coordinates of one particular pixel location of the plurality of contiguous pixel locations, the index value ranging from 1 to $h_{right}$;
$\rho(x_j, y_j)$=a value of $j^{th}$ pixel in the second Ro image at the one particular pixel location of the plurality of contiguous pixel locations;
TOL4=an empirically determined value equal to 0.5.

14. A system for evaluating a possible center stringer of a pallet comprising:
a memory storage device;
a computer configured to execute instructions stored in the memory storage device;
a first Ro image comprising pixels that may generally correspond to an orthogonal distance from an origin point to one or more possible vertical left lines in a corresponding gray scale image;
a second Ro image comprising pixels that may generally correspond to an orthogonal distance from an origin point to one or more possible vertical right lines in the corresponding gray scale image;
the computer when executing instructions stored in the memory storage device:
identifies a possible lower left corner location of a center stringer in the corresponding gray scale image;
determines an upper left corner location based on the possible lower left corner location;
identifies a possible lower right corner location of the center stringer in the corresponding gray scale image; and
determines an upper right corner location based on the possible lower right corner location.

15. The system of claim 14, wherein the upper left corner location is horizontally aligned with the possible lower left corner location and located a predetermined number of pixels above the possible lower left corner location.

16. The system of claim 15, wherein the upper right corner location is horizontally aligned with the possible lower right corner location and located the predetermined number of pixels above the possible lower right corner location.

17. The system of claim 14, wherein the computer when executing instructions stored in the memory storage device:
calculates a left vertical stringer line extending between the possible lower left corner location and the upper left corner location.

18. The system of claim 17, wherein the computer when calculating the left vertical stringer line, calculates:

$$\varphi_1 = \tan^{-1}\left(\frac{P_{LowerLeft}(y) - P_{UpperLeft}(y)}{P_{LowerLeft}(x) - P_{UpperLeft}(x)}\right)$$

$$\rho_{1desired} = -P_{LowerLeft}(x)\sin\varphi_1 + P_{LowerLeft}(y)\cos\varphi_1$$

$\rho_{1desired} = -P_{LowerLeft}(x)\sin\phi_1 + P_{LowerLeft}(y)\cos\phi_1$ wherein:
- $\phi_1$=is an angle between a horizontal line and the left vertical stringer line;
- $P_{LowerLeft}(y)$=a Y coordinate value for the possible lower left corner location;
- $P_{UpperLeft}(y)$=a Y coordinate value for the upper left corner location;
- $P_{LowerLeft}(x)$ an X coordinate value for the possible lower left corner location;
- $P_{UpperLeft}(x)$ an X coordinate value for the upper left corner location;
- $\rho_{1desired}$=an orthogonal distance from an origin point on the corresponding gray scale image to a vertical line passing through the possible lower left corner location and the upper left corner location.

19. The system of claim 18, wherein the computer when executing instructions stored in the memory storage device:
identifies a plurality of contiguous pixel locations adjacent the possible lower left corner location and extending vertically upwards, the plurality of pixel locations comprising $h_{left}$ pixels.

20. The system of claim 19, wherein:

$$h_{left} = \min(P_{LowerLeft}(y) - P_{UpperLeft}(y), 10).$$

21. The system of claim 20, wherein the computer when executing instructions stored in the memory storage device:
calculates a score value, $Score_{left}$, that represents a likelihood that the plurality of contiguous pixel locations correspond to an actual stringer left edge in the corresponding gray scale image, wherein:

$$Score_{left} = \frac{A_1}{h_{left}}$$

where $A_1$ is an accumulator value that is incremented each time the following inequality is true:

$$|\rho(x_i, y_i) - \rho_{1desired}| \leq TOL4 * \rho_{1desired}$$

wherein:
- i=an index value referring to x and y coordinates of one particular pixel location of the plurality of contiguous pixel locations, the index value ranging from 1 to $h_{left}$;
- $\rho(x_i, y_i)$=a value of an $i^{th}$ pixel in the first Ro image at the one particular pixel location of the plurality of contiguous pixel locations;
- TOL4=an empirically determined value equal to 0.5.

22. The system of claim 14, wherein the computer when executing instructions stored in the memory storage device:
calculates a right vertical stringer line extending between the possible lower right corner location and the upper right corner location.

23. The system of claim 22, wherein the computer when calculating the right vertical stringer line, calculates:

$$\varphi_2 = \tan^{-1}\left(\frac{P_{LowerRight}(y) - P_{UpperRight}(y)}{P_{LowerRight}(x) - P_{UpperRight}(x)}\right)$$

$$\rho_{2desired} = -P_{LowerRight}(x)\sin\varphi_2 + P_{LowerRight}(y)\cos\varphi_2$$

wherein:
- $\phi_2$=is an angle between a horizontal line and the right vertical stringer line;
- $P_{LowerRight}(y)$=a Y coordinate value for the possible lower right corner location;
- $P_{UpperRight}(y)$=a Y coordinate value for the upper right corner location;
- $P_{LowerRight}(x)$=an X coordinate value for the possible lower right corner location;
- $P_{UpperRight}(x)$=an X coordinate value for the upper right corner location;
- $\rho_{1desired}$=an orthogonal distance from an origin point on the corresponding gray scale image to a vertical line passing through the possible lower right corner location and the upper right corner location.

24. The system of claim 23, wherein the computer when executing instructions stored in the memory storage device:
identifies a plurality of contiguous pixel locations adjacent the possible lower right corner and extending vertically upwards, the plurality of pixel locations comprising $h_{right}$ pixels.

25. The system of claim 24, wherein:

$$h_{right} = \min(P_{LowerRight}(y) - P_{UpperRight}(y), 10).$$

26. The system of claim 25, wherein the computer when executing instructions stored in the memory storage device:
calculates a score value, $Score_{right}$, that represents a likelihood that the plurality of contiguous pixel locations correspond to an actual stringer right edge in the corresponding gray scale image, wherein:

$$Score_{right} = \frac{A_2}{h_{right}}$$

where $A_2$ is an accumulator value that is incremented each time the following inequality is true:

$$|\rho(x_j, y_j) - \rho_{2desired}| \leq TOL4 * \rho_{2desired}$$

wherein:
- j=an index value referring to x and y coordinates of one particular pixel location of the plurality of contiguous pixel locations, the index value ranging from 1 to $h_{right}$;
- $\rho(x_j, y_j)$=a value of $j^{th}$ pixel in the second Ro image at the one particular pixel location of the plurality of contiguous pixel locations;
- TOL4=an empirically determined value equal to 0.5.

27. A computer program product for evaluating a possible center stringer of a pallet, comprising:
a non-transitory computer readable storage medium having computer readable program code embodied therewith, the computer readable program code comprising:
computer readable program code configured to analyze a first Ro image comprising pixels that may generally correspond to an orthogonal distance from an origin point to one or more possible vertical left lines in a corresponding gray scale image;
computer readable program code configured to analyze a second Ro image comprising pixels that may generally correspond to an orthogonal distance from an origin point to one or more possible vertical right lines in the corresponding gray scale image;

computer readable program code configured to identify a possible lower left corner location of a center stringer in the corresponding gray scale image;

computer readable program code configured to determine an upper left corner location based on the possible lower left corner location;

computer readable program code configured to identify a possible lower right corner location of the center stringer in the corresponding gray scale image; and computer readable program code configured to determine an upper right corner location based on the possible lower right corner location.

28. The computer program product of claim 27, wherein the upper left corner location is horizontally aligned with the possible lower left corner location and located a predetermined number of pixels above the possible lower left corner location.

29. The computer program product of claim 28, wherein the upper right corner location is horizontally aligned with the possible lower right corner location and located the predetermined number of pixels above the possible lower right corner location.

30. The computer program product of claim 27, further comprising:

computer readable program code configured to calculate a left vertical stringer line extending between the possible lower left corner location and the upper left corner location.

31. The computer program product of claim 30, wherein the computer readable program code configured to calculate a left vertical stringer line is further configured to calculate:

$$\varphi_1 = \tan^{-1}\left(\frac{P_{LowerLeft}(y) - P_{UpperLeft}(y)}{P_{LowerLeft}(x) - P_{UpperLeft}(x)}\right)$$

$$\rho_{1desired} = -P_{LowerLeft}(x)\sin\varphi_1 + P_{LowerLeft}(y)\cos\varphi_1$$

wherein:
- $\phi_1$=is an angle between a horizontal line and the left vertical stringer line;
- $P_{LowerLeft}(y)$=a Y coordinate value for the possible lower left corner location;
- $P_{UpperLeft}(y)$=a Y coordinate value for the upper left corner location;
- $P_{LowerLeft}(X)$=an X coordinate value for the possible lower left corner location;
- $P_{UpperLeft}(x)$=an X coordinate value for the upper left corner location;
- $\rho_{1desired}$=an orthogonal distance from an origin point on the corresponding gray scale image to a vertical line passing through the possible lower left corner location and the upper left corner location.

32. The computer program product of claim 31, further comprising:

computer readable program code configured to identify a plurality of contiguous pixel locations adjacent the possible lower left corner location and extending vertically upwards, the plurality of pixel locations comprising $h_{left}$ pixels.

33. The computer program product of claim 23, wherein:

$$h_{left} = \min(P_{LowerLeft}(y) - P_{UpperLeft}(y), 10).$$

34. The computer program product of claim 33, further comprising:

computer readable program code configured to calculate a score value, $Score_{left}$, that represents a likelihood that the plurality of contiguous pixel locations correspond to an actual stringer left edge in the corresponding gray scale image, wherein:

$$Score_{left} = \frac{A_1}{h_{left}}$$

where $A_1$ is an accumulator value that is incremented each time the following inequality is true:

$$|\rho(x_i, y_i) - \rho_{1desired}| \leq TOL4 * \rho_{1desired}$$

wherein:
- i=an index value referring to x and y coordinates of one particular pixel location of the plurality of contiguous pixel locations, the index value ranging from 1 to $h_{left}$;
- $\rho(x_i, y_i)$=a value of an $i^{th}$ pixel in the first Ro image at the one particular pixel location of the plurality of contiguous pixel locations;
- TOL4=an empirically determined value equal to 0.5.

35. The computer program product of claim 27, further comprising:

computer readable program code configured to calculate a right vertical stringer line extending between the possible lower right corner location and the upper right corner location.

36. The computer program product of claim 35, wherein the computer readable program code configured to calculate a right vertical stringer line is further configured to calculate:

$$\varphi_2 = \tan^{-1}\left(\frac{P_{LowerRight}(y) - P_{UpperRight}(y)}{P_{LowerRight}(x) - P_{UpperRight}(x)}\right)$$

$$\rho_{2desired} = -P_{LowerRight}(x)\sin\varphi_2 + P_{LowerRight}(y)\cos\varphi_2$$

wherein:
- $\phi_2$=is an angle between a horizontal line and the right vertical stringer line;
- $P_{LowerRight}(y)$=a Y coordinate value for the possible lower right corner location;
- $P_{UpperRight}(y)$=a Y coordinate value for the upper right corner location;
- $P_{LowerRight}(x)$=an X coordinate value for the possible lower right corner location;
- $P_{UpperRight}(x)$=an X coordinate value for the upper right corner location;
- $\rho_{2desired}$=an orthogonal distance from an origin point on the corresponding gray scale image to a vertical line passing through the possible lower right corner location and the upper right corner location.

37. The computer program product of claim 36, further comprising:

computer readable program code configured to identify a plurality of contiguous pixel locations adjacent the possible lower right corner and extending vertically upwards, the plurality of pixel locations comprising $h_{right}$ pixels.

38. The computer program product of claim 37, wherein:

$$h_{right} = \min(P_{LowerRight}(y) - P_{UpperRight}(y), 10).$$

39. The computer program product of claim 38, further comprising:

computer readable program code configured to calculate a score value, $Score_{right}$, that represents a likelihood that the plurality of contiguous pixel locations correspond to an actual stringer right edge in the corresponding gray scale image, wherein:

$$Score_{right} = \frac{A_2}{h_{right}}$$

where $A_2$ is an accumulator value that is incremented each time the following inequality is true:

$$|\rho(x_j,y_j) - \rho_{2desired}| \leq TOL4 * \rho_{2desired}$$

wherein:
- j=an index value referring to x and y coordinates of one particular pixel location of the plurality of contiguous pixel locations, the index value ranging from 1 to $h_{right}$;
- $\rho(x_j, y_j)$=a value of $j^{th}$ pixel in the second Ro image at the one particular pixel location of the plurality of contiguous pixel locations;
- TOL4=an empirically determined value equal to 0.5.

* * * * *

UNITED STATES PATENT AND TRADEMARK OFFICE
CERTIFICATE OF CORRECTION

PATENT NO.       : 8,885,948 B2
APPLICATION NO.  : 13/652546
DATED            : November 11, 2014
INVENTOR(S)      : Lee F. Holeva et al.

It is certified that error appears in the above-identified patent and that said Letters Patent is hereby corrected as shown below:

In the Claims:

Col. 143, line 63, "The computer program product of claim 23, wherein:" should read
--The computer program product of claim 32, wherein:--

Signed and Sealed this
Thirtieth Day of December, 2014

Michelle K. Lee
*Deputy Director of the United States Patent and Trademark Office*